United States Patent [19]
Park

[11] Patent Number: 6,117,039
[45] Date of Patent: Sep. 12, 2000

[54] POWERTRAIN FOR 5-SPEED AUTOMATIC TRANSMISSIONS

[75] Inventor: Jong-sool Park, Suwon-si, Rep. of Korea

[73] Assignee: Hyundai Motor Company, Seoul, Rep. of Korea

[21] Appl. No.: 09/166,277

[22] Filed: Oct. 5, 1998

[30] Foreign Application Priority Data

Oct. 8, 1997 [KR] Rep. of Korea ............... 97-51615

[51] Int. Cl.[7] ........................... F16H 57/08; F16H 57/10
[52] U.S. Cl. ................. 475/284; 475/280; 475/305
[58] Field of Search ........................... 475/269, 275, 475/280, 284, 305

[56] References Cited

U.S. PATENT DOCUMENTS

| | | | |
|---|---|---|---|
| 3,446,092 | 5/1969 | Moan | 475/275 |
| 4,143,562 | 3/1979 | Murakami et al. | 475/281 X |
| 4,263,822 | 4/1981 | Harmon | 475/280 X |
| 5,069,656 | 12/1991 | Sherman | 475/280 X |
| 5,885,184 | 3/1999 | Park | 475/280 X |
| 5,924,951 | 7/1999 | Winzeler et al. | 475/275 |
| 5,928,102 | 7/1999 | Park | 475/280 X |
| 5,941,791 | 8/1999 | Park | 475/284 |

FOREIGN PATENT DOCUMENTS 2485139  12/1981  France ................. 475/280

*Primary Examiner*—Sherry L. Estremsky
*Assistant Examiner*—Ha Ho
*Attorney, Agent, or Firm*—Finnegan, Henderson, Farabow, Garrett & Dunner, L.L.P.

[57] ABSTRACT

A powertrain used for a 5-speed automatic transmission. The powertrain includes a first compound planetary gearset and a second compound planetary gearset. The first compound planetary gearset includes first and second simple planetary gearsets having first, second, third and fourth operating elements. The second compound planetary gear unit includes third and fourth simple planetary gearsets having fifth, sixth, seventh and eighth operating elements. The fifth operating element acts as an output element, and the first operating element acts as an input element. The fifth and sixth operating elements are variably connected to the second operating element, and the seventh operating element is fixedly connected to the fourth operating element. Clutches are disposed to variably connect the fifth and sixth operating elements to the second operating element. Brakes are interposed between the fourth and eighth operating elements and a transmission housing.

393 Claims, 98 Drawing Sheets

FIG.6

| Shift Range | | 42 | 44 | 48 | 50 |
|---|---|---|---|---|---|
| R | | | | ● | ● |
| D | 1 | ● | | ● | |
| | 2 | ● | | | ● |
| | 3 | ● | ● | | |
| | 4 | | | ● | ● |
| | 5 | | ● | ● | |

6,117,039

POWERTRAIN FOR 5-SPEED AUTOMATIC TRANSMISSIONS

FIELD OF THE INVENTION

The present invention relates to a powertrain for automatic transmissions, and more particularly, to a powertrain for a 5-speed automatic transmission which can be designed to be compact in size and lightweight by reducing the number of friction elements and planetary gearsets.

BACKGROUND OF THE INVENTION

Automatic transmissions generally include a transmission control unit (TCU) for automatically controlling shift ratios according to variations in vehicle speed and load. The TCU controls friction elements, a plurality of which are provided in a powertrain, to ON and OFF states such that one of the three elements of a planetary gearset—a sun gear, ring gear, and planet carrier—acts as an input element, another a reaction element, and the last an output element, thereby controlling the number of output revolutions.

To design a powertrain so that four forward speeds and one reverse speed can be output, one compound planetary gearset, comprised of two simple planetary gearsets, and at least five friction elements are used. The compound planetary gearset is structured such that elements from one simple planetary gearset are integrated or shared with elements from the other simple planetary gearset.

However, the powertrain structured as in the above has the disadvantage of having a limited number of forward speeds, i.e., four. As a result, the powertrain cannot make full use of the power provided by engines that are being developed to deliver increasingly higher amounts of output. Also, the restrictive number of forward speeds limits the fuel efficiency of the vehicle.

As a solution, there is provided a prior art powertrain enabling the output of five forward speeds and one reverse speed. Such a powertrain is comprised of three simple planetary gearsets and at least six friction elements.

However, in such a powertrain for a 5-speed automatic transmission, to drive the vehicle in fourth or fifth-speed overdrive, there is a need for an element which rotates at a higher speed than that of a final output element. This results in a substantial amount of power loss. Further, the large number of friction elements results in a heavy and large-size automatic transmission, and acts to increase overall manufacturing costs.

SUMMARY OF THE INVENTION

The present invention has been made in an effort to solve the above problems. It is an object of the present invention to provide a powertrain for a 5-speed automatic transmission which minimizes power loss by eliminating an element rotating faster than a final output element needed in the prior art when in overdrive.

It is another object of the present invention to provide a powertrain for a 5-speed automatic transmission which can be designed to be compact in size and lightweight by reducing the number of friction elements.

To achieve the above objects, the present invention provides a powertrain for a 5-speed automatic transmission. The powertrain includes a first compound planetary gearset and a second compound planetary gearset. The first compound planetary gearset comprises first and second simple planetary gearsets having first, second, third and fourth operating elements, while the second compound planetary gear unit comprises third and fourth simple planetary gearsets having fifth, sixth, seventh and eighth operating elements.

The fifth operating element acts as an output element, and the first operating acts as an input element. The fifth and sixth operating elements are variably connected to the second operating element, and the seventh operating element is fixedly connected to the fourth operating element.

Clutches are disposed to variably connect the fifth and sixth operating elements to the second operating element, and brakes are interposed between the fourth and eighth operating elements and a transmission housing.

BRIEF DESCRIPTION OF THE DRAWINGS

These and other features, aspects, and advantages of the present invention will become better understood with regard to the following description, appended claims, and accompanying drawings where:

FIG. 6 is a chart illustrating the operation of friction elements in each shift range of a powertrain according to a preferred embodiment of the present invention;

DETAILED DESCRIPTION OF THE PREFERRED EMBODIMENTS

In the following detailed description, only the preferred embodiments of the invention have been shown and described, simply by way of illustration of the best mode contemplated by the inventor of carrying out the invention. As will be realized, the invention is capable of modification in various obvious respects, all without departing from the invention. Accordingly, the drawings and description are to be regarded as illustrative in nature, and not restrictive.

First Embodiment

Figure 1:
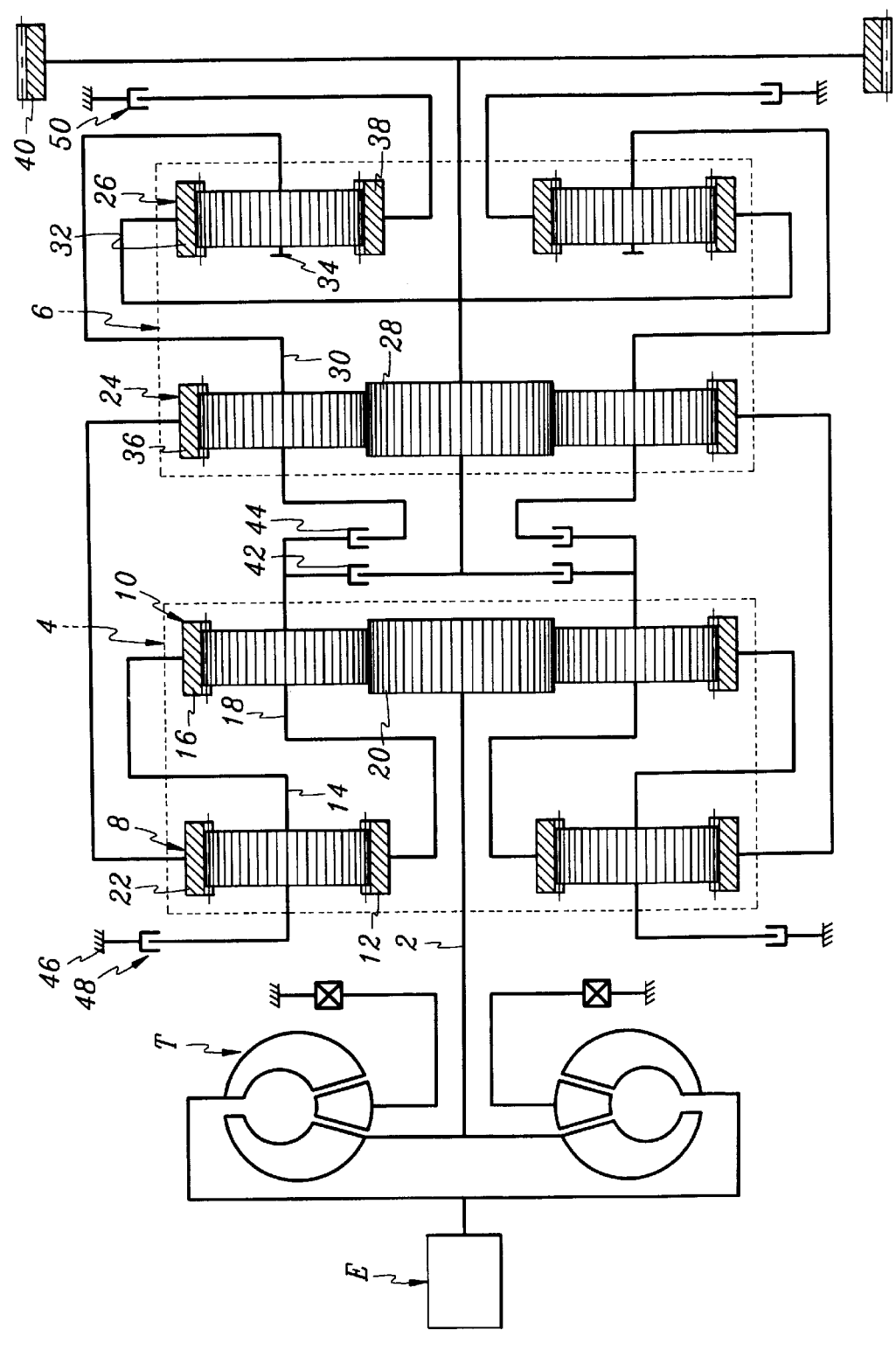
FIG. 1 is a schematic view of a powertrain according to a first preferred embodiment of the present invention.

Referring to FIG. 1, shown is a schematic view of a powertrain according to a first preferred embodiment of the present invention. As shown in the drawing, the inventive powertrain comprises an engine E for generating power, a torque converter T for multiplying torque generated from the engine E, and first and second compound planetary gearsets 4 and 6 for receiving rotational power through an input shaft 2 and for outputting five forward speeds and one reverse speed.

The first compound planetary gearset 4 is realized through a combination of a first simple planetary gearset 8 and a second simple planetary gearset 10. In the first embodiment, the first and second simple planetary gearsets 8 and 10 are single pinion planetary gearsets.

A sun gear 12 and a planet carrier 14 of the first simple planetary gearset 8 are fixedly connected respectively to a planet carrier 18 and a ring gear 16 of the second simple planetary gearset 10. Together with these two combinations, plus a sun gear 20 of the second simple planetary gearset 10, and a ring gear 22 of the first simple planetary gearset 8, four operating elements are provided in the first compound planetary gearset 4.

The second compound planetary gearset 6 is realized through a combination of a third simple planetary gearset 24 and a fourth simple planetary gearset 26, both of which are single pinion planetary gearsets in the first embodiment.

A sun gear 28 and a planet carrier 30 of the third simple planetary gearset 24 are fixedly connected respectively to a ring gear 32 and a planet carrier 34 of the fourth simple planetary gearset 26. Together with these two combinations, plus a ring gear 36 of the third simple planetary gearset 24, and a sun gear 38 of the fourth simple planetary gearset 26, four operating elements are provided in the second compound planetary gearset 6.

With regard to the combination of the first and second compound planetary gearsets 4 and 6, the ring gear 22 of the first simple planetary gearset 8 is fixedly connected to the ring gear 36 of the third simple planetary gearset 24, and a combination of the sun gear 12 and planet carrier 18 of the first and second simple planetary gearsets 8 and 10 is variably connected to both a combination of the sun gear 28 and ring gear 32 of the third and fourth simple planetary gearsets 24 and 26, and a combination of the planet carriers 30 and 34 of the third and fourth simple planetary gearsets 24 and 26. The fixedly combined sun gear 28 of the third simple planetary gearset 24 and the ring gear 32 of the fourth simple planetary gearset 26 are integrally formed with an output gear 40 such that the sun gear 28 and ring gear 32 act as output elements.

Here, because the structure and operation of the output gear 40 is well known, i.e., its differential function through a final reduction gear, an explanation thereof and illustration in FIG. 1 have been omitted.

First and second clutches 42 and 44 are provided to realize the above variable connections. Namely, the first clutch 42 connects the combination of the sun gear 12 and planet carrier 18 of the first and second simple planetary gearsets 8 and 10 to the combination of the sun gear 28 and ring gear 32 of the third and fourth simple planetary gearsets 24 and 26 in forward first, second, and third speeds; and the second clutch 44 connects the combination of the sun gear 12 and planet carrier 18 of the first and second simple planetary gearsets 8 and 10 to the combination of the planet carriers 30 and 34 of the third and fourth simple planetary gearsets 24 and 26 in forward third, fourth, and fifth speeds.

Also, first and second brakes 48 and 50 are provided to selectively enable at least one of the operating elements forming the first and second compound planetary gearsets 4 and 6 to act as a reaction element. The first brake 48 connects a combination of the planet carrier 14 and ring gear 16 of the first and second simple planetary gearsets 8 and 10 to a transmission housing 46 in forward first and fifth speeds and in reverse, and the second brake 50 connects the sun gear 38 of the fourth simple planetary gearset 26 to the transmission housing 46 in forward second and fourth speeds and in reverse.

Figure 2:
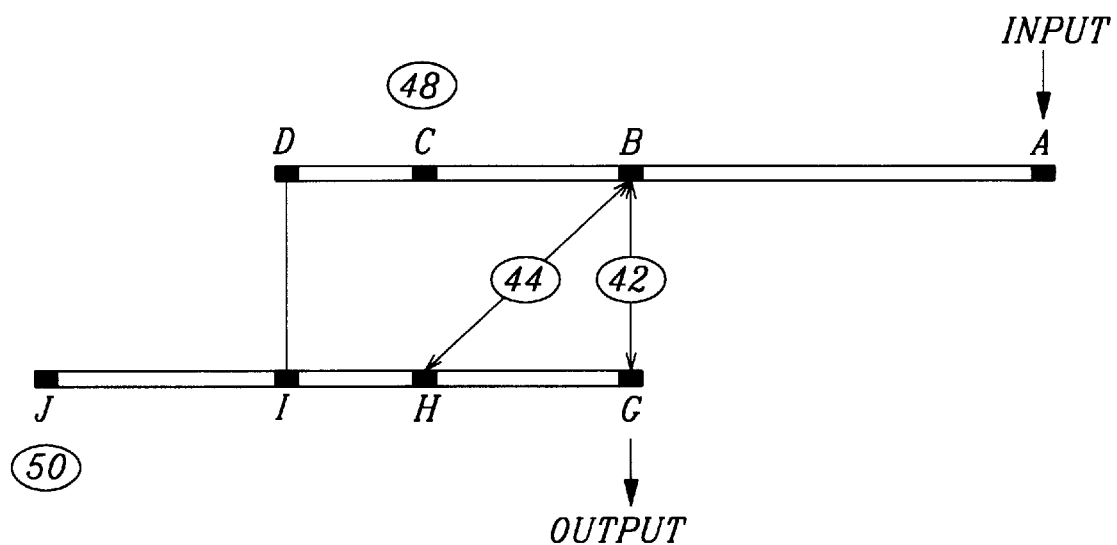
FIG. 2 is a lever analogy representation which can be obtained through powertrains according to various embodiments of the present invention.

Referring now to FIG. 2, shown is a lever analogy representation which can be obtained through powertrains according to various embodiments of the present invention. In the drawing, the first compound planetary gearset 4 is represented by a first operating element A indicating the sun gear 20 of the second simple planetary gearset 10, a second operating element B indicating a combination of the sun gear 12 and planet carrier 18 of the first and second simple planetary gearsets 8 and 10, a third operating element C indicating a combination of the planet carrier 14 and ring gear 16 of the first and second simple planetary gearsets 8 and 10, and a fourth operating element D indicating the ring gear 22 of the first simple planetary gearset 8.

In the above, the establishment of the first through fourth operating elements of the first compound planetary gearset 4 is determined by the type of planetary gearset and connecting structure. As this process is well known, a detailed description thereof is omitted.

The second compound planetary gearset 6 is represented in FIG. 2 by a first operating element G indicating a combination of the sun gear 28 and ring gear 32 of the third and fourth simple planetary gearsets 24 and 26, a second operating element H indicating a combination of the planet carriers 30 and 34 of the third and fourth simple planetary gearsets 24 and 26, a third operating element I indicating the ring gear 36 of the third simple planetary gearset 24, and a fourth operating element J indicating the sun gear 38 of the fourth simple planetary gearset 26.

In the drawing, the first and second compound planetary gearsets 4 and 6 are combined in the following manner: the fourth operating element D of the first compound planetary gearset 4, or the ring gear 22 of the first simple planetary gearset 8, is fixedly connected to the third operating element I of the second compound planetary gearset 6, or the ring gear 36 of the third simple planetary gearset 24; and the second operating element B of the first compound planetary gearset 4, or the combination of the sun gear 12 and planet carrier 18 of the first and second simple planetary gearsets 8 and 10, is variably connected to both the first operating element G of the second compound planetary gearset 6, or the combination of the sun gear 28 and ring gear 32 of the third and fourth simple planetary gearsets 24 and 26, through the first clutch 42, and to the second operating element H of the second compound planetary gearset 6, or the combination of the planet carriers 30 and 34 of the third and fourth simple planetary gearsets 24 and 26, through the second clutch 44.

Figure 3:
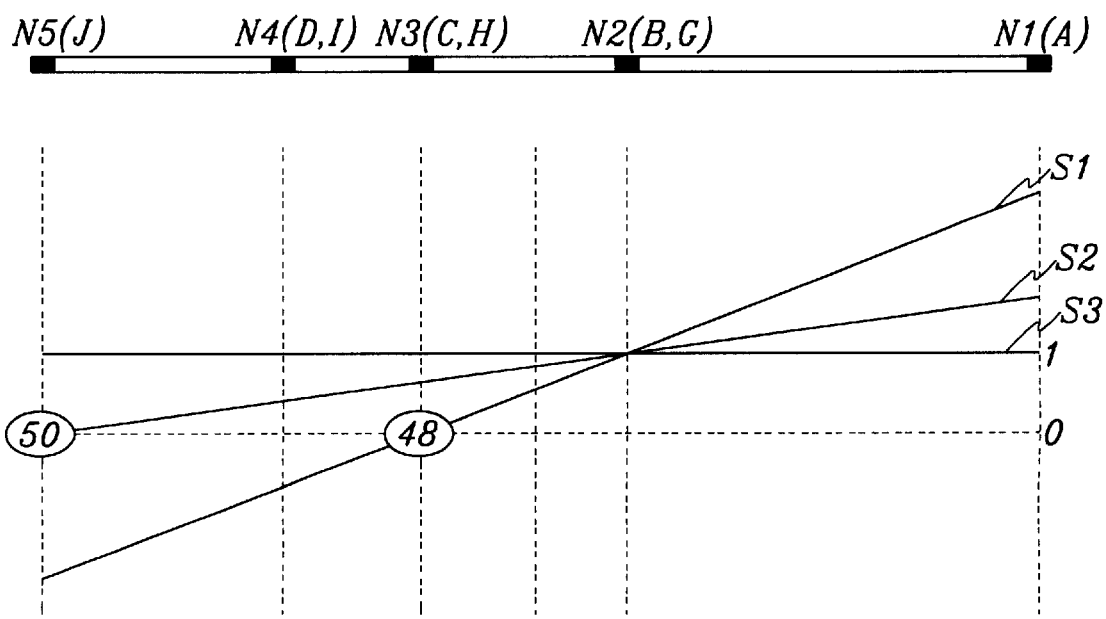
FIG. 3 is a schematic diagram illustrating an operation of forward first, second, and third speeds of a powertrain according to a preferred embodiment of the present invention through a lever analogy.

On the basis of the above description, the first and second compound planetary gearsets 4 and 6 can be merged into a single lever as shown in FIG. 3, the lever having first through fifth nodes N1, N2, N3, N4, and N5 representing the operating elements of the first and second compound planetary gearsets 4 and 6. The lever analogy of FIG. 3 is used to illustrate the operation of the inventive powertrain in forward first, second, and third speeds. The first clutch 42 is engaged in all three of these speeds.

Describing in more detail with reference to the drawing, the first node N1 indicates the first operating element A of the first compound planetary gearset 4, the second node N2 indicates a combination of the second operating element B of the first compound planetary gearset 4 and the first operating element G of the second compound planetary gearset 6, the third node N3 indicates a combination of the third operating element C of the first compound planetary gearset 4 and the second operating element H of the second compound planetary gearset 6, the fourth node N4 indicates a combination of the fourth operating element D of the first compound planetary gearset 4 and the third operating element I of the second compound planetary gearset 6, and the fifth node N5 indicates the fourth operating element J of the second compound planetary gearset 6.

Forward First Speed

Figure 6:
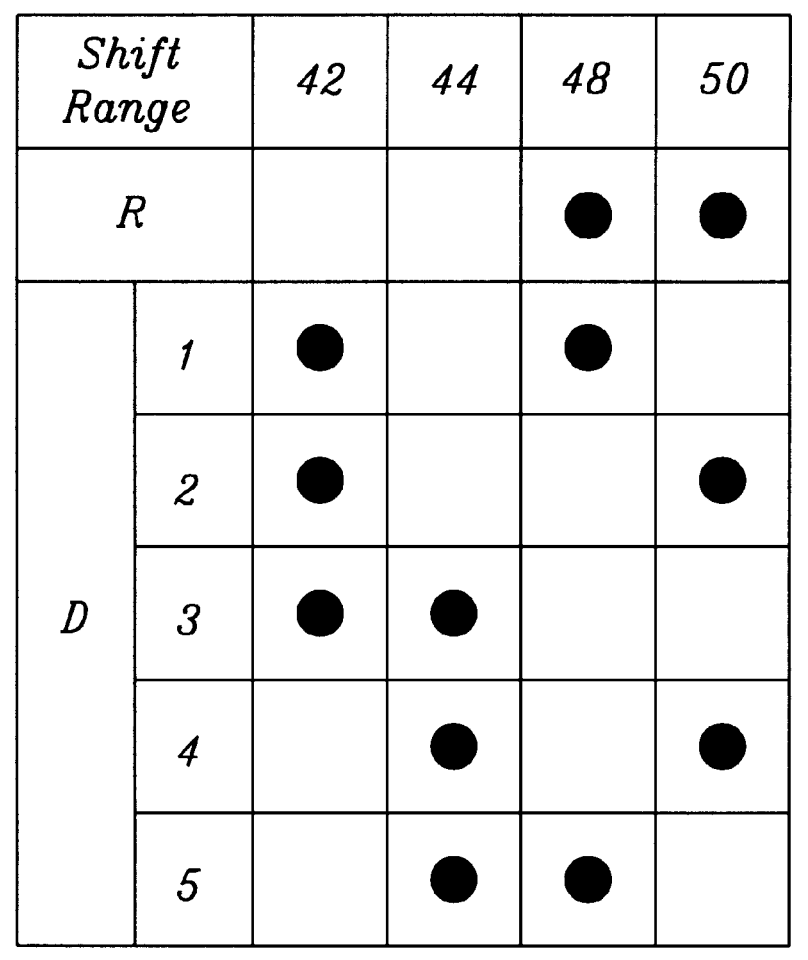

In the forward first speed, the first clutch 42 and the first brake 48 are engaged as shown in the chart of FIG. 6. As a result, in a state where input is realized through the sun gear 20 of the second simple planetary gearset 10, or the first node N1, the combination of the planet carrier 14 and ring gear 16 of the first and second simple planetary gearsets 8 and 10, or third node N3, acts as a reaction element by the operation of the first brake 48.

Accordingly, as shown in FIG. 3, if assuming that the number of output revolutions is "1", the line connecting the third node N3, or reaction element, to the second node N2, or output element, becomes a first speed line S1. As shown by the first speed line S1, the number of revolutions input through the first node N1 is substantially higher than output revolutions.

Further, in the first speed, the elements comprising the fourth node N4- the ring gears 22 and 36 of the first and third simple planetary gearsets 8 and 24- and those comprising the fifth node N5- the sun gear 38 of the fourth simple planetary gearset 26- rotate in a reverse direction as indicated by the fact that the first speed line S1 in FIG. 3 falls below the zero point at positions corresponding to these nodes N4 and N5.

Forward Second Speed

In the forward second speed, the first brake 48 is disengaged from the first speed, while the second brake 50 is engaged as shown in the chart of FIG. 6. As a result, in a state where input is realized through the sun gear 20 of the second simple planetary gearset 10, or the first node N1, the sun gear 38 of the fourth simple planetary gearset 26, or the fifth node N5, acts as a reaction element by the operation of the second brake 50.

Accordingly, as shown in FIG. 3, if assuming that the number of output revolutions is "1", the line connecting the fifth node N5, or reaction element, to the second node N2, or output element, becomes a second speed line S2. As shown by the second speed line S2, the number of revolutions input through the first node N1 is less than that of the first speed, but still higher than output revolutions.

Further, in the second speed, although the elements comprising the third and fourth nodes N3 and N4 rotate in a direction identical to that of input and not in a reverse direction as in the first speed, the rotational speed of the elements comprising these two nodes is less than that of the elements of the second node N2 through which output is realized.

Forward Third Speed

In the forward third speed, as shown in the chart of FIG. 6, the second brake 50 is disengaged from the second speed, while the second clutch 44 is engaged such that both clutches 42 and 44 are operating and both brakes 48 and 50 are disengaged. As a result, in a state where input is realized through the sun gear 20 of the second simple planetary gearset 10, or the first node N1, the first and second compound planetary gearsets 4 and 6 become locked in direct drive such that a 1:1 ratio is realized between the input and output. That is, neither a state of gear reduction nor overdrive is realized.

Forward Fourth and Fifth Speeds

In the forward fourth and fifth speeds, as shown in the chart of FIG. 6, the first clutch 42 is disengaged, the second clutch 44 is engaged, and either the first or second brake 48 and 50 is engaged. As a result, the second operating element B of the first compound planetary gearset 4 and the second operating element H of the second compound planetary gearset 6 are combined.

Figure 4:
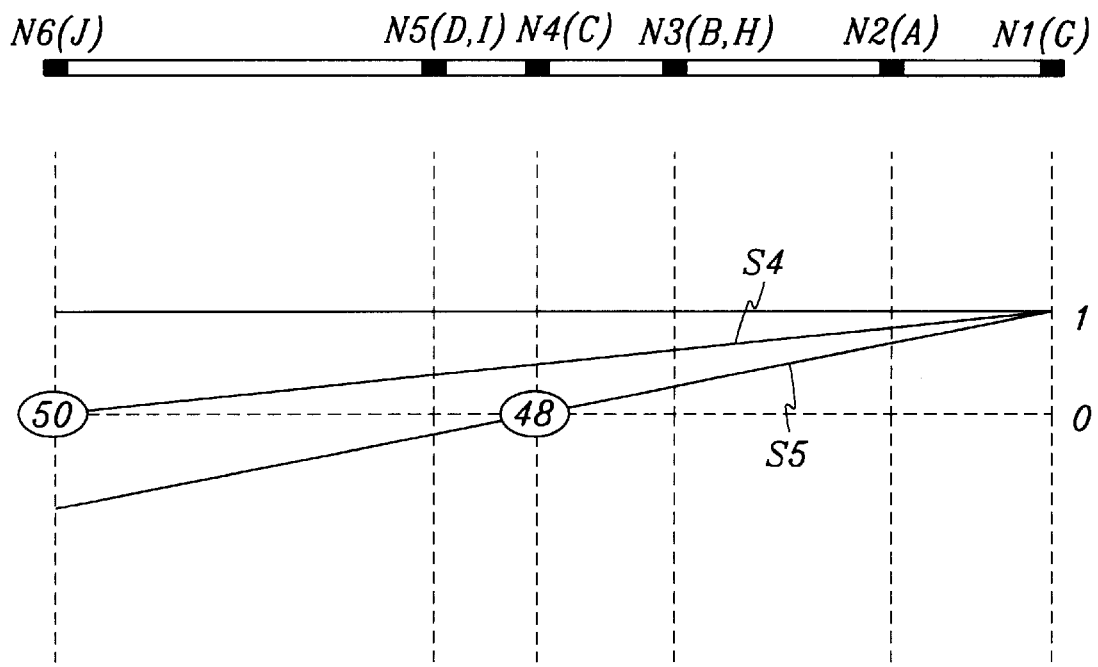
FIG. 4 is a schematic diagram illustrating an operation of forward fourth and fifth speeds of a powertrain according to a preferred embodiment of the present invention through a lever analogy.

Accordingly, the first and second compound planetary gearsets 4 and 6 can be merged into a single lever having first to sixth nodes N1, N2, N3, N4, N5, and N6 as shown in FIG. 4. That is, in the lever of FIG. 4, the first node N1 indicates the first operating element G of the second compound planetary gearset 6, the second node N2 indicates the first operating element A of the first compound planetary gearset 4, the third node N3 indicates a combination of the second operating element B of the first compound planetary gearset 4 and the second operating element H of the second compound planetary gearset 6, the fourth node N4 indicates the third operating element C of the first compound planetary gearset 4, the fifth node N5 indicates a combination of the fourth operating element D of the first compound planetary gearset 4 and the third operating element I of the second compound planetary gearset 6, and the sixth node N6 indicates the fourth operating element J of the second compound planetary gearset 6.

A. Forward Fourth Speed

Therefore, in the fourth speed, where the second clutch 44 and the second brake 50 are engaged, if assuming the number of output revolutions is "1" in a state where input is realized through the second node N2, a line connecting the sixth node N6, operating as a reaction element by the operation of the second brake 50, with the first node N1, operating as an output element, becomes a fourth speed line S4. Accordingly, the number of revolutions input through the second node N2 is lower than output revolutions, indicating the realization of an overdrive state.

Also, because the third, fourth and fifth nodes N3, N4, and N5 rotate at a rate slower than the output, an operating element rotating faster than the output is not need as in the prior art such that power loss is prevented.

B. Forward Fifth Speed

In the forward fifth speed, the second brake 50 is disengaged from the fourth speed, the first brake 48 is engaged, and the second clutch 44 is maintained engaged from the fourth speed as shown in the chart of FIG. 6. Accordingly, in a state where input is realized through the second node N2, if assuming the number of output revolutions is "1", a line connecting the fourth node N4, operating as a reaction element by the operation of the first brake 48, with the first node N1, operating as an output element, becomes a fifth speed line S5. Here, an overdrive state is realized as in the forward fourth speed indicated by the fact that the number of revolutions input through the second node N2 is lower than output revolutions realized through the first node N1.

Reverse

In the reverse range, neither the first nor second clutch 42 and 44 is engaged, while both the first and second brakes 48 and 50 are engaged as shown in the chart of FIG. 6. Accordingly, as shown in FIG. 5, the third operating element C of the first compound planetary gearset 4 and the fourth operating element J of the second compound planetary gearset 6 are connected such that the first operating element A of the first planetary gear unit 4 comes to be located at an opposite position to when in the forward speeds, i.e., the lever in FIG. 2 representing the first compound planetary gearset 4 is inverted.

Figure 5:
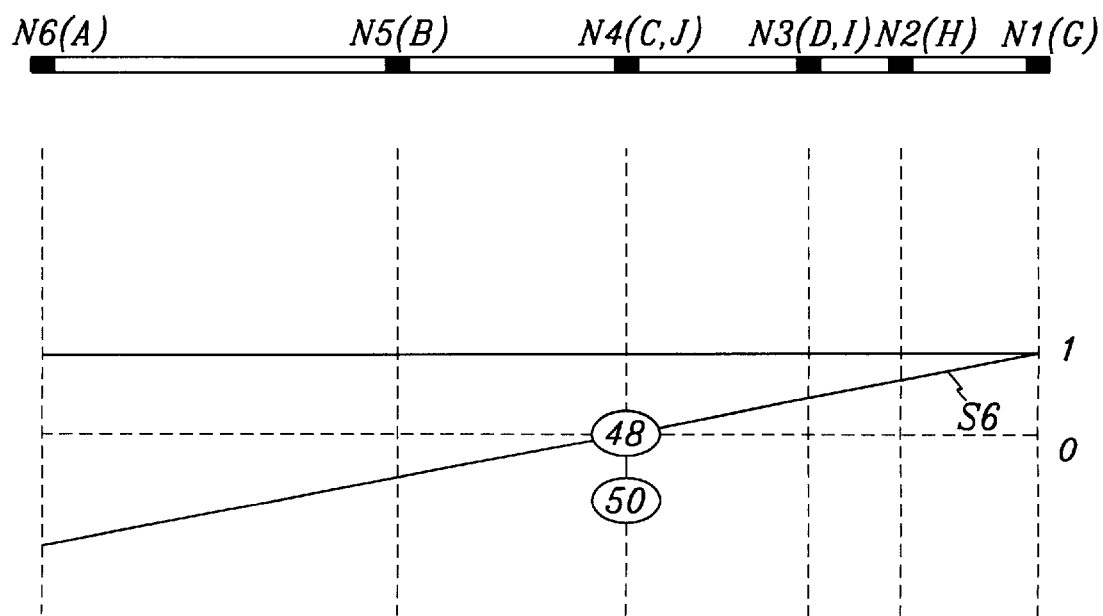
FIG. 5 is a schematic diagram illustrating an operation of a reverse speed of a powertrain according to a preferred embodiment of the present invention through a lever analogy.

As a result, the lever of FIG. 5, in which the first and second compound planetary gearsets 4 and 6 are merged, has first to sixth nodes N1, N2, N3, N4, N5, and N6 indicating the following: the first node N1 indicates the first operating element G of the second compound planetary gearset 6, the second node N2 indicates the second operating element H of the second compound planetary gearset 6, the third node N3 indicates a combination of the fourth operating element D of the first compound planetary gearset 4 and the third operating element I of the second compound planetary gearset 6, the fourth node N4 indicates a combination of the third operating element C of the first compound planetary gearset 4 and the fourth operating element J of the second compound planetary gearset 6, the fifth node N5 indicates the second operating element B of the first compound planetary gearset 4, and the sixth node N6 indicates the first operating element A of the first compound planetary gearset 4.

Therefore, in the reverse range where input is realized through the sixth node N6 and the fourth node N4 acts as a reaction element by the engagement of the first and second brakes 48 and 50, if assuming the number of output revolutions is "1", a line connecting the fourth node N4, operating as a reaction element, with the first node N1, operating as an output element, becomes a reverse speed line S6.

In FIG. 5, input below "0" does not indicate input in the reverse direction. This is merely a result of selecting the random number of "1" as output revolutions.

Second Embodiment

Figure 7:
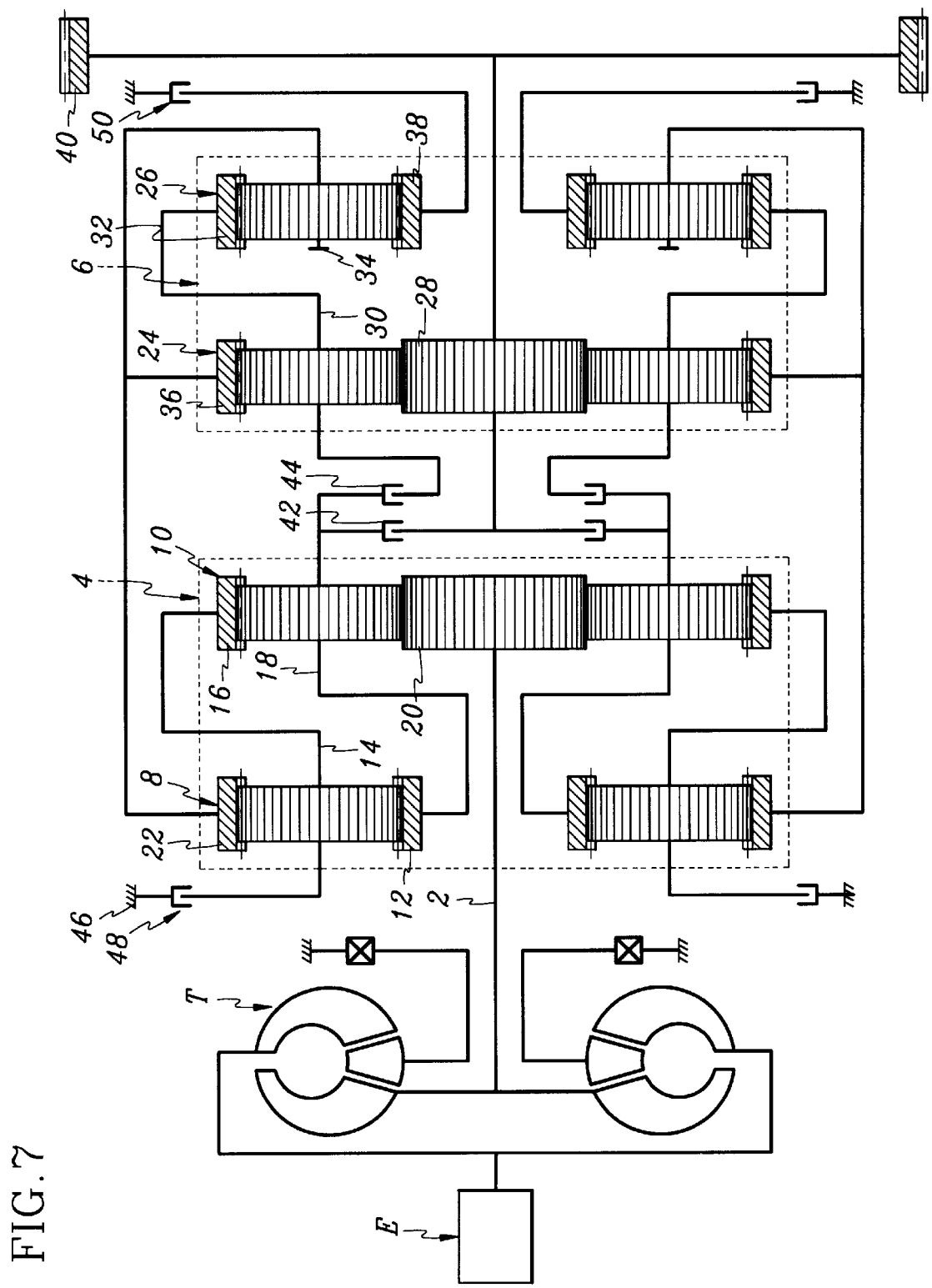
FIG. 7 is a schematic view of a powertrain according to a second preferred embodiment of the present invention.

Referring to FIG. 7, shown is a schematic view of a powertrain according to a second preferred embodiment of the present invention. In the second embodiment, the first, second, third, and fourth simple planetary gearsets 8, 10, 24, and 26 are single pinion planetary gearsets as in the first embodiment. As shown in the drawing, the planet carrier 30 and ring gear 36 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to a combination of the ring gear 36 and planet carrier 34 of the third and fourth simple planetary gearsets 24 and 26, and a combination of the sun gear 12 and planet carrier 18 of the first and second simple planetary gearsets 8 and 10 is variably connected to both the sun gear 28 of the third simple planetary gearset 24 through the first clutch 42, and to a combination of the planet carrier 30 and ring gear 32 of the third and fourth simple planetary gearsets 24 and 26 through the second clutch 44.

Also, the sun gear 38 of the fourth simple planetary gearset 26 is connected to the transmission housing 46 with the second brake 50 interposed therebetween such that the sun gear 38 acts as a reaction element. In addition, the sun gear 28 of the third simple planetary gearset 24 acts as an output element.

According to the above structure, operating elements for the second compound planetary gearset 6 in the lever analogies of FIGS. 2–5 are as follows: the first operating element G indicates the sun gear 28 of the third simple planetary gearset 24, the second operating element H indicates a combination of the planet carrier 30 and ring gear 32 of the third and fourth simple planetary gearsets 24 and 26, the third operating element I indicates a combination of the ring gear 36 and planet carrier 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the second embodiment, only the structure of the second compound planetary gearset 6 is changed from the first embodiment. As the operation of the operating elements in each shift range is identical to that of the first embodiment, an explanation thereof will be omitted herein.

Third Embodiment

Figure 8:
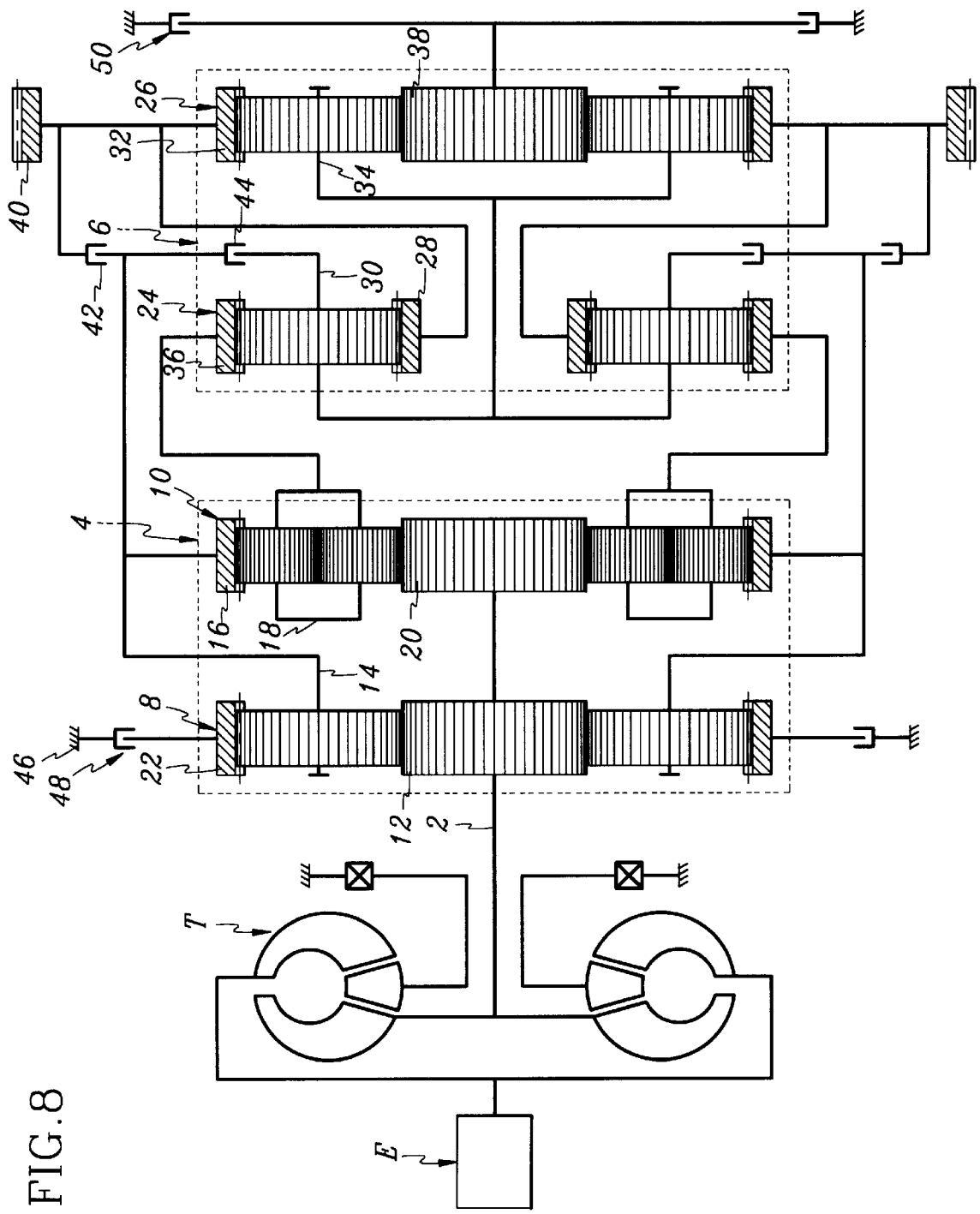
FIG. 8 is a schematic view of a powertrain according to a third preferred embodiment of the present invention.

Referring to FIG. 8, shown is a schematic view of a powertrain according to a third preferred embodiment of the present invention. In the third embodiment, the first, third, and fourth simple planetary gearsets 8, 24, and 26 are single pinion planetary gearsets as in the first embodiment, while the second simple planetary gearset 10 is a double pinion planetary gearset. As shown in the drawing, the sun gear 12 and planet carrier 14 of the first simple planetary gearset 8 are fixedly connected respectively to the sun gear 20 and ring gear 16 of the second simple planetary gearset 10.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and ring gear 16 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween such that the ring gear 22 acts as a reaction element. In addition, input is realized through the combination of the sun gears 12 and 20 of the first and second simple planetary gearsets 8 and 10.

According to the above structure, operating elements for the first compound planetary gearset 4 in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the third embodiment, only the structure of the first compound planetary gearset 4 is changed from the first embodiment. As the operation of the operating elements in each shift range is identical to that of the first embodiment, an explanation thereof will be omitted herein.

Fourth Embodiment

Figure 9:
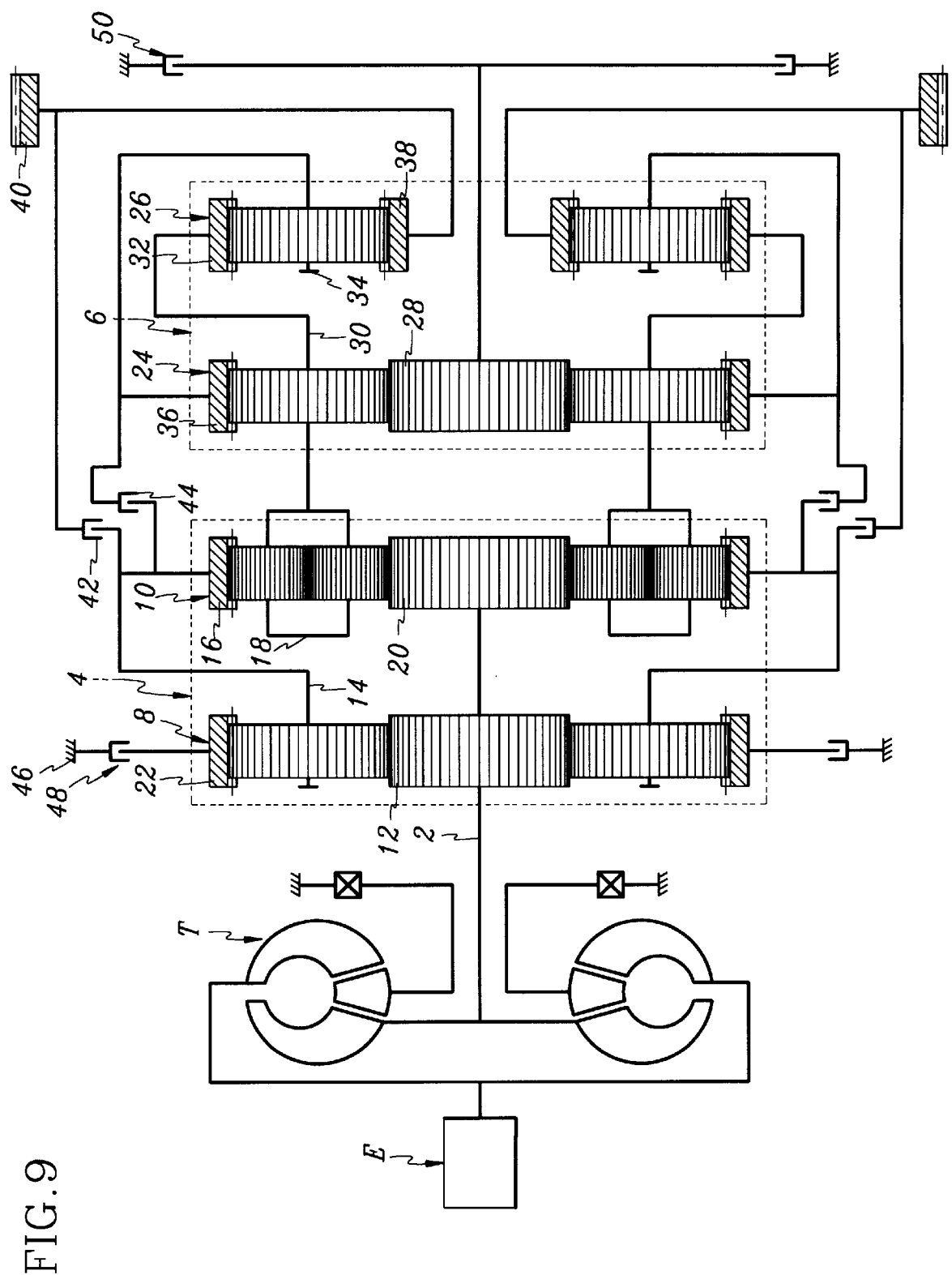
FIG. 9 is a schematic view of a powertrain according to a fourth preferred embodiment of the present invention.

Referring to FIG. 9, shown is a schematic view of a powertrain according to a fourth preferred embodiment of the present invention. In the fourth embodiment, as in the third embodiment, the first, third, and fourth simple planetary gearsets 8, 24, and 26 are single pinion planetary gearsets, while the second simple planetary gearset 10 is a double pinion planetary gearset.

In the first compound planetary gearset 4, as with the third embodiment, the sun gear 12 and planet carrier 14 of the first simple planetary gearset 8 are fixedly connected respectively to the sun gear 20 and ring gear 16 of the second simple planetary gearset 10. In the second compound planetary gearset 6, the planet carrier 30 and ring gear 36 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and the ring gear 32 of the third and fourth simple planetary gearsets 24 and 26, and a combination of the planet carrier 14 and ring gear 16 of the first and second simple planetary gearsets 8 and 10 is variably connected to both the sun gear 38 of the fourth simple planetary gearset 26 through the first clutch 42, and to a combination of the ring gear 36 and planet carrier 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and the sun gear 28 of the third simple planetary gearset 24 is connected to the transmission housing 46 with the second brake 50 interposed therebetween such that the ring gear 22 and sun gear 28 act as reaction elements. In addition, input is realized through the sun gears 12 and 20 of the first and second simple planetary gearsets 8 and 10, and the sun gear 38 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the sun gear 38 of the fourth simple planetary gearset 26, the second operating element H indicates a combination of the ring gear 36 and planet carrier 34 of the third and fourth simple planetary gearsets 24 and 26, the third operating element I indicates a combination of the planet carrier 30 and ring gear 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fourth embodiment, only the structures of the first and second compound planetary gearsets 4 and 6 are changed from the first embodiment. As the operation of the operating elements in each shift range is identical to that of the first embodiment, an explanation thereof will be omitted herein.

Fifth Embodiment

Figure 10:
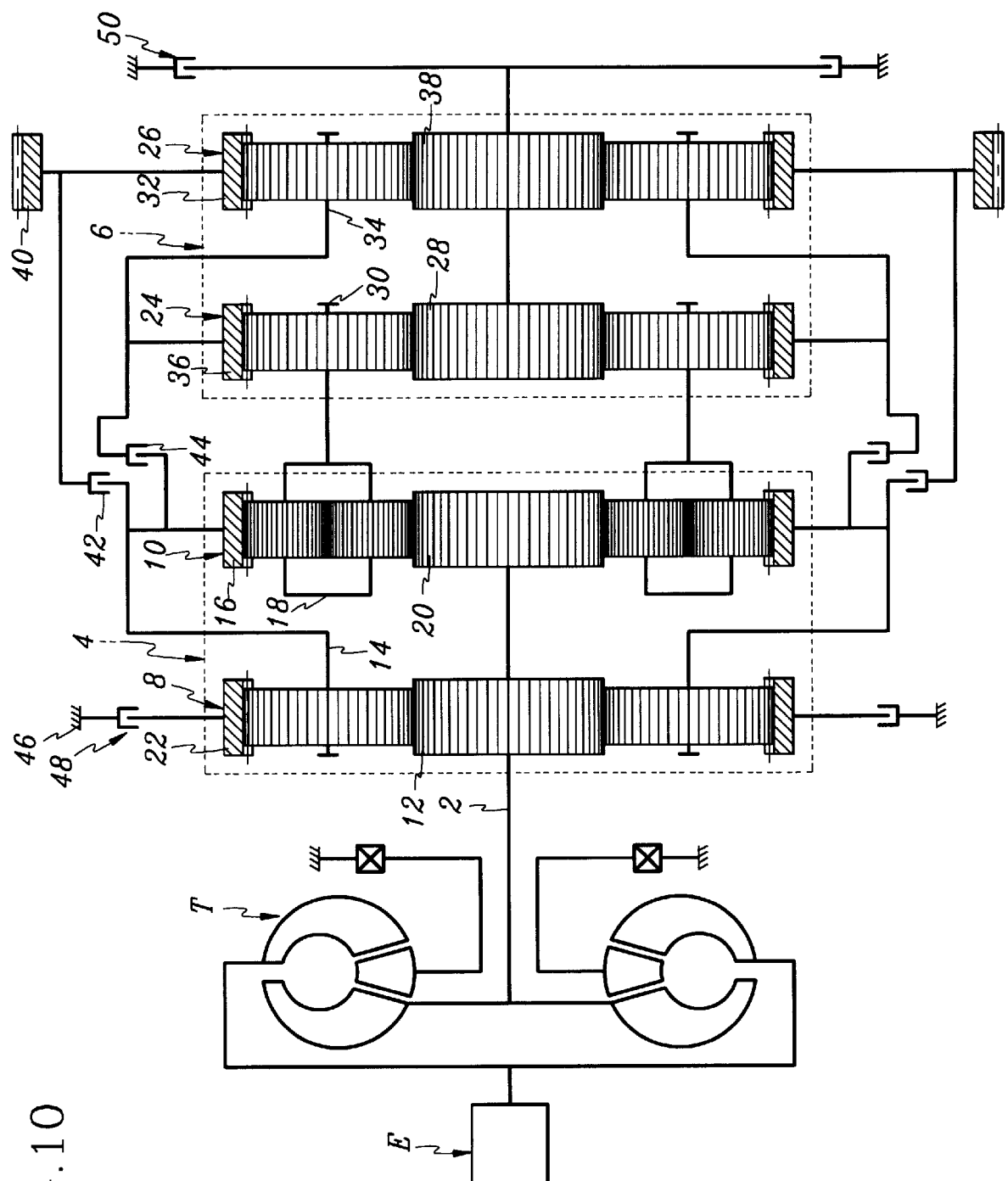
FIG. 10 is a schematic view of a powertrain according to a fifth preferred embodiment of the present invention.

Referring to FIG. 10, shown is a schematic view of a powertrain according to a fifth preferred embodiment of the present invention. In the fifth embodiment, as in the third embodiment, the first, third, and fourth simple planetary gearsets 8, 24, and 26 are single pinion planetary gearsets, while the second simple planetary gearset 10 is a double pinion planetary gearset.

In the first compound planetary gearset 4, as with the third embodiment, the sun gear 12 and planet carrier 14 of the first simple planetary gearset 8 are fixedly connected respectively to the sun gear 20 and ring gear 16 of the second simple planetary gearset 10. In the second compound planetary gearset 6, the sun gear 28 and ring gear 36 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the planet carrier 14 and ring gear 16 of the first and second simple planetary gearsets 8 and 10 is variably connected to both the ring gear 32 of the fourth simple planetary gearset 26 through the first clutch 42, and to a combination of the ring gear 36 and planet carrier 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and a combination of the sun gears 28 and 38 of the third and fourth simple planetary gearsets 24 and 26 is connected to the transmission housing 46 with the second brake 50 interposed therebetween such that the ring gear 22 and the sun gears 28 and 38 act as reaction elements. In addition, input is realized through the combination of the sun gears 12 and 20 of the first and second simple planetary gearsets 8 and 10 as in the third embodiment, and the ring gear 32 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the ring gear 32 of the fourth simple planetary gearset 26, the second operating element H indicates a combination of the ring gear 36 and planet carrier 34 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifth embodiment, only the structures of the first and second compound planetary gearsets 4 and 6 are changed from the first embodiment. As the operation of the operating elements in each shift range is identical to that of the first embodiment, an explanation thereof will be omitted herein.

Sixth Embodiment

Figure 11:
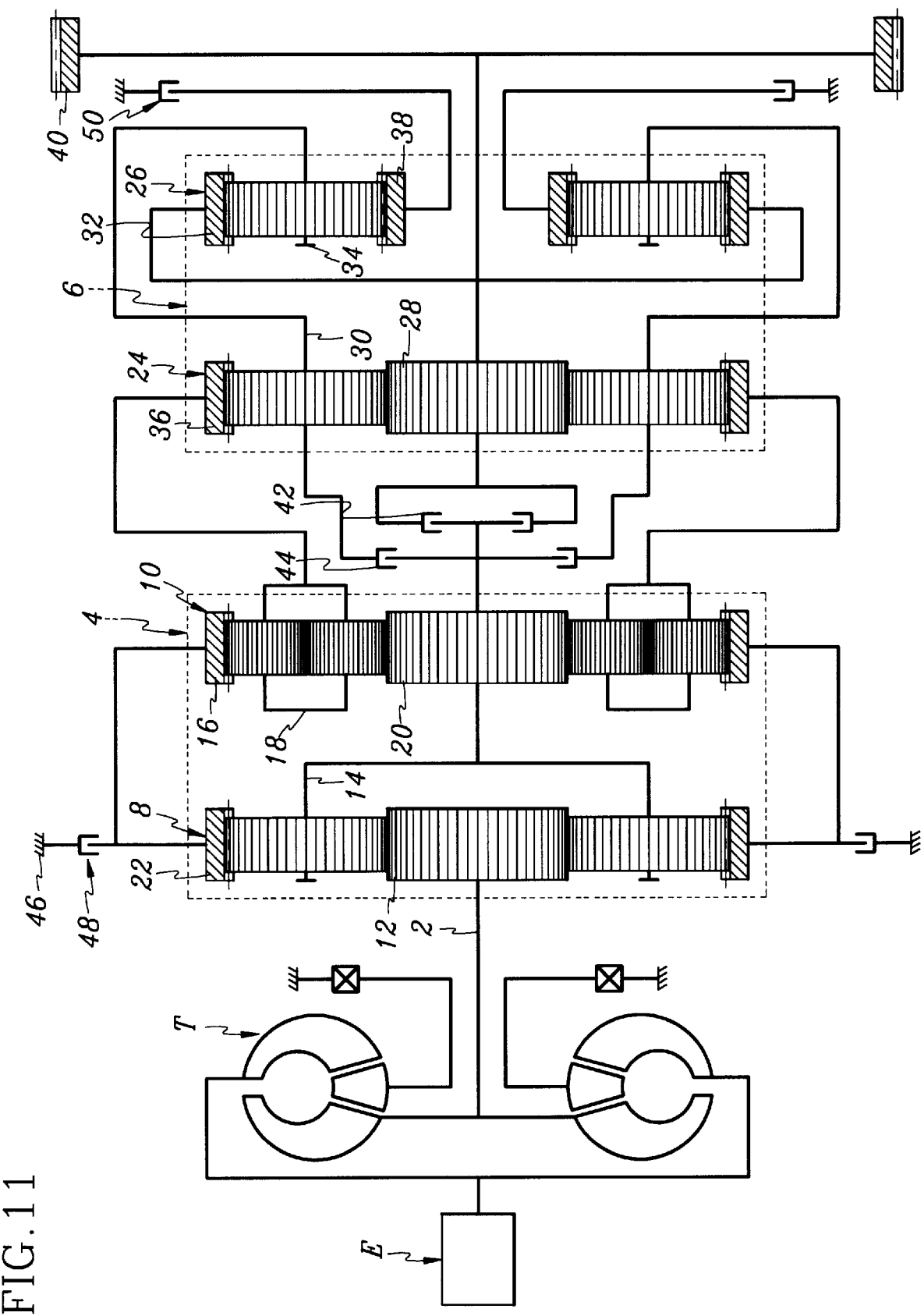
FIG. 11 is a schematic view of a powertrain according to a sixth preferred embodiment of the present invention.

Referring to FIG. 11, shown is a schematic view of a powertrain according to a sixth preferred embodiment of the present invention. In the sixth embodiment, as in the third embodiment, the second simple planetary gearset 10 is a double pinion planetary gearset, while the first, third, and fourth simple planetary gearsets 8, 24, and 26 are single pinion planetary gearsets. As shown in the drawing, the planet carrier 14 and ring gear 22 of the first simple planetary gearset 8 are fixedly connected respectively to the sun gear 20 and ring gear 16 of the second simple planetary gearset 10. Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and sun gear 20 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween such that the ring gears 22 and 16 act as reaction elements. In addition, input is realized through the sun gear 12 of the first simple planetary gearset 8.

According to the above structure, operating elements for the first compound planetary gearset 4 in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixth embodiment, only the structure of the first compound planetary gearset 4 is changed from the first embodiment. As the operation of the operating elements in each shift range is identical to that of the first embodiment, an explanation thereof will be omitted herein.

Seventh Embodiment

Figure 12:
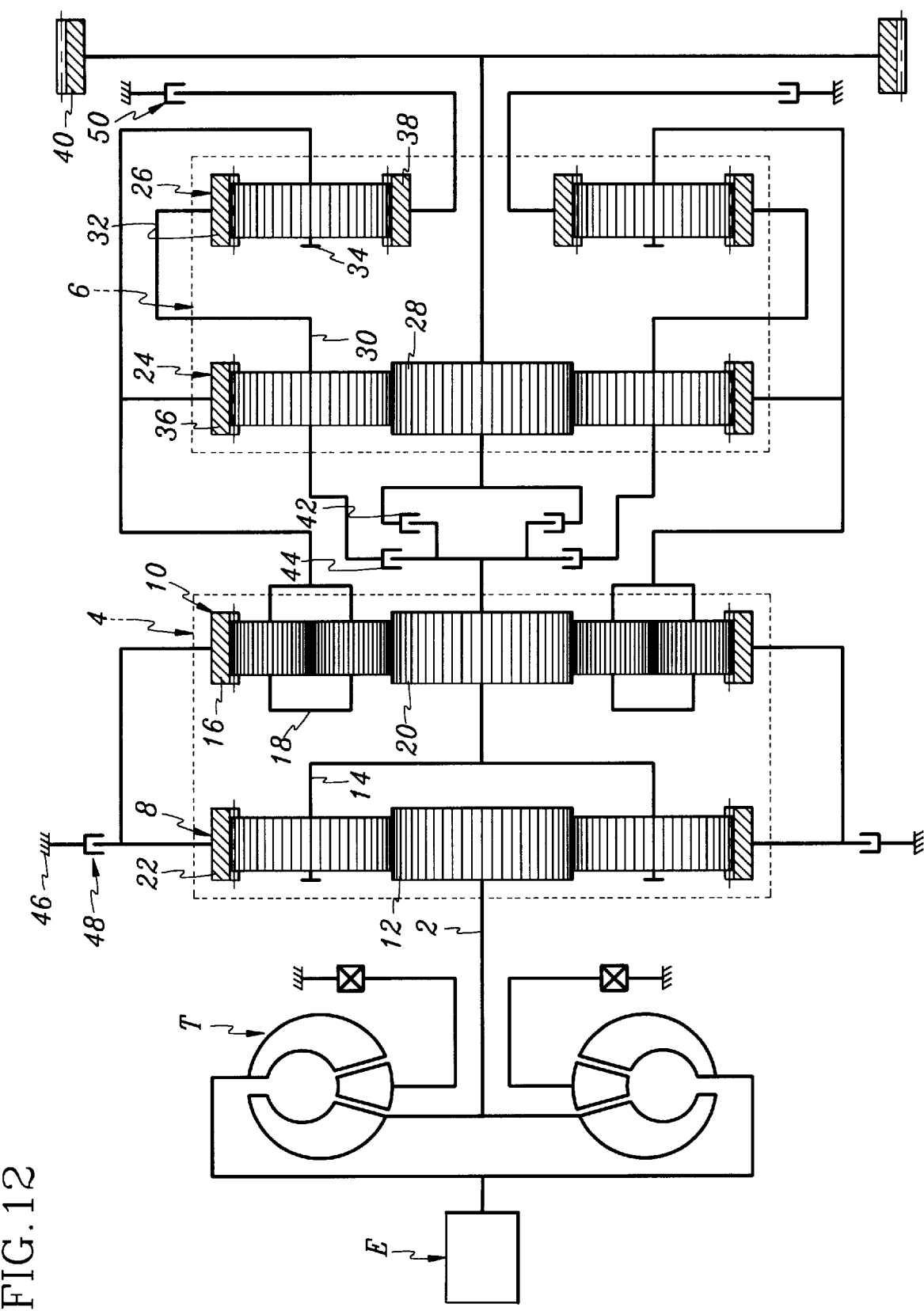
FIG. 12 is a schematic view of a powertrain according to a seventh preferred embodiment of the present invention.

Referring to FIG. 12, shown is a schematic view of a powertrain according to a seventh preferred embodiment of the present invention. In the seventh embodiment, as in the third embodiment, the second simple planetary gearset 10 is a double pinion planetary gearset, while the first, third, and fourth simple planetary gearsets 8, 24, and 26 are single pinion planetary gearsets.

In the first compound planetary gearset 4, as in the sixth embodiment, the planet carrier 14 and ring gear 22 of the first simple planetary gearset 8 are fixedly connected respectively to the sun gear 20 and ring gear 16 of the second simple planetary gearset 10. In the second compound planetary gearset 6, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, the planet carrier 18 of the second simple planetary gearset 10 is fixedly connected to a combination of the ring gear 36 and planet carrier 34 of the third and fourth simple planetary gearsets 24 and 26, and a combination of the planet carrier 14 and sun gear 20 of the first and second simple planetary gearsets 8 and 10 is variably connected to both the sun gear 28 of the third simple planetary gearset 24 through the first clutch 42, and to a combination of the planet carrier 30 and ring gear 32 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the sun gear 38 of the fourth simple planetary gearset 26 is connected to the transmission housing 46 with the second brake 50 interposed therebetween such that the ring gears 22 and 16, and the sun gear 38 act as reaction elements. In addition, input is realized through the sun gear 12 of the first simple planetary gearset 8 and the sun gear 28 of the third simple planetary gearset 24 acts as an output element.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the sun gear 28 of the third simple planetary gearset 24, the second operating element H indicates a combination of the planet carrier 30 and ring gear 32 of the third and fourth simple planetary gearsets 24 and 26, the third operating element I indicates a combination of the ring gear 36 and planet carrier 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventh embodiment, only the structures of the first and second compound planetary gearsets 4 and 6 are changed from the first embodiment. As the operation of the operating elements in each shift range is identical to that of the first embodiment, an explanation thereof will be omitted herein.

Eighth Embodiment

Figure 13:
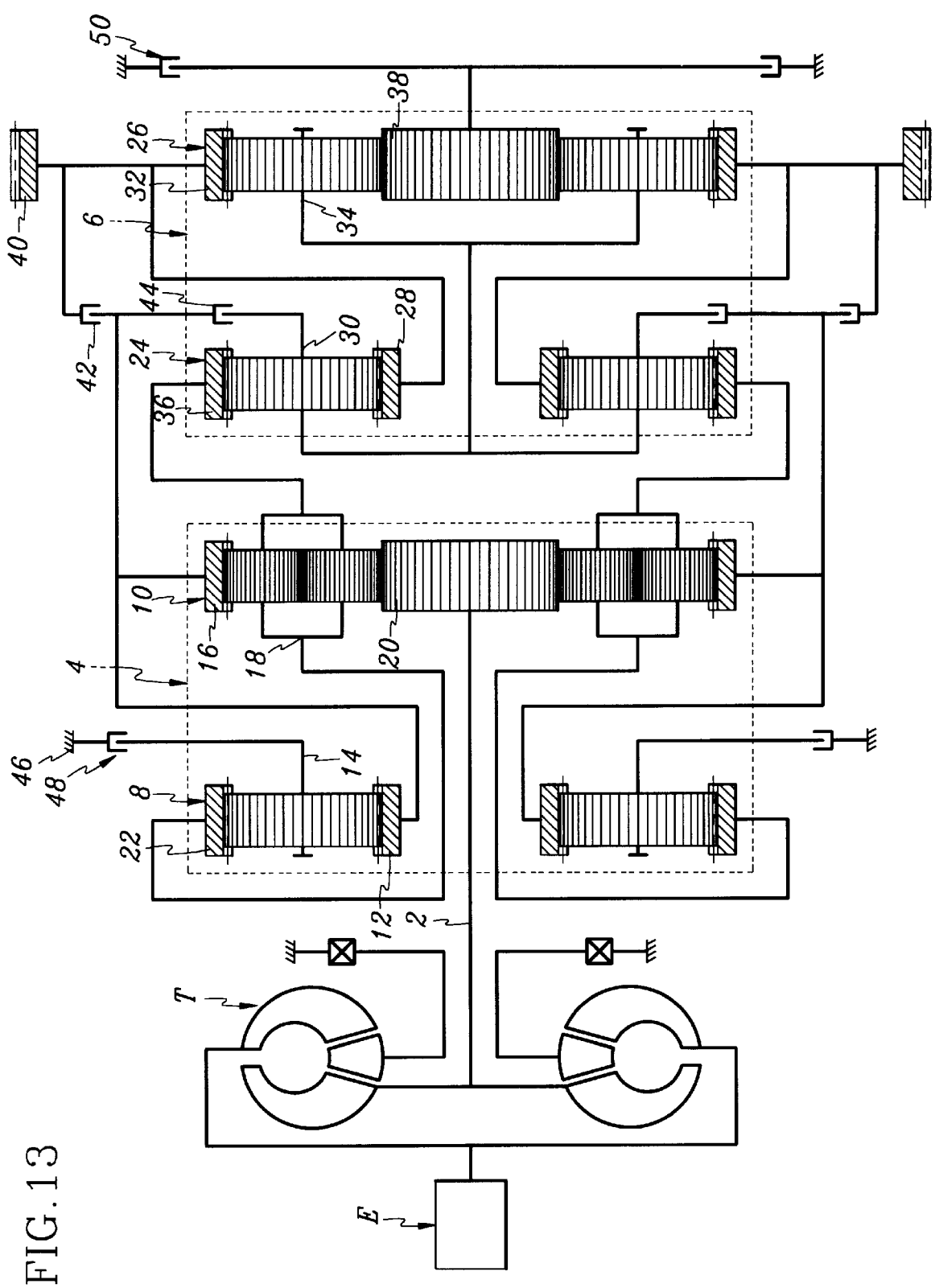
FIG. 13 is a schematic view of a powertrain according to an eighth preferred embodiment of the present invention.

Referring to FIG. 13, shown is a schematic view of a powertrain according to an eighth preferred embodiment of the present invention. In the eighth embodiment, as in the third embodiment, the second simple planetary gearset 10 is a double pinion planetary gearset, while the first, third, and fourth simple planetary gearsets 8, 24, and 26 are single pinion planetary gearsets. As shown in the drawing, the ring gear 22 and sun gear 12 of the first simple planetary gearset 8 are fixedly connected respectively to the planet carrier 18 and ring gear 16 of the second simple planetary gearset 10.

Further, with regard to the combination of the first and second compound planetary gearsets 4 and 6, a combination of the ring gear 22 and planet carrier 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween such that the planet carrier 14 acts as a reaction element. In addition, input is realized through the sun gear 20 of the second simple planetary gearset 10.

According to the above structure, operating elements for the first compound planetary gearset 4 in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighth embodiment, only the structure of the first compound planetary gearset 4 is changed from the first embodiment. As the operation of the operating elements in each shift range is identical to that of the first embodiment, an explanation thereof will be omitted herein.

Ninth Embodiment

Figure 14:
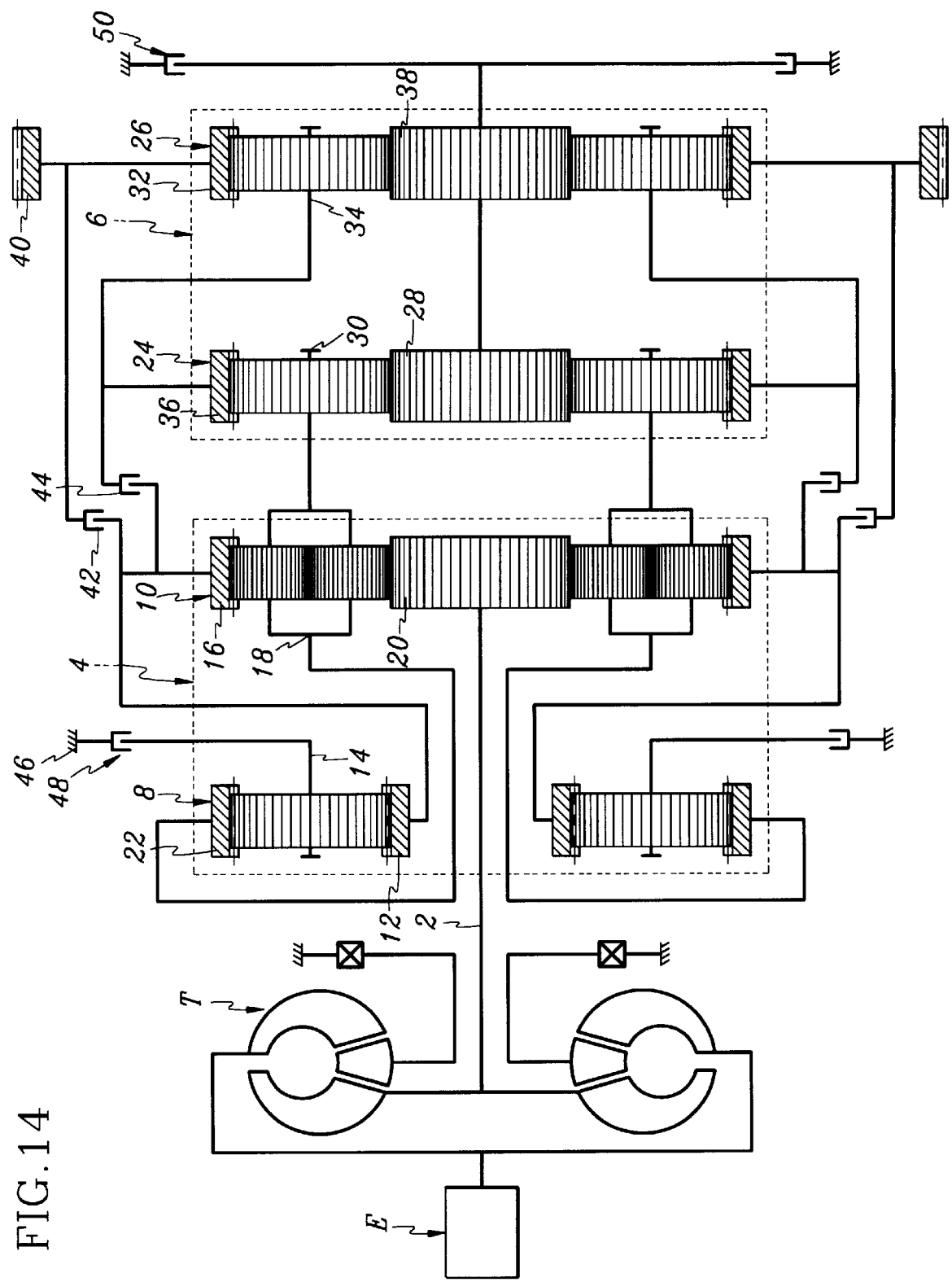
FIG. 14 is a schematic view of a powertrain according to a ninth preferred embodiment of the present invention.

Referring to FIG. 14, shown is a schematic view of a powertrain according to a ninth preferred embodiment of the present invention. In the ninth embodiment, as in the third embodiment, the second simple planetary gearset 10 is a double pinion planetary gearset, while the first, third, and fourth simple planetary gearsets 8, 24, and 26 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the fifth embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both the ring gear 32 of the fourth simple planetary gearset 26 through the first clutch 42, and to a combination of the ring gear 36 and planet carrier 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and a combination of the sun gears 28 and 38 of the third and fourth simple planetary gearsets 24 and 26 is connected to the transmission housing 46 with the second brake 50 interposed therebetween as in the fifth embodiment such that the planet carrier 14 and the sun gears 28 and 38 act as reaction elements. In addition, input is realized through the sun gear 20 of the second simple planetary gearset 10 as in the eighth embodiment, and the ring gear 32 of the fourth simple planetary gearset 26 acts as an output element as in the fifth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the fifth embodiment, in the lever analogies of FIGS. 2–5 are as follows: the first operating element G indicates the ring gear 32 of the fourth simple planetary gearset 26, the second operating element H indicates a combination of the ring gear 36 and planet carrier 34 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninth embodiment, only the structures of the first and second compound planetary gearsets 4 and 6 are changed from the first embodiment. As the operation of the operating elements in each shift range is identical to that of the first embodiment, an explanation thereof will be omitted herein.

Tenth Embodiment

Figure 15:
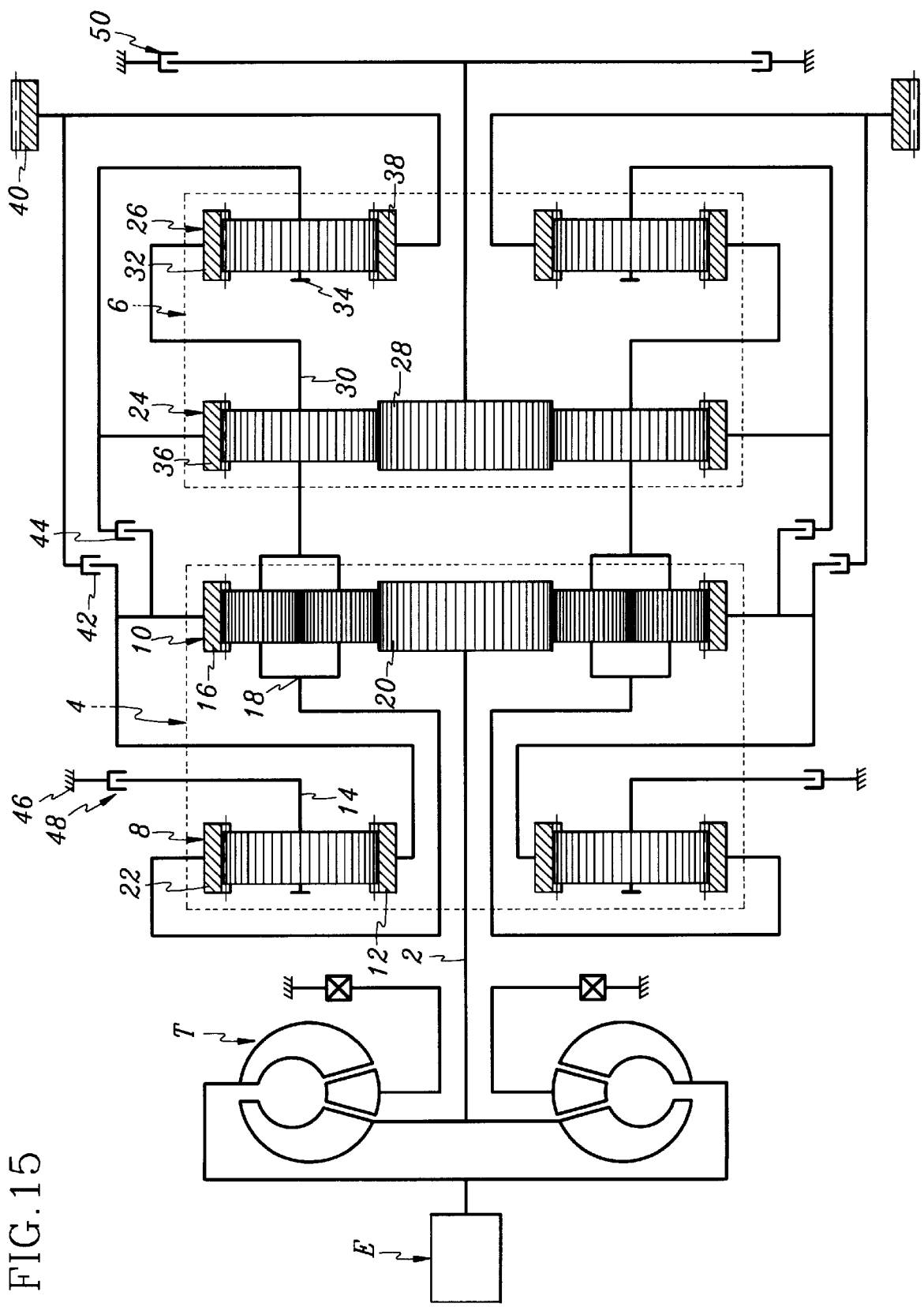
FIG. 15 is a schematic view of a powertrain according to a tenth preferred embodiment of the present invention.

Referring to FIG. 15, shown is a schematic view of a powertrain according to a tenth preferred embodiment of the present invention. In the tenth embodiment, as in the third embodiment, the second simple planetary gearset 10 is a double pinion planetary gearset, while the first, third, and fourth simple planetary gearsets 8, 24, and 26 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the fourth embodiment, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to a combination of the planet carrier 30 and ring gear 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to a combination of the ring gear 36 and planet carrier 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and the sun gear 28 of the third simple planetary gearset 24 is connected to the transmission housing 46 with the second brake 50 interposed therebetween as in the fourth embodiment such that the planet carrier 14 and sun gear 28 act as reaction elements. In addition, input is realized through the sun gear 20 of the second simple planetary gearset 10 as in the eighth embodiment, and the sun gear 38 of the fourth simple planetary gearset 26 acts as an output element as in the fourth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the fourth embodiment, in the lever analogies of FIGS. 2–5 are as follows: the first operating element G indicates the sun gear 38 of the fourth simple planetary gearset 26, the second operating element H indicates a combination of the ring gear 36 and planet carrier 34 of the third and fourth simple planetary gearsets 24 and 26, the third operating element I indicates a combination of the planet carrier 30 and ring gear 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the tenth embodiment, only the structures of the first and second compound planetary gearsets 4 and 6 are changed from the first embodiment. As the operation of the operating elements in each shift range is identical to that of the first embodiment, an explanation thereof will be omitted herein.

Eleventh Embodiment

Figure 16:
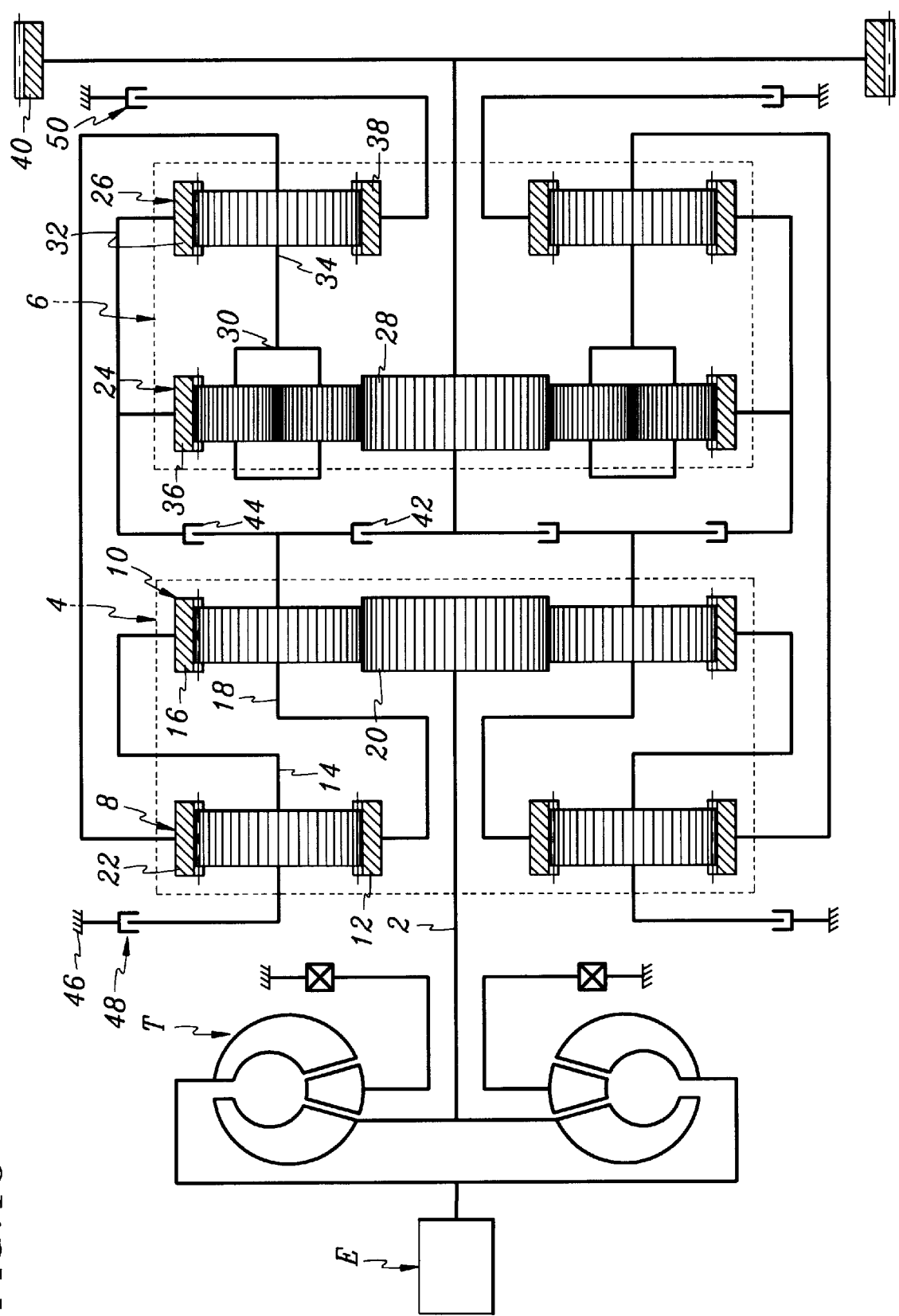
FIG. 16 is a schematic view of a powertrain according to an eleventh preferred embodiment of the present invention.

Referring to FIG. 16, shown is a schematic view of a powertrain according to an eleventh preferred embodiment of the present invention. In the eleventh embodiment, the third simple planetary gearset 24 is a double pinion planetary gearset, while the first, second, and fourth simple planetary gearsets 8, 10, and 26 are single pinion planetary gearsets as in the first embodiment. As shown in the drawing, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to a combination of the planet carriers 30 and 34 of the third and fourth simple planetary gearsets 24 and 26, and a combination of the sun gear 12 and planet carrier 18 of the first and second simple planetary gearsets 8 and 10 is variably connected to both the sun gear 28 of the third simple planetary gearset 24 through the first clutch 42, and to a combination of the ring gears 36 and 32 of the third and fourth simple planetary gearsets 24 and 26 through the second clutch 44.

Also, the sun gear 38 of the fourth simple planetary gearset 26 is connected to the transmission housing 46 with the second brake 50 interposed therebetween such that the sun gear 38 acts as a reaction element. In addition, the sun gear 28 of the third simple planetary gearset 24 acts as an output element.

According to the above structure, operating elements for the second compound planetary gearset 6 in the lever analogies of FIGS. 2–5 are as follows: the first operating element G indicates the sun gear 28 of the third simple planetary gearset 24, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eleventh embodiment, only the structure of the second compound planetary gearset 6 is changed from the first embodiment. As the operation of the operating elements in each shift range is identical to that of the first embodiment, an explanation thereof will be omitted herein.

Twelfth Embodiment

Figure 17:
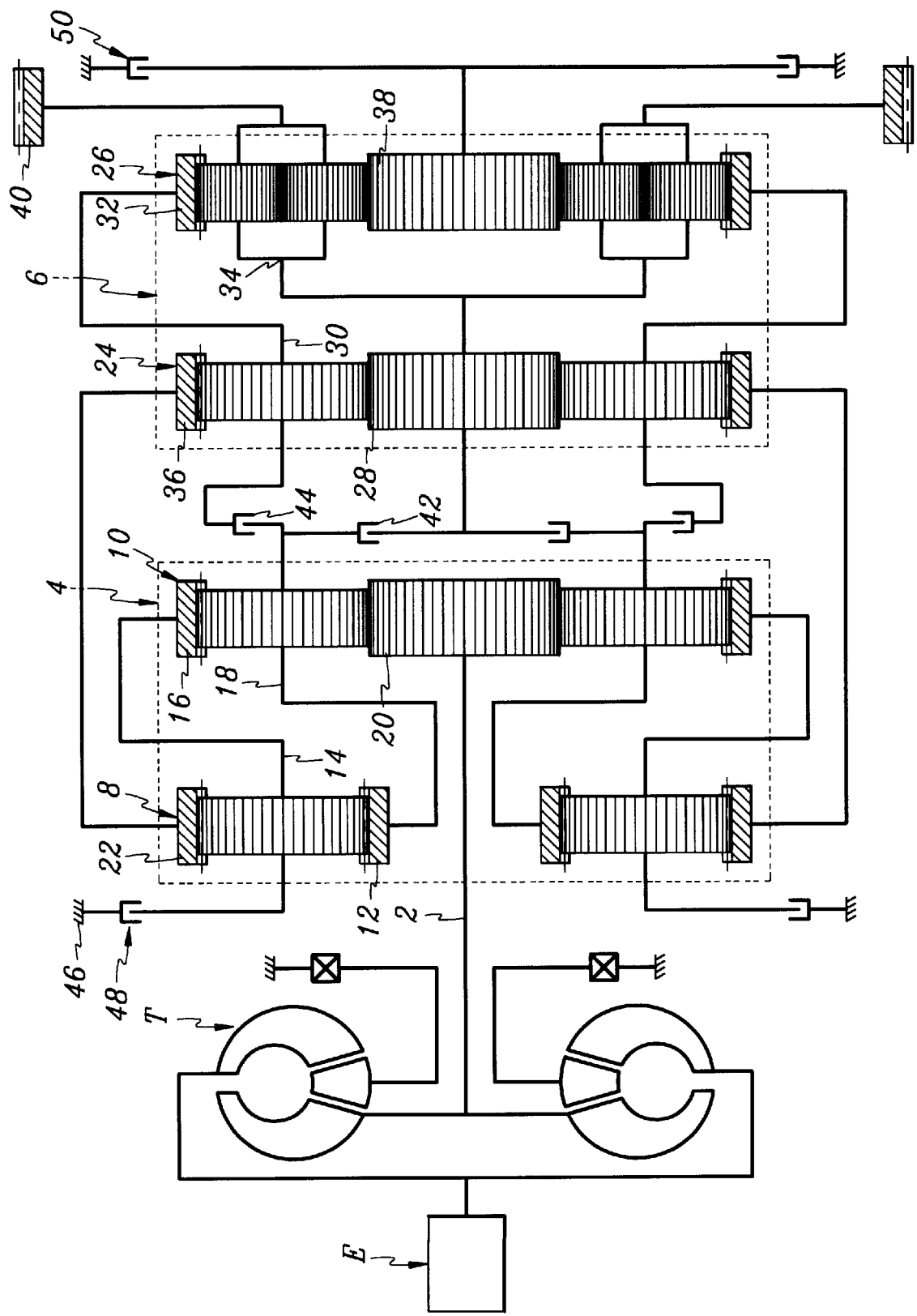
FIG. 17 is a schematic view of a powertrain according to a twelfth preferred embodiment of the present invention.

Referring to FIG. 17, shown is a schematic view of a powertrain according to a twelfth preferred embodiment of the present invention. In the twelfth embodiment, the fourth simple planetary gearset 26 is a double pinion planetary gearset, while the first, second, and third simple planetary gearsets 8, 10, and 24 are single pinion planetary gearsets as in the first embodiment. As shown in the drawing, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to the ring gear 36 of the third simple planetary gearset 24, and a combination of the sun gear 12 and planet carrier 18 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, the sun gear 38 of the fourth simple planetary gearset 26 is connected to the transmission housing 46 with the second brake 50 interposed therebetween such that the sun gear 38 acts as a reaction element. In addition, a combination of the sun gear 28 and planet carrier 34 of the third and fourth simple planetary gearsets 24 and 26 acts as an output element.

According to the above structure, operating elements for the second compound planetary gearset 6 in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twelfth embodiment, only the structure of the second compound planetary gearset 6 is changed from the first embodiment. As the operation of the operating elements in each shift range is identical to that of the first embodiment, an explanation thereof will be omitted herein.

Thirteenth Embodiment

Figure 18:
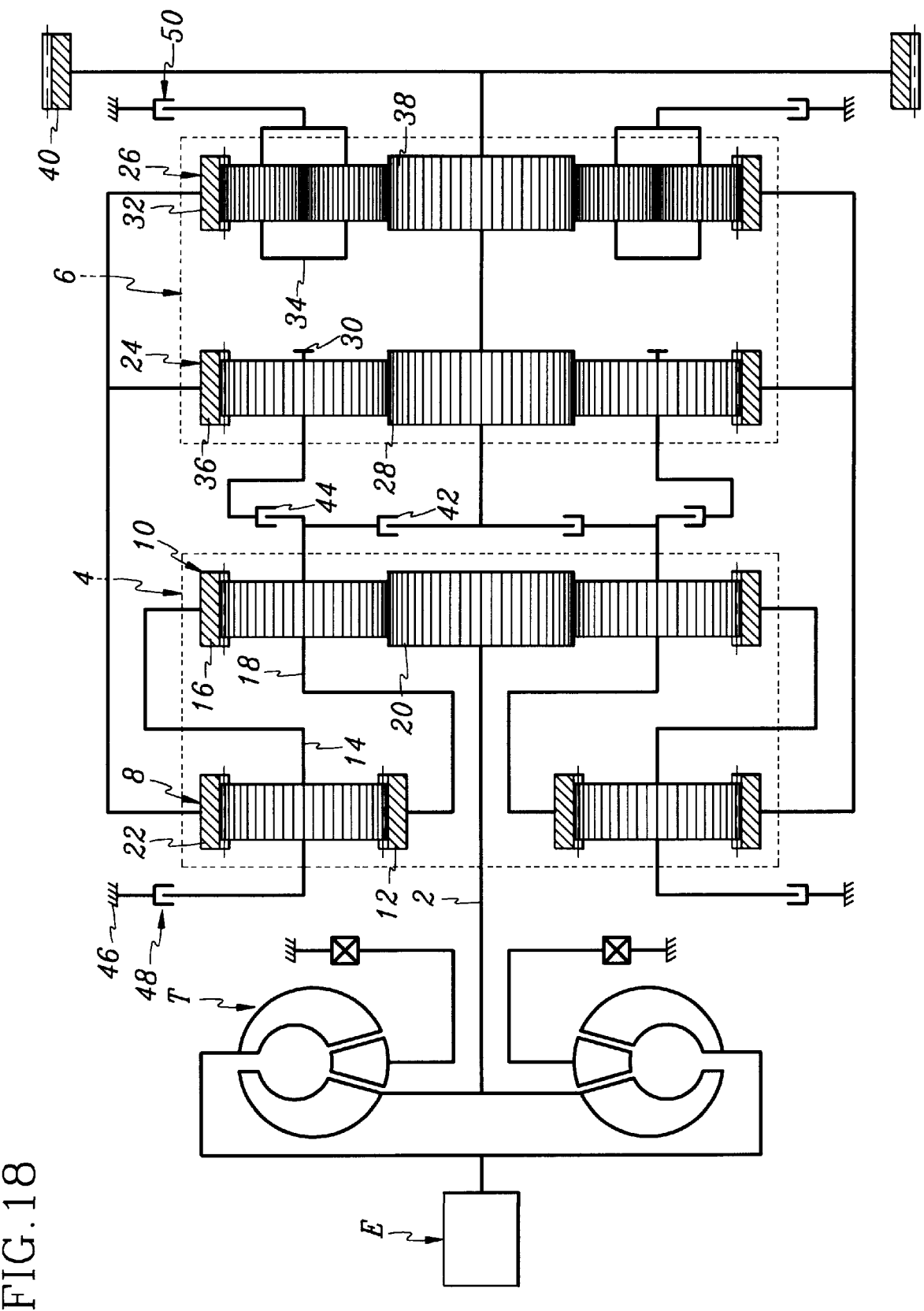
FIG. 18 is a schematic view of a powertrain according to a thirteenth preferred embodiment of the present invention.

Referring to FIG. 18, shown is a schematic view of a powertrain according to a thirteenth preferred embodiment of the present invention. In the thirteenth embodiment, as in the twelfth embodiment, the fourth simple planetary gearset 26 is a double pinion planetary gearset, while the first, second, and third simple planetary gearsets 8, 10, and 24 are single pinion planetary gearsets. As shown in the drawing, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the ring gear 22 of the first simple planetary gearset 8 is fixedly connected to a combination of the ring gears 36 and 32 of the third and fourth simple planetary gearsets 24 and 26, and a combination of the sun gear 12 and planet carrier 18 of the first and second simple planetary gearsets 8 and 10 is variably connected to both a combination of the sun gears 28 and 38 of the third and fourth simple planetary gearsets 24 and 26 through the first clutch 42, and to the planet carrier 30 of the third simple planetary gearset 24 through the second clutch 44.

Also, the planet carrier 34 of the fourth simple planetary gearset 26 is connected to the transmission housing 46 with the second brake 50 interposed therebetween such that the planet carrier 34 acts as a reaction element. In addition, a combination of the sun gears 28 and 38 of the third and fourth simple planetary gearsets 24 and 26 acts as an output element.

According to the above structure, operating elements for the second compound planetary gearset 6 in the lever analogies of FIGS. 2–5 are as follows: the first operating element G indicates a combination of the sun gears 28 and 38 of the third and fourth simple planetary gearsets 24 and 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirteenth embodiment, only the structure of the second compound planetary gearset 6 is changed from the first embodiment. As the operation of the operating elements in each shift range is identical to that of the first embodiment, an explanation thereof will be omitted herein.

Fourteenth Embodiment

Figure 19:
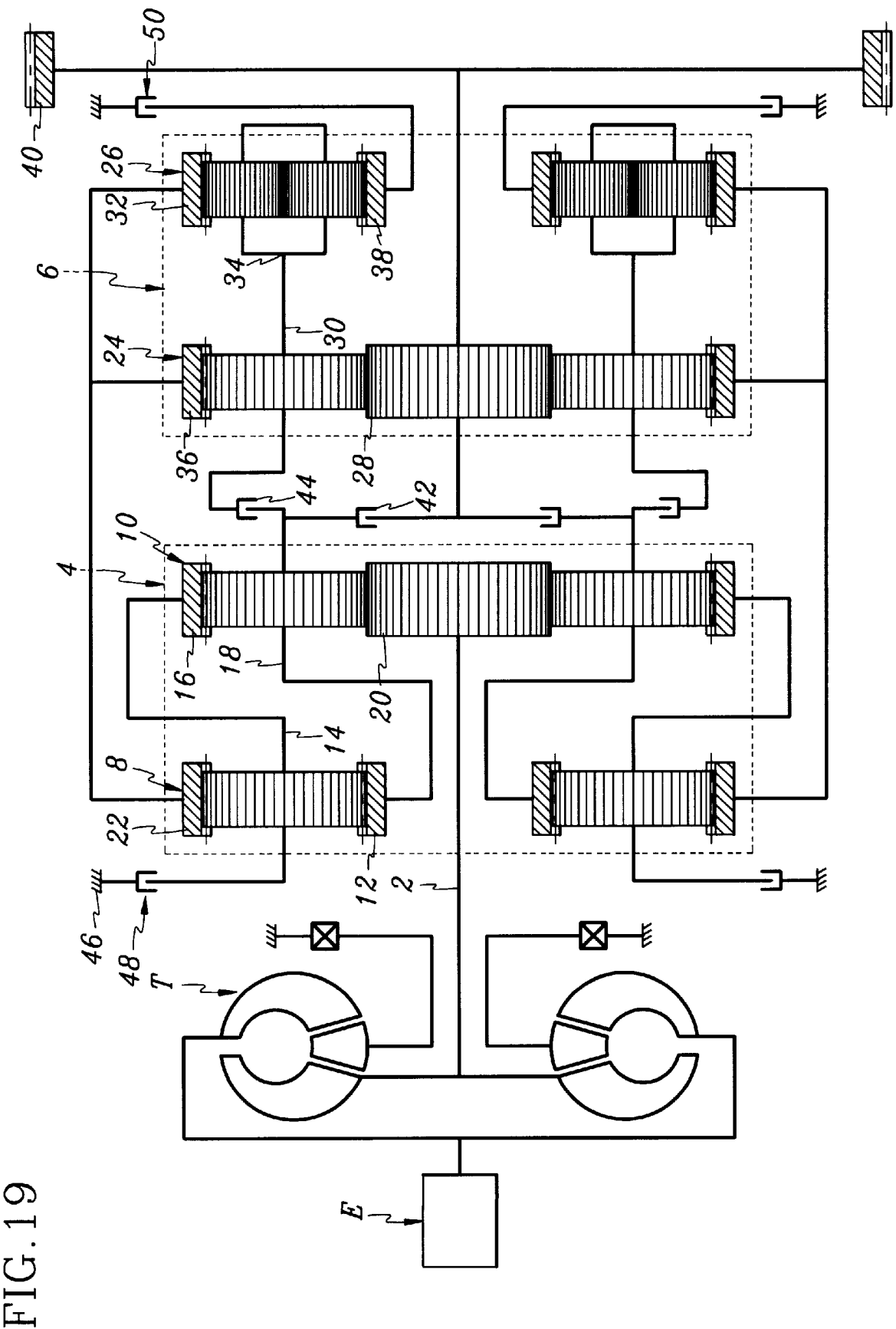
FIG. 19 is a schematic view of a powertrain according to a fourteenth preferred embodiment of the present invention.

Referring to FIG. 19, shown is a schematic view of a powertrain according to a fourteenth preferred embodiment of the present invention. In the fourteenth embodiment, as in the twelfth embodiment, the fourth simple planetary gearset 26 is a double pinion planetary gearset, while the first, second, and third simple planetary gearsets 8, 10, and 24 are single pinion planetary gearsets. As shown in the drawing, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to a combination of the ring gears 36 and 32 of the third and fourth simple planetary gearsets 24 and 26, and a combination of the sun gear 12 and planet carrier 18 of the first and second simple planetary gearsets 8 and 10 is variably connected to both the sun gear 28 of the third simple planetary gearset 24 through the first clutch 42, and to a combination of the planet carriers 30 and 34 of the third and fourth simple planetary gearsets 24 and 26 through the second clutch 44.

Also, the sun gear 38 of the fourth simple planetary gearset 26 is connected to the transmission housing 46 with the second brake 50 interposed therebetween such that the sun gear 38 acts as a reaction element. In addition, the sun gear 28 of the third simple planetary gearset 24 acts as an output element.

According to the above structure, operating elements for the second compound planetary gearset 6 in the lever analogies of FIGS. 2–5 are as follows: the first operating element G indicates the sun gear 28 of the third simple planetary gearset 24, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fourteenth embodiment, only the structure of the second compound planetary gearset 6 is changed from the first embodiment. As the operation of the operating elements in each shift range is identical to that of the first embodiment, an explanation thereof will be omitted herein.

Fifteenth Embodiment

Figure 20:
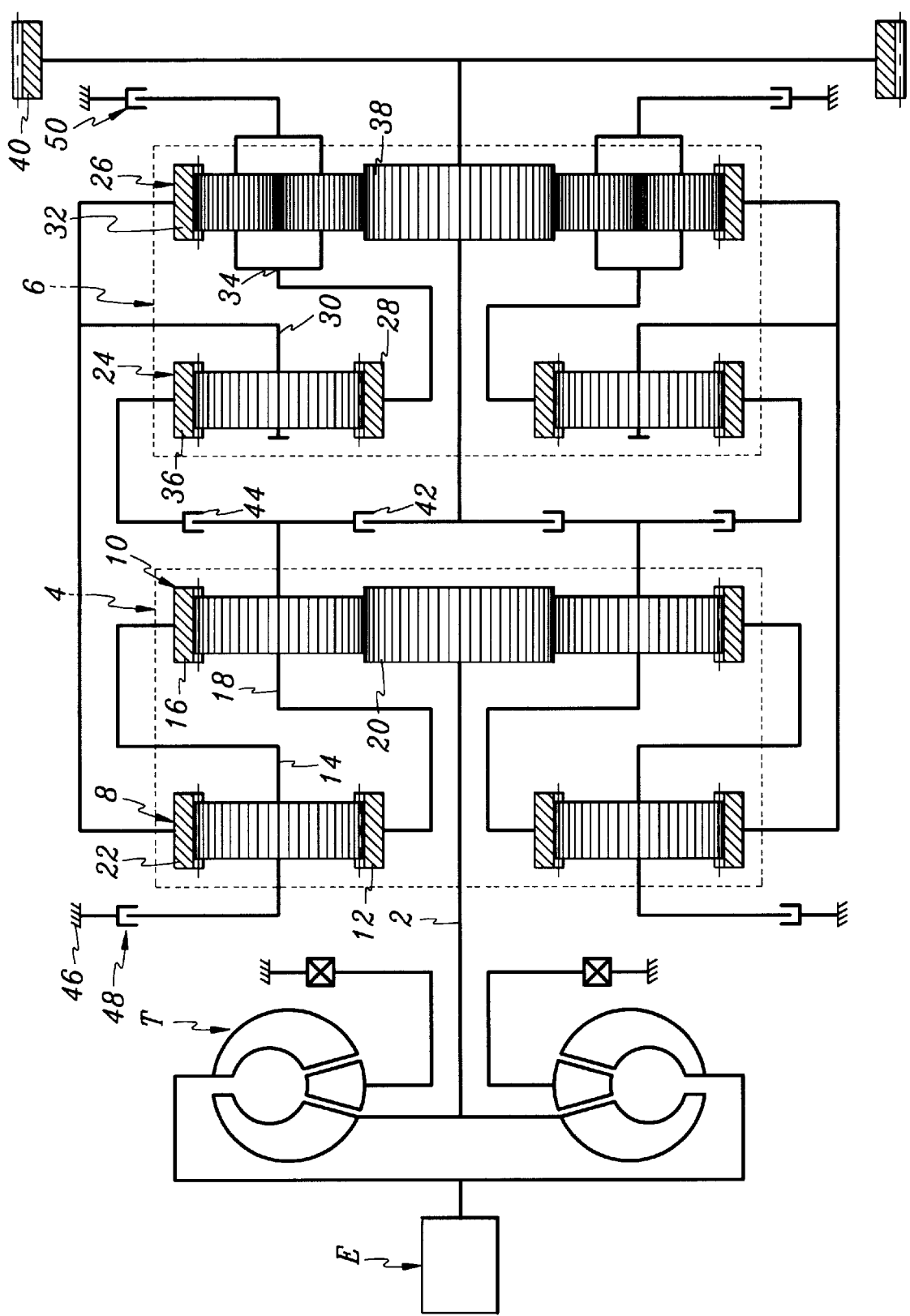
FIG. 20 is a schematic view of a powertrain according to a fifteenth preferred embodiment of the present invention.

Referring to FIG. 20, shown is a schematic view of a powertrain according to a fifteenth preferred embodiment of the present invention. In the fifteenth embodiment, as in the twelfth embodiment, the fourth simple planetary gearset 26 is a double pinion planetary gearset, while the first, second, and third simple planetary gearsets 8, 10, and 24 are single pinion planetary gearsets. As shown in the drawing, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to a combination of the planet carrier 30 and ring gear 32 of the third and fourth simple planetary gearsets 24 and 26, and a combination of the sun gear 12 and planet carrier 18 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, a combination of the sun gear 28 and planet carrier 34 of the third and fourth simple planetary gearsets 24 and 26 is connected to the transmission housing 46 with the second brake 50 interposed therebetween such that the sun gear 28 and planet carrier 34 act as reaction elements. In addition, the sun gear 38 of the fourth simple planetary gearset 26 acts as an output element.

According to the above structure, operating elements for the second compound planetary gearset 6 in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifteenth embodiment, only the structure of the second compound planetary gearset 6 is changed from the first embodiment. As the operation of the operating elements in each shift range is identical to that of the first embodiment, an explanation thereof will be omitted herein.

Sixteenth Embodiment

Figure 21:
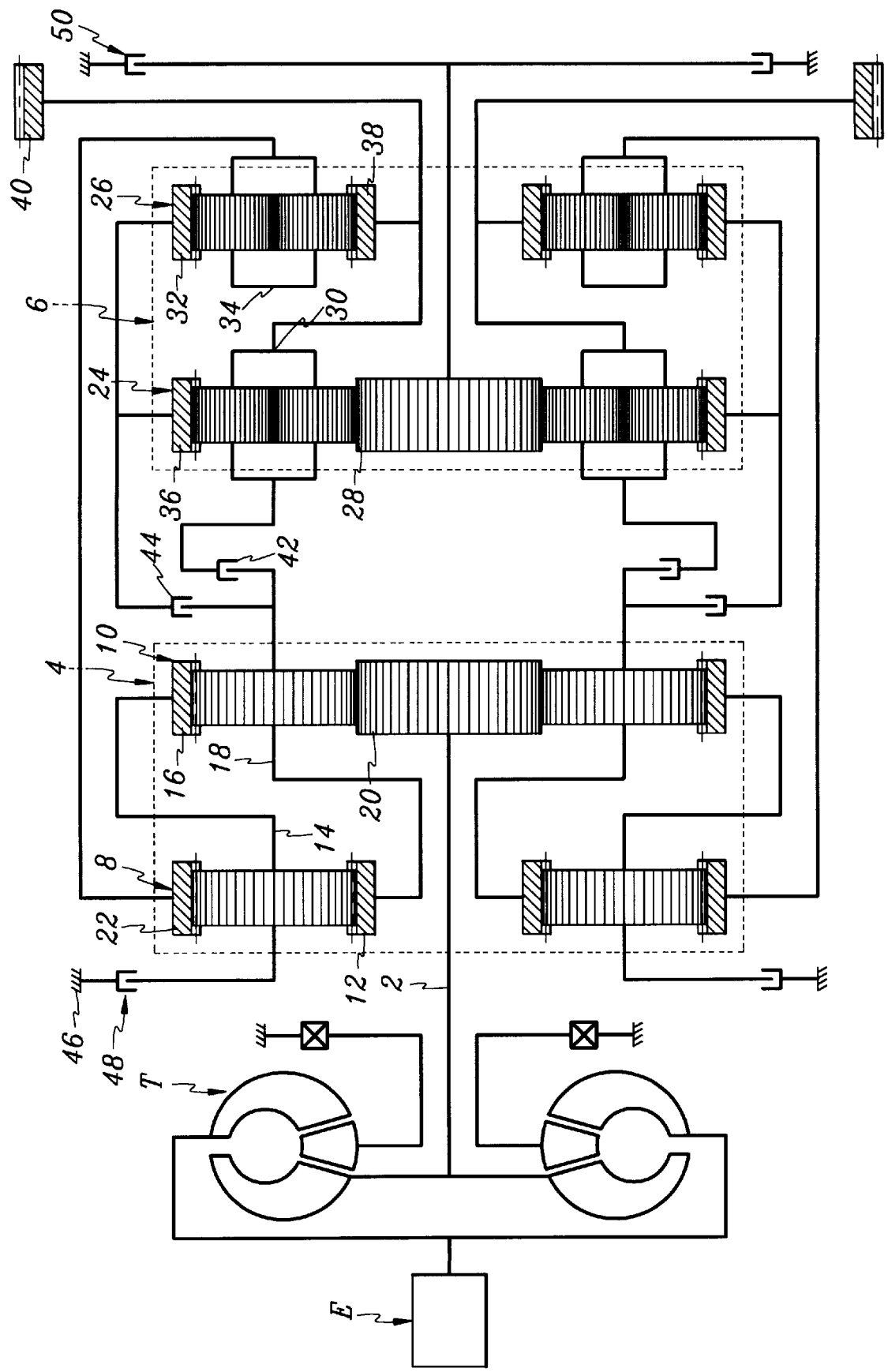
FIG. 21 is a schematic view of a powertrain according to a sixteenth preferred embodiment of the present invention.

Referring to FIG. 21, shown is a schematic view of a powertrain according to a sixteenth preferred embodiment of the present invention. In the sixteenth embodiment, the third and fourth simple planetary gearsets 24 and 26 are double pinion planetary gearsets, while the first and second simple planetary gearsets 8 and 10 are single pinion planetary gearsets as in the first embodiment. As shown in the drawing, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the ring gear 22 of the first simple planetary gearset 8 is fixedly connected to the planet carrier 34 of the fourth simple planetary gearset 24, and a combination of the sun gear 12 and planet carrier 18 of the first and second simple planetary gearsets 8 and 10 is variably connected to both a combination of the planet carrier 30 and sun gear 38 of the third and fourth simple planetary gearsets 24 and 26 through the first clutch 42, and to a combination of the ring gears 36 and 32 of the third and fourth simple planetary gearsets 24 and 26 through the second clutch 44.

Also, the sun gear 28 of the third simple planetary gearset 24 is connected to the transmission housing 46 with the second brake 50 interposed therebetween such that the sun gear 28 acts as a reaction element. In addition, output is realized through a combination of the planet carrier 30 and sun gear 38 of the third and fourth simple planetary gearsets 24 and 26.

According to the above structure, operating elements for the second compound planetary gearset 6 in the lever analogies of FIGS. 2–5 are as follows: the first operating element G indicates a combination of the planet carrier 30 and sun gear 38 of the third and fourth simple planetary gearsets 24 and 26, the second operating element H indicates a combination of the ring gears 36 and 32 of the third and fourth simple planetary gearsets 24 and 26, the third operating element I indicates the planet carrier 34 of the fourth simple planetary gearset 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixteenth embodiment, only the structure of the second compound planetary gearset 6 is changed from the first embodiment. As the operation of the operating elements in each shift range is identical to that of the first embodiment, an explanation thereof will be omitted herein.

Seventeenth Embodiment

Figure 22:
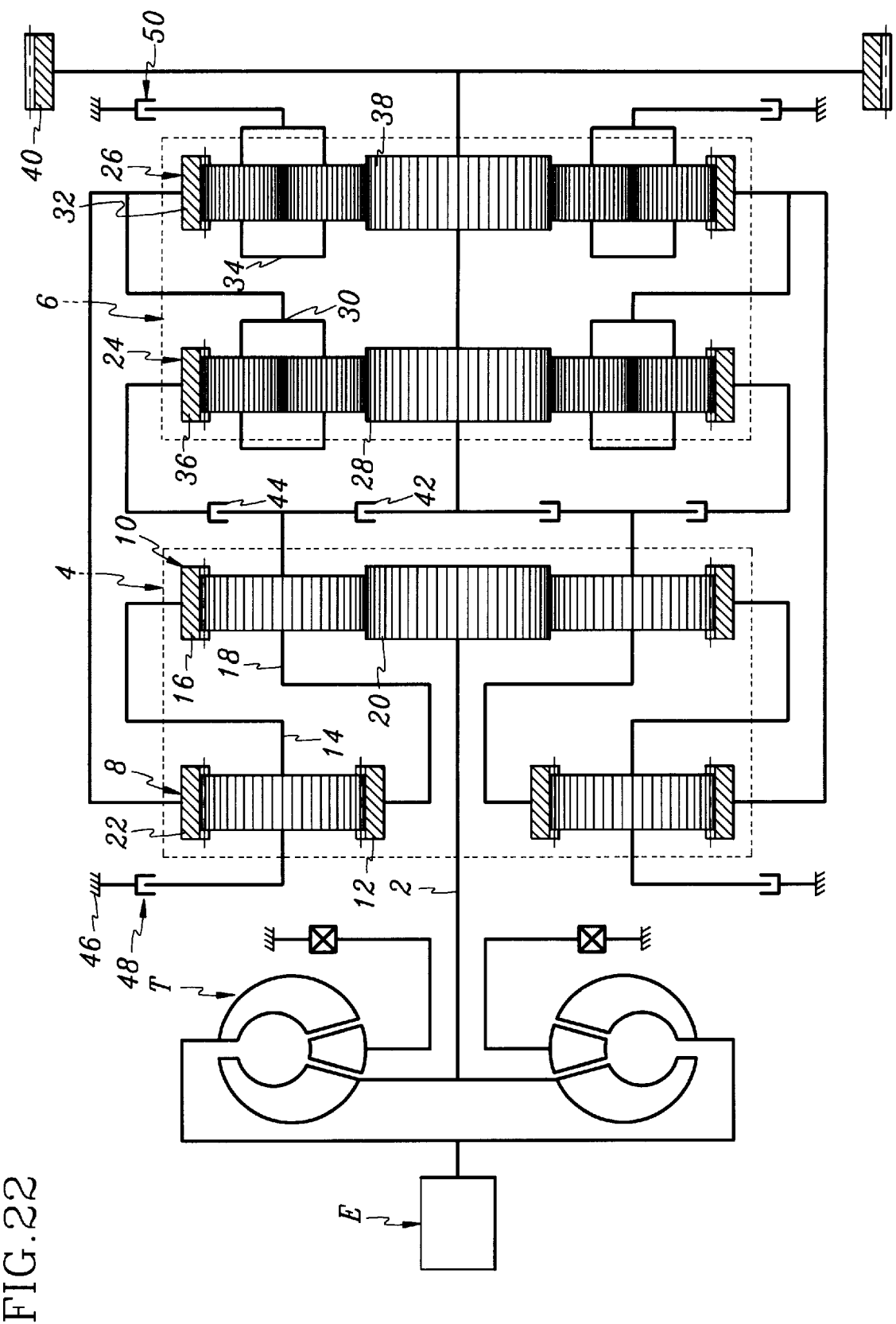
FIG. 22 is a schematic view of a powertrain according to a seventeenth preferred embodiment of the present invention.

Referring to FIG. 22, shown is a schematic view of a powertrain according to a seventeenth preferred embodiment of the present invention. In the seventeenth embodiment, as in the sixteenth embodiment, the third and fourth simple planetary gearsets 24 and 26 are double pinion planetary gearsets, while the first and second simple planetary gearsets 8 and 10 are single pinion planetary gearsets. As shown in the drawing, the planet carrier 30 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the ring gear 22 of the first simple planetary gearset 8 is fixedly connected to a combination of the planet carrier 30 and ring gear 32 of the third and fourth simple planetary gearsets 24 and 26, and a combination of the sun gear 12 and planet carrier 18 of the first and second simple planetary gearsets 8 and 10 is variably connected to both a combination of the sun gears 28 and 38 of the third and fourth simple planetary gearsets 24 and 26 through the first clutch 42, and to the ring gear 36 of the third simple planetary gearset 24 through the second clutch 44.

Also, the planet carrier 34 of the fourth simple planetary gearset 26 is connected to the transmission housing 46 with the second brake 50 interposed therebetween such that the planet carrier 34 acts as a reaction element. In addition, a combination of the sun gears 28 and 38 of the third and fourth simple planetary gearsets 24 and 26 acts as an output element.

According to the above structure, operating elements for the second compound planetary gearset 6 in the lever analogies of FIGS. 2–5 are as follows: the first operating element G indicates a combination of the sun gears 28 and 38 of the third and fourth simple planetary gearsets 24 and 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventeenth embodiment, only the structure of the second compound planetary gearset 6 is changed from the first embodiment. As the operation of the operating elements in each shift range is identical to that of the first embodiment, an explanation thereof will be omitted herein.

Eighteenth Embodiment

Figure 23:
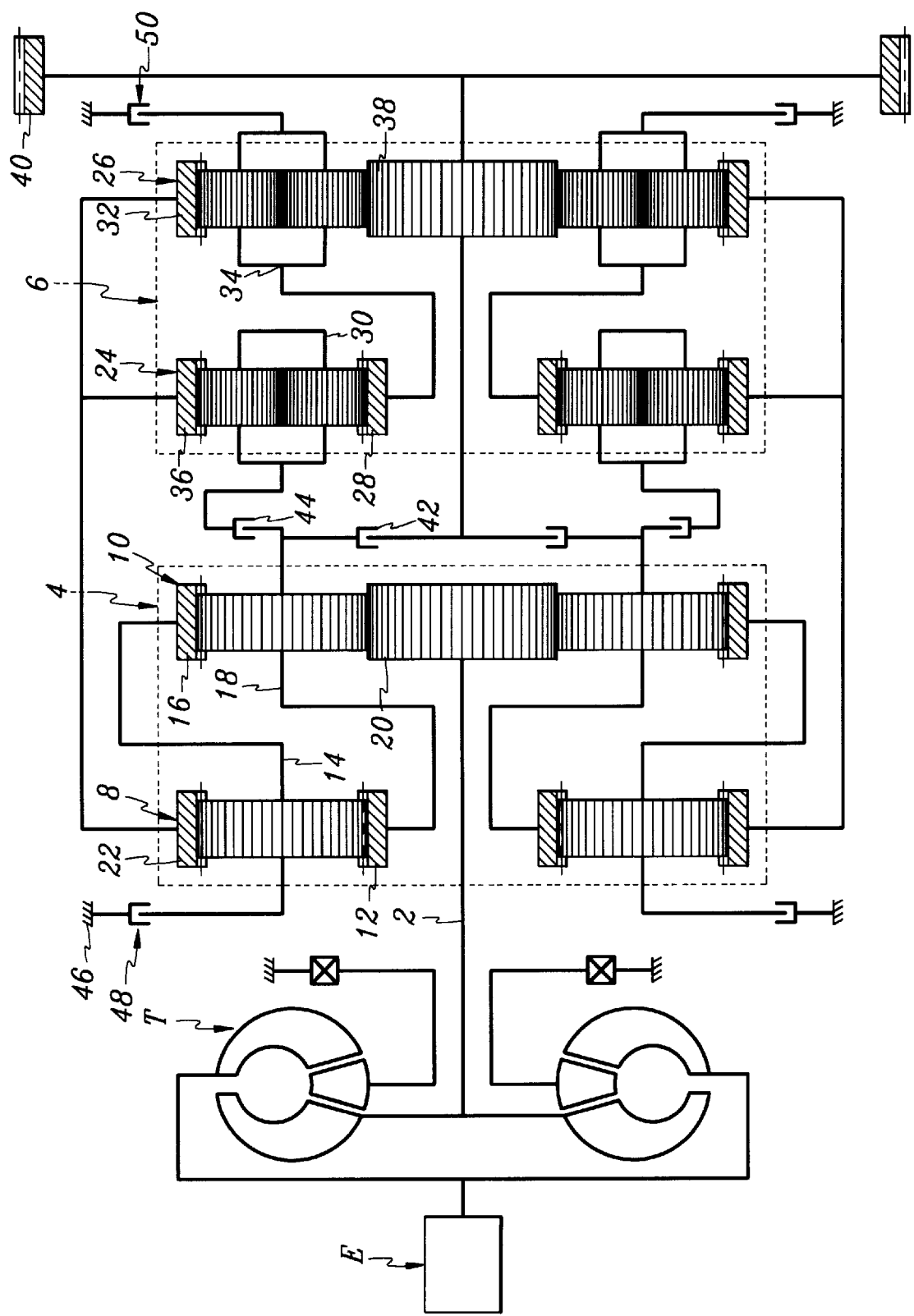
FIG. 23 is a schematic view of a powertrain according to an eighteenth preferred embodiment of the present invention.

Referring to FIG. 23, shown is a schematic view of a powertrain according to an eighteenth preferred embodiment of the present invention. In the eighteenth embodiment, as in the sixteenth embodiment, the third and fourth simple planetary gearsets 24 and 26 are double pinion planetary gearsets, while the first and second simple planetary gearsets 8 and 10 are single pinion planetary gearsets. As shown in the drawing, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 22 of the first simple planetary gearset 8 is fixedly connected to a combination of the ring gears 36 and 32 of the third and fourth simple planetary gearsets 24 and 26, and a combination of the sun gear 12 and planet carrier 18 of the first and second simple planetary gearsets 8 and 10 is variably connected to both the sun gear 38 of the fourth simple planetary gearset 26 through the first clutch 42, and to the planet carrier 30 of the third simple planetary gearset 24 through the second clutch 44.

Also, a combination of the sun gear 28 and planet carrier 34 of the third and fourth simple planetary gearsets 24 and 26 is connected to the transmission housing 46 with the second brake 50 interposed therebetween such that the sun gear 28 and planet carrier 34 act as reaction elements. In addition, the sun gear 38 of the fourth simple planetary gearset 26 acts as an output element.

According to the above structure, operating elements for the second compound planetary gearset 6 in the lever analogies of FIGS. 2–5 are as follows: the first operating element G indicates the sun gear 38 of the fourth simple planetary gearset 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighteenth embodiment, only the structure of the second compound planetary gearset 6 is changed from the first embodiment. As the operation of the operating elements in each shift range is identical to that of the first embodiment, an explanation thereof will be omitted herein.

Nineteenth Embodiment

Figure 24:
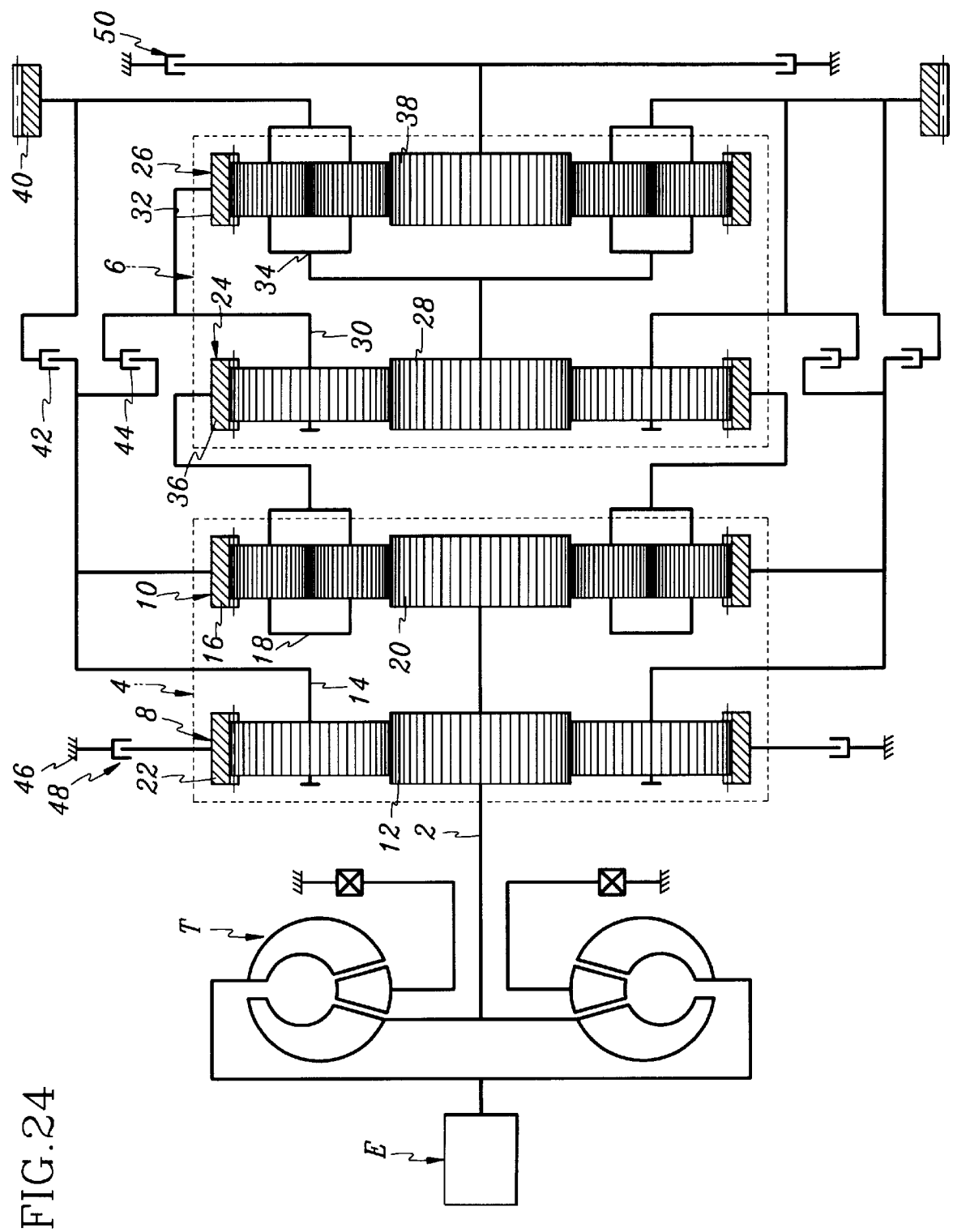
FIG. 24 is a schematic view of a powertrain according to a nineteenth preferred embodiment of the present invention.

Referring to FIG. 24, shown is a schematic view of a powertrain according to a nineteenth preferred embodiment of the present invention. In the nineteenth embodiment, the second and fourth simple planetary gearsets 10 and 26 are double pinion planetary gearsets, while the first and third simple planetary gearsets 8 and 24 are single pinion planetary gearsets as in the first embodiment.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and the sun gear 38 of the fourth simple planetary gearset 26 is connected to the transmission housing 46 with the second brake 50 interposed therebetween as in the twelfth embodiment such that the ring gear 22 and sun gear 38 act as reaction elements. In addition, input is realized through a combination of the sun gears 12 and 20 of the first and second simple planetary gearsets 8 and 10 as in the third embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the nineteenth embodiment, only the structures of the first and second compound planetary gearsets 4 and 6 are changed from the first embodiment. As the operation of the operating elements in each shift range is identical to that of the first embodiment, an explanation thereof will be omitted herein.

Twentieth Embodiment

Figure 25:
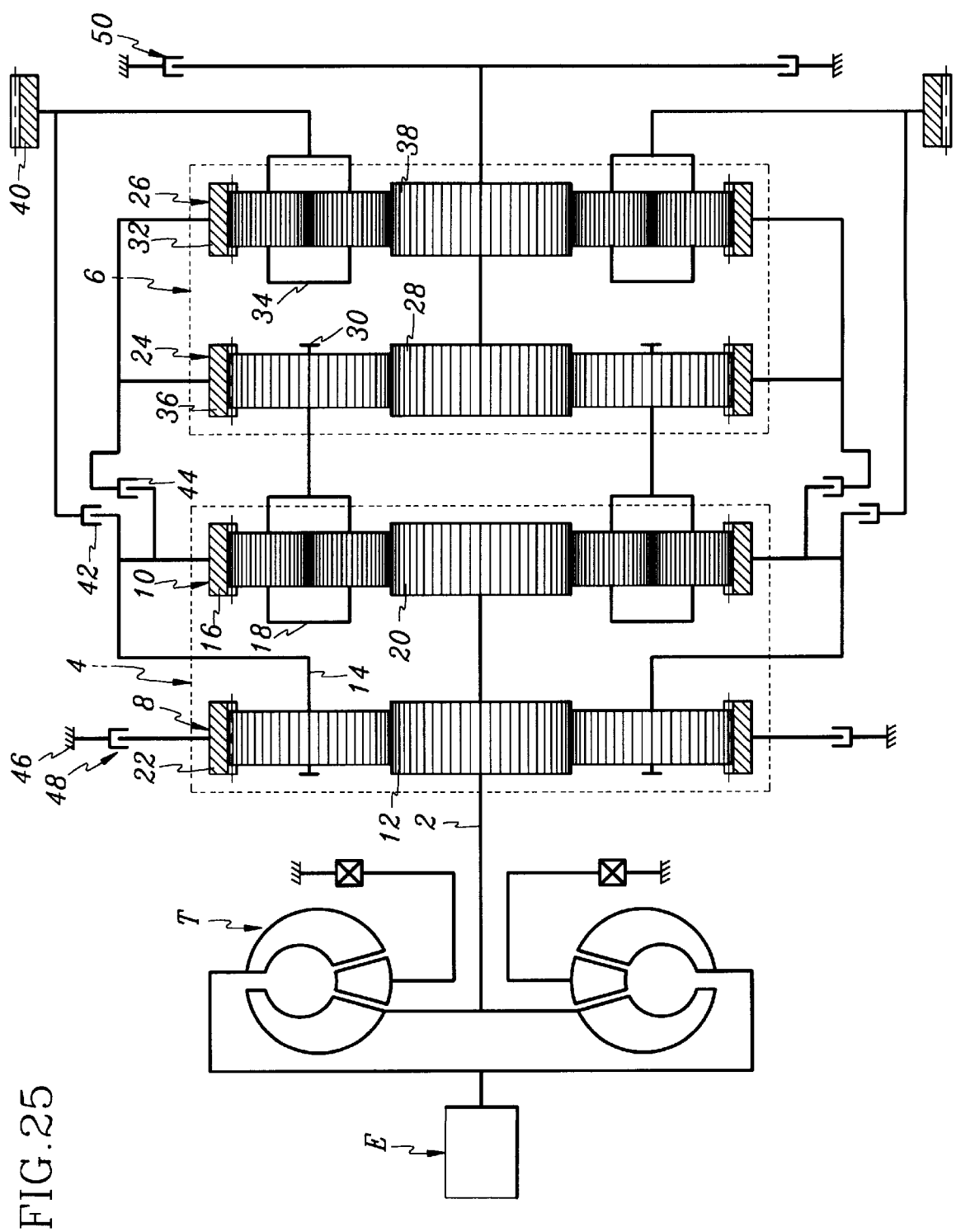
FIG. 25 is a schematic view of a powertrain according to a twentieth preferred embodiment of the present invention.

Referring to FIG. 25, shown is a schematic view of a powertrain according to a twentieth preferred embodiment of the present invention. In the twentieth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the planet carrier 14 and ring gear 16 of the first and second simple planetary gearsets 8 and 10 is variably connected to both the planet carrier 34 of the fourth simple planetary gearset 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and a combination of the sun gears 28 and 38 of the third and fourth simple planetary gearsets 24 and 26 is connected to the transmission housing 46 with the second brake 50 interposed therebetween such that the ring gear 22 and the sun gears 28 and 38 act as reaction elements. In addition, input is realized through a combination of the sun gears 12 and 20 of the first and second simple planetary gearsets 8 and 10 as in the third embodiment, and the planet carrier 34 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the planet carrier 34 of the fourth simple planetary gearset 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twentieth embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-first Embodiment

Figure 26:
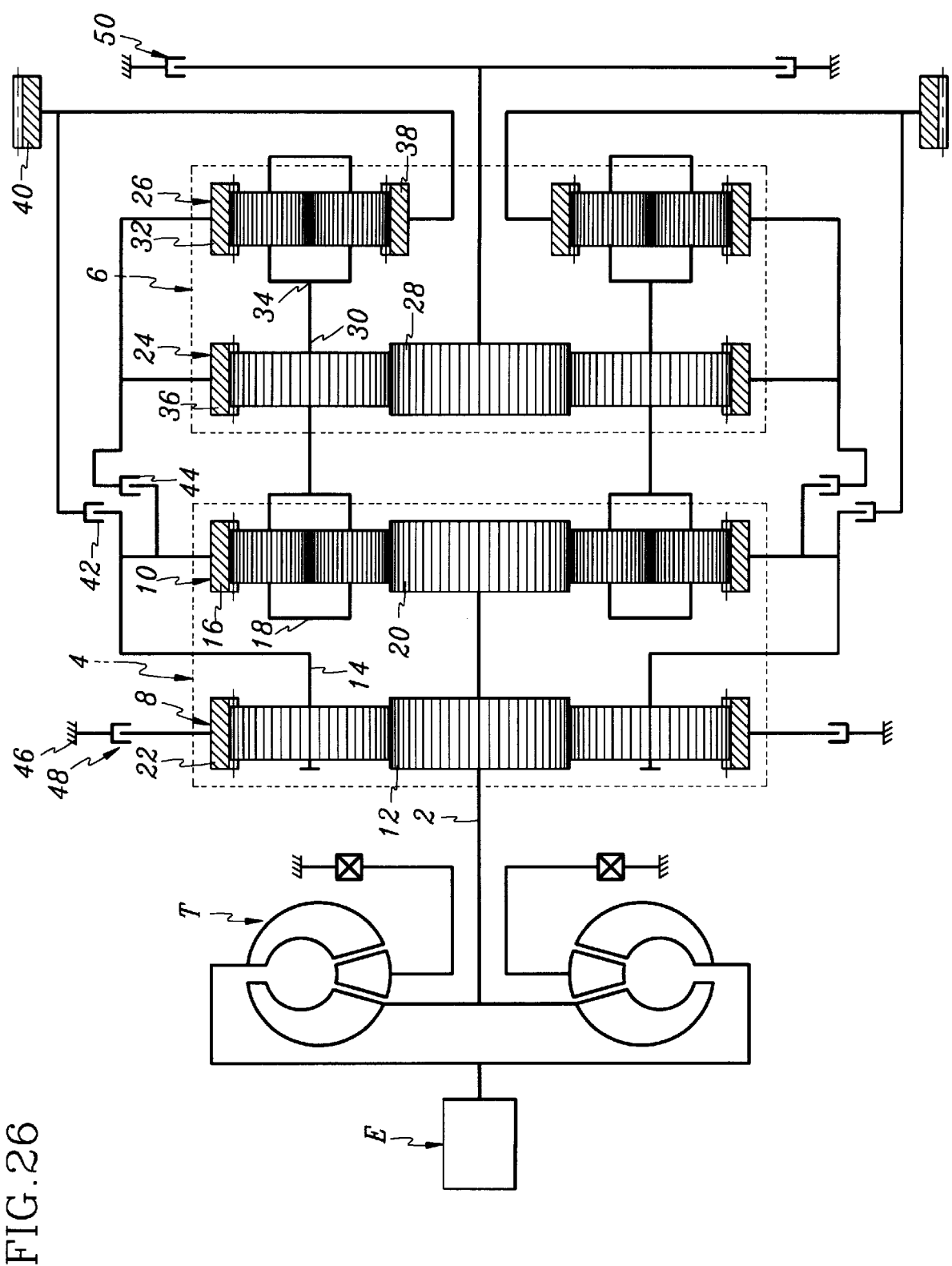
FIG. 26 is a schematic view of a powertrain according to a twenty-first preferred embodiment of the present invention.

Referring to FIG. 26, shown is a schematic view of a powertrain according to a twenty-first preferred embodiment of the present invention. In the twenty-first embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carriers 30 and 34 of the third and fourth simple planetary gearsets 24 and 26, and a combination of the planet carrier 14 and ring gear 16 of the first and second simple planetary gearsets 8 and 10 is variably connected to both the sun gear 38 of the fourth simple planetary gearset 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and the sun gear 28 of the third simple planetary gearset 24 is connected to the transmission housing 46 with the second brake 50 interposed therebetween such that the ring gear 22 and sun gear 28 act as reaction elements. In addition, input is realized through a combination of the sun gears 12 and 20 of the first and second simple planetary gearsets 8 and 10 as in the third embodiment, and the sun gear 38 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the sun gear 38 of the fourth simple planetary gearset 26, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-first embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-second Embodiment

Figure 27:
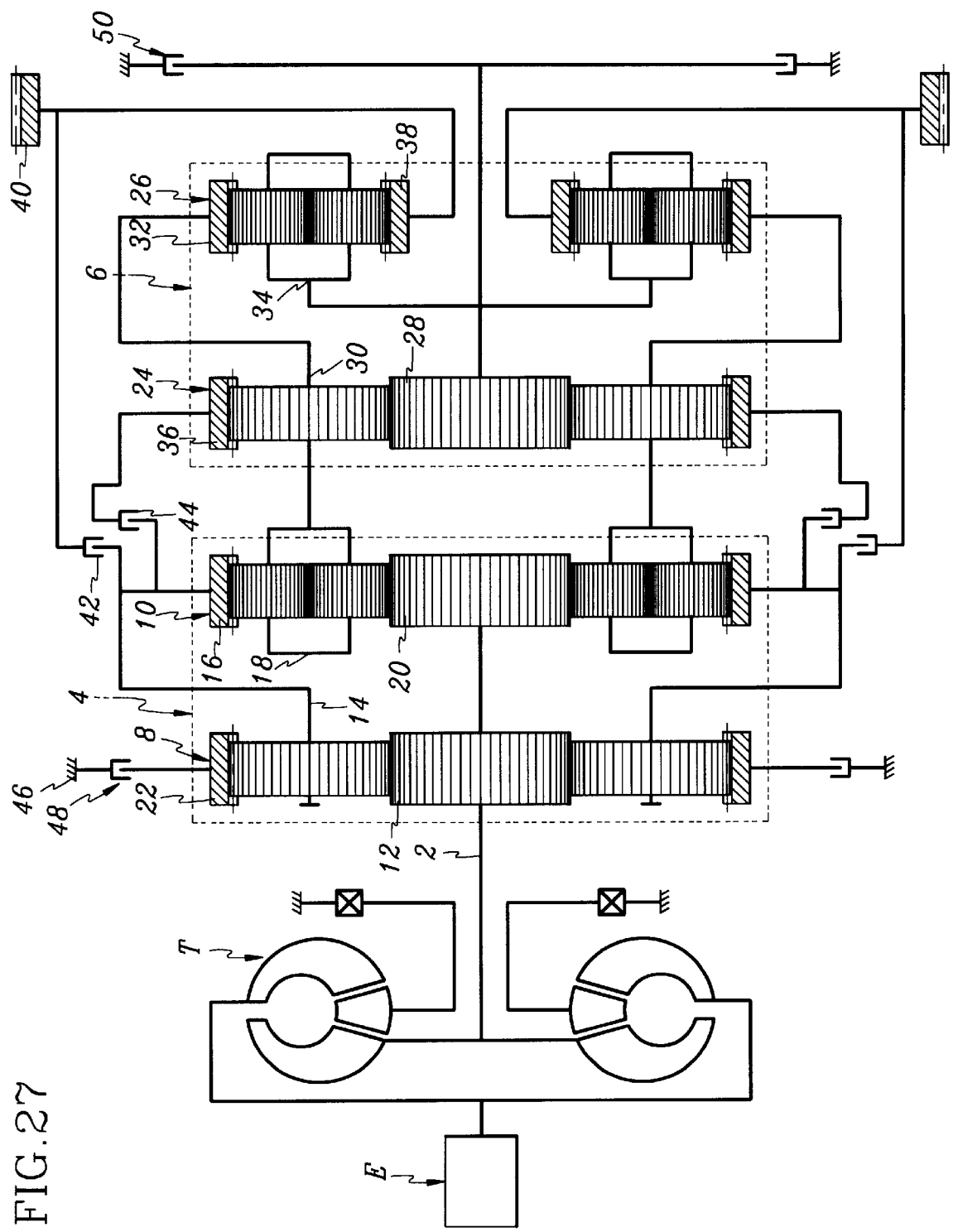
FIG. 27 is a schematic view of a powertrain according to a twenty-second preferred embodiment of the present invention.

Referring to FIG. 27, shown is a schematic view of a powertrain according to a twenty-second preferred embodiment of the present invention. In the twenty-second embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the planet carrier 14 and ring gear 16 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, the ring gear 22 of the first simple planetary gearset 8 is connected to the transmission housing 46 with the first brake 48 interposed therebetween as in the third embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the ring gear 22, and the sun gear 28 and planet carrier 34 act as reaction elements. In addition, input is realized through a combination of the sun gears 12 and 20 of the first and second simple planetary gearsets 8 and 10 as in the third embodiment, and the sun gear 38 of the fourth simple planetary gearset 26 acts as an output element as in the fifteenth embodiment.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-second embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-third Embodiment

Figure 28:
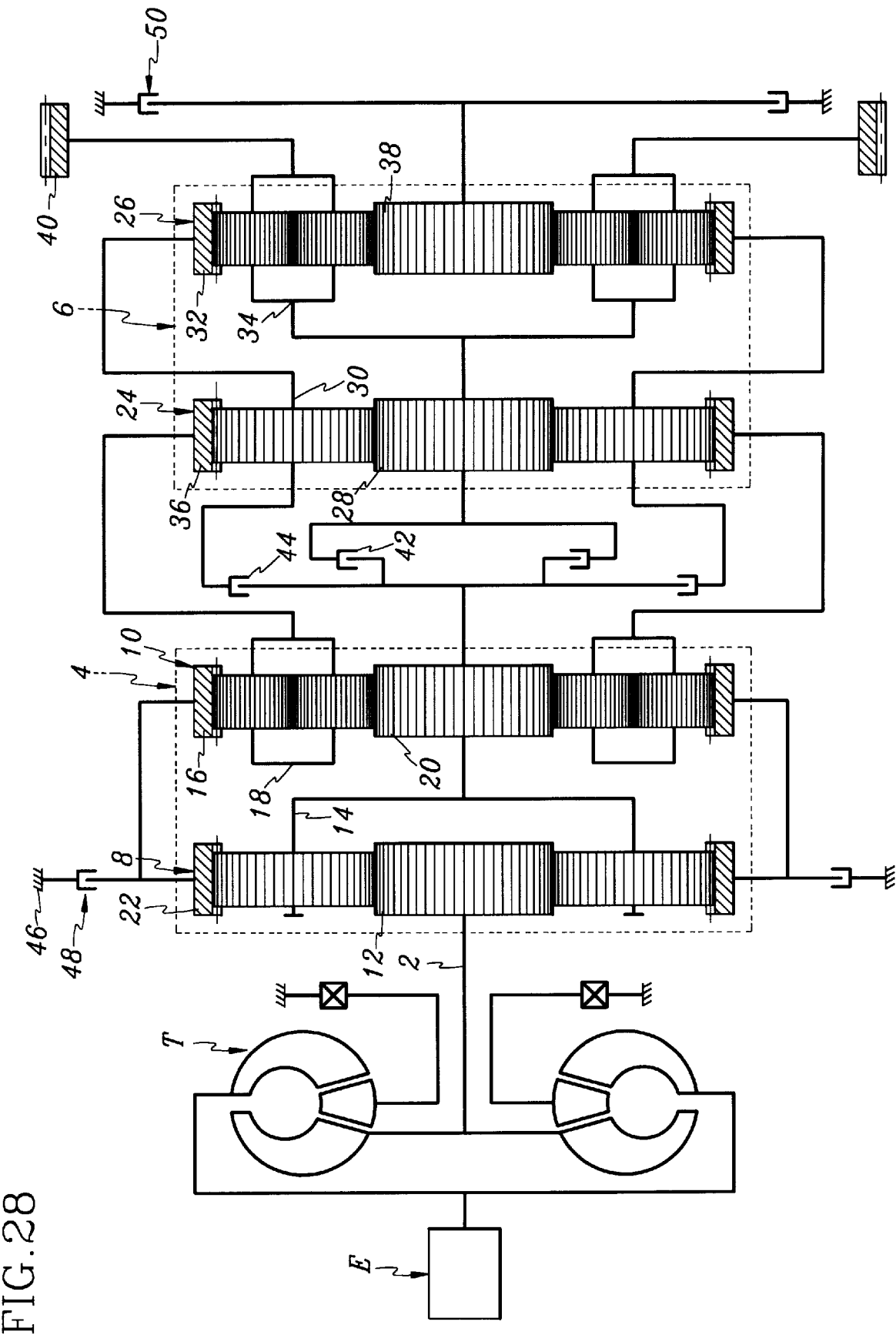
FIG. 28 is a schematic view of a powertrain according to a twenty-third preferred embodiment of the present invention.

Referring to FIG. 28, shown is a schematic view of a powertrain according to a twenty-third preferred embodiment of the present invention. In the twenty-third embodiment, as in the nineteenth embodiment, the second and fourth simple planetary gearsets 10 and 26 are double pinion planetary gearsets, while the first and third simple planetary gearsets 8 and 24 are single pinion planetary gearsets. As shown in the drawing, as in the sixth embodiment, the ring gear 22 and planet carrier 14 of the first simple planetary gearset 8 are fixedly connected respectively to the ring gear 16 and sun gear 20 of the second simple planetary gearset 10.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and sun gear 20 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween such that the ring gears 22 and 16 act as reaction elements. In addition, the sun gear 12 of the first simple planetary gearset 8 acts as an input element.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-third embodiment, only the structure of the first compound planetary gearset 4 is changed from the first embodiment. As the operation of the operating elements in each shift range is identical to that of the first embodiment, an explanation thereof will be omitted herein.

Twenty-fourth Embodiment

Figure 29:
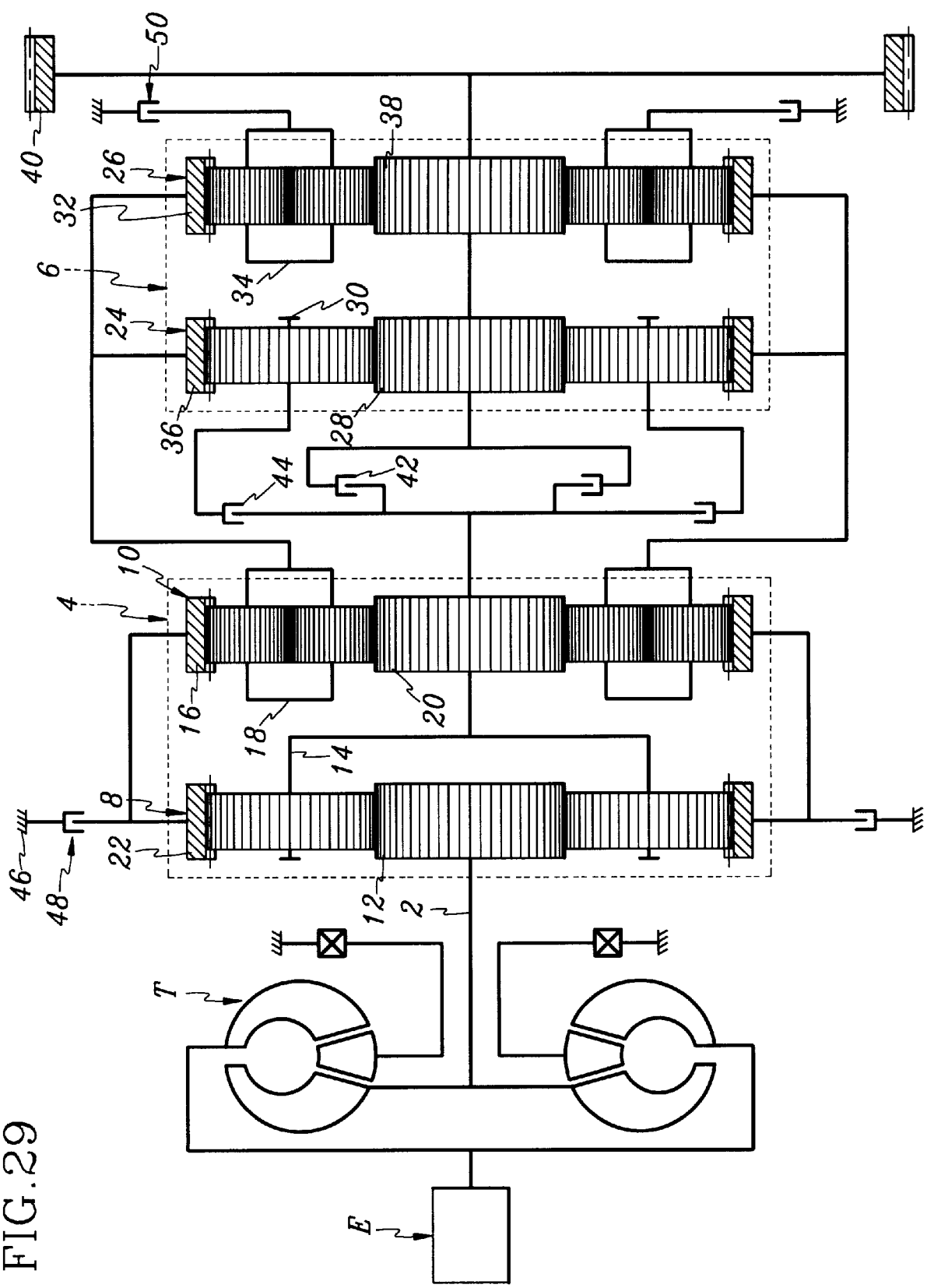
FIG. 29 is a schematic view of a powertrain according to a twenty-fourth preferred embodiment of the present invention.

Referring to FIG. 29, shown is a schematic view of a powertrain according to a twenty-fourth preferred embodiment of the present invention. In the twenty-fourth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the thirteenth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the planet carrier 14 and sun gear 20 of the first and second simple planetary gearsets 8 and 10 is variably connected to both a combination of the sun gears 28 and 38 of the third and fourth simple planetary gearsets 24 and 26 through the first clutch 42, and to the planet carrier 30 of the third simple planetary gearset 24 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the planet carrier 34 of the fourth simple planetary gearset 26 is connected to the transmission housing 46 with the second brake 50 interposed therebetween as in the thirteenth embodiment such that the ring gears 22 and 16, and the planet carrier 34 act as reaction elements. In addition, input is realized through the sun gear 12 of the first simple planetary gearset 8 as in the sixth embodiment, and a combination of the sun gears 28 and 38 of the third and fourth simple planetary gearsets 24 and 26 acts as an output element as in the thirteenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the thirteenth embodiment, in the lever analogies of FIGS. 2–5 are as follows: the first operating element G indicates a combination of the sun gears 28 and 38 of the third and fourth simple planetary gearsets 24 and 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-fifth embodiment

Figure 30:
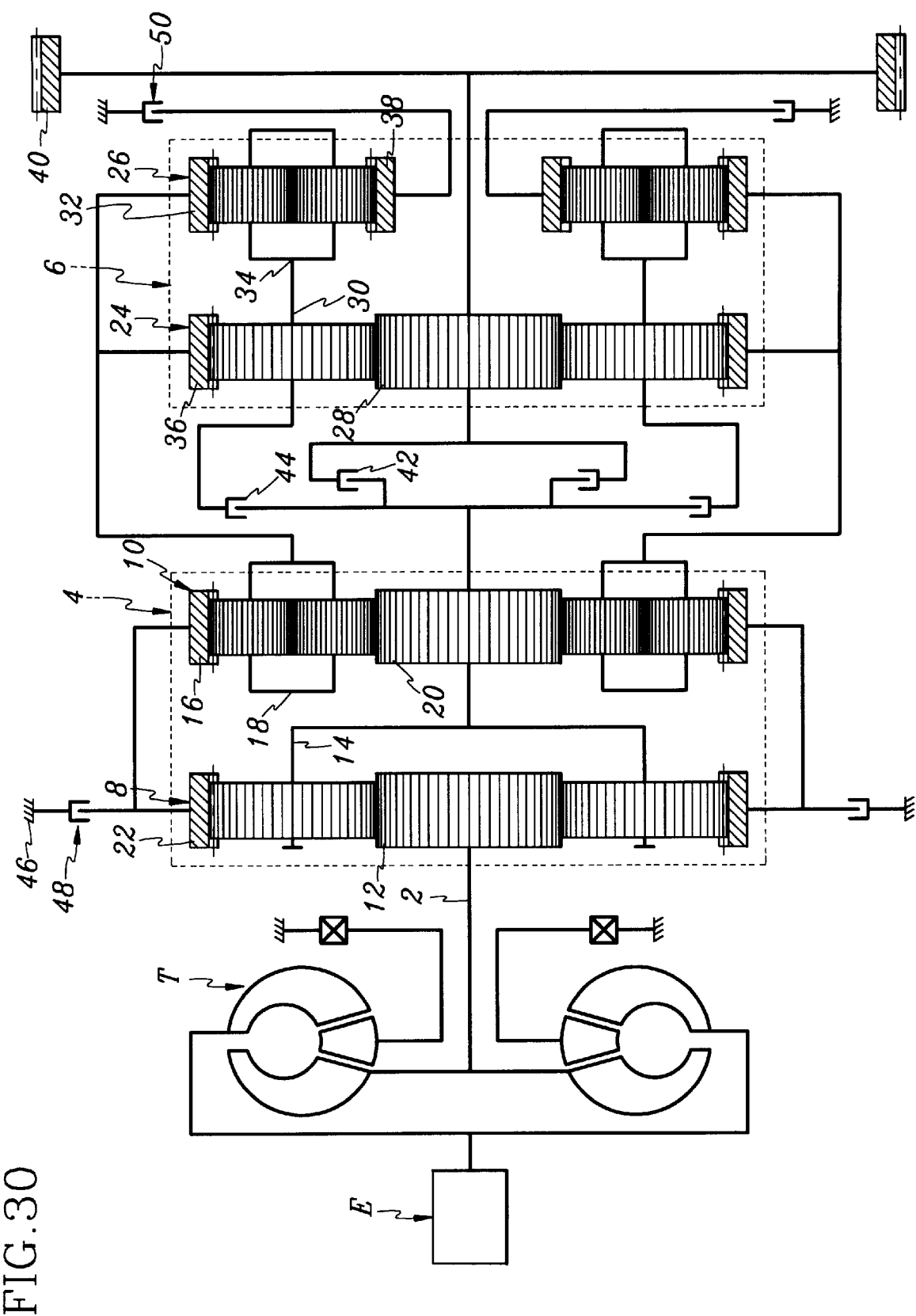
FIG. 30 is a schematic view of a powertrain according to a twenty-fifth preferred embodiment of the present invention.

Referring to FIG. 30, shown is a schematic view of a powertrain according to a twenty-fifth preferred embodiment of the present invention. In the twenty-fifth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the fourteenth embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the planet carrier 14 and sun gear 20 of the first and second simple planetary gearsets 8 and 10 is variably connected to both the sun gear 28 of the third simple planetary gearset 24 through the first clutch 42, and to a combination of the planet carriers 30 and 34 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the sun gear 38 of the fourth simple planetary gearset 26 is connected to the transmission housing 46 with the second brake 50 interposed therebetween as in the fourteenth embodiment such that the ring gears 22 and 16, and the sun gear 38 act as reaction elements. In addition, input is realized through the sun gear 12 of the first simple planetary gearset 8 as in the sixth embodiment, and the sun gears 28 of the third simple planetary gearset 24 acts as an output element as in the fourteenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the fourteenth embodiment, in the lever analogies of FIGS. 2–5 are as follows: the first operating element G indicates the sun gear 28 of the third simple planetary gearset 24, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-sixth Embodiment

Figure 31:
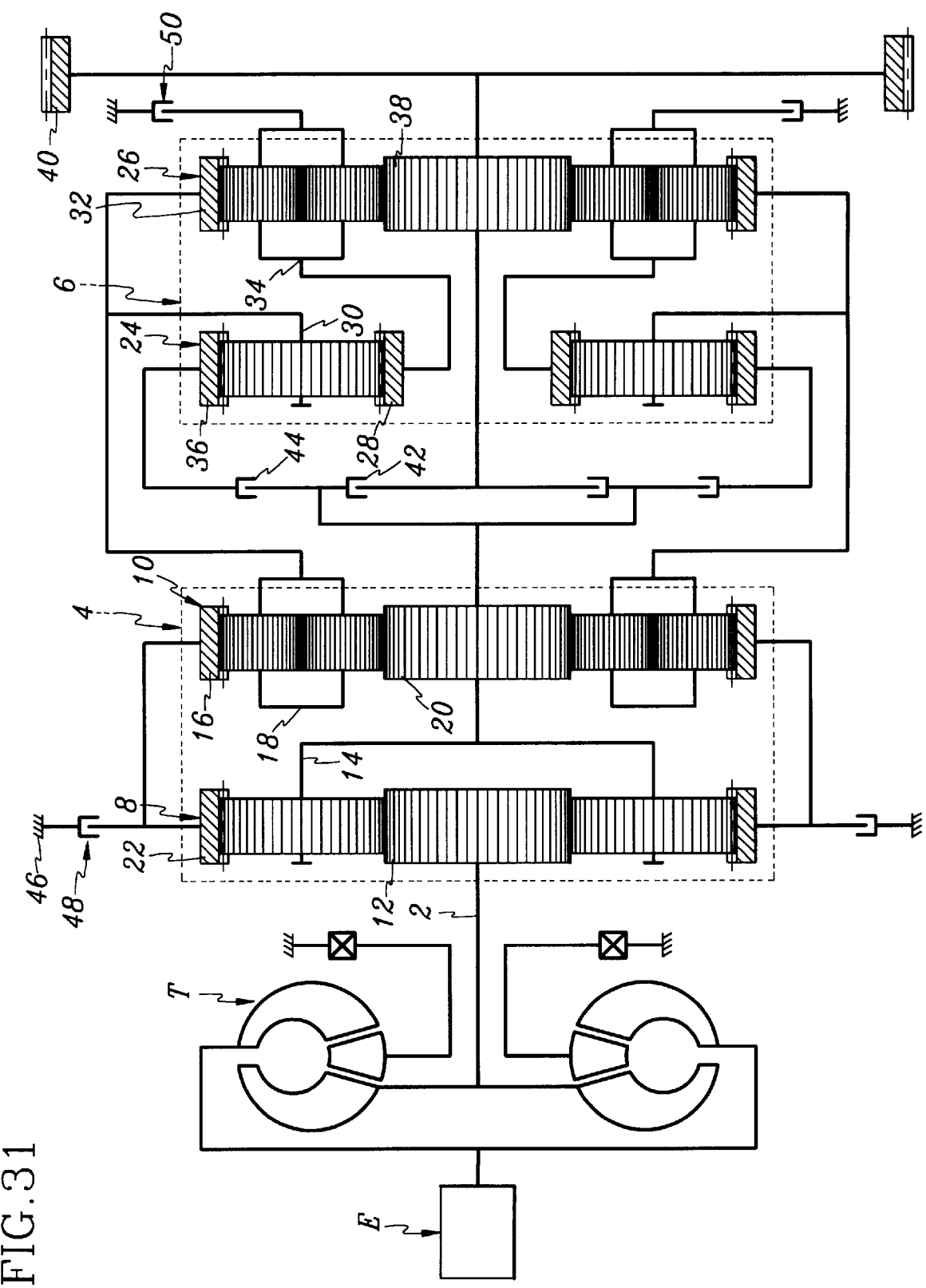
FIG. 31 is a schematic view of a powertrain according to a twenty-sixth preferred embodiment of the present invention.

Referring to FIG. 31, shown is a schematic view of a powertrain according to a twenty-sixth preferred embodiment of the present invention. In the twenty-sixth embodiment, as in the nineteenth embodiment, the second and fourth simple planetary gearsets 10 and 26 are double pinion planetary gearsets, while the first and third simple planetary gearsets 8 and 24 are single pinion planetary gearsets as in the first embodiment.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the planet carrier 14 and sun gear 20 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the ring gears 22 and 16, and the sun gear 28 and planet carrier 34 act as reaction elements. In addition, input is realized through the sun gear 12 of the first simple planetary gearset 8 as in the sixth embodiment, and the sun gear 38 of the fourth simple planetary gearset 26 acts as an output element as in the fifteenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-seventh Embodiment

Figure 32:
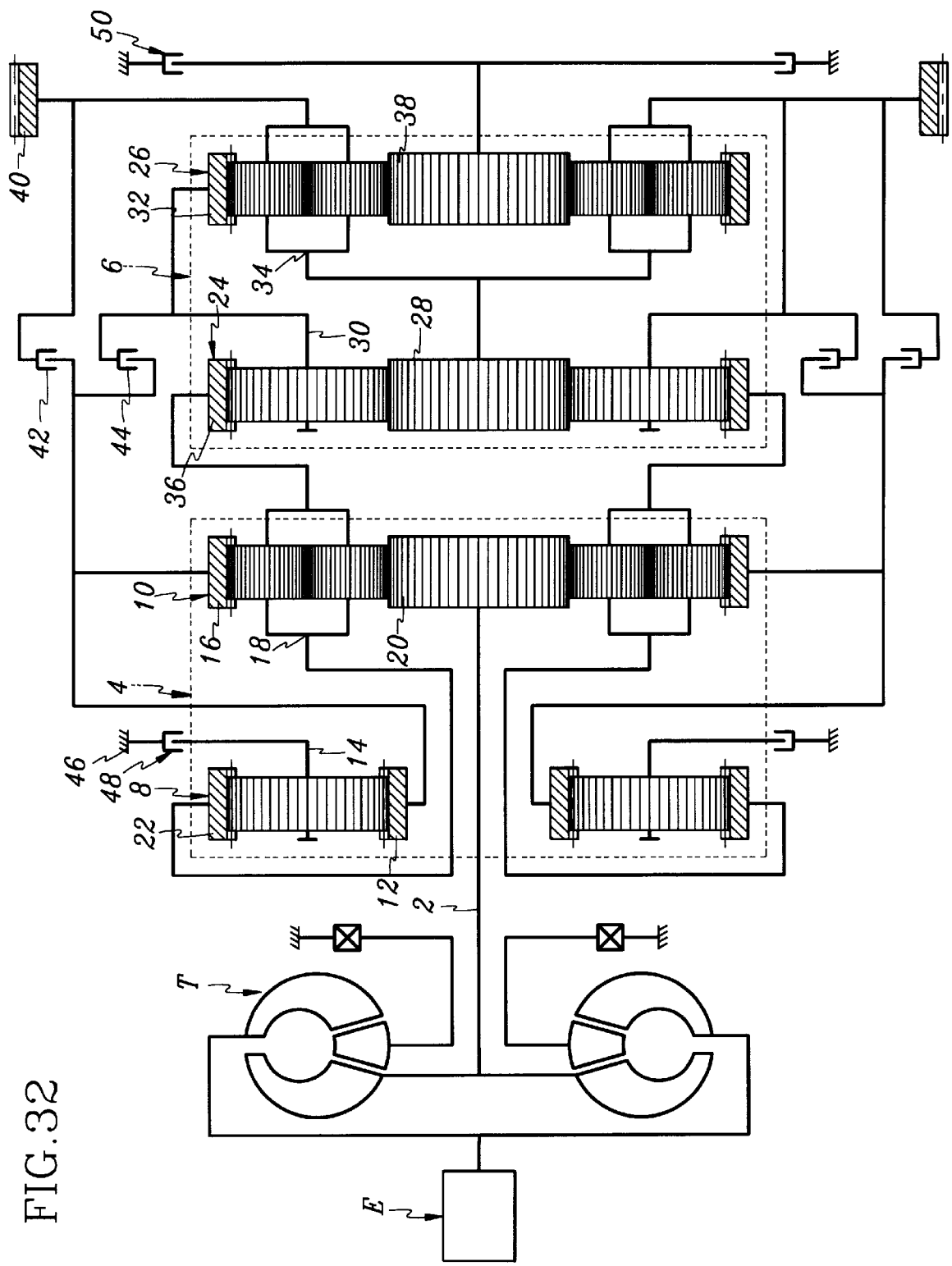
FIG. 32 is a schematic view of a powertrain according to a twenty-seventh preferred embodiment of the present invention.

Referring to FIG. 32, shown is a schematic view of a powertrain according to a twenty-seventh preferred embodiment of the present invention. In the twenty-seventh embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and the sun gear 38 of the fourth simple planetary gearset 26 is connected to the transmission housing 46 with the second brake 50 interposed therebetween as in the twelfth embodiment such that the planet carrier 14 and sun gear 38 act as reaction elements. In addition, input is realized through the sun gear 20 of the second simple planetary gearset 10 as in the eighth embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-eighth Embodiment

Figure 33:
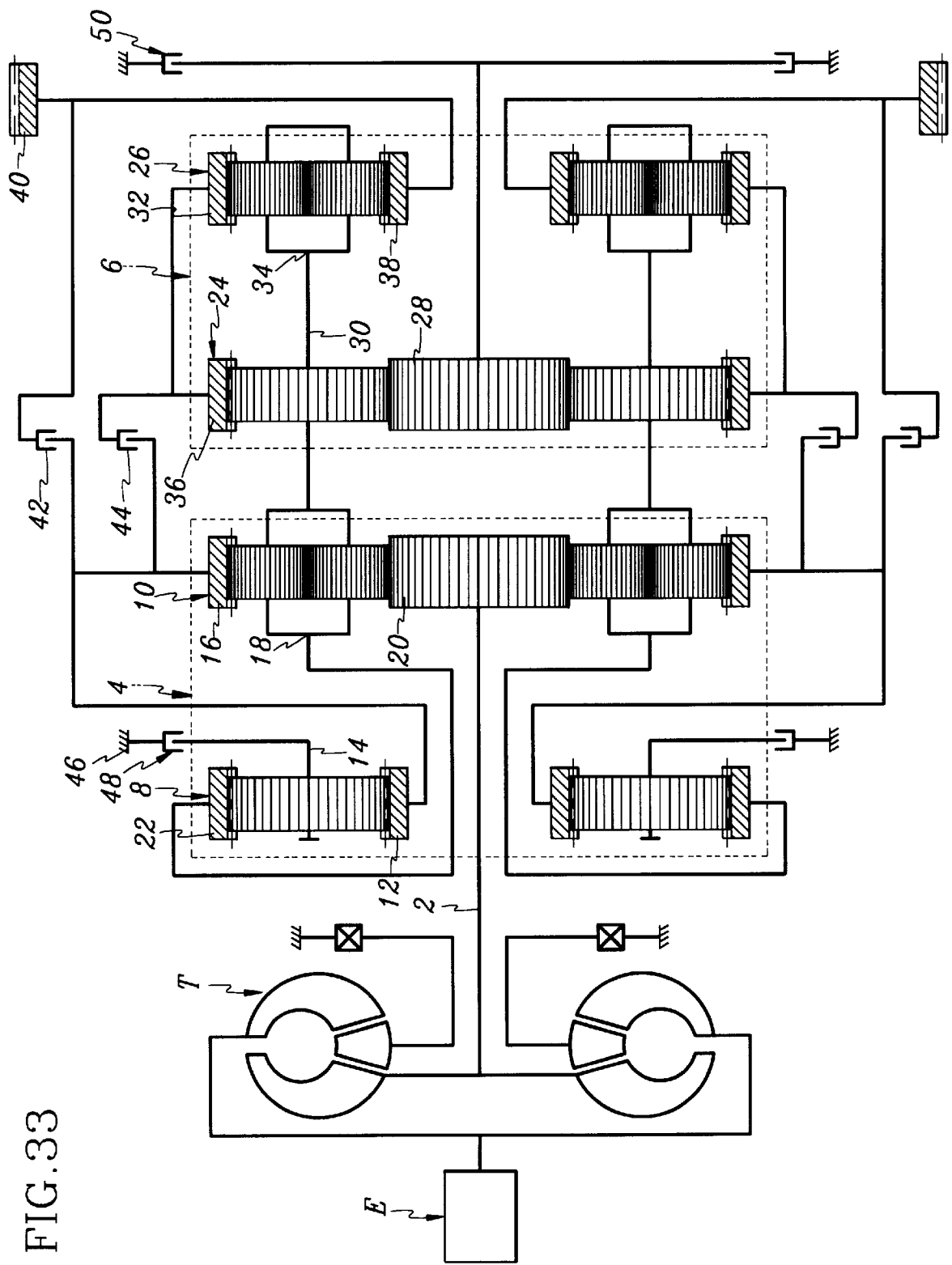
FIG. 33 is a schematic view of a powertrain according to a twenty-eighth preferred embodiment of the present invention.

Referring to FIG. 33, shown is a schematic view of a powertrain according to a twenty-eighth preferred embodiment of the present invention. In the twenty-eighth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the twenty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to a combination of the planet carriers 30 and 34 of the third and fourth simple planetary gearsets 24 and 26, and a combination of the sun gear 12 and ring gear 16 of the first and second simple planetary gearsets 8 and 10 is variably connected to the sun gear 38 of the fourth simple planetary gearset 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and the sun gear 28 of the third simple planetary gearset 24 is connected to the transmission housing 46 with the second brake 50 interposed therebetween as in the twenty-first embodiment such that the planet carrier 14 and sun gear 28 act as reaction elements. In addition, input is realized through the sun gear 20 of the second simple planetary gearset 10 as in the eighth embodiment, and the sun gear 38 of the fourth simple planetary gearset 26 acts as an output element as in the twenty-first embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the twenty-first embodiment, in the lever analogies of FIGS. 2–5 are as follows: the first operating element G indicates the sun gear 38 of the fourth simple planetary gearset 26, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Twenty-ninth Embodiment

Figure 34:
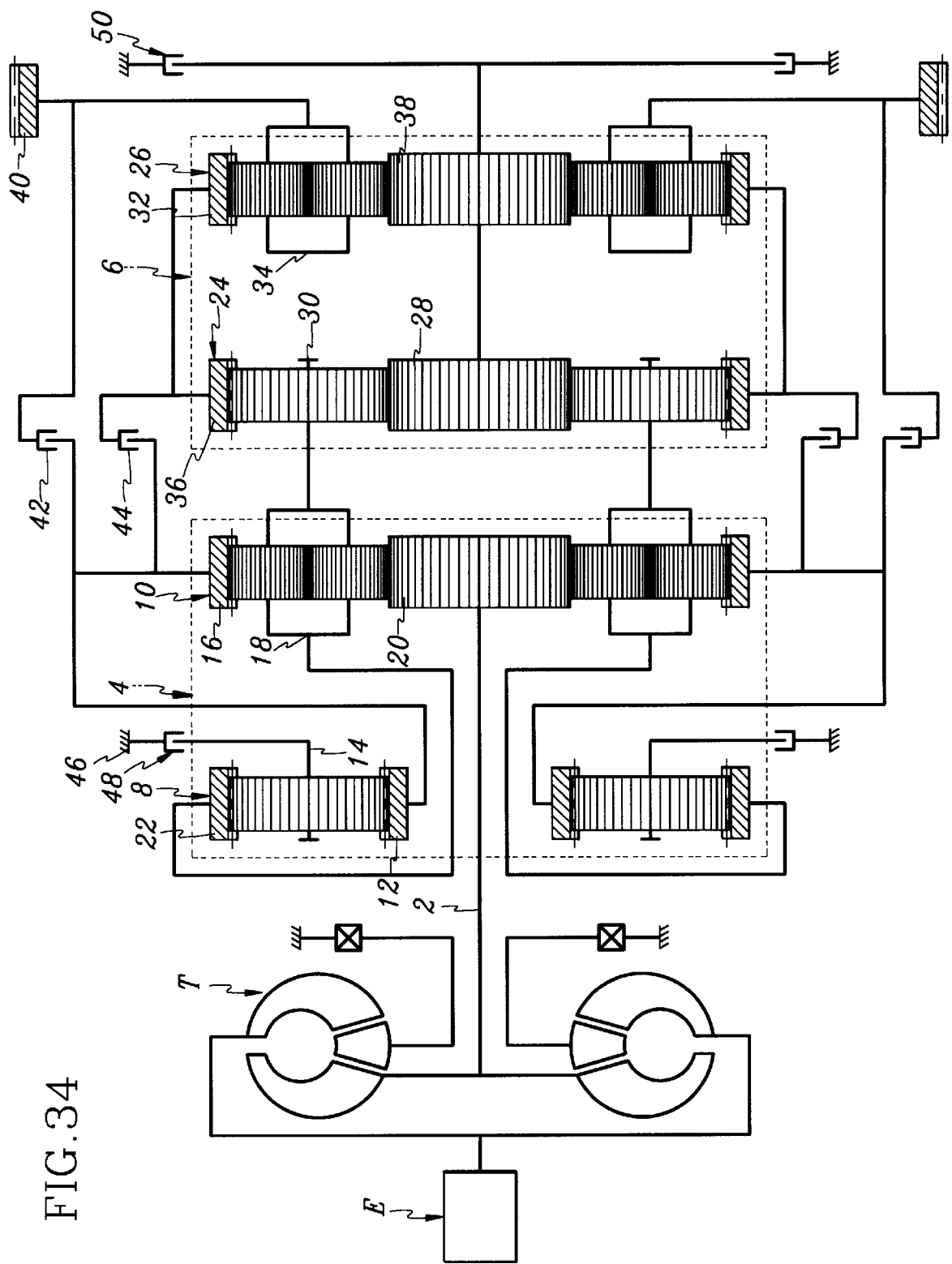
FIG. 34 is a schematic view of a powertrain according to a twenty-ninth preferred embodiment of the present invention.

Referring to FIG. 34, shown is a schematic view of a powertrain according to a twenty-ninth preferred embodiment of the present invention. In the twenty-ninth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the twentieth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both the planet carrier 34 of the fourth simple planetary gearset 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and a combination of the sun gears 28 and 38 of the third and fourth simple planetary gearsets 24 and 26 is connected to the transmission housing 46 with the second brake 50 interposed therebetween as in the twentieth embodiment such that the planet carrier 14 and sun gears 28 and 38 act as reaction elements. In addition, input is realized through the sun gear 20 of the second simple planetary gearset 10 as in the eighth embodiment, and the planet carrier 34 of the fourth simple planetary gearset 26 acts as an output element as in the twentieth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the twentieth embodiment, in the lever analogies of FIGS. 2–5 are as follows: the first operating element G indicates the planet carrier 34 of the fourth simple planetary gearset 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the twenty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Thirtieth Embodiment

Figure 35:
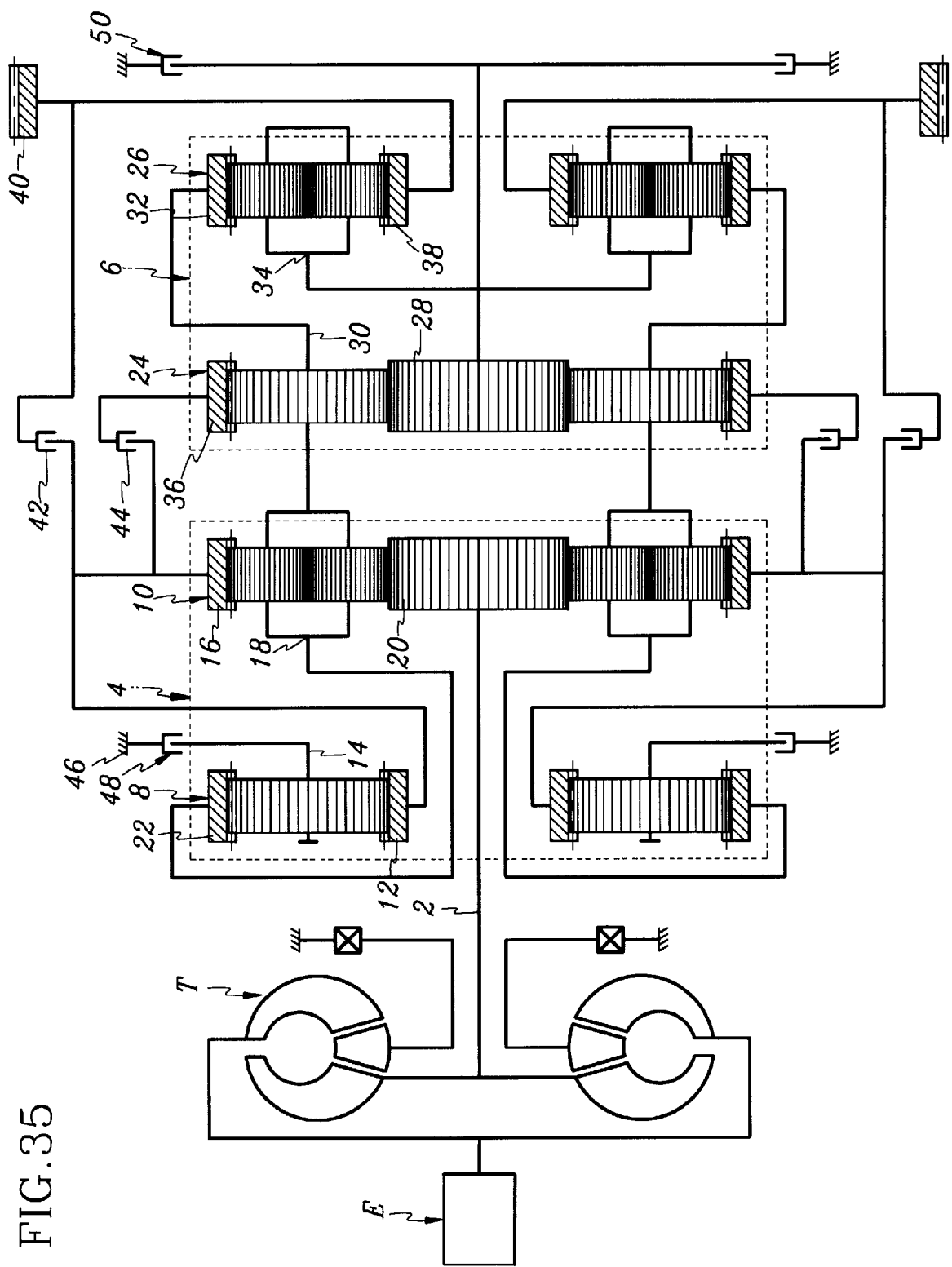
FIG. 35 is a schematic view of a powertrain according to a thirtieth preferred embodiment of the present invention.

Referring to FIG. 35, shown is a schematic view of a powertrain according to a thirtieth preferred embodiment of the present invention. In the thirtieth embodiment, as in the nineteenth embodiment, the second and fourth simple planetary gearsets 10 and 26 are double pinion planetary gearsets, while the first and third simple planetary gearsets 8 and 24 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to a combination of the planet carrier 30 and ring gear 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, the planet carrier 14 of the first simple planetary gearset 8 is connected to the transmission housing 46 with the first brake 48 interposed therebetween as in the eighth embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the planet carrier 14, and the sun gear 28 and planet carrier 34 act as reaction elements. In addition, input is realized through the sun gear 20 of the second simple planetary gearset 10 as in the eighth embodiment, and the sun gear 38 of the fourth simple planetary gearset 26 acts as an output element as in the fifteenth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the twentieth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirtieth embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-first Embodiment

Figure 36:
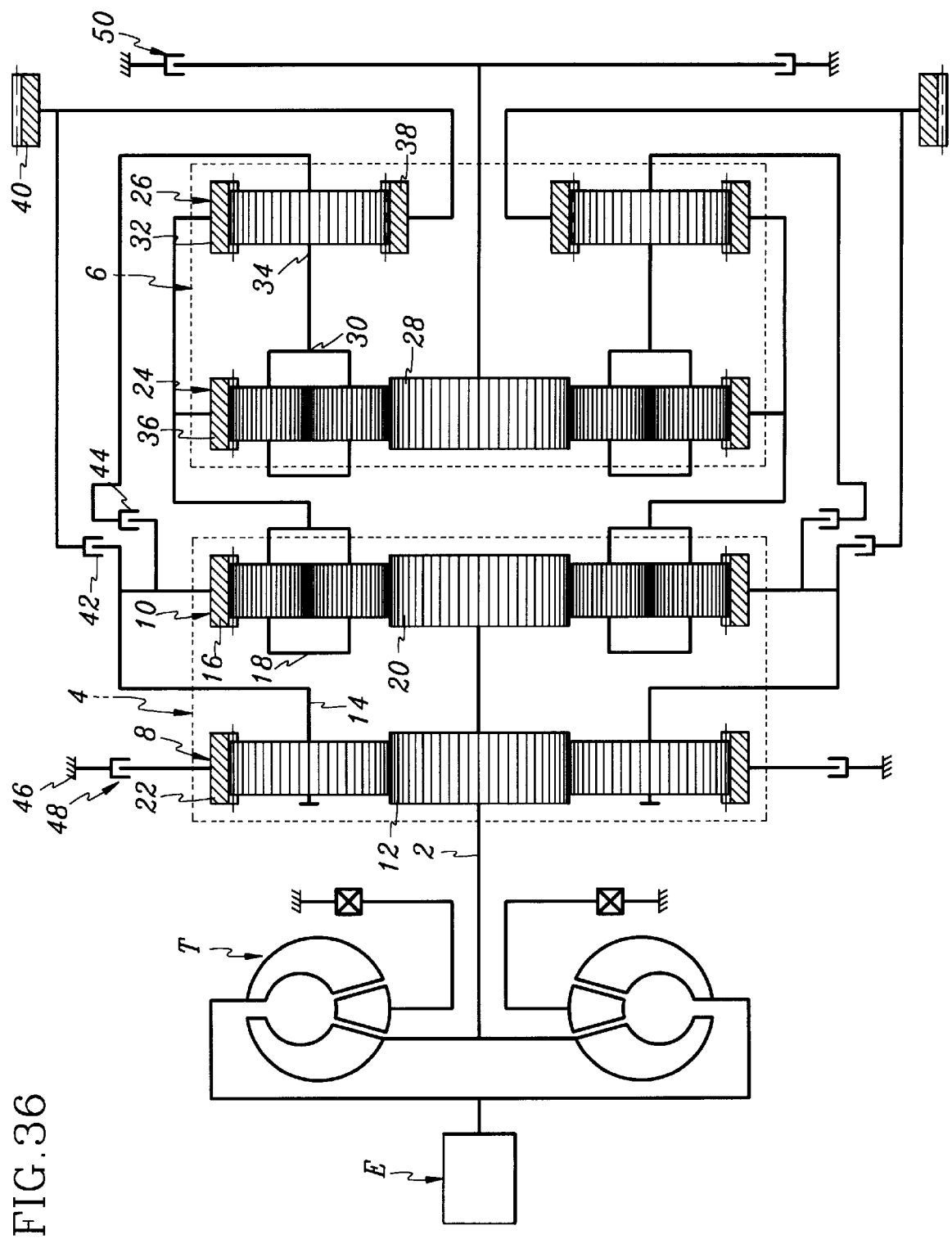
FIG. 36 is a schematic view of a powertrain according to a thirty-first preferred embodiment of the present invention.

Referring to FIG. 36, shown is a schematic view of a powertrain according to a thirty-first preferred embodiment of the present invention. In the thirty-first embodiment, the second and third simple planetary gearsets 10 and 24 are double pinion planetary gearsets, while the first and fourth simple planetary gearsets 8 and 26 are single pinion planetary gearsets as in the first embodiment.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the planet carrier 14 and ring gear 16 of the first and second simple planetary gearsets 8 and 10 is variably connected to both the sun gear 38 of the fourth simple planetary gearset 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and the sun gear 28 of the third simple planetary gearset 24 is connected to the transmission housing 46 with the second brake 50 interposed therebetween such that the ring gear 22 and sun gear 28 act as reaction elements. In addition, input is realized through a combination of the sun gears 12 and 20 of the first and second simple planetary gearsets 8 and 10 as in the third embodiment, and the sun gear 38 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the sun gear 38 of the fourth simple planetary gearset 26, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-first embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-second Embodiment

Figure 37:
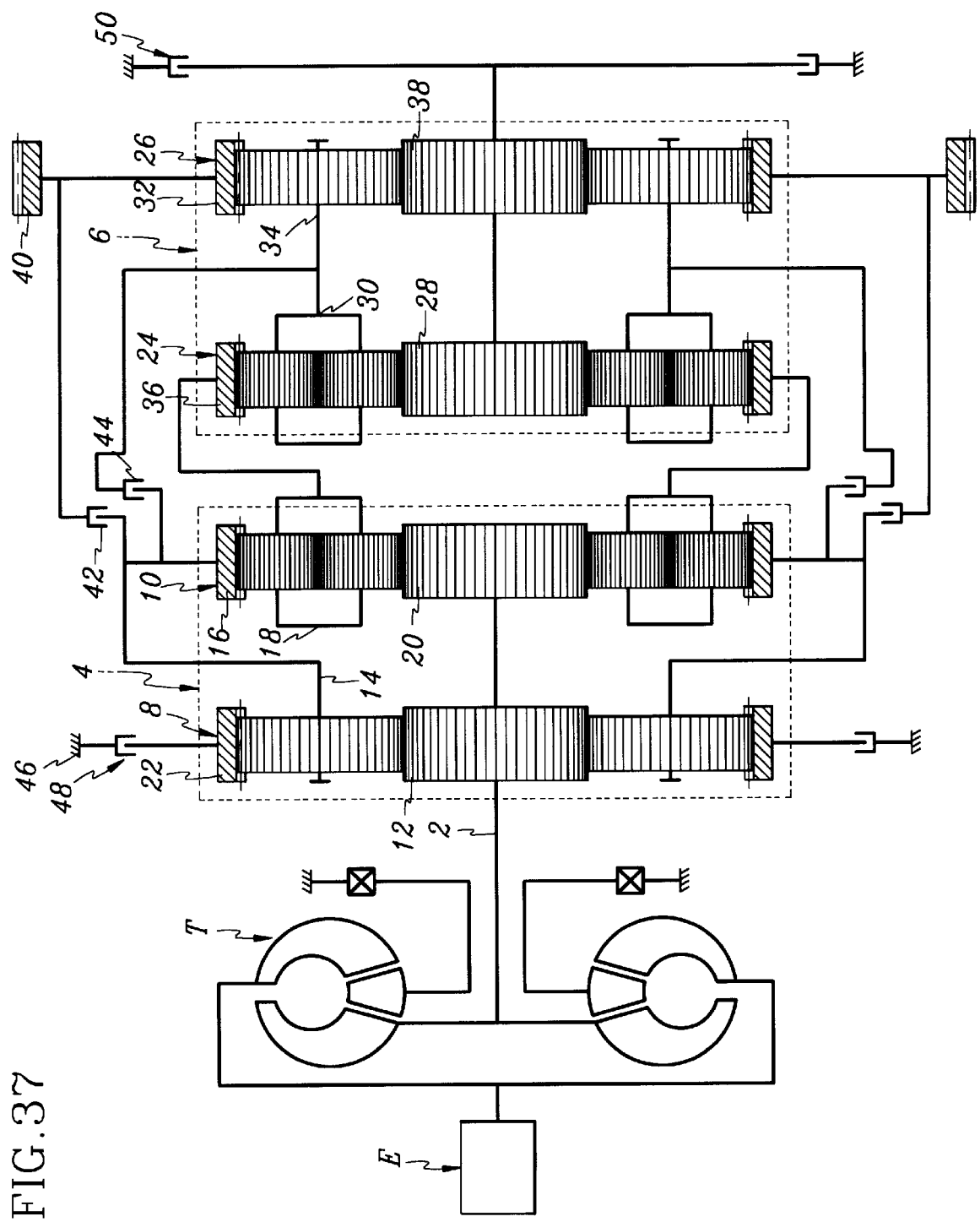
FIG. 37 is a schematic view of a powertrain according to a thirty-second preferred embodiment of the present invention.

Referring to FIG. 37, shown is a schematic view of a powertrain according to a thirty-second preferred embodiment of the present invention. In the thirty-second embodiment, as in the thirty-first embodiment, the second and third simple planetary gearsets 10 and 24 are double pinion planetary gearsets, while the first and fourth simple planetary gearsets 8 and 26 are single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the planet carrier 30 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and ring gear 16 of the first and second simple planetary gearsets 8 and 10 is variably connected to both the ring gear 32 of the fourth simple planetary gearset 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and a combination of the sun gears 28 and 38 of the third and fourth simple planetary gearsets 24 and 26 is connected to the transmission housing 46 with the second brake 50 interposed therebetween such that the ring gear 22 and the sun gears 28 and 38 act as reaction elements. In addition, input is realized through a combination of the sun gears 12 and 20 of the first and second simple planetary gearsets 8 and 10 as in the third embodiment, and the ring gear 32 of the fourth simple planetary gearset 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the ring gear 32 of the fourth simple planetary gearset 26, the second operating element H indicates a combination of the planet carriers 30 and 34 of the third and fourth simple planetary gearsets 24 and 26, the third operating element I indicates the ring gear 36 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-second embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-third Embodiment

Figure 38:
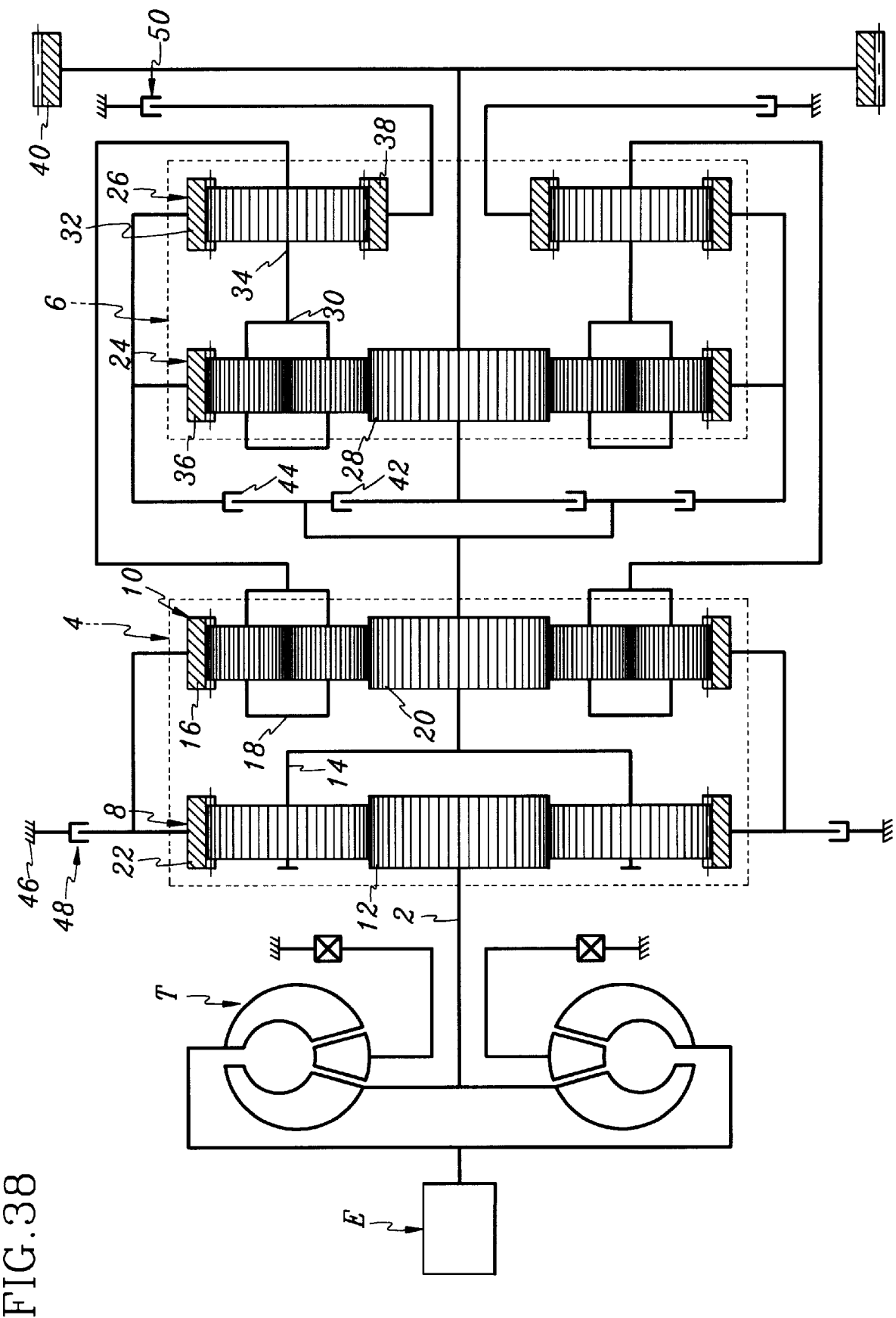
FIG. 38 is a schematic view of a powertrain according to a thirty-third preferred embodiment of the present invention.

Referring to FIG. 38, shown is a schematic view of a powertrain according to a thirty-third preferred embodiment of the present invention. In the thirty-third embodiment, as in the thirty-first embodiment, the second and third simple planetary gearsets 10 and 24 are double pinion planetary gearsets, while the first and fourth simple planetary gearsets 8 and 26 are single pinion planetary gearsets.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the eleventh embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carriers 30 and 34 of the third and fourth simple planetary gearsets 24 and 26, and a combination of the planet carrier 14 and sun gear 20 of the first and second simple planetary gearsets 8 and 10 is variably connected to both the sun gear 28 of the third simple planetary gearset 24 through the first clutch 42, and to a combination of the ring gears 36 and 32 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the sun gear 38 of the fourth simple planetary gearset 26 is connected to the transmission housing 46 with the second brake 50 interposed therebetween as in the eleventh embodiment such that the ring gears 22 and 16 and the sun gear 38 act as reaction elements. In addition, input is realized through the sun gear 12 of the first simple planetary gearset 8 as in the sixth embodiment, and the sun gear 28 of the third simple planetary gearset 24 acts as an output element as in the eleventh embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the eleventh embodiment, in the lever analogies of FIGS. 2–5 are as follows: the first operating element G indicates the sun gear 28 of the third simple planetary gearset 24, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-third embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-fourth Embodiment

Figure 39:
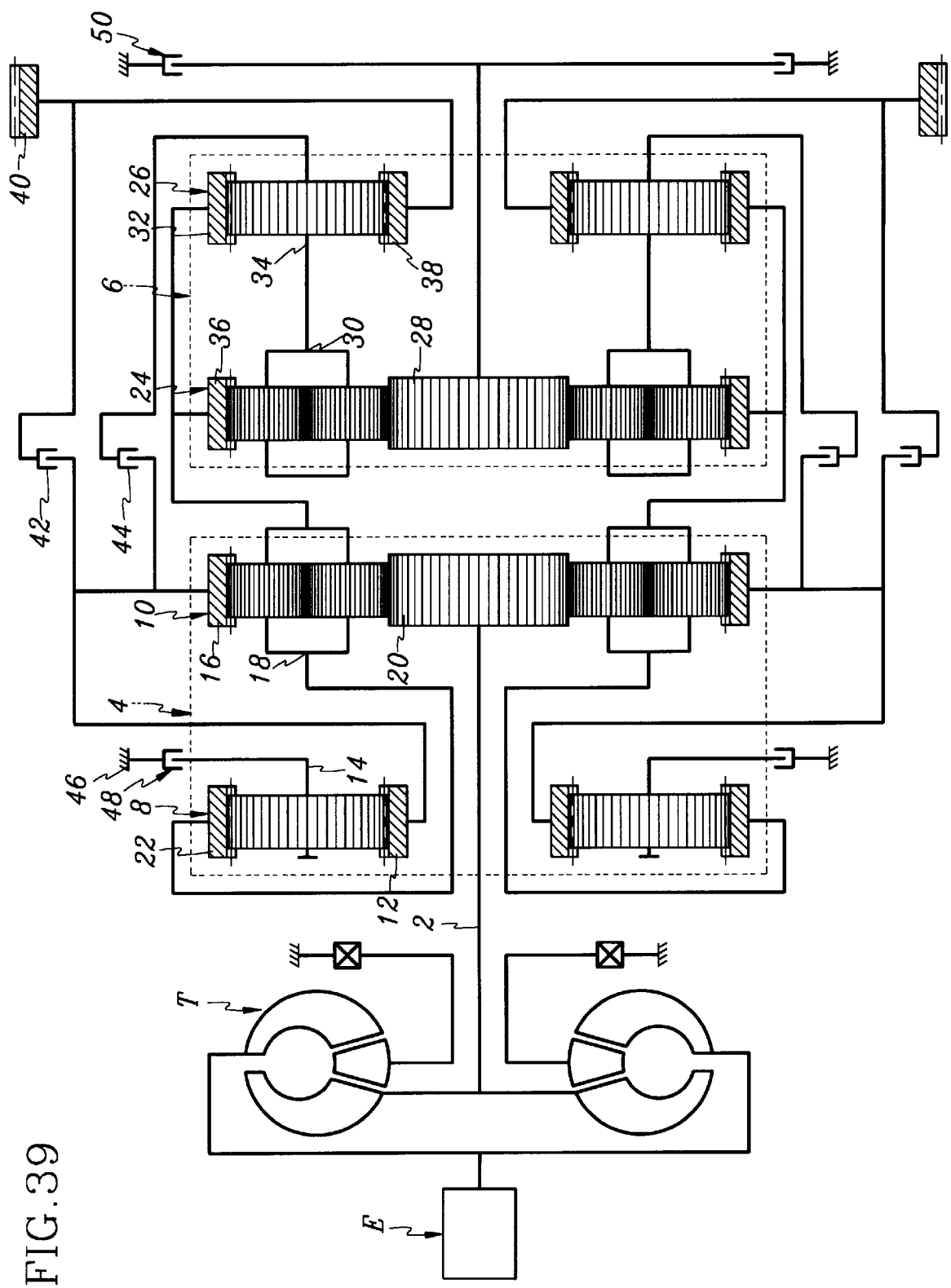
FIG. 39 is a schematic view of a powertrain according to a thirty-fourth preferred embodiment of the present invention.

Referring to FIG. 39, shown is a schematic view of a powertrain according to a thirty-fourth preferred embodiment of the present invention. In the thirty-fourth embodiment, as in the thirty-first embodiment, the second and third simple planetary gearsets 10 and 24 are double pinion planetary gearsets, while the first and fourth simple planetary gearsets 8 and 26 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to a combination of the ring gears 36 and 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and the sun gear 28 of the third simple planetary gearset 24 is connected to the transmission housing 46 with the second brake 50 interposed therebetween as in the thirty-first embodiment such that the planet carrier 14 and sun gear 28 act as reaction elements. In addition, input is realized through the sun gear 20 of the second simple planetary gearset 10 as in the eighth embodiment, and the sun gear 38 of the fourth simple planetary gearset 26 acts as an output element as in the thirty-first embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-first embodiment, in the lever analogies of FIGS. 2–5 are as follows: the first operating element G indicates the sun gear 38 of the fourth simple planetary gearset 26, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-fifth Embodiment

Figure 40:
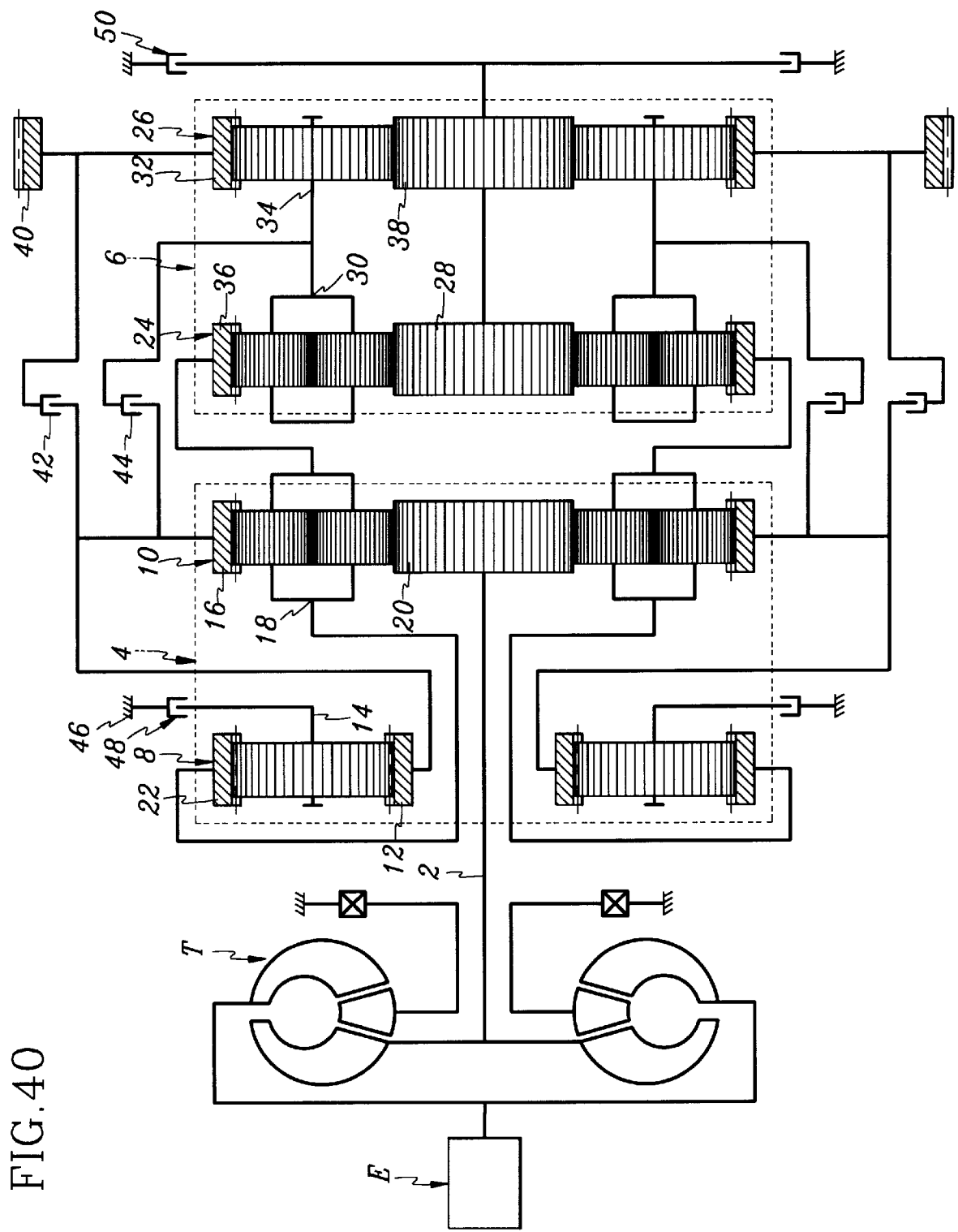
FIG. 40 is a schematic view of a powertrain according to a thirty-fifth preferred embodiment of the present invention.

Referring to FIG. 40, shown is a schematic view of a powertrain according to a thirty-fifth preferred embodiment of the present invention. In the thirty-fifth embodiment, as in the thirty-first embodiment, the second and third simple planetary gearsets 10 and 24 are double pinion planetary gearsets, while the first and fourth simple planetary gearsets 8 and 26 are single pinion planetary gearsets.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-second embodiment, the planet carrier 30 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both the ring gear 32 of the fourth simple planetary gearset 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and a combination of the sun gears 28 and 38 of the third and fourth simple planetary gearsets 24 and 26 is connected to the transmission housing 46 with the second brake 50 interposed therebetween as in the thirty-second embodiment such that the planet carrier 14 and the sun gears 28 and 38 act as reaction elements. In addition, input is realized through the sun gear 20 of the second simple planetary gearset 10 as in the eighth embodiment, and the ring gear 32 of the fourth simple planetary gearset 26 acts as an output element as in the thirty-second embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-second embodiment, in the lever analogies of FIGS. 2–5 are as follows: the first operating element G indicates the ring gear 32 of the fourth simple planetary gearset 26, the second operating element H indicates a combination of the planet carriers 30 and 34 of the third and fourth simple planetary gearsets 24 and 26, the third operating element I indicates the ring gear 36 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-sixth Embodiment

Figure 41:
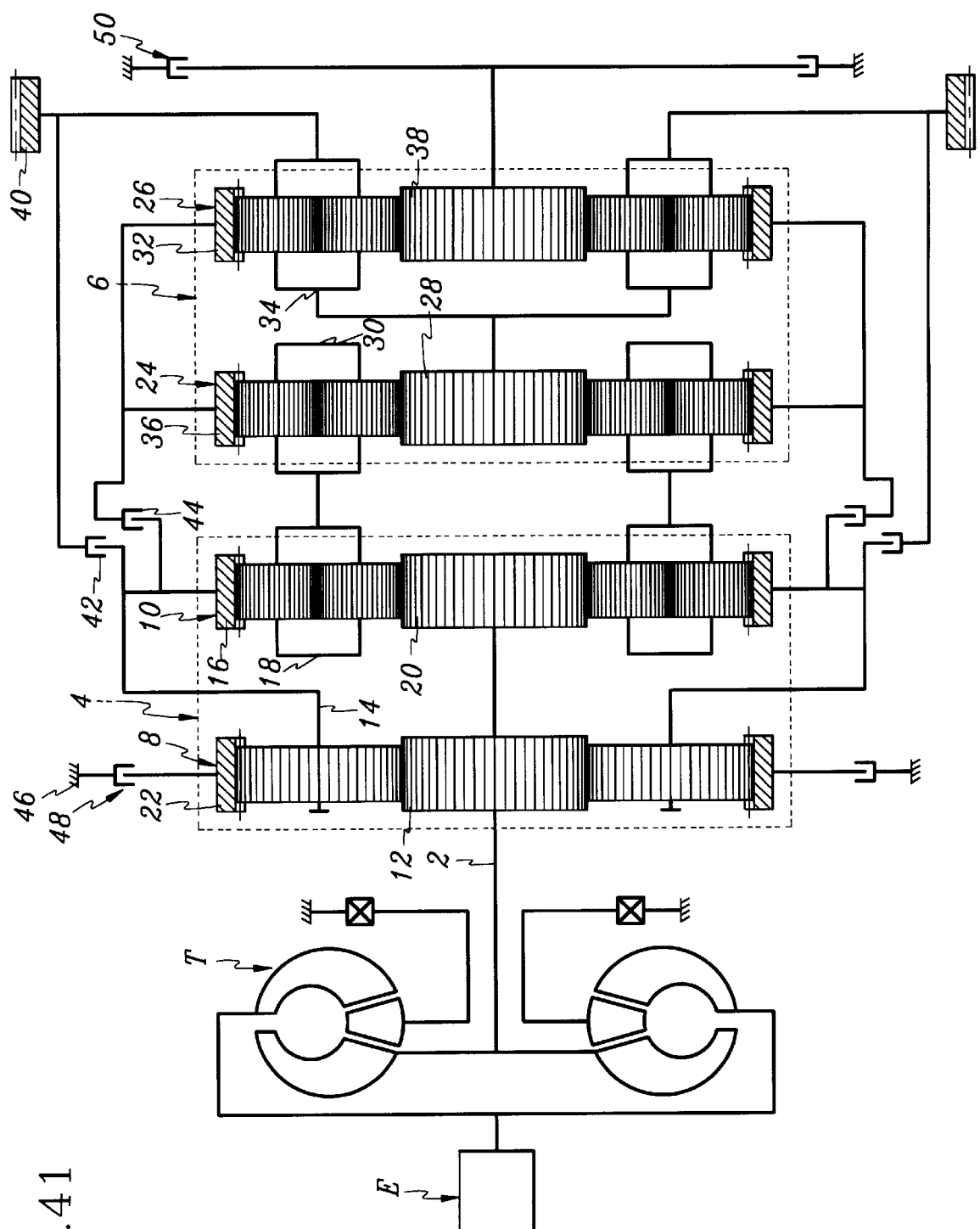
FIG. 41 is a schematic view of a powertrain according to a thirty-sixth preferred embodiment of the present invention.

Referring to FIG. 41, shown is a schematic view of a powertrain according to a thirty-sixth preferred embodiment of the present invention. In the thirty-sixth embodiment, the second, third, and fourth simple planetary gearsets 10, 24, and 26 are double pinion planetary gearsets, while the first simple planetary gearset 8 is a single pinion planetary gearsets as in the first embodiment.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the planet carrier 14 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the third embodiment, and the sun gear 38 of the fourth simple planetary gearset 26 is connected to the transmission housing 46 with the second brake 50 interposed therebetween such that the ring gear 22 and sun gear 38 act as reaction elements. In addition, input is realized through a combination of the sun gears 12 and 20 of the first and second simple planetary gearsets 8 and 10 as in the third embodiment, and a combination of the sun gear 28 and planet carrier 34 of the third and fourth simple planetary gearsets 24 and 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-seventh Embodiment

Figure 42:
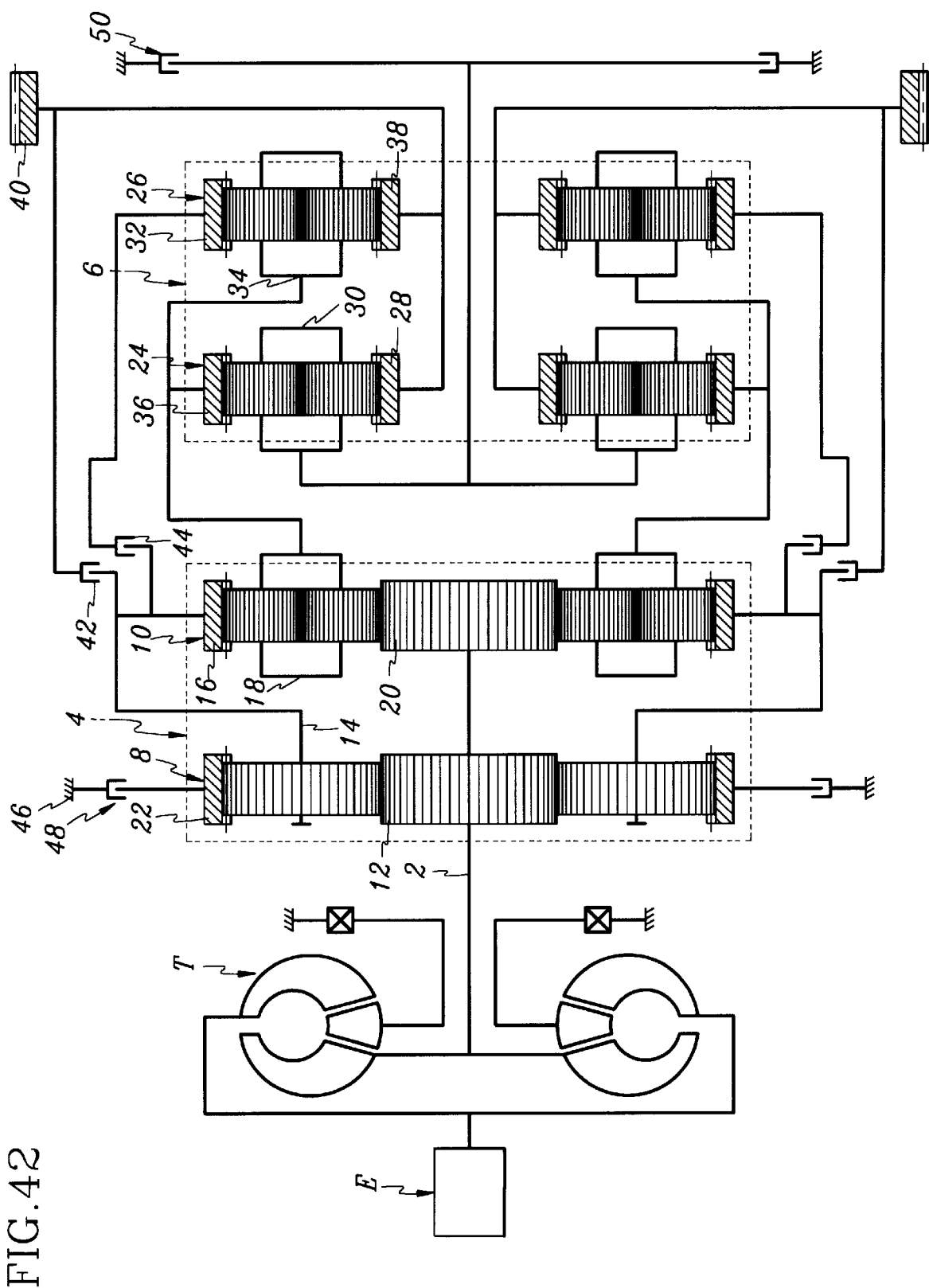
FIG. 42 is a schematic view of a powertrain according to a thirty-seventh preferred embodiment of the present invention.

Referring to FIG. 42, shown is a schematic view of a powertrain according to a thirty-seventh preferred embodiment of the present invention. In the thirty-seventh embodiment, as in the thirty-sixth embodiment, the second, third, and fourth simple planetary gearsets 10, 24, and 26 are double pinion planetary gearsets, while the first simple planetary gearset 8 is a single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gear 36 and planet carrier 34 of the third and fourth simple planetary gearsets 24 and 26, and a combination of the planet carrier 14 and ring gear 16 of the first and second simple planetary gearsets 8 and 10 is variably connected to both a combination of the sun gears 28 and 38 of the third and fourth simple planetary gearsets 24 and 26 through the first clutch 42, and to the ring gear 32 of the fourth simple planetary gearset 26 through the second clutch 44.

Also, the ring gear 22 of the first simple planetary gearset 8 is connected to the transmission housing 46 with the first brake 48 interposed therebetween as in the third embodiment, and the planet carrier 30 of the third simple planetary gearset 24 is connected to the transmission housing 46 with the second brake 50 interposed therebetween such that the ring gear 22 and planet carrier 30 act as reaction elements. In addition, input is realized through a combination of the sun gears 12 and 20 of the first and second simple planetary gearsets 8 and 10 as in the third embodiment, and a combination of the sun gears 28 and 38 of the third and fourth simple planetary gearsets 24 and 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates a combination of the sun gears 28 and 38 of the third and fourth simple planetary gearsets 24 and 26, the second operating element H indicates the ring gear 32 of the fourth simple planetary gearset 26, the third operating element I indicates a combination of the ring gear 36 and planet carrier 34 of the third and fourth simple planetary gearsets 24 and 26, and the fourth operating element J indicates the planet carrier 30 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-eighth Embodiment

Figure 43:
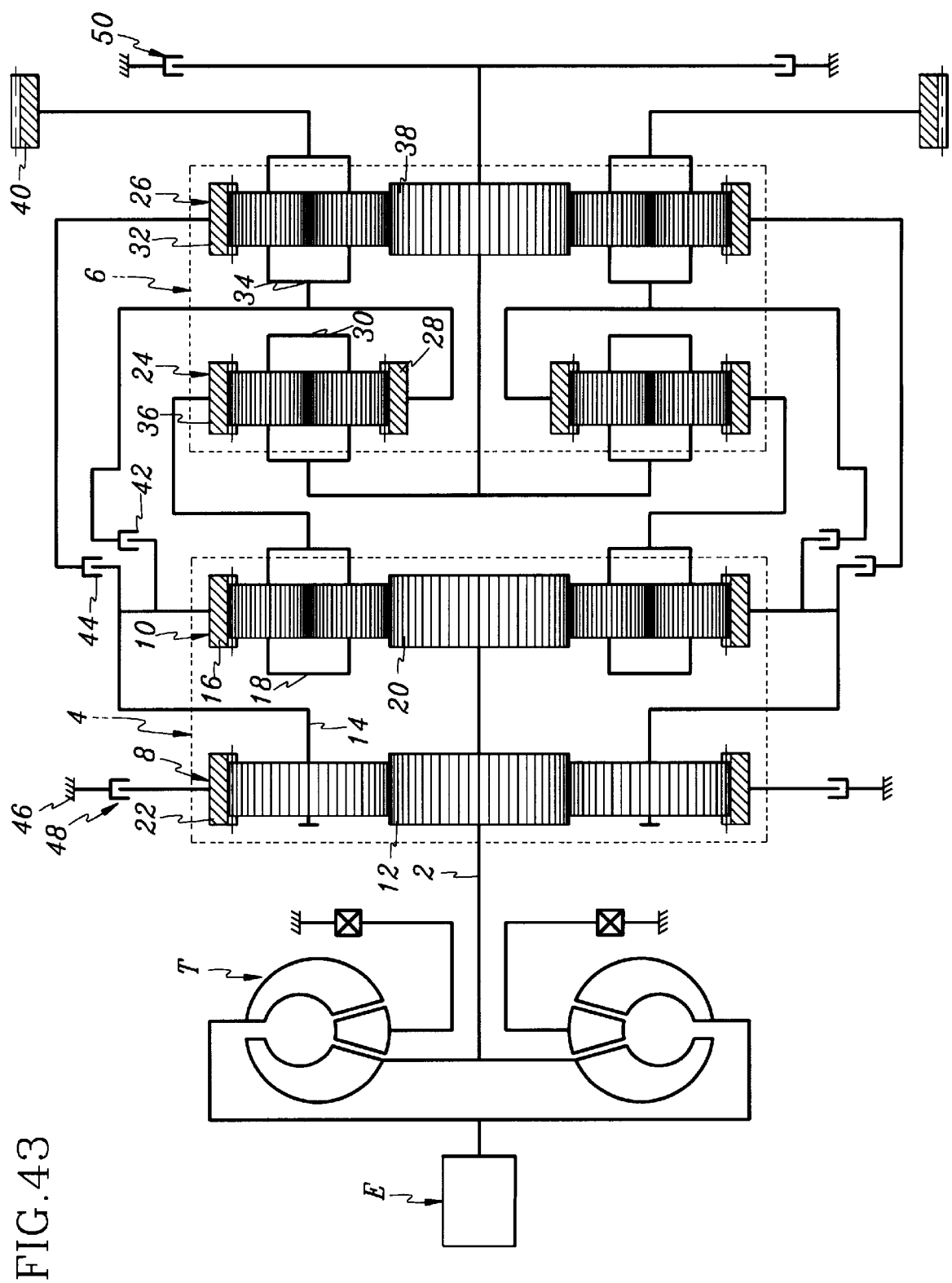
FIG. 43 is a schematic view of a powertrain according to a thirty-eighth preferred embodiment of the present invention.

Referring to FIG. 43, shown is a schematic view of a powertrain according to a thirty-eighth preferred embodiment of the present invention. In the thirty-eighth embodiment, as in the thirty-sixth embodiment, the second, third, and fourth simple planetary gearsets 10, 24, and 26 are double pinion planetary gearsets, while the first simple planetary gearset 8 is a single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the planet carrier 30 and sun gear 28 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the planet carrier 14 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to the ring gear 32 of the fourth simple planetary gearset 26 through the second clutch 44.

Also, the ring gear 22 of the first simple planetary gearset 8 is connected to the transmission housing 46 with the first brake 48 interposed therebetween as in the third embodiment, and a combination of the planet carrier 30 and sun gear 38 of the third and fourth simple planetary gearsets 24 and 26 is connected to the transmission housing 46 with the second brake 50 interposed therebetween such that the ring gear 22, and the planet carrier 30 and sun gear 38 act as reaction elements. In addition, input is realized through a combination of the sun gears 12 and 20 of the first and second simple planetary gearsets 8 and 10 as in the third embodiment, and a combination of the sun gear 28 and planet carrier 34 of the third and fourth simple planetary gearsets 24 and 26 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates a combination of the sun gear 28 and planet carrier 34 of the third and fourth simple planetary gearsets 24 and 26, the second operating element H indicates the ring gear 32 of the fourth simple planetary gearset 26, the third operating element I indicates the ring gear 36 of the third simple planetary gearset 24, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Thirty-ninth Embodiment

Figure 44:
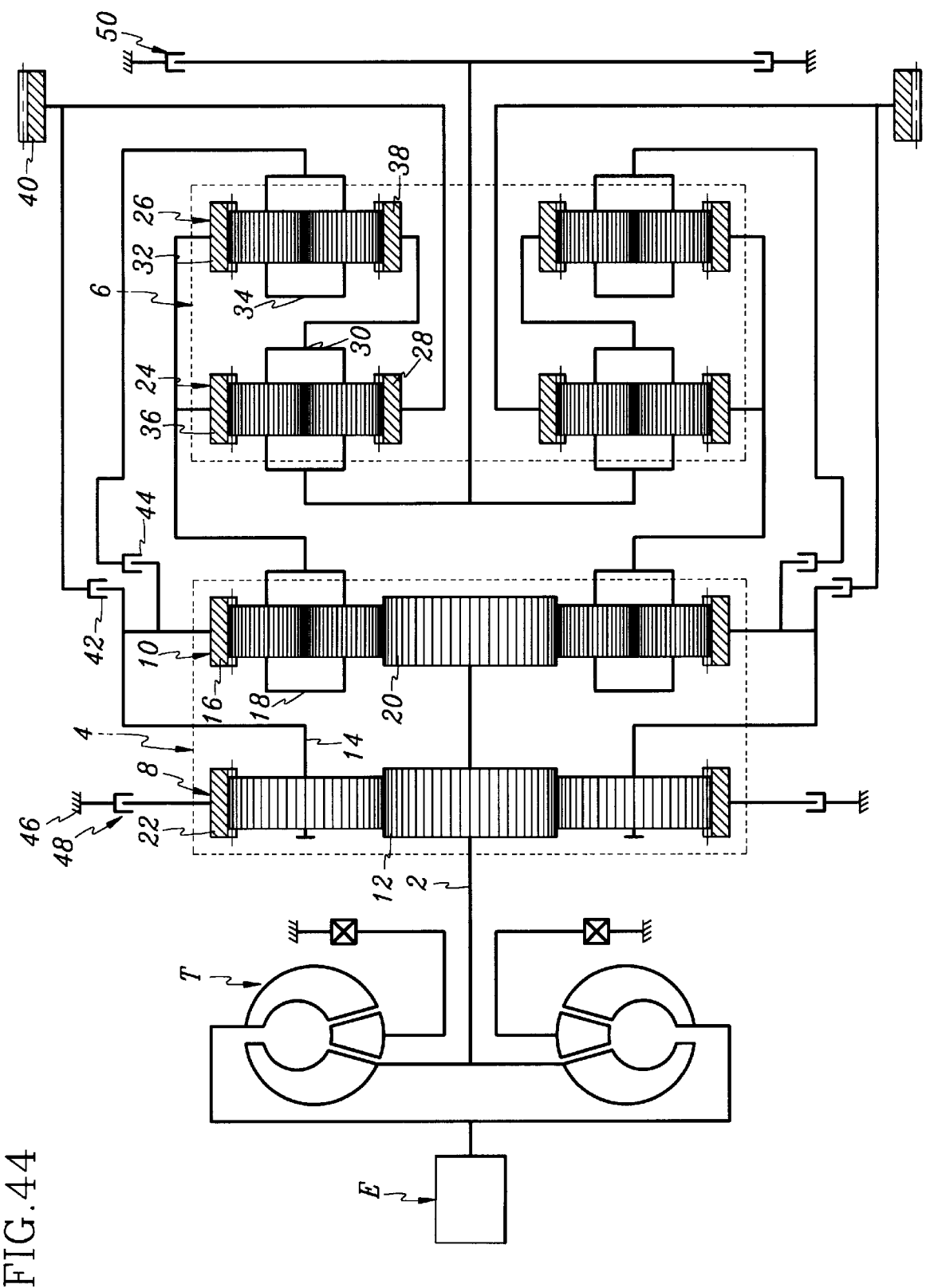
FIG. 44 is a schematic view of a powertrain according to a thirty-ninth preferred embodiment of the present invention.

Referring to FIG. 44, shown is a schematic view of a powertrain according to a thirty-ninth preferred embodiment of the present invention. In the thirty-ninth embodiment, as in the thirty-sixth embodiment, the second, third, and fourth simple planetary gearsets 10, 24, and 26 are double pinion planetary gearsets, while the first simple planetary gearset 8 is a single pinion planetary gearsets.

In the first compound planetary gearset 4, as in the third embodiment, the planet carrier 14 and sun gear 12 of the first simple planetary gearset 8 are fixedly connected respectively to the ring gear 16 and sun gear 20 of the second simple planetary gearset 10. In the second compound planetary gearset 6, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the planet carrier 14 and ring gear 16 of the first and second simple planetary gearsets 8 and 10 is variably connected to both the sun gear 28 of the third simple planetary gearset 24 through the first clutch 42, and to the planet carrier 34 of the fourth simple planetary gearset 26 through the second clutch 44.

Also, the ring gear 22 of the first simple planetary gearset 8 is connected to the transmission housing 46 with the first brake 48 interposed therebetween as in the third embodiment, and a combination of the planet carrier 30 and sun gear 38 of the third and fourth simple planetary gearsets 24 and 26 is connected to the transmission housing 46 with the second brake 50 interposed therebetween such that the ring gear 22, and the planet carrier 30 and sun gear 38 act as reaction elements. In addition, input is realized through a combination of the sun gears 12 and 20 of the first and second simple planetary gearsets 8 and 10 as in the third embodiment, and the sun gear 28 of the third simple planetary gearset 24 acts as an output element.

According to the above structure, operating elements for the first compound planetary gearset 4, as in the third embodiment, in the lever analogies of FIGS. 2–5 are as follows: the first operating element A indicates a combination of the sun gears 12 and 20 of the first and second simple planetary gearsets 8 and 10, the second operating element B indicates a combination of the planet carrier 14 and ring gear 16 of the first and second simple planetary gearsets 8 and 10, the third operating element C indicates the ring gear 22 of the first simple planetary gearset 8, and the fourth operating element D indicates the planet carrier 18 of the second simple planetary gearset 10.

Further, operating elements for the second compound planetary gearset 6 in the lever analogies of FIGS. 2–5 are as follows: the first operating element G indicates the sun gear 28 of the third simple planetary gearset 24, the second operating element H indicates the planet carrier 34 of the fourth simple planetary gearset 26, the third operating element I indicates a combination of the ring gears 36 and 32 of the third and fourth simple planetary gearsets 24 and 26, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the thirty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Fortieth Embodiment

Figure 45:
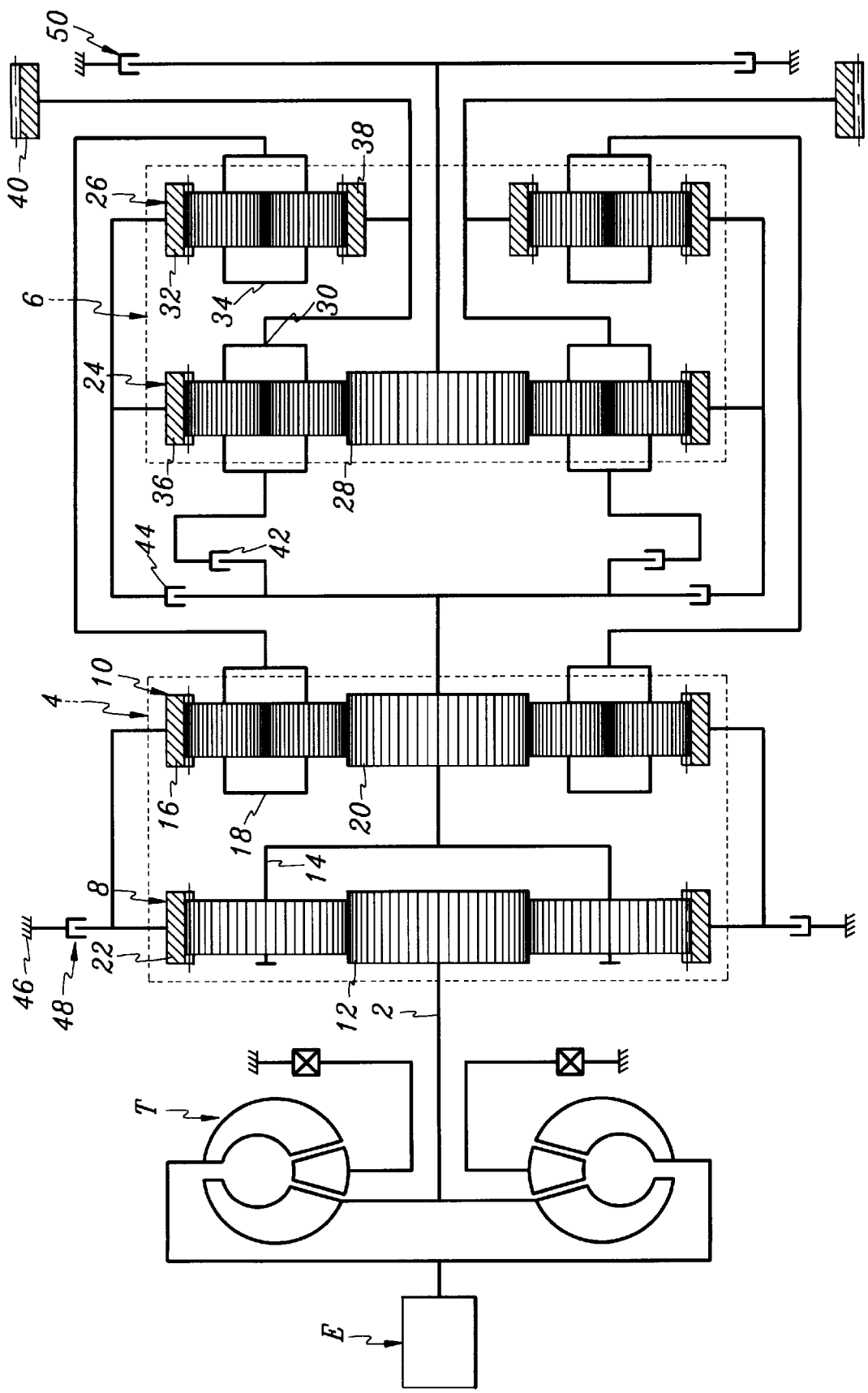
FIG. 45 is a schematic view of a powertrain according to a fortieth preferred embodiment of the present invention.

Referring to FIG. 45, shown is a schematic view of a powertrain according to a fortieth preferred embodiment of the present invention. In the fortieth embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the sixteenth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to the planet carrier 34 of the fourth simple planetary gearset 26, and a combination of the planet carrier 14 and sun gear 20 of the first and second simple planetary gearsets 8 and 10 is variably connected to both a combination of the planet carrier 30 and sun gear 38 of the third and fourth simple planetary gearsets 24 and 26 through the first clutch 42, and to a combination of the ring gears 36 and 32 of the third and fourth simple planetary gearsets 24 and 26 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the sun gear 28 of the third simple planetary gearset 24 is connected to the transmission housing 46 with the second brake 50 interposed therebetween as in the sixteenth embodiment such that the ring gears 22 and 16 and the sun gear 28 act as reaction elements. In addition, input is realized through the sun gear 12 of the first simple planetary gearset 8 as in the sixth embodiment, and a combination of the planet carrier 30 and sun gear 38 of the third and fourth simple planetary gearsets 24 and 26 acts as an output element as in the sixteenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the sixteenth embodiment, in the lever analogies of FIGS. 2–5 are as follows: the first operating element G indicates a combination of the planet carrier 30 and sun gear 38 of the third and fourth simple planetary gearsets 24 and 26, the second operating element H indicates a combination of the ring gears 36 and 32 of the third and fourth simple planetary gearsets 24 and 26, the third operating element I indicates the planet carrier 34 of the fourth simple planetary gearset 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fortieth embodiment, only the structures of the first and second compound planetary gearsets 4 and 6 are changed from the first embodiment. As the operation of the operating elements in each shift range is identical to that of the first embodiment, an explanation thereof will be omitted herein.

Forty-first Embodiment

Figure 46:
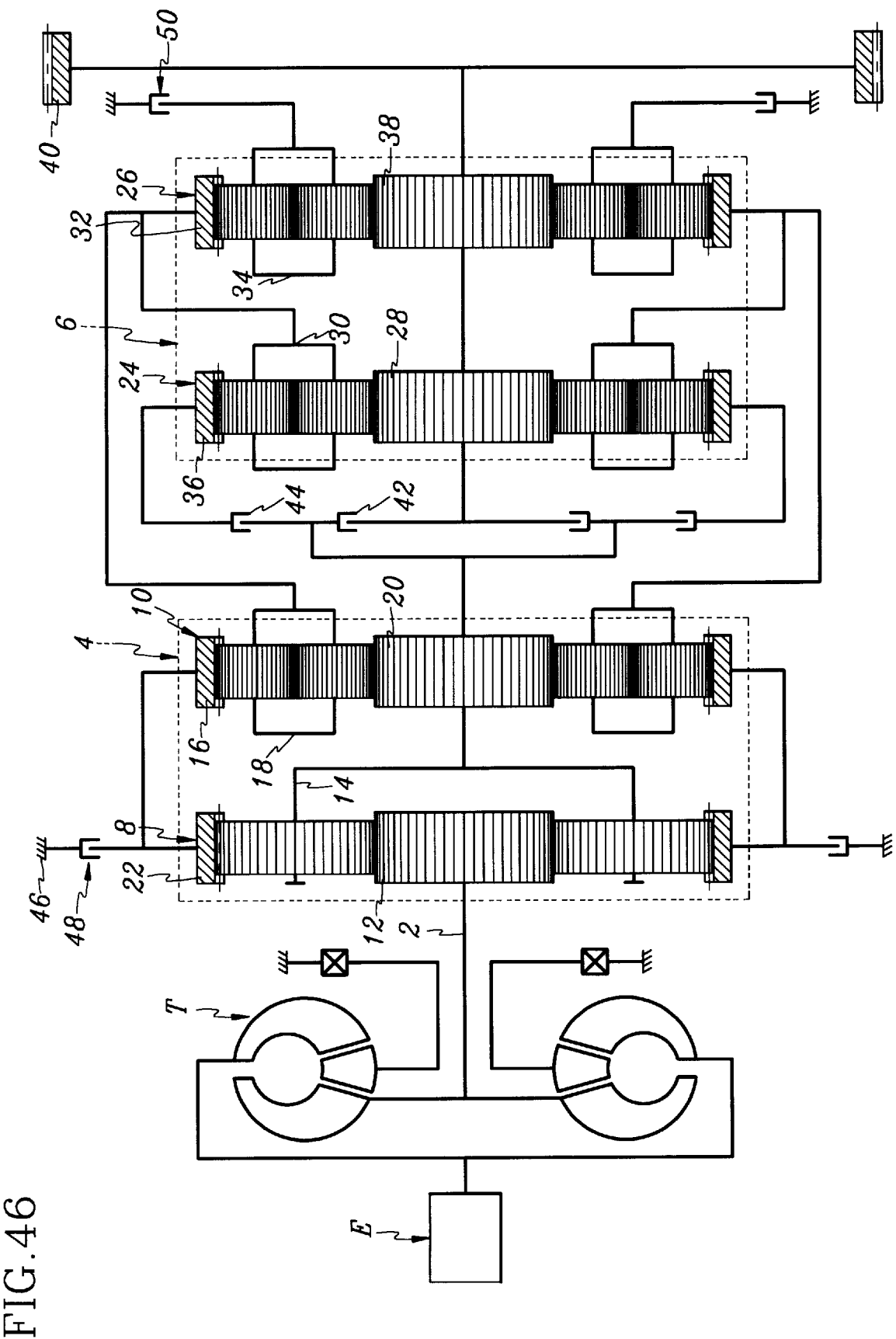
FIG. 46 is a schematic view of a powertrain according to a forty-first preferred embodiment of the present invention.

Referring to FIG. 46, shown is a schematic view of a powertrain according to a forty-first preferred embodiment of the present invention. In the forty-first embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the seventeenth embodiment, the planet carrier 30 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the planet carrier 14 and sun gear 20 of the first and second simple planetary gearsets 8 and 10 is variably connected to both a combination of the sun gears 28 and 38 of the third and fourth simple planetary gearsets 24 and 26 through the first clutch 42, and to the ring gear 36 of the third simple planetary gearset 24 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and the planet carrier 34 of the fourth simple planetary gearset 26 is connected to the transmission housing 46 with the second brake 50 interposed therebetween as in the seventeenth embodiment such that the ring gears 22 and 16 and the planet carrier 34 act as reaction elements. In addition, input is realized through the sun gear 12 of the first simple planetary gearset 8 as in the sixth embodiment, and a combination of the sun gears 28 and 38 of the third and fourth simple planetary gearsets 24 and 26 acts as an output element as in the seventeenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the seventeenth embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-first embodiment, only the structures of the first and second compound planetary gearsets 4 and 6 are changed from the first embodiment. As the operation of the operating elements in each shift range is identical to that of the first embodiment, an explanation thereof will be omitted herein.

Forty-second Embodiment

Figure 47:
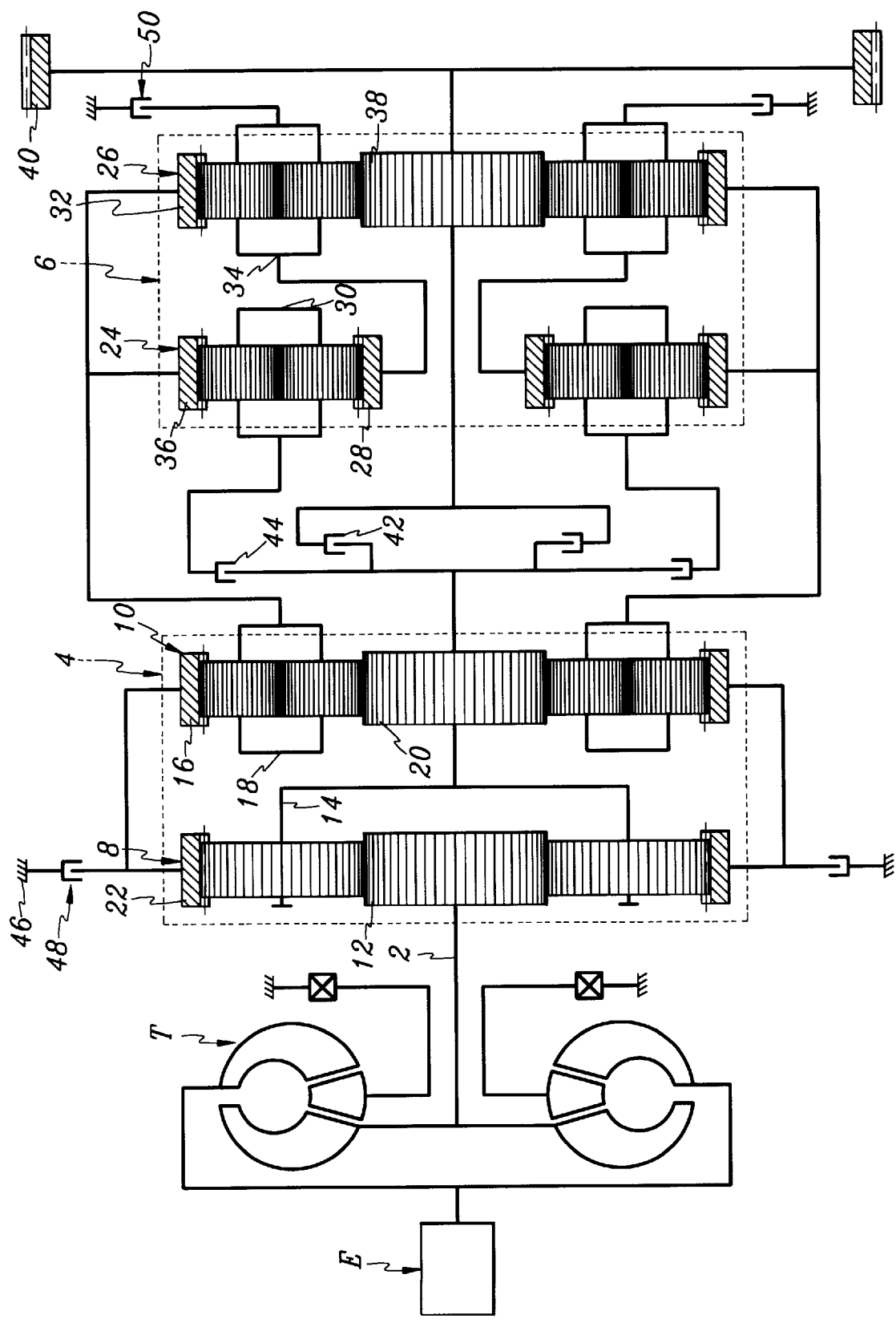
FIG. 47 is a schematic view of a powertrain according to a forty-second preferred embodiment of the present invention.

Referring to FIG. 47, shown is a schematic view of a powertrain according to a forty-second preferred embodiment of the present invention. In the forty-second embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the sixth embodiment, the ring gear 22 and planet carrier 14 of the first simple planetary gearset 8 are fixedly connected respectively to the ring gear 16 and sun gear 20 of the second simple planetary gearset 10. In the second compound planetary gearset 6, as in the eighteenth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the planet carrier 14 and sun gear 20 of the first and second simple planetary gearsets 8 and 10 is variably connected to both the sun gear 38 of the fourth simple planetary gearset 26 through the first clutch 42, and to the planet carrier 30 of the third simple planetary gearset 24 through the second clutch 44.

Also, a combination of the ring gears 22 and 16 of the first and second simple planetary gearsets 8 and 10 is connected to the transmission housing 46 with the first brake 48 interposed therebetween as in the sixth embodiment, and a combination of the sun gear 28 and planet carrier 34 of the third and fourth simple planetary gearsets 24 and 26 is connected to the transmission housing 46 with the second brake 50 interposed therebetween as in the eighteenth embodiment such that the ring gears 22 and 16, and the sun gear 28 and planet carrier 34 act as reaction elements. In addition, input is realized through the sun gear 12 of the first simple planetary gearset 8 as in the sixth embodiment, and the sun gear 38 of the fourth simple planetary gearset 26 acts as an output element as in the eighteenth embodiment.

According to the above structure, operating elements for the first compound planetary gearset 4, as in the sixth embodiment, in the lever analogies of FIGS. 2–5 are as follows: the first operating element A indicates the sun gear 12 of the first simple planetary gearset 8, the second operating element B indicates a combination of the planet carrier 14 and sun gear 20 of the first and second simple planetary gearsets 8 and 10, the third operating element C indicates a combination of the ring gears 22 and 16 of the first and second simple planetary gearsets 8 and 10, and the fourth operating element D indicates the planet carrier 18 of the second simple planetary gearset 10.

Further, operating elements for the second compound planetary gearset 6, as in the eighteenth embodiment, in the lever analogies of FIGS. 2–5 are as follows: the first operating element G indicates the sun gear 38 of the fourth simple planetary gearset 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-second embodiment, only the structures of the first and second compound planetary gearsets 4 and 6 are changed from the first embodiment. As the operation of the operating elements in each shift range is identical to that of the first embodiment, an explanation thereof will be omitted herein.

Forty-third Embodiment

Figure 48:
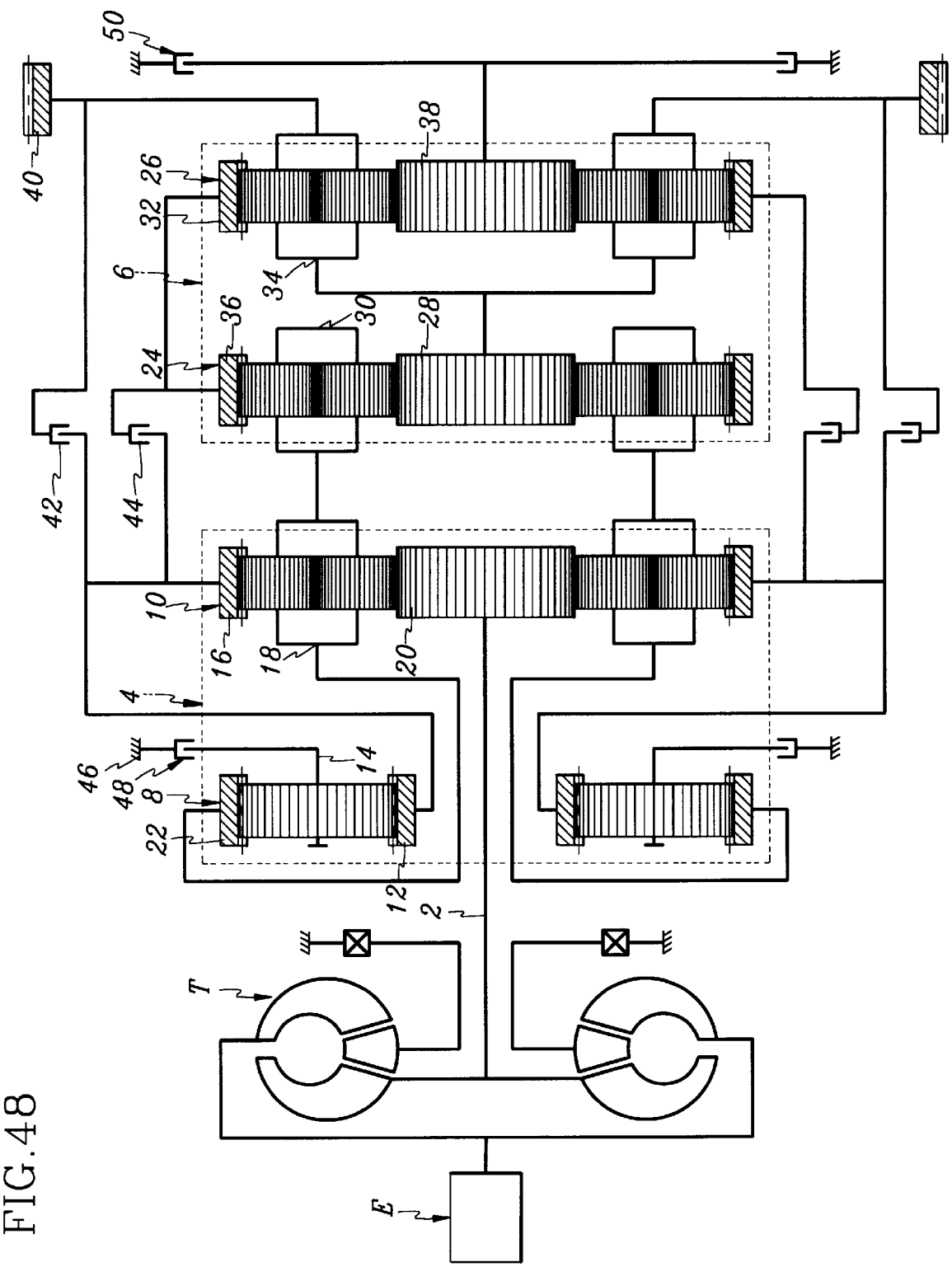
FIG. 48 is a schematic view of a powertrain according to a forty-third preferred embodiment of the present invention.

Referring to FIG. 48, shown is a schematic view of a powertrain according to a forty-third preferred embodiment of the present invention. In the forty-third embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-sixth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the eighth embodiment, and the sun gear 38 of the fourth simple planetary gearset 26 is connected to the transmission housing 46 with the second brake 50 interposed therebetween as in the thirty-sixth embodiment such that the planet carrier 14 and sun gear 38 act as reaction elements. In addition, input is realized through the sun gear 20 of the second simple planetary gearset 10 as in the eighth embodiment, and a combination of the sun gear 28 and planet carrier 34 of the third and fourth 24 and 26 simple planetary gearsets acts as an output element as in the thirty-sixth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-sixth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-third embodiment, only the structures of the first and second compound planetary gearsets 4 and 6 are changed from the first embodiment. As the operation of the operating elements in each shift range is identical to that of the first embodiment, an explanation thereof will be omitted herein.

Forty-fourth Embodiment

Figure 49:
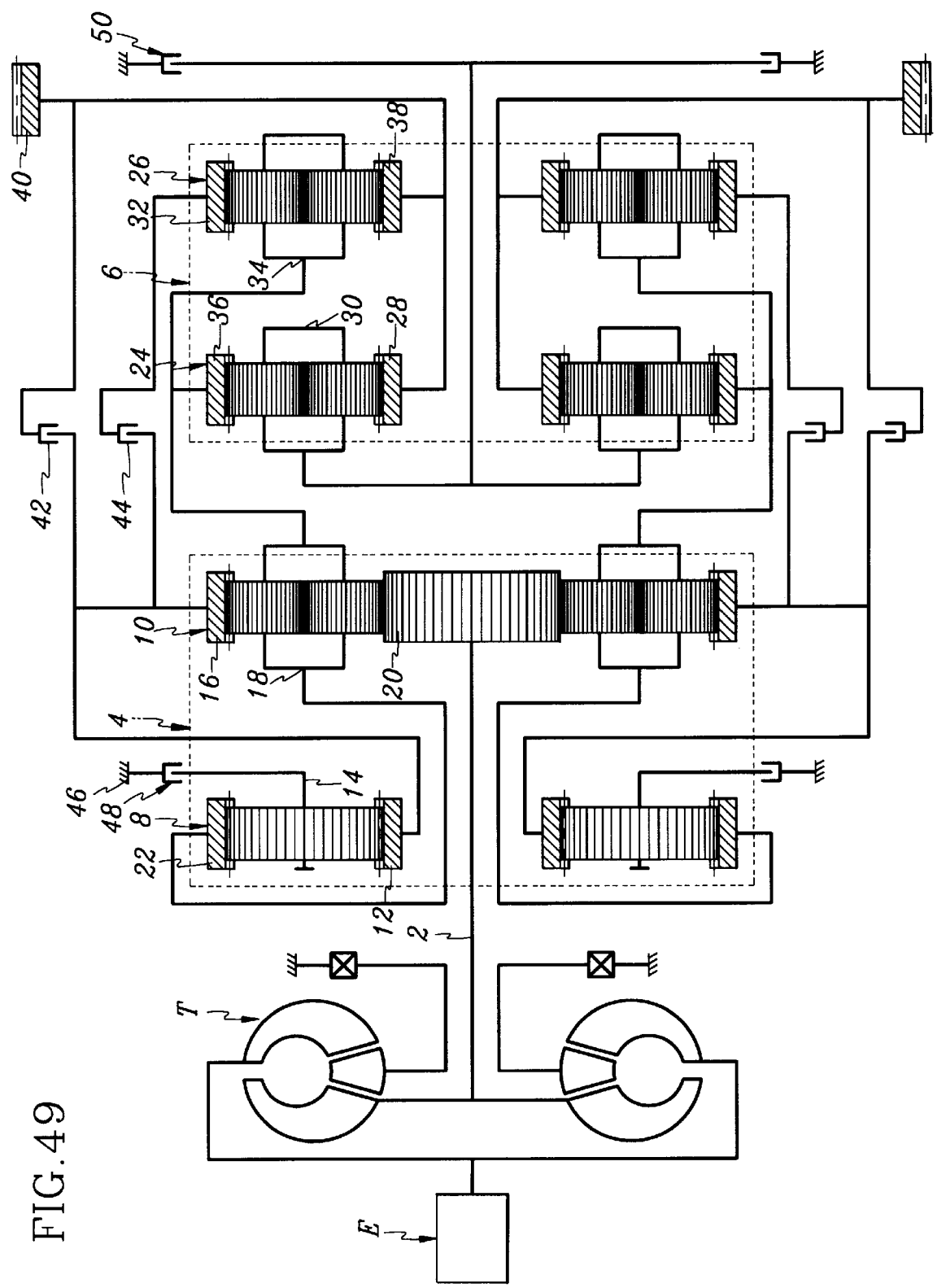
FIG. 49 is a schematic view of a powertrain according to a forty-fourth preferred embodiment of the present invention.

Referring to FIG. 49, shown is a schematic view of a powertrain according to a forty-fourth preferred embodiment of the present invention. In the forty-fourth embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-seventh embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to a combination of the ring gear 36 and planet carrier 34 of the third and fourth simple planetary gearsets 24 and 26, and a combination of the sun gear 12 and ring gear 16 of the first and second simple planetary gearsets 8 and 10 is variably connected to both a combination of the sun gears 28 and 38 of the third and fourth simple planetary gearsets 24 and 26 through the first clutch 42, and to the ring gear 32 of the fourth simple planetary gearset 26 through the second clutch 44.

Also, the planet carrier 14 of the first simple planetary gearset 8 is connected to the transmission housing 46 with the first brake 48 interposed therebetween as in the eighth embodiment, and the planet carrier 30 of the third simple planetary gearset 24 is connected to the transmission housing 46 with the second brake 50 interposed therebetween as in the thirty-seventh embodiment such that the planet carriers 14 and 30 act as reaction elements. In addition, input is realized through the sun gear 20 of the second simple planetary gearset 10 as in the eighth embodiment, and a combination of the sun gears 28 and 38 acts as an output element as in the thirty-seventh embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-seventh embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 32 of the fourth simple planetary gearset 26, the third operating element I indicates a combination of the ring gear 36 and planet carrier 34 of the third and fourth simple planetary gearsets 24 and 26, and the fourth operating element J indicates the planet carrier 30 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Forty-fifth Embodiment

Figure 50:
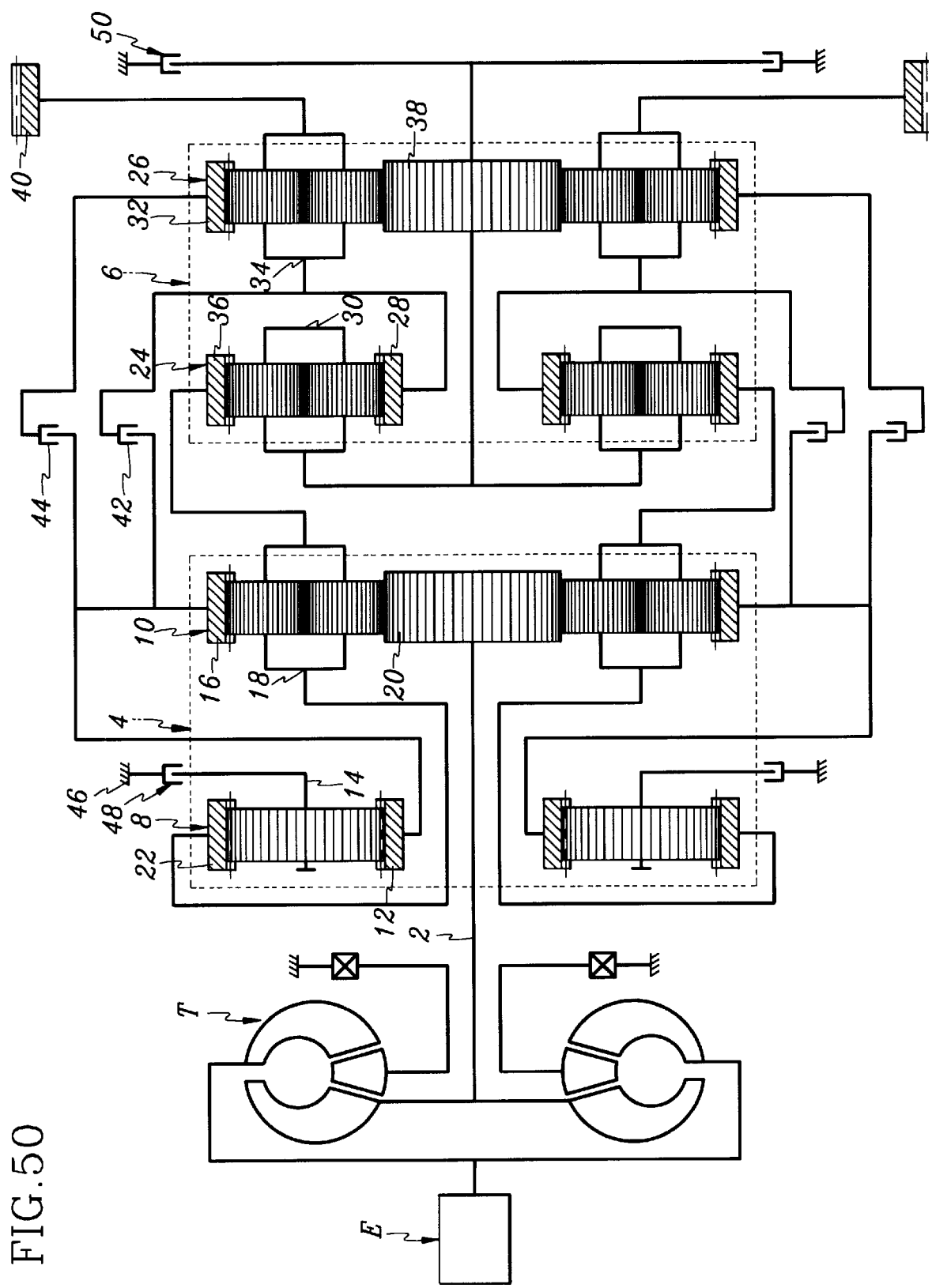
FIG. 50 is a schematic view of a powertrain according to a forty-fifth preferred embodiment of the present invention.

Referring to FIG. 50, shown is a schematic view of a powertrain according to a forty-fifth preferred embodiment of the present invention. In the forty-fifth embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-eighth embodiment, the planet carrier 30 and sun gear 28 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, a combination of the ring gear 22 and planet carrier 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to the ring gear 32 of the fourth simple planetary gearset 26 through the second clutch 44.

Also, the planet carrier 14 of the first simple planetary gearset 8 is connected to the transmission housing 46 with the first brake 48 interposed therebetween as in the eighth embodiment, and a combination of the planet carrier 30 and sun gear 38 of the third and fourth simple planetary gearsets 24 and 26 is connected to the transmission housing 46 with the second brake 50 interposed therebetween as in the thirty-eighth embodiment such that the planet carrier 14, and the planet carrier 30 and sun gear 38 act as reaction elements. In addition, input is realized through the sun gear 20 of the second simple planetary gearset 10 as in the eighth embodiment, and a combination of the sun gear 28 and planet carrier 34 of the third and fourth simple planetary gearsets 24 and 26 acts as an output element as in the thirty-eighth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-eighth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates the ring gear 32 of the fourth simple planetary gearset 26, the third operating element I indicates the ring gear 36 of the third simple planetary gearset 24, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Forty-sixth Embodiment

Figure 51:
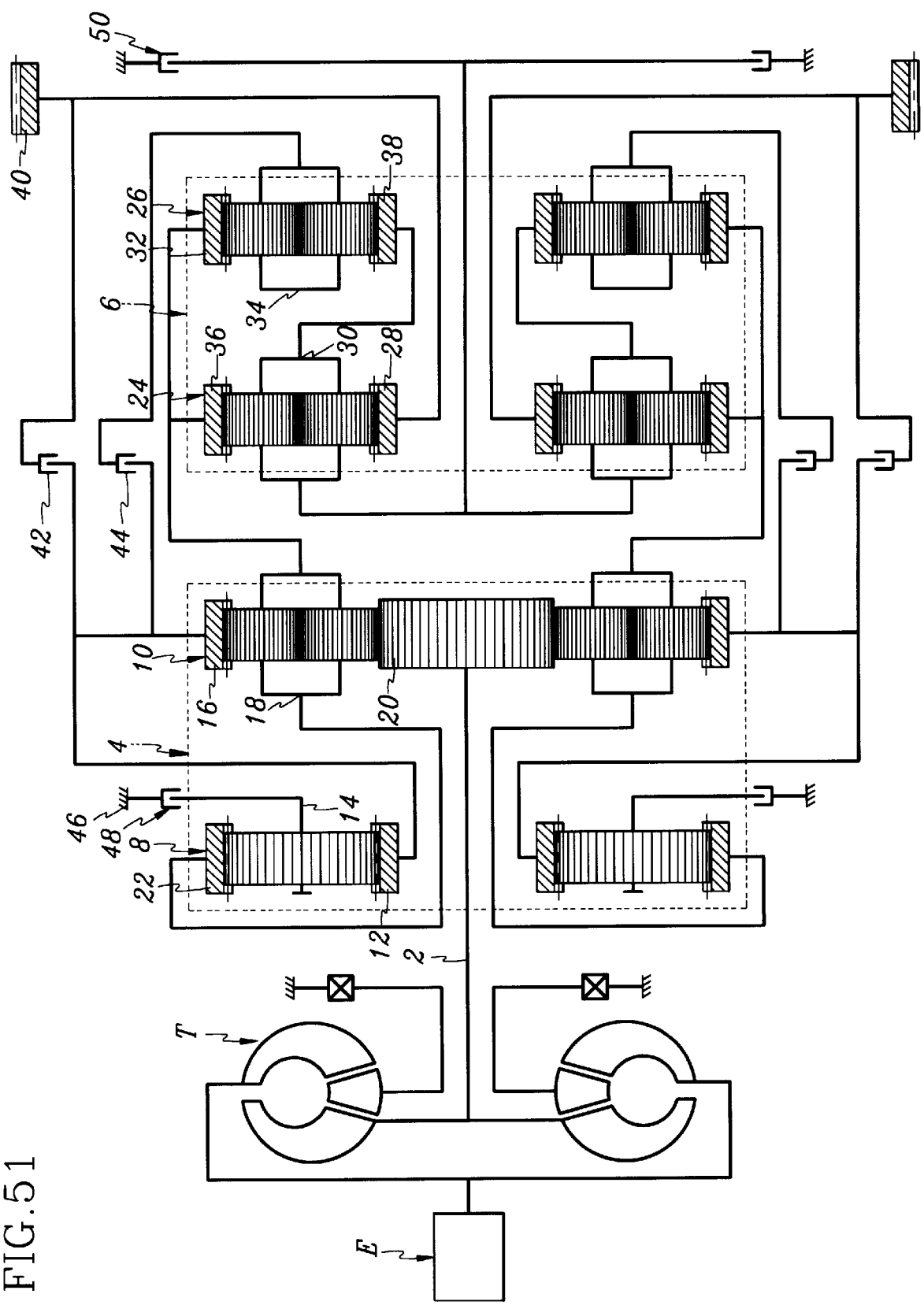
FIG. 51 is a schematic view of a powertrain according to a forty-sixth preferred embodiment of the present invention.

Referring to FIG. 51, shown is a schematic view of a powertrain according to a forty-sixth preferred embodiment of the present invention. In the forty-sixth embodiment, as in the thirty-sixth embodiment, the second, third, and fourth simple planetary gearsets 10, 24, and 26 are double pinion planetary gearsets, while the first simple planetary gearset 8 is a single pinion planetary gearset.

In the first compound planetary gearset 4, as in the eighth embodiment, the ring gear 22 and sun gear 12 of the first simple planetary gearset 8 are fixedly connected respectively to the planet carrier 18 and ring gear 16 of the second simple planetary gearset 10. In the second compound planetary gearset 6, as in the thirty-ninth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, a combination of the ring gear 22 and planet carrier 18 of the first and second simple planetary gearset 10 is fixedly connected to a combination of the ring gears 36 and 32 of the third and fourth simple planetary gearsets 24 and 26, and a combination of the sun gear 12 and ring gear 16 of the first and second simple planetary gearsets 8 and 10 is variably connected to both the sun gear 28 of the third simple planetary gearset 24 through the first clutch 42, and to the planet carrier 34 of the fourth simple planetary gearset 26 through the second clutch 44.

Also, the planet carrier 14 of the first simple planetary gearset 8 is connected to the transmission housing 46 with the first brake 48 interposed therebetween as in the eighth embodiment, and a combination of the planet carrier 30 and sun gear 38 of the third and fourth simple planetary gearsets 24 and 26 is connected to the transmission housing 46 with the second brake 50 interposed therebetween as in the thirty-ninth embodiment such that the planet carrier 14, and the planet carrier 30 and sun gear 38 act as reaction elements. In addition, input is realized through the sun gear 20 of the second simple planetary gearset 10 as in the eighth embodiment, and the sun gear 28 of the third simple planetary gearset 24 acts as an output element as in the thirty-ninth embodiment.

According to the above structure, operating elements for the first compound planetary gearset 4, as in the eighth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the planet carrier 14 of the first simple planetary gearset 8, and the fourth operating element D indicates a combination of the ring gear 22 and planet carrier 18 of the first and second simple planetary gearsets 8 and 10.

Further, operating elements for the second compound planetary gearset 6, as in the thirty-ninth embodiment, in the lever analogies of FIGS. 2–5 are as follows: the first operating element G indicates the sun gear 28 of the third simple planetary gearset 24, the second operating element H indicates the planet carrier 34 of the fourth simple planetary gearset 26, the third operating element I indicates a combination of the ring gears 36 and 32 of the third and fourth simple planetary gearsets 24 and 26, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Forty-seventh Embodiment

Figure 52:
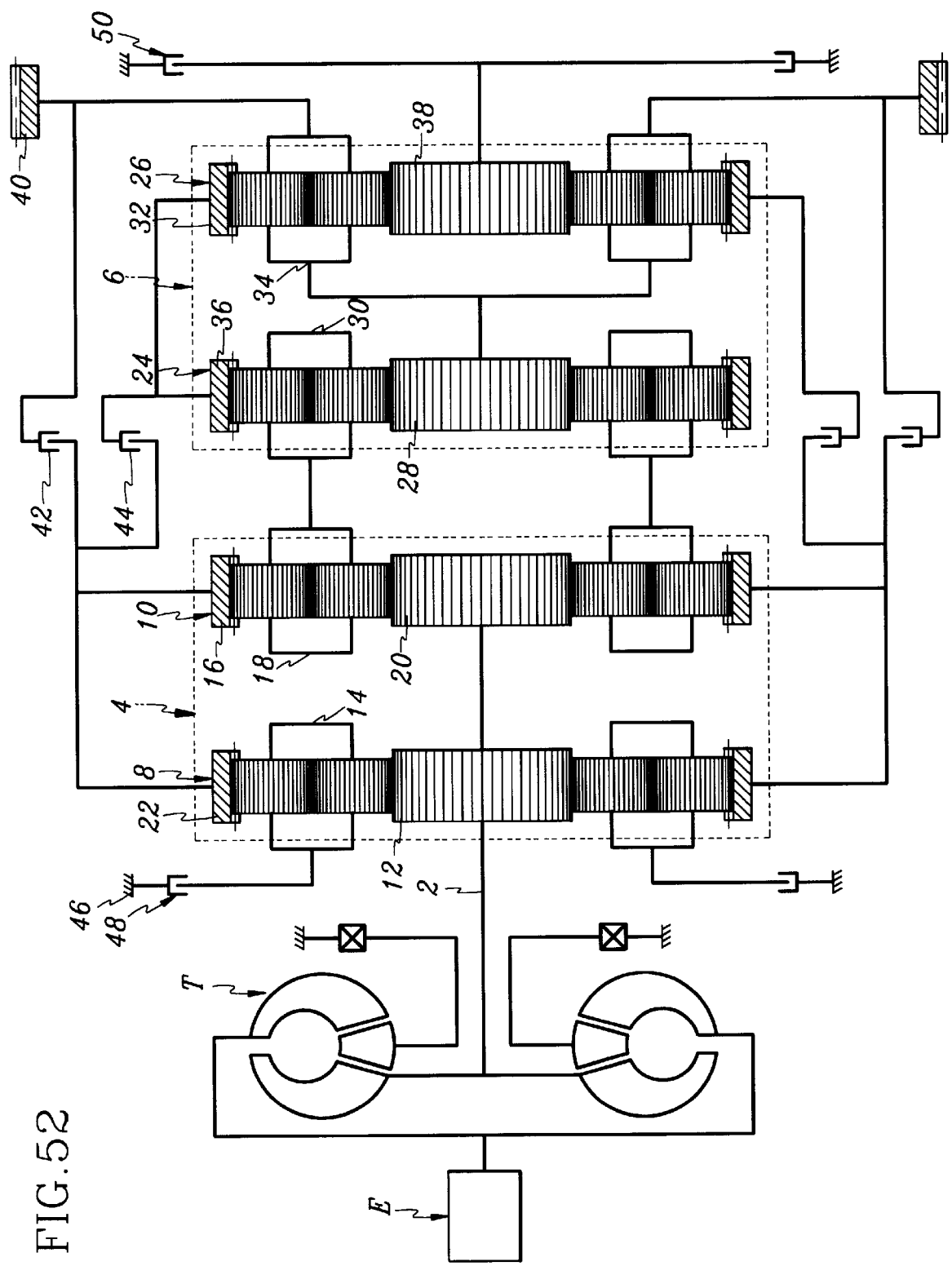
FIG. 52 is a schematic view of a powertrain according to a forty-seventh preferred embodiment of the present invention.

Referring to FIG. 52, shown is a schematic view of a powertrain according to a forty-seventh preferred embodiment of the present invention. In the forty-seventh embodiment, the first, second, third, and fourth simple planetary gearsets 8, 10, 24, and 26 are double pinion planetary gearsets.

In the first compound planetary gearset 4, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-sixth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the ring gears 22 and 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween, and the sun gear 38 of the fourth simple planetary gearset 26 is connected to the transmission housing 46 with the second brake 50 interposed therebetween as in the thirty-sixth embodiment such that the planet carrier 14 and sun gear 38 act as reaction elements. In addition, input is realized through a combination of the sun gears 12 and 20 of the first and second simple planetary gearsets 8 and 10, and a combination of the sun gear 28 and planet carrier 34 of the third and fourth simple planetary gearsets 24 and 26 acts as an output element.

According to the above structure, operating elements for the first compound planetary gearset 4 in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-sixth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Forty-eighth Embodiment

Figure 53:
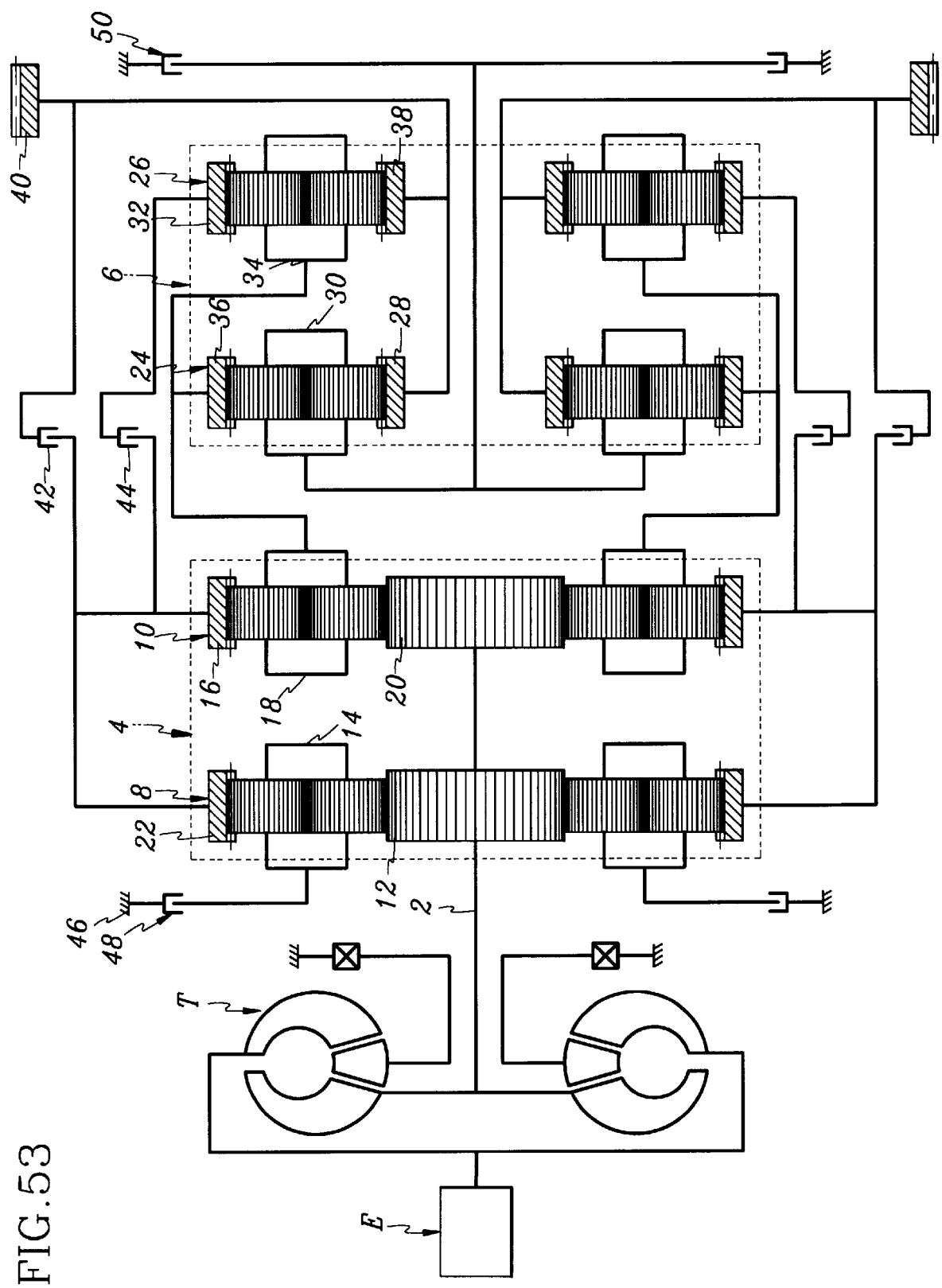
FIG. 53 is a schematic view of a powertrain according to a forty-eighth preferred embodiment of the present invention.

Referring to FIG. 53, shown is a schematic view of a powertrain according to a forty-eighth preferred embodiment of the present invention. In the forty-eighth embodiment, as in the forty-seventh embodiment, the first, second, third, and fourth simple planetary gearsets 8, 10, 24, and 26 are double pinion planetary gearsets.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-seventh embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gear 36 and planet carrier 34 of the third and fourth simple planetary gearsets 24 and 26, and a combination of the ring gears 22 and 16 of the first and second simple planetary gearsets 8 and 10 is variably connected to both a combination of the sun gears 28 and 38 of the third and fourth simple planetary gearsets 24 and 26 through the first clutch 42, and to the ring gear 32 of the fourth simple planetary gearset 26 through the second clutch 44.

Also, the planet carrier 14 of the first simple planetary gearset 8 is connected to the transmission housing 46 with the first brake 48 interposed therebetween as in the forty-seventh embodiment, and the planet carrier 30 of the third simple planetary gearset 24 is connected to the transmission housing 46 with the second brake 50 interposed therebetween as in the thirty-seventh embodiment such that the planet carriers 14 and 30 act as reaction elements. In addition, input is realized through a combination of the sun gears 12 and 20 of the first and second simple planetary gearsets 8 and 10 as in the forty-seventh embodiment, and a combination of the sun gears 28 and 38 of the third and fourth simple planetary gearsets 24 and 26 acts as an output element as in the thirty-seventh embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-seventh embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 32 of the fourth simple planetary gearset 26, the third operating element I indicates a combination of the ring gear 36 and planet carrier 34 of the third and fourth simple planetary gearsets 24 and 26, and the fourth operating element J indicates the planet carrier 30 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Forty-ninth Embodiment

Figure 54:
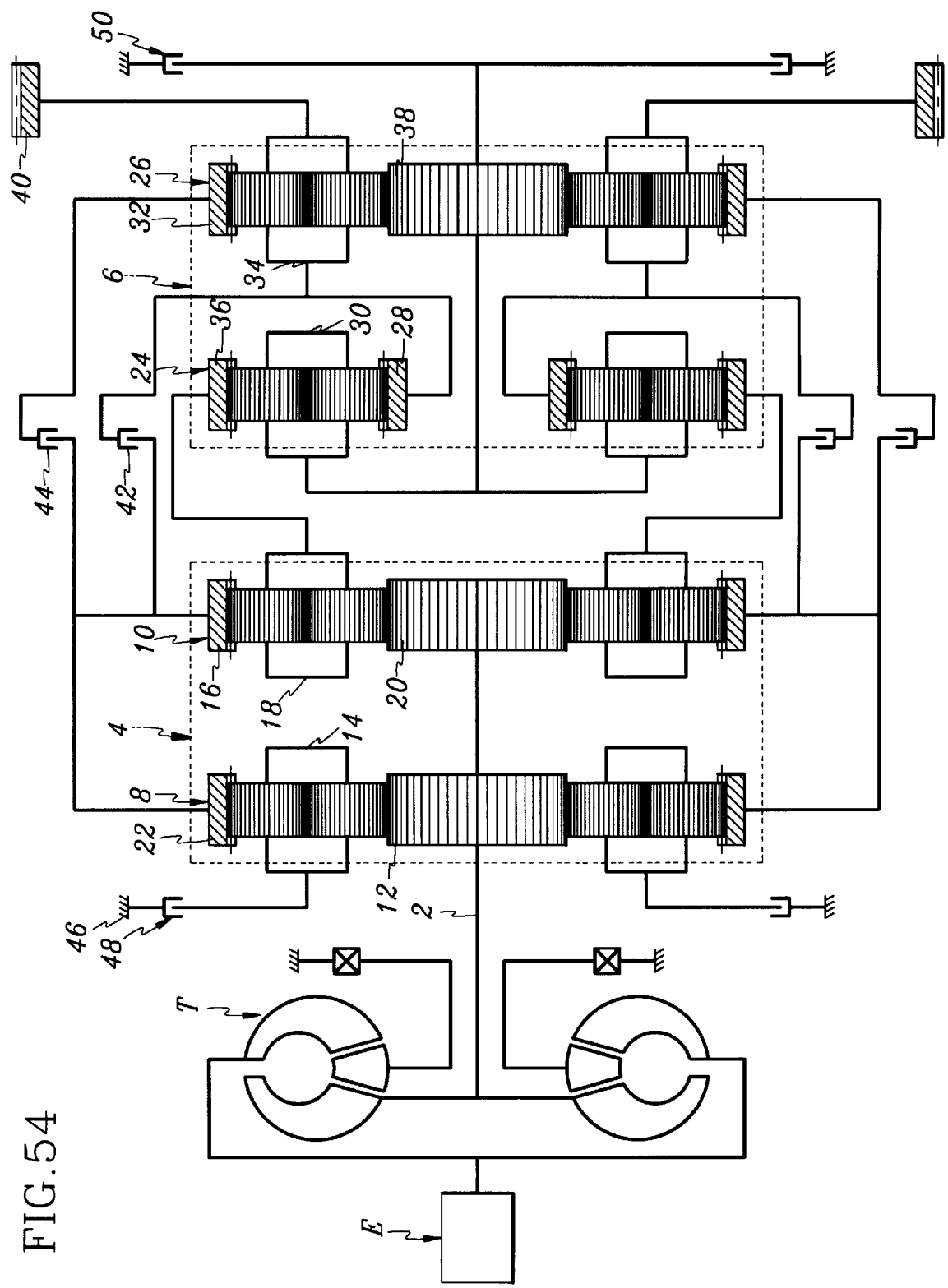
FIG. 54 is a schematic view of a powertrain according to a forty-ninth preferred embodiment of the present invention.

Referring to FIG. 54, shown is a schematic view of a powertrain according to a forty-ninth preferred embodiment of the present invention. In the forty-ninth embodiment, as in the forty-seventh embodiment, the first, second, third, and fourth simple planetary gearsets 8, 10, 24, and 26 are double pinion planetary gearsets.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-eighth embodiment, the planet carrier 30 and sun gear 28 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gears 22 and 16 of the first and second simple planetary gearsets 8 and 10 is variably connected to both a combination of the sun gear 28 and planet carrier 34 of the third and fourth simple planetary gearsets 24 and 26 through the first clutch 42, and to the ring gear 32 of the fourth simple planetary gearset 26 through the second clutch 44.

Also, the planet carrier 14 of the first simple planetary gearset 8 is connected to the transmission housing 46 with the first brake 48 interposed therebetween as in the forty-seventh embodiment, and a combination of the planet carrier 30 and sun gear 38 of the third and fourth simple planetary gearsets 24 and 26 is connected to the transmission housing 46 with the second brake 50 interposed therebetween as in the thirty-eighth embodiment such that the planet carrier 14, and the planet carrier 30 and sun gear 38 act as reaction elements. In addition, input is realized through a combination of the sun gears 12 and 20 of the first and second simple planetary gearsets 8 and 10 as in the forty-seventh embodiment, and a combination of the sun gear 28 and planet carrier 34 of the third and fourth simple planetary gearsets 24 and 26 acts as an output element as in the thirty-seventh embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-eighth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates the ring gear 32 of the fourth simple planetary gearset 26, the third operating element I indicates the ring gear 36 of the third simple planetary gearset 24, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the forty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Fiftieth Embodiment

Figure 55:
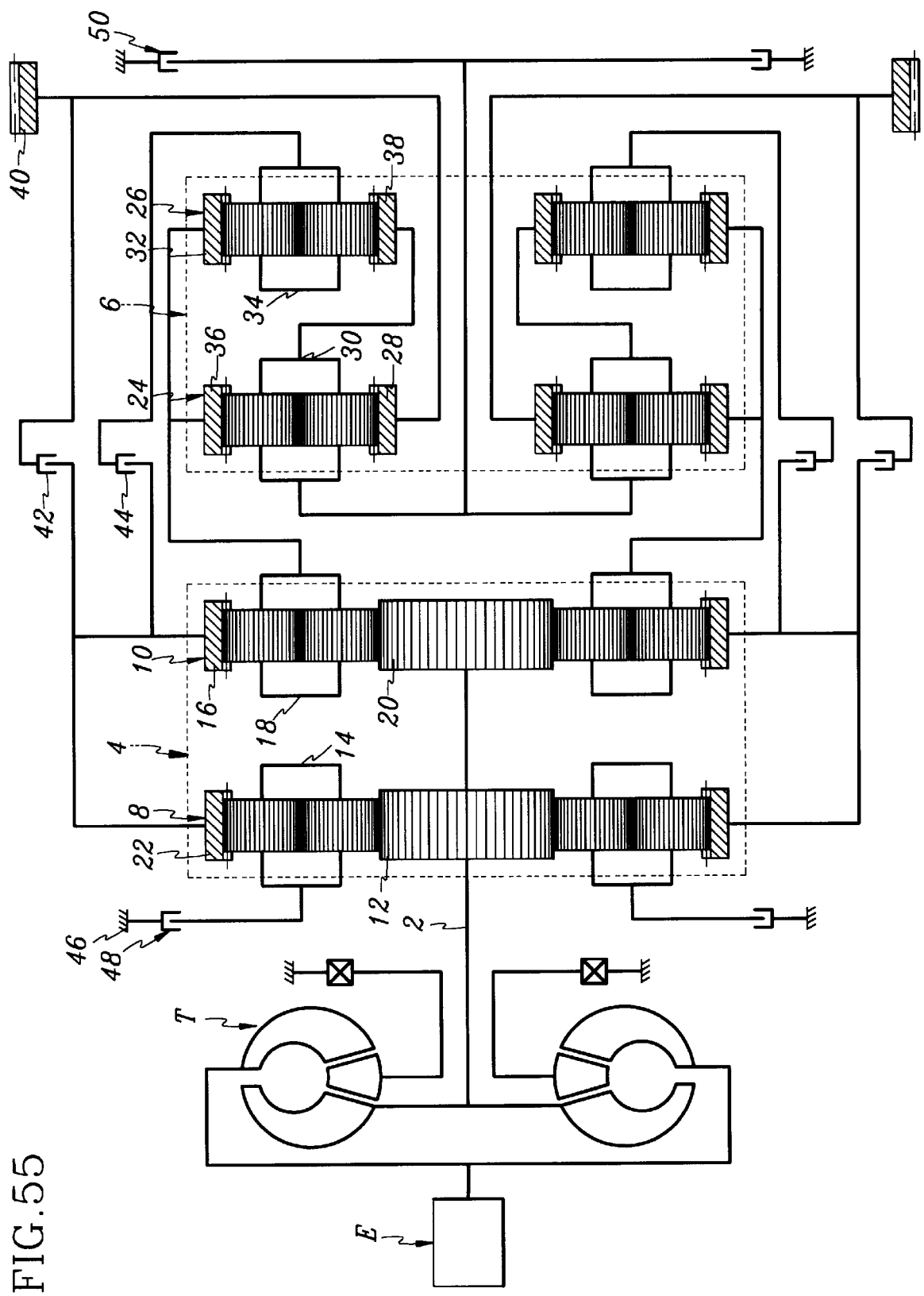
FIG. 55 is a schematic view of a powertrain according to a fiftieth preferred embodiment of the present invention.

Referring to FIG. 55, shown is a schematic view of a powertrain according to a fiftieth preferred embodiment of the present invention. In the fiftieth embodiment, as in the forty-seventh embodiment, the first, second, third, and fourth simple planetary gearsets 8, 10, 24, and 26 are double pinion planetary gearsets.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-ninth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the ring gears 22 and 16 of the first and second simple planetary gearsets 8 and 10 is variably connected to both the sun gear 28 of the third simple planetary gearset 24 through the first clutch 42, and to the planet carrier 34 of the fourth simple planetary gearset 26 through the second clutch 44.

Also, the planet carrier 14 of the first simple planetary gearset 8 is connected to the transmission housing 46 with the first brake 48 interposed therebetween as in the forty-seventh embodiment, and a combination of the planet carrier 30 and sun gear 38 of the third and fourth simple planetary gearsets 24 and 26 is connected to the transmission housing 46 with the second brake 50 interposed therebetween as in the thirty-ninth embodiment such that the planet carrier 14, and the planet carrier 30 and sun gear 38 act as reaction elements. In addition, input is realized through a combination of the sun gears 12 and 20 of the first and second simple planetary gearsets 8 and 10 as in the forty-seventh embodiment, and the sun gear 28 of the third simple planetary gearset 24 acts as an output element as in the thirty-ninth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-ninth embodiment, in the lever analogies of FIGS. 2–5 are as follows: the first operating element G indicates the sun gear 28 of the third simple planetary gearset 24, the second operating element H indicates the planet carrier 34 of the fourth simple planetary gearset 26, the third operating element I indicates a combination of the ring gears 36 and 32 of the third and fourth simple planetary gearsets 24 and 26, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fiftieth embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-first Embodiment

Figure 56:
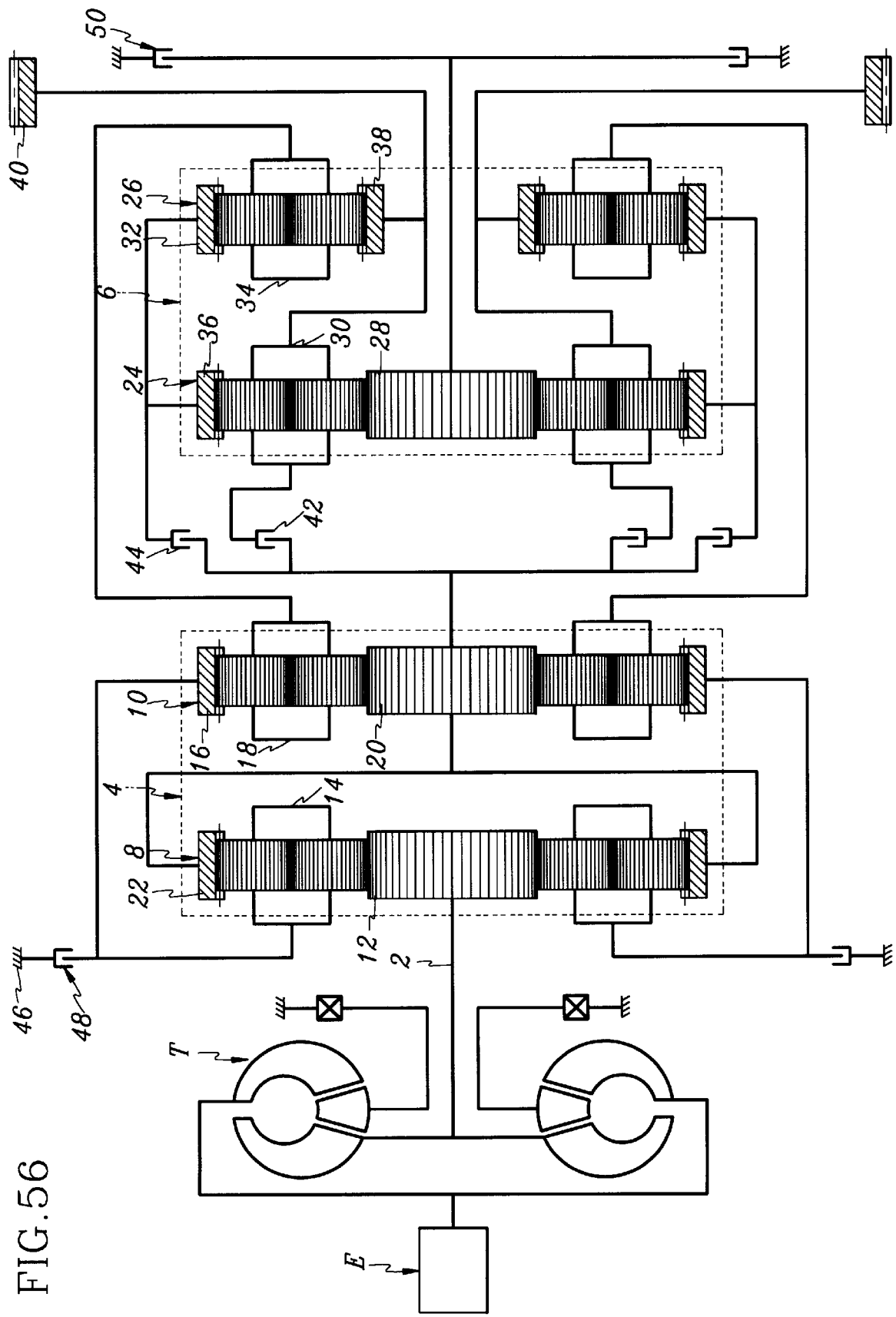
FIG. 56 is a schematic view of a powertrain according to a fifty-first preferred embodiment of the present invention.

Referring to FIG. 56, shown is a schematic view of a powertrain according to a fifty-first preferred embodiment of the present invention. In the fifty-first embodiment, as in the forty-seventh embodiment, the first, second, third, and fourth simple planetary gearsets 8, 10, 24, and 26 are double pinion planetary gearsets.

In the first compound planetary gearset 4, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the sixteenth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to the planet carrier 34 of the fourth simple planetary gearset 26, and a combination of the ring gear 22 and sun gear 20 of the first and second simple planetary gearsets 8 and 10 is variably connected to both a combination of the planet carrier 30 and sun gear 38 of the third and fourth simple planetary gearsets 24 and 26 through the first clutch 42, and to a combination of the ring gears 36 and 32 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween, and the sun gear 28 of the third simple planetary gearset 24 is connected to the transmission housing 46 with the second brake 50 interposed therebetween as in the sixteenth embodiment such that the planet carrier 14 and ring gear 16, and the sun gear 28 act as reaction elements. In addition, input is realized through the sun gear 12 of the first simple planetary gearset 8, and a combination of the planet carrier 30 and sun gear 38 of the third and fourth simple planetary gearsets 24 and 26 acts as an output element as in the sixteenth embodiment.

According to the above structure, operating elements for the first compound planetary gearset 4 in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the sixteenth embodiment, in the lever analogies of FIGS. 2–5 are as follows: the first operating element G indicates a combination of the planet carrier 30 and sun gear 38 of the third and fourth simple planetary gearsets 24 and 26, the second operating element H indicates a combination of the ring gears 36 and 32 of the third and fourth simple planetary gearsets 24 and 26, the third operating element I indicates the planet carrier 34 of the fourth simple planetary gearset 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-first embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-second Embodiment

Figure 57:
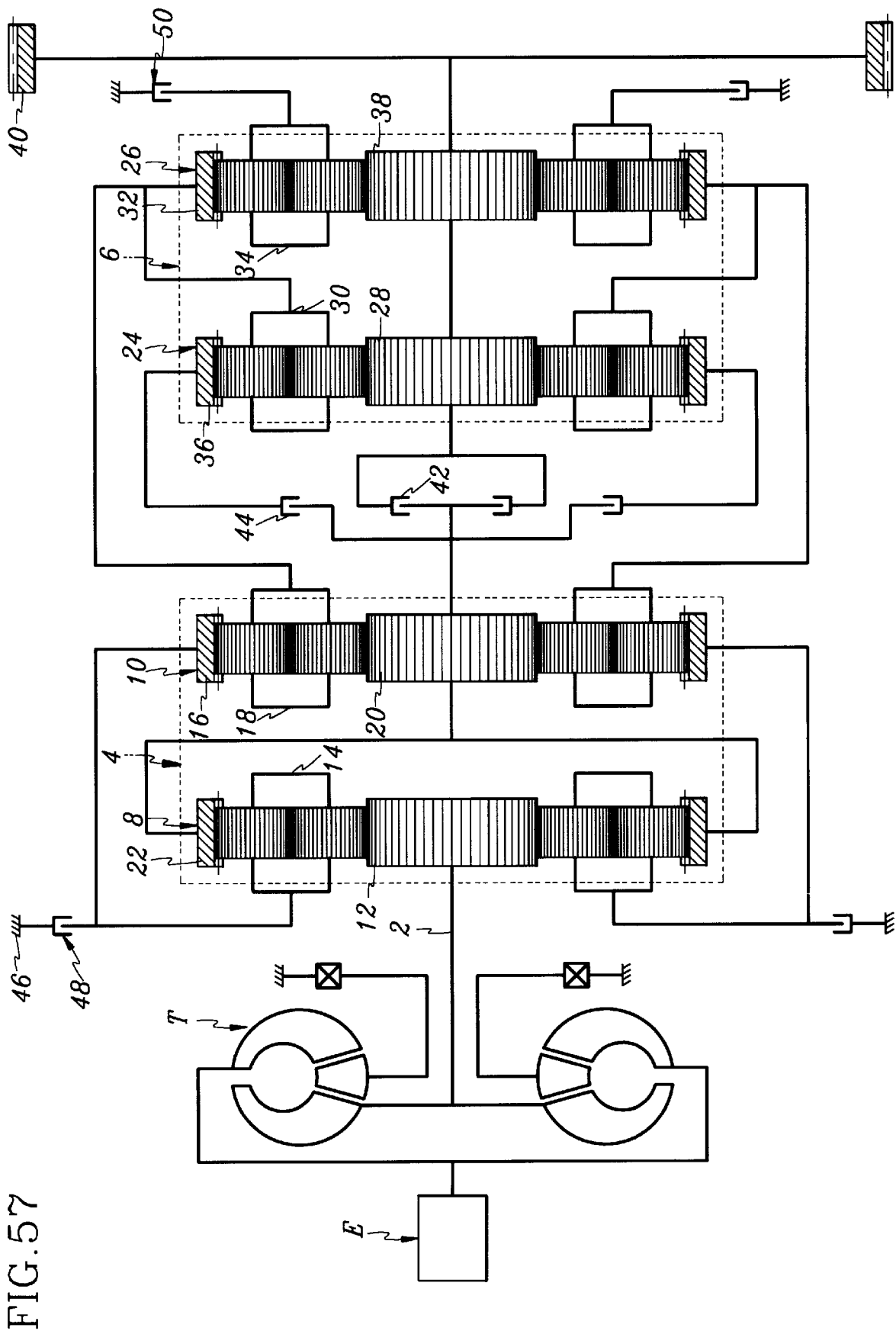
FIG. 57 is a schematic view of a powertrain according to a fifty-second preferred embodiment of the present invention.

Referring to FIG. 57, shown is a schematic view of a powertrain according to a fifty-second preferred embodiment of the present invention. In the fifty-second embodiment, as in the forty-seventh embodiment, the first, second, third, and fourth simple planetary gearsets 8, 10, 24, and 26 are double pinion planetary gearsets.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the seventeenth embodiment, the planet carrier 30 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the ring gear 22 and sun gear 20 of the first and second simple planetary gearsets 8 and 10 is variably connected to both a combination of the sun gears 28 and 38 of the third and fourth simple planetary gearsets 24 and 26 through the first clutch 42, and to the ring gear 36 of the third simple planetary gearset 24 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the planet carrier 34 of the fourth simple planetary gearset 26 is connected to the transmission housing 46 with the second brake 50 interposed therebetween as in the seventeenth embodiment such that the planet carrier 14 and ring gear 16, and the planet carrier 34 act as reaction elements. In addition, input is realized through the sun gear 12 of the first simple planetary gearset 8 as in the fifty-first embodiment, and a combination of the sun gears 28 and 38 of the third and fourth simple planetary gearsets 24 and 26 acts as an output element as in the seventeenth embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearsets 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the seventeenth embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-second embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-third Embodiment

Figure 58:
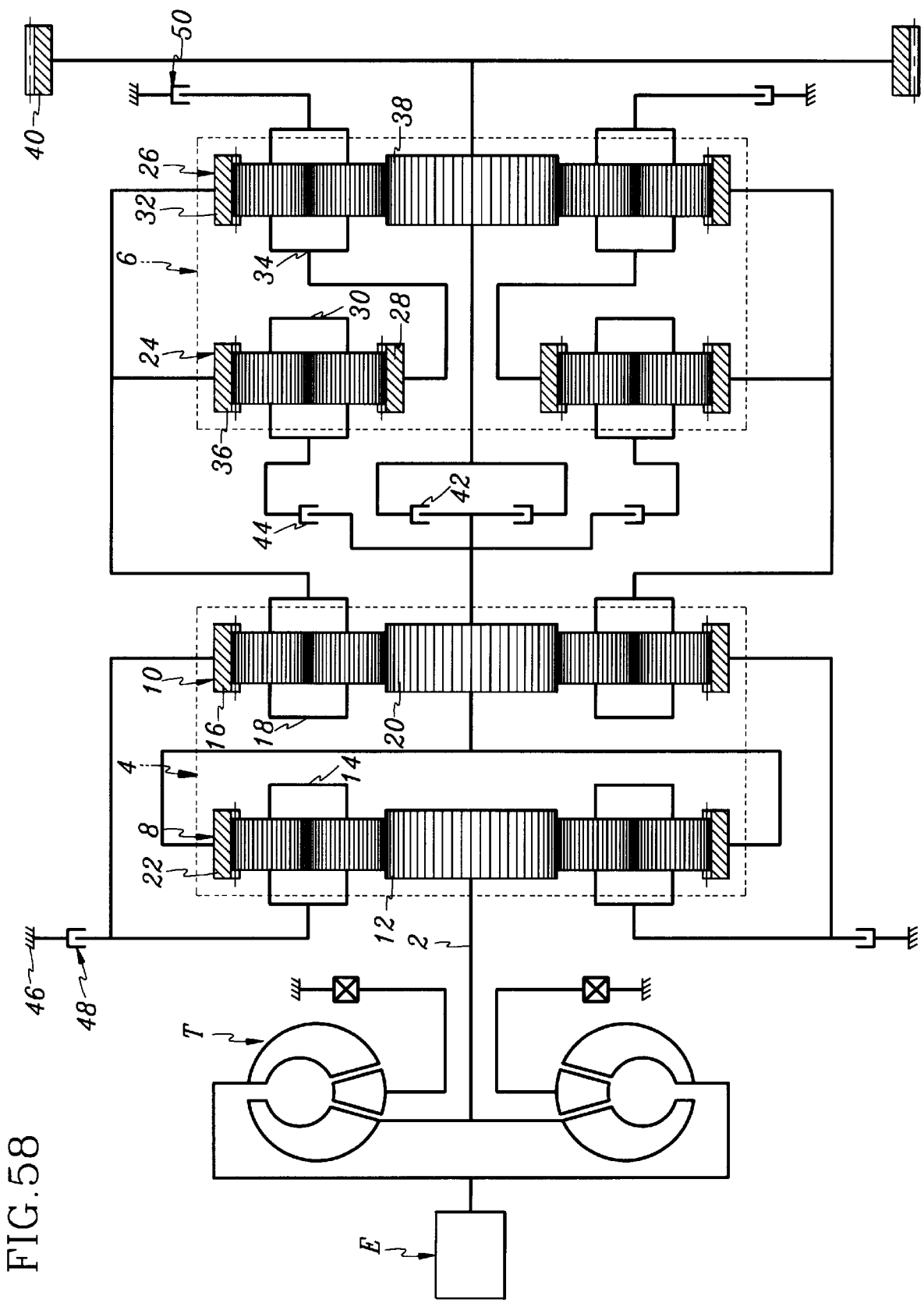
FIG. 58 is a schematic view of a powertrain according to a fifty-third preferred embodiment of the present invention.

Referring to FIG. 58, shown is a schematic view of a powertrain according to a fifty-third preferred embodiment of the present invention. In the fifty-third embodiment, as in the forty-seventh embodiment, the first, second, third, and fourth simple planetary gearsets 8, 10, 24, and 26 are double pinion planetary gearsets.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the eighteenth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to the planet carrier 30 of the third simple planetary gearset 24 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and a combination of the sun gear 28 and planet carrier 34 of the third and fourth simple planetary gearsets 24 and 26 is connected to the transmission housing 46 with the second brake 50 interposed therebetween as in the eighteenth embodiment such that the planet carrier 14 and ring gear 16, and the sun gear 28 and planet carrier 34 act as reaction elements. In addition, input is realized through the sun gear 12 of the first simple planetary gearset 8 as in the fifty-first embodiment, and the sun gear 38 of the fourth simple planetary gearset 26 acts as an output element as in the eighteenth embodiment.

According to the above structure, operating elements for the first compound s planetary gearset 4, as in the fifty-first embodiment, in the lever analogies of FIGS. 2–5 are as follows: the first operating element A indicates the sun gear 12 of the first simple planetary gearsets 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the eighteenth embodiment, in the lever analogies of FIGS. 2–5 are as follows: the first operating element G indicates the sun gear 38 of the fourth simple planetary gearset 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-third embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-fourth Embodiment

Figure 59:
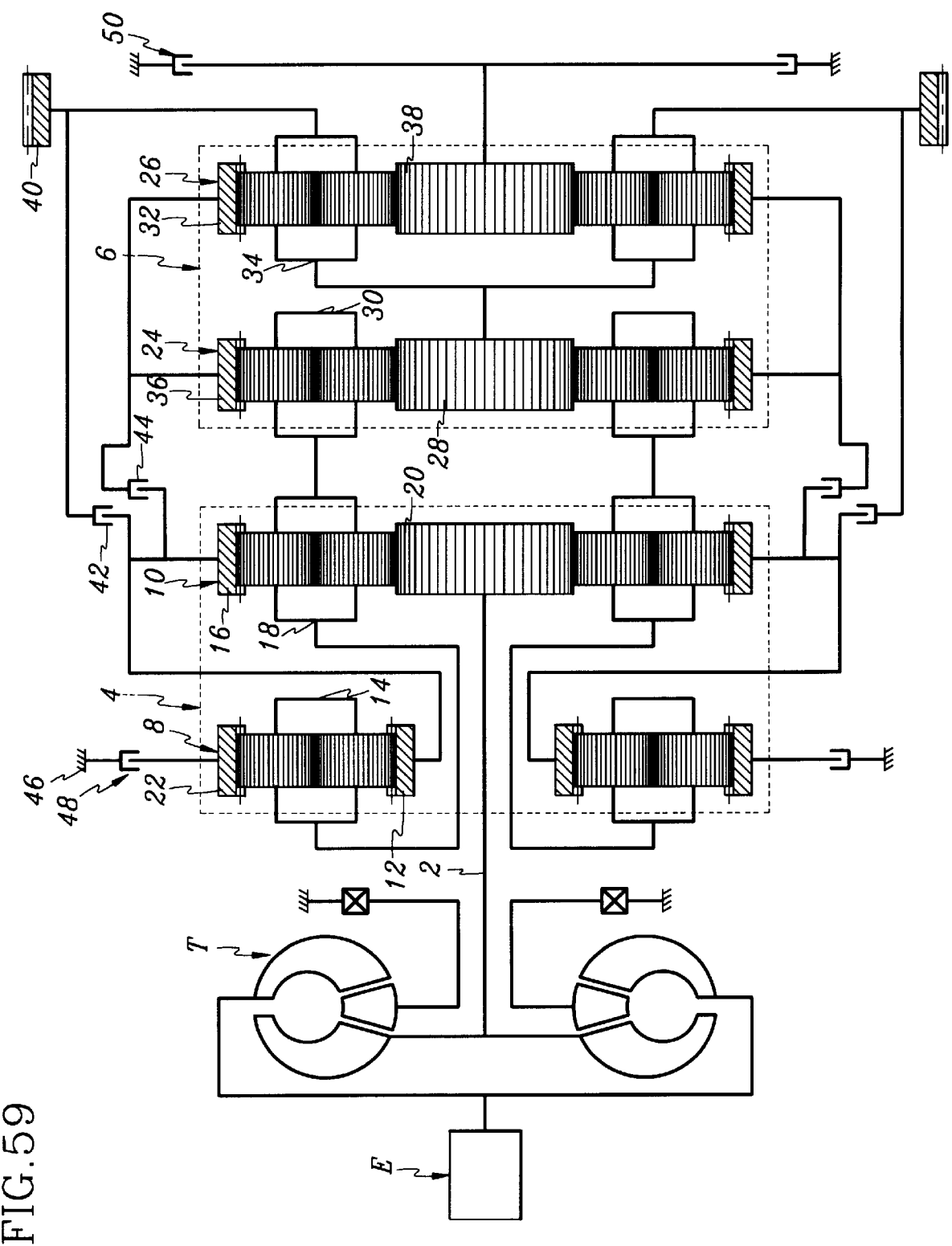
FIG. 59 is a schematic view of a powertrain according to a fifty-fourth preferred embodiment of the present invention.

Referring to FIG. 59, shown is a schematic view of a powertrain according to a fifty-fourth preferred embodiment of the present invention. In the fifty-fourth embodiment, as in the forty-seventh embodiment, the first, second, third, and fourth simple planetary gearsets 8, 10, 24, and 26 are double pinion planetary gearsets.

In the first compound planetary gearset 4, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-sixth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween, and the sun gear 38 of the fourth simple planetary gearset 26 is connected to the transmission housing 46 with the second brake 50 interposed therebetween as in the thirty-sixth embodiment such that the ring gear 22 and sun gear 38 act as reaction elements. In addition, input is realized through the sun gear 20 of the second simple planetary gearset 10, and a combination of the sun gear 28 and planet carrier 34 of the third and fourth simple planetary gearsets 24 and 26 acts as an output element as in the thirty-sixth embodiment.

According to the above structure, operating elements for the first compound planetary gearset 4 in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-sixth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-fifth Embodiment

Figure 60:
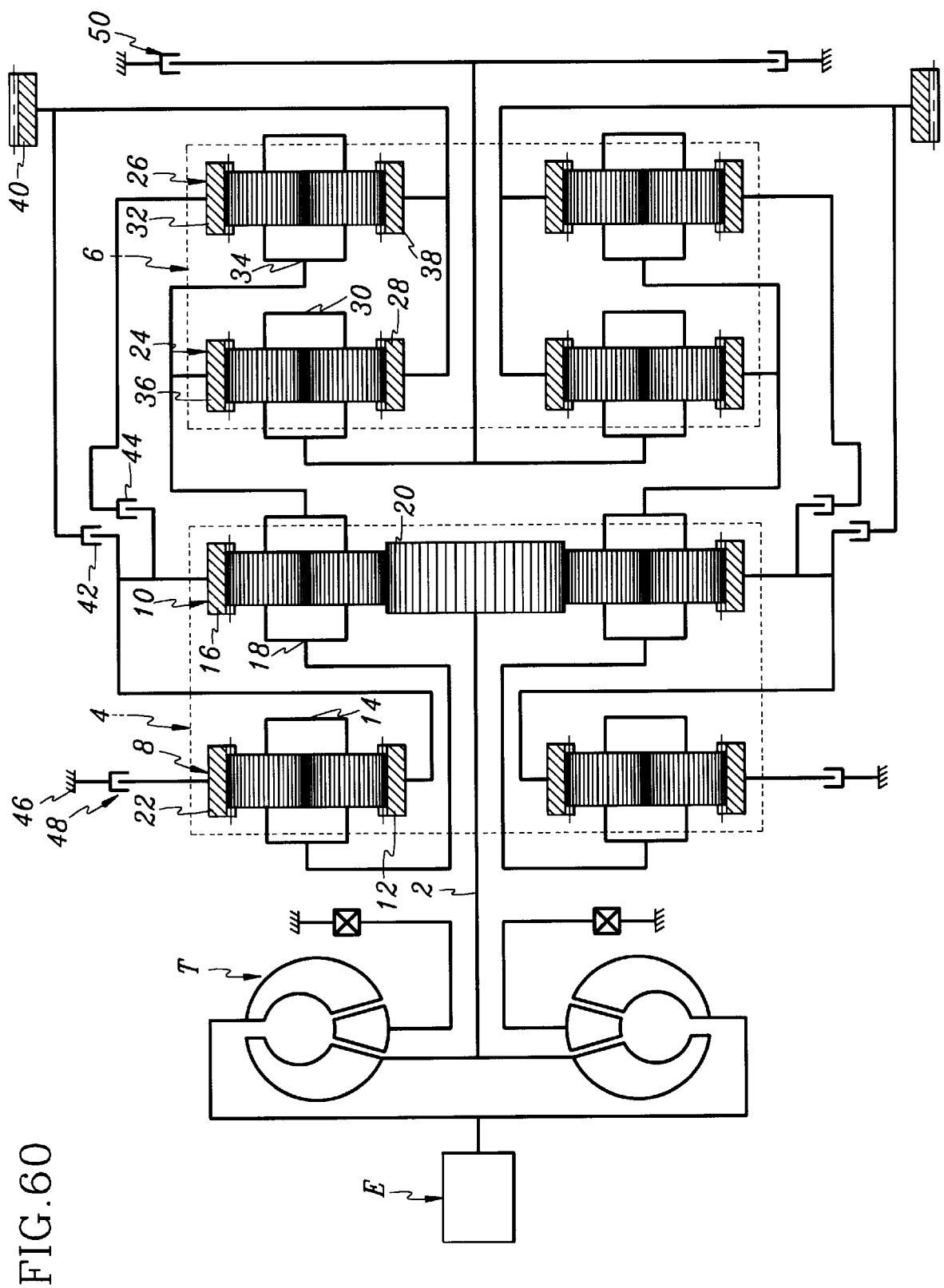
FIG. 60 is a schematic view of a powertrain according to a fifty-fifth preferred embodiment of the present invention.

Referring to FIG. 60, shown is a schematic view of a powertrain according to a fifty-fifth preferred embodiment of the present invention. In the fifty-fifth embodiment, as in the forty-seventh embodiment, the first, second, third, and fourth simple planetary gearsets 8, 10, 24, and 26 are double pinion planetary gearsets.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-seventh embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the ring gear 36 and planet carrier 34 of the third and fourth simple planetary gearsets 24 and 26, and a combination of the sun gear 12 and ring gear 16 of the first and second simple planetary gearsets 8 and 10 is variably connected to both a combination of the sun gears 28 and 38 of the third and fourth simple planetary gearsets 24 and 26 through the first clutch 42, and to the ring gear 32 of the fourth simple planetary gearset 26 through the second clutch 44.

Also, the ring gear 22 of the first simple planetary gearset 8 is connected to the transmission housing 46 with the first brake 48 interposed therebetween as in the fifty-fourth embodiment, and the planet carrier 30 of the third simple planetary gearset 24 is connected to the transmission housing 46 with the second brake 50 interposed therebetween as in the thirty-seventh embodiment such that the ring gear 22 and planet carrier 30 act as reaction elements. In addition, input is realized through the sun gear 20 of the second simple planetary gearset 10 as in the fifty-fourth embodiment, and a combination of the sun gears 28 and 38 of the third and fourth simple planetary gearsets 24 and 26 acts as an output element as in the thirty-seventh embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 8, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-seventh embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 32 of the fourth simple planetary gearset 26, the third operating element I indicates a combination of the ring gear 36 and planet carrier 34 of the third and fourth simple planetary gearsets 24 and 26, and the fourth operating element J indicates the planet carrier 30 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-sixth Embodiment

Figure 61:
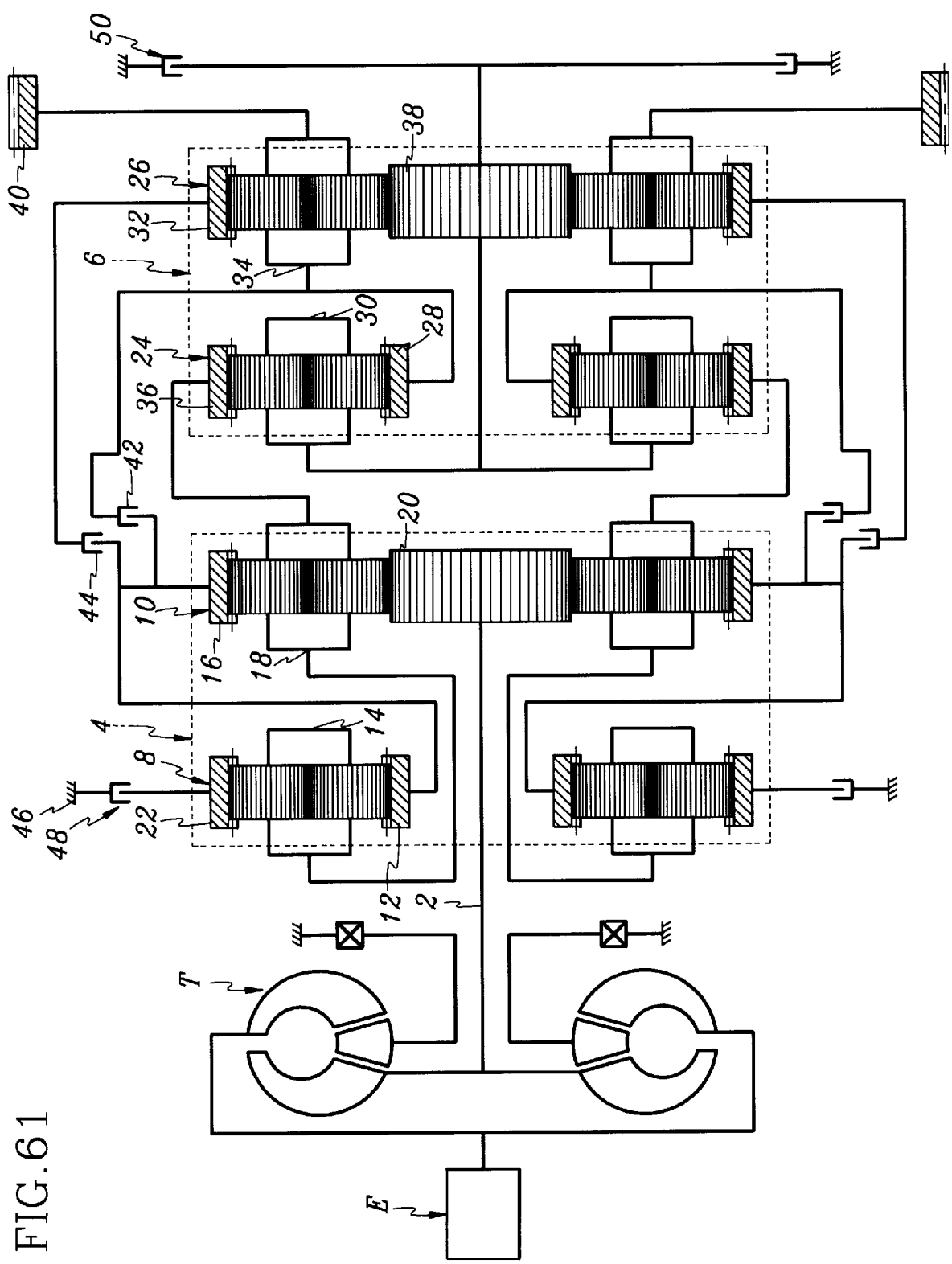
FIG. 61 is a schematic view of a powertrain according to a fifty-sixth preferred embodiment of the present invention.

Referring to FIG. 61, shown is a schematic view of a powertrain according to a fifty-sixth preferred embodiment of the present invention. In the fifty-sixth embodiment, as in the forty-seventh embodiment, the first, second, third, and fourth simple planetary gearsets 8, 10, 24, and 26 are double pinion planetary gearsets.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-eighth embodiment, the planet carrier 30 and sun gear 28 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to the ring gear 32 of the fourth simple planetary gearset 26 through the second clutch 44.

Also, the ring gear 22 of the first simple planetary gearset 8 is connected to the transmission housing 46 with the first brake 48 interposed therebetween as in the fifty-fourth embodiment, and a combination of the planet carrier 30 and sun gear 38 of the third and fourth simple planetary gearsets 24 and 26 is connected to the transmission housing 46 with the second brake 50 interposed therebetween as in the thirty-eighth embodiment such that the ring gear 22, and the planet carrier 30 and sun gear 38 act as reaction elements. In addition, input is realized through the sun gear 20 of the second simple planetary gearset 10 as in the fifty-fourth embodiment, and a combination of the sun gear 28 and planet carrier 34 of the third and fourth simple planetary gearsets 24 and 26 acts as an output element as in the thirty-eighth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 8, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-eighth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates the ring gear 32 of the fourth simple planetary gearset 26, the third operating element I indicates the ring gear 36 of the third simple planetary gearset 24, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-seventh Embodiment

Figure 62:
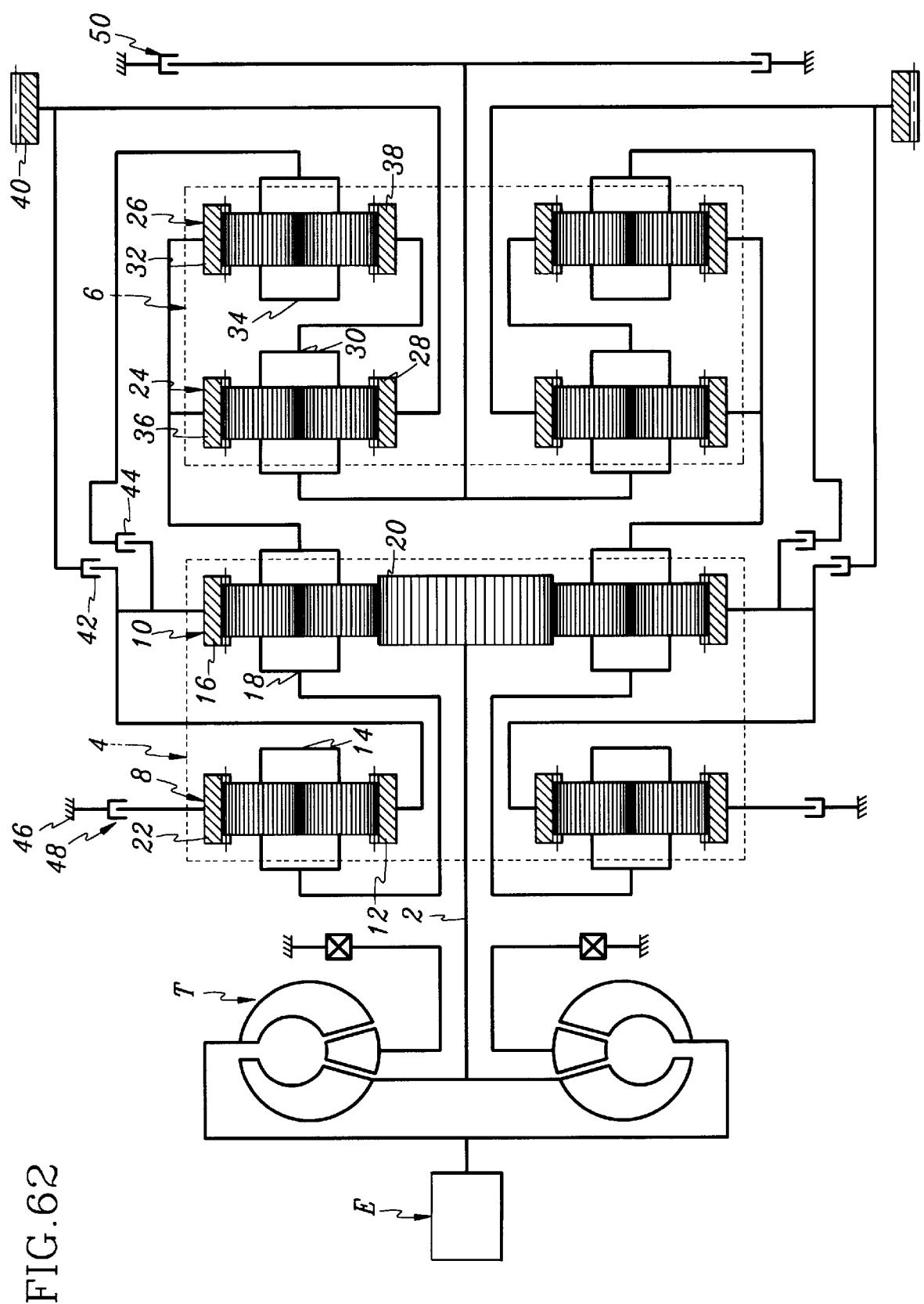
FIG. 62 is a schematic view of a powertrain according to a fifty-seventh preferred embodiment of the present invention.

Referring to FIG. 62, shown is a schematic view of a powertrain according to a fifty-seventh preferred embodiment of the present invention. In the fifty-seventh embodiment, as in the forty-seventh embodiment, the first, second, third, and fourth simple planetary gearsets 8, 10, 24, and 26 are double pinion planetary gearsets.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-ninth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the ring gears 36 and 32 of the third and fourth simple planetary gearsets 24 and 26, and a combination of the sun gear 12 and ring gear 16 of the first and second simple planetary gearsets 8 and 10 is variably connected to both the sun gear 28 of the third simple planetary gearset 24 through the first clutch 42, and to the planet carrier 34 of the fourth simple planetary gearset 26 through the second clutch 44.

Also, the ring gear 22 of the first simple planetary gearset 8 is connected to the transmission housing 46 with the first brake 48 interposed therebetween as in the fifty-fourth embodiment, and a combination of the planet carrier 30 and sun gear 38 of the third and fourth simple planetary gearsets 24 and 26 is connected to the transmission housing 46 with the second brake 50 interposed therebetween as in the thirty-ninth embodiment such that the ring gear 22, and the planet carrier 30 and sun gear 38 act as reaction elements. In addition, input is realized through the sun gear 20 of the second simple planetary gearset 10 as in the fifty-fourth embodiment, and the sun gear 28 of the third simple planetary gearset 24 acts as an output element as in the thirty-ninth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 8, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-ninth embodiment, in the lever analogies of FIGS. 2–5 are as follows: the first operating element G indicates the sun gear 28 of the third simple planetary gearset 24, the second operating element H indicates the planet carrier 34 of the fourth simple planetary gearset 26, the third operating element I indicates a combination of the ring gears 36 and 32 of the third and fourth simple planetary gearsets 24 and 26, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-eighth Embodiment

Figure 63:
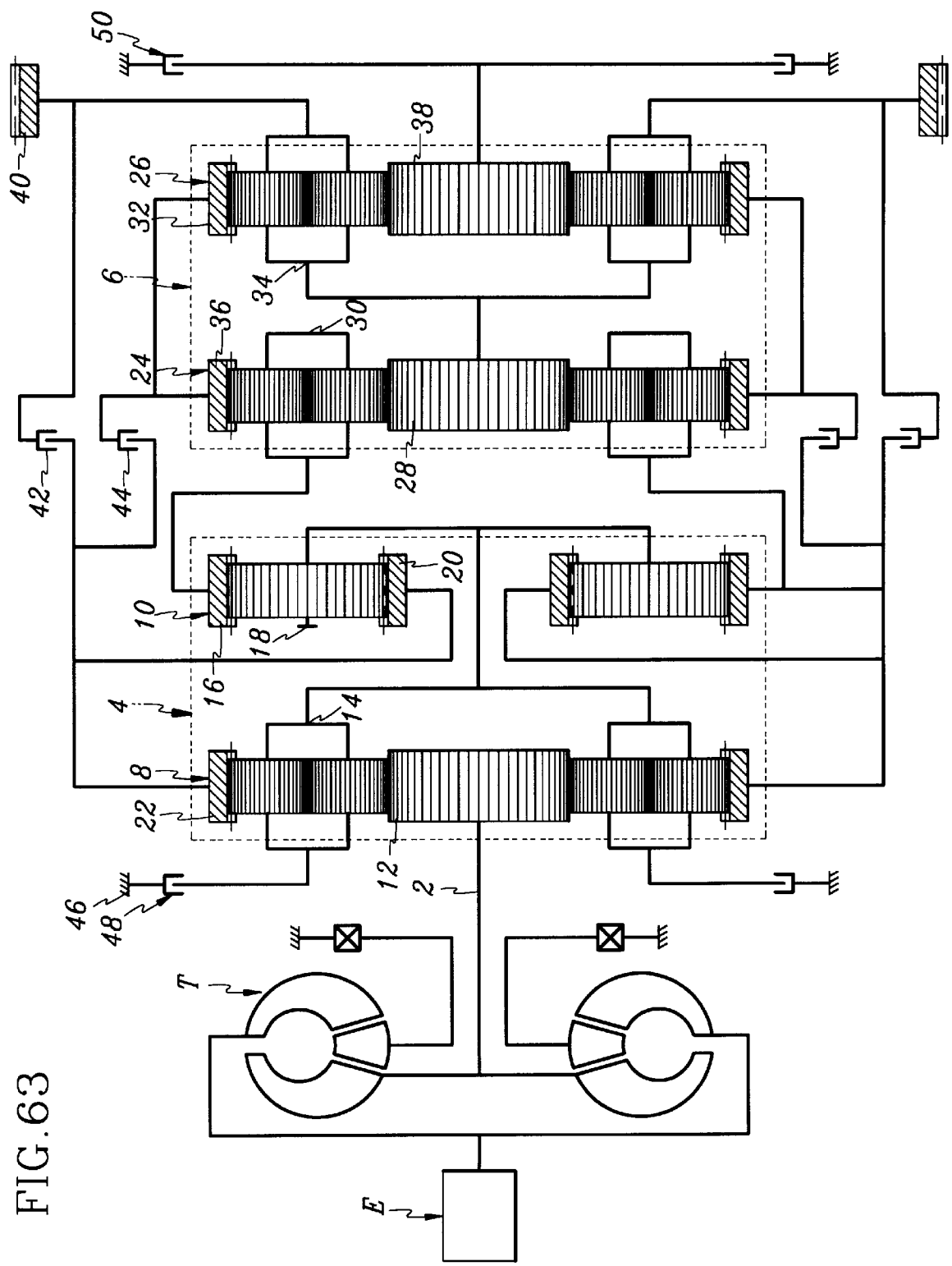
FIG. 63 is a schematic view of a powertrain according to a fifty-eighth preferred embodiment of the present invention.

Referring to FIG. 63, shown is a schematic view of a powertrain according to a fifty-eighth preferred embodiment of the present invention. In the fifty-eighth embodiment, the first, third, and fourth simple planetary gearsets 8, 24, and 26 are double pinion planetary gearsets, while the second simple planetary gearset 10 is a single pinion planet gearset as in the first embodiment.

In the first compound planetary gearset 4, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-sixth embodiment, the ring gear 36 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 16 of the second simple planetary gearset 10 is fixedly connected to the planet carrier 30 of the third simple planetary gearset 24, and a combination of the ring gear 22 and sun gear 20 of the first and second simple planetary gearsets 8 and 10 is variably connected to both a combination of the sun gear 28 and planet carrier 34 of the third and fourth simple planetary gearsets 24 and 26 through the first clutch 42, and to a combination of the ring gears 36 and 32 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween, and the sun gear 38 of the fourth simple planetary gearset 26 is connected to the transmission housing 46 with the second brake 50 interposed therebetween as in the thirty-sixth embodiment such that the planet carriers 14 and 18, and the sun gear 38 act as reaction elements. In addition, input is realized through the sun gear 12 of the first simple planetary gearset 8, and a combination of the sun gear 28 and planet carrier 34 of the third and fourth simple planetary gearsets 24 and 26 acts as an output element as in the thirty-sixth embodiment.

According to the above structure, operating elements for the first compound planetary gearset 4 in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-sixth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Fifty-ninth Embodiment

Figure 64:
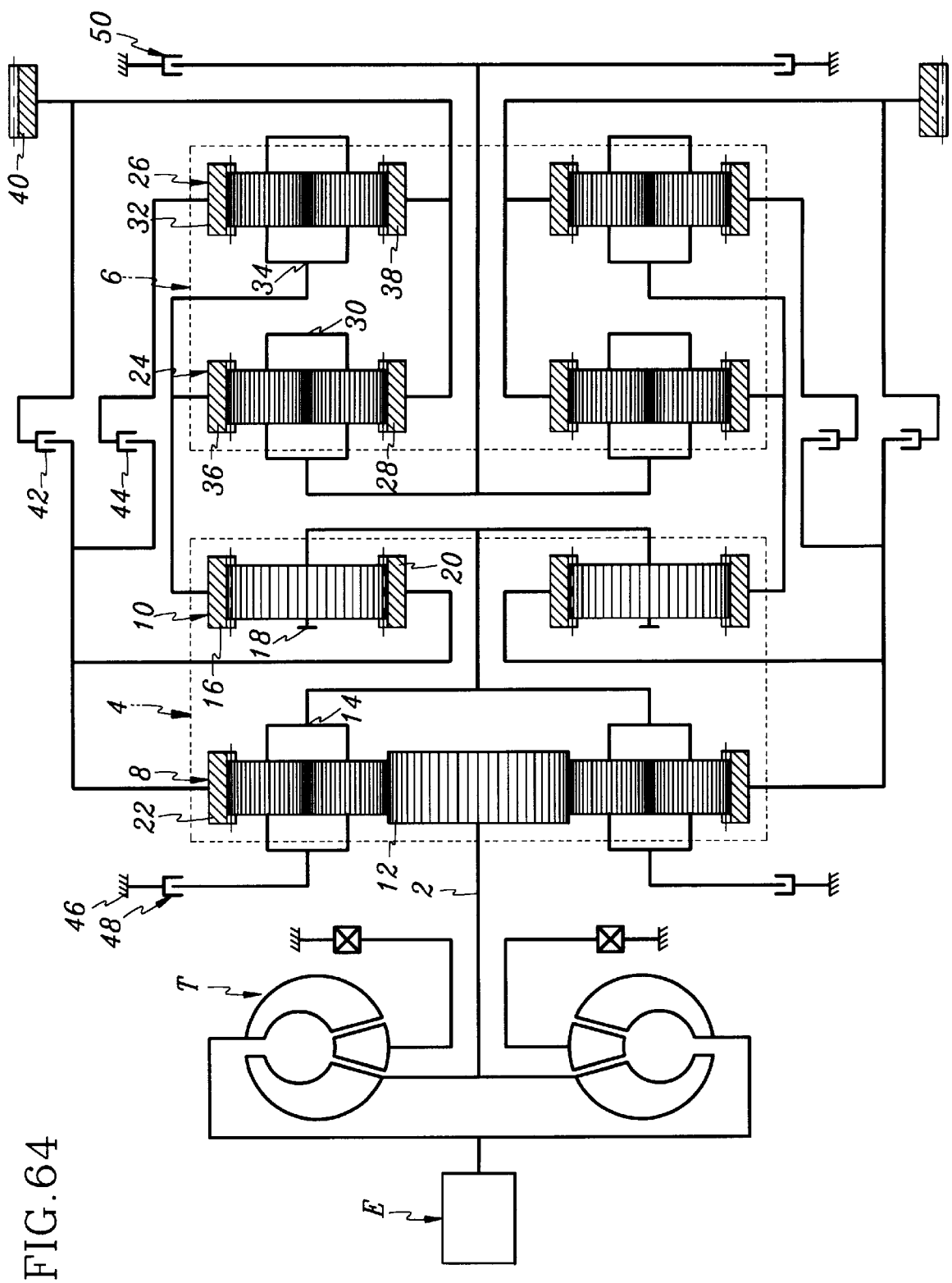
FIG. 64 is a schematic view of a powertrain according to a fifty-ninth preferred embodiment of the present invention.

Referring to FIG. 64, shown is a schematic view of a powertrain according to a fifty-ninth preferred embodiment of the present invention. In the fifty-ninth embodiment, as in the fifty-eighth embodiment, the first, third, and fourth simple planetary gearsets 8, 24, and 26 are double pinion planetary gearsets, while the second simple planetary gearset 10 is a single pinion planetary gearset.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-seventh embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the ring gear 16 of the second simple planetary gearset 10 is fixedly connected to a combination of the ring gear 36 and planet carrier 34 of the third and fourth simple planetary gearsets 24 and 26, and a combination of the ring gear 22 and sun gear 20 of the first and second simple planetary gearsets 8 and 10 is variably connected to both a combination of the sun gears 28 and 38 of the third and fourth simple planetary gearsets 24 and 26 through the first clutch 42, and to the ring gear 32 of the fourth simple planetary gearset 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and the planet carrier 30 of the third simple planetary gearset 24 is connected to the transmission housing 46 with the second brake 50 interposed therebetween as in the thirty-seventh embodiment such that the planet carriers 14 and 18, and the planet carrier 30 act as reaction elements. In addition, input is realized through the sun gear 12 of the first simple planetary gearset 8 as in the fifty-eighth embodiment, and a combination of the sun gears 28 and 38 of the third and fourth simple planetary gearsets 24 and 26 acts as an output element as in the thirty-seventh embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-seventh embodiment, in the lever analogies of FIGS. 2–5 are as follows: the first operating element G indicates a combination of the sun gears 28 and 38 of the third and fourth simple planetary gearsets 24 and 26, the second operating element H indicates the ring gear 32 of the fourth simple planetary gearset 26, the third operating element I indicates a combination of the ring gear 36 and planet carrier 34 of the third and fourth simple planetary gearsets 24 and 26, and the fourth operating element J indicates the planet carrier 30 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the fifty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Sixtieth Embodiment

Figure 65:
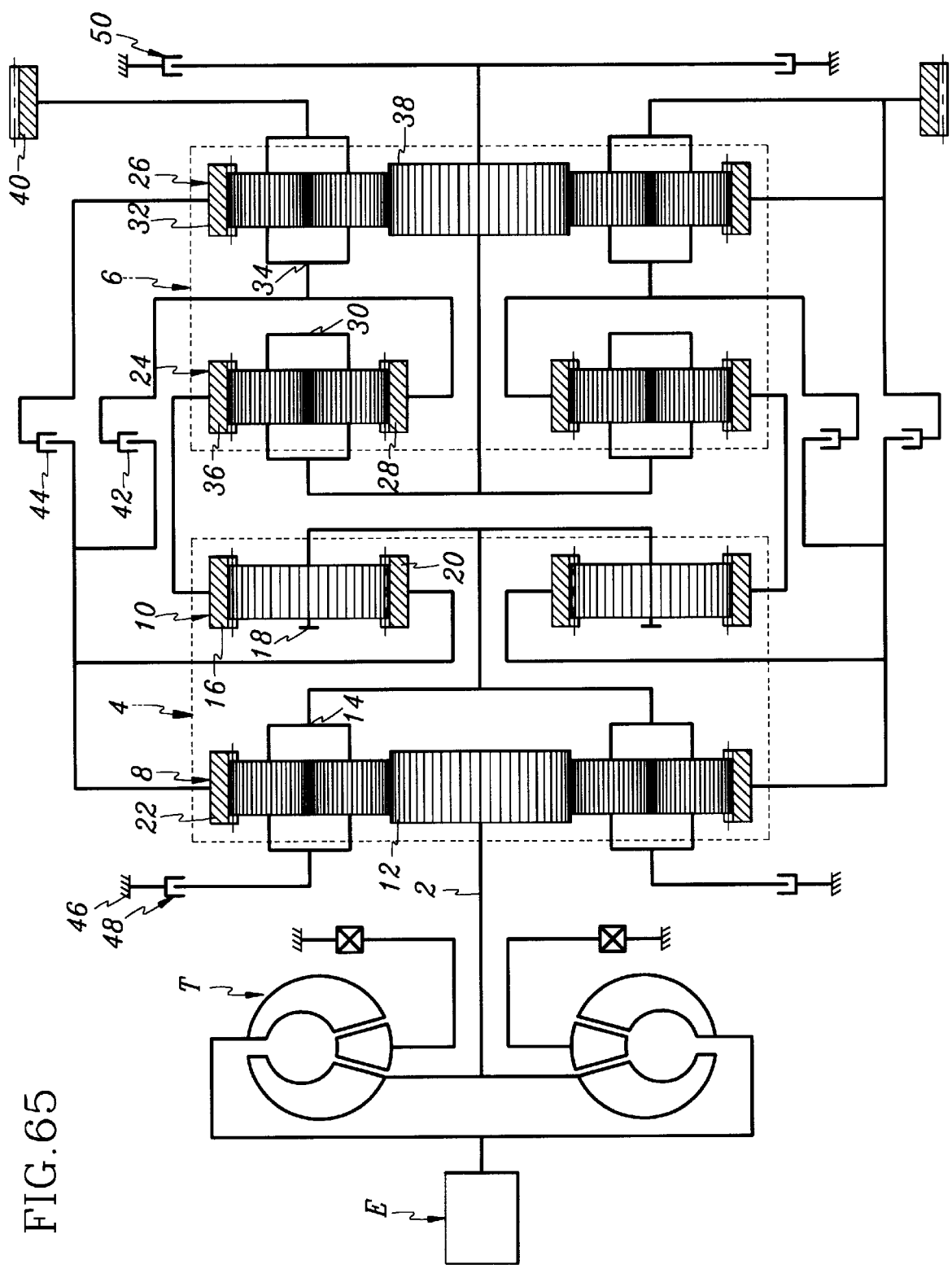
FIG. 65 is a schematic view of a powertrain according to a sixtieth preferred embodiment of the present invention.

Referring to FIG. 65, shown is a schematic view of a powertrain according to a sixtieth preferred embodiment of the present invention. In the sixtieth embodiment, as in the fifty-eighth embodiment, the first, third, and fourth simple planetary gearsets 8, 24, and 26 are double pinion planetary gearsets, while the second simple planetary gearset 10 is a single pinion planetary gearset.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-eighth embodiment, the planet carrier 30 and sun gear 28 of the third simple planetary gearset 24 are fixedly connected respectively to the sun gear 38 and planet carrier 34 of the fourth simple planetary gearset 26.

Further, with regard to the combination of the first and second compound planetary gearsets 4 and 6, the ring gear 16 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both a combination of the sun gear 28 and planet carrier 34 of the third and fourth simple planetary gearsets 24 and 26 through the first clutch 42, and to the ring gear 32 of the fourth simple planetary gearset 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the planet carrier 30 and sun gear 38 of the third and fourth simple planetary gearsets 24 and 26 is connected to the transmission housing 46 with the second brake 50 interposed therebetween as in the thirty-eighth embodiment such that the planet carriers 14 and 18, and the planet carrier 30 and sun gear 38 act as reaction elements. In addition, input is realized through the sun gear 12 of the first simple planetary gearset 8 as in the fifty-eighth embodiment, and a combination of the sun gear 28 and planet carrier 34 of the third and fourth simple planetary gearsets 24 and 26 acts as an output element as in the thirty-eighth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-eighth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates the ring gear 32 of the fourth simple planetary gearset 26, the third operating element I indicates the ring gear 36 of the third simple planetary gearset 24, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixtieth embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-first Embodiment

Figure 66:
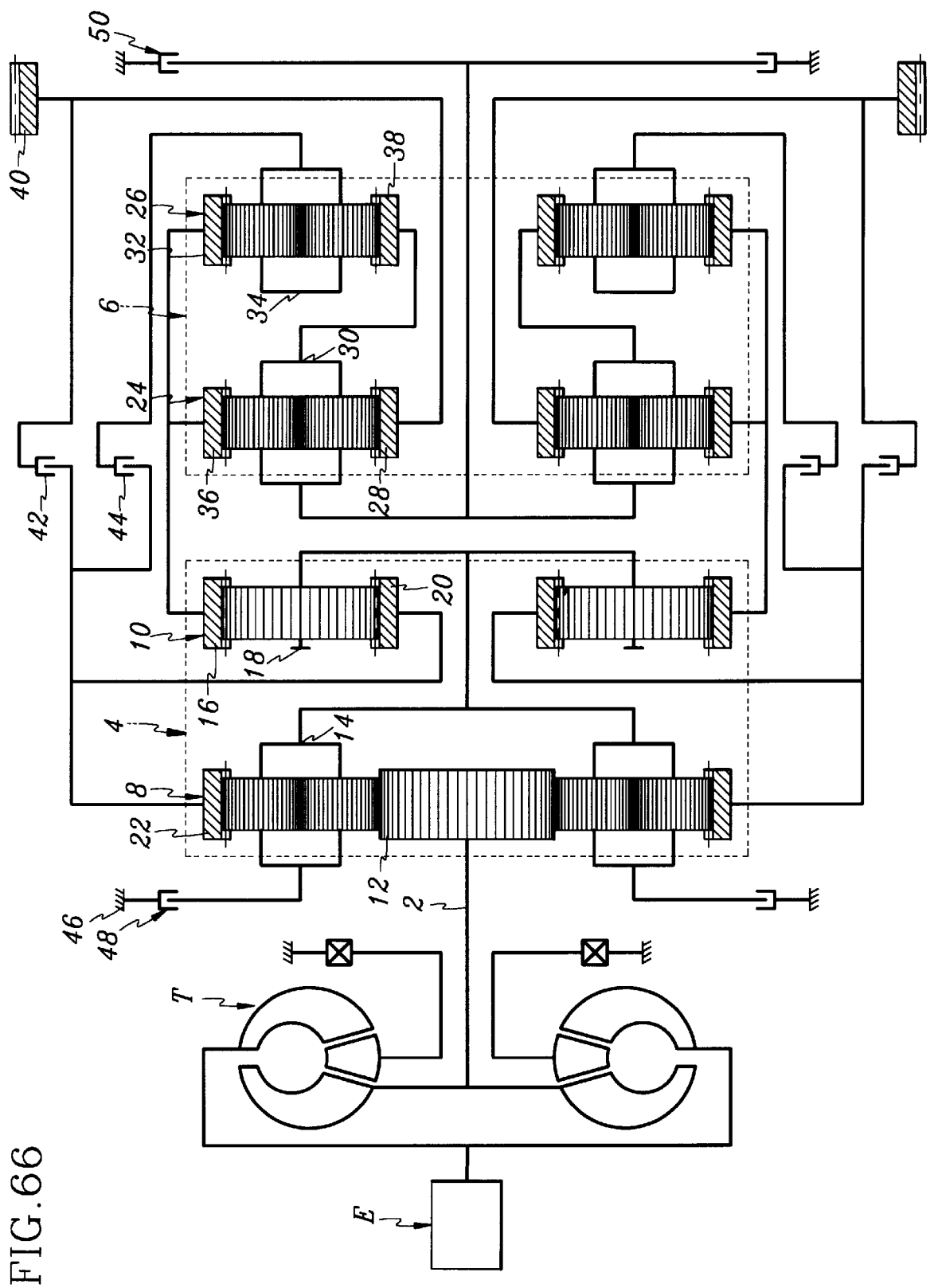
FIG. 66 is a schematic view of a powertrain according to a sixty-first preferred embodiment of the present invention.

Referring to FIG. 66, shown is a schematic view of a powertrain according to a sixty-first preferred embodiment of the present invention. In the sixty-first embodiment, as in the fifty-eighth embodiment, the first, third, and fourth simple are double pinion planetary gearsets 8, 24, and 26 are double pinion planetary gearsets, while the second simple planetary gearset 10 is a single pinion planetary gearset.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-ninth embodiment, the ring gear 36 and planet carrier 30 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the ring gear 16 of the second simple planetary gearset 10 is fixedly connected to a combination of the ring gears 36 and 32 of the third and fourth simple planetary gearsets 24 and 26, and a combination of the ring gear 22 and sun gear 20 of the first and second simple planetary gearsets 8 and 10 is variably connected to both the sun gear 28 of the third simple planetary gearset 24 through the first clutch 42, and to the planet carrier 34 of the fourth simple planetary gearset 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the planet carrier 30 and sun gear 38 of the third and fourth simple planetary gearsets 24 and 26 is connected to the transmission housing 46 with the second brake 50 interposed therebetween as in the thirty-ninth embodiment such that the planet carriers 14 and 18, and the planet carrier 30 and sun gear 38 act as reaction elements. In addition, input is realized through the sun gear 12 of the first simple planetary gearset 8 as in the fifty-eighth embodiment, and the sun gear 28 of the third simple planetary gearset 24 acts as an output element as in the thirty-ninth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-ninth embodiment, in the lever analogies of FIGS. 2–5 are as follows: the first operating element G indicates the sun gear 28 of the third simple planetary gearset 24, the second operating element H indicates the planet carrier 34 of the fourth simple planetary gearset 26, the third operating element I indicates a combination of the ring gears 36 and 32 of the third and fourth simple planetary gearsets 24 and 26, and the fourth operating element J indicates a combination of the planet carrier 30 and sun gear 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-first embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-second Embodiment

Figure 67:
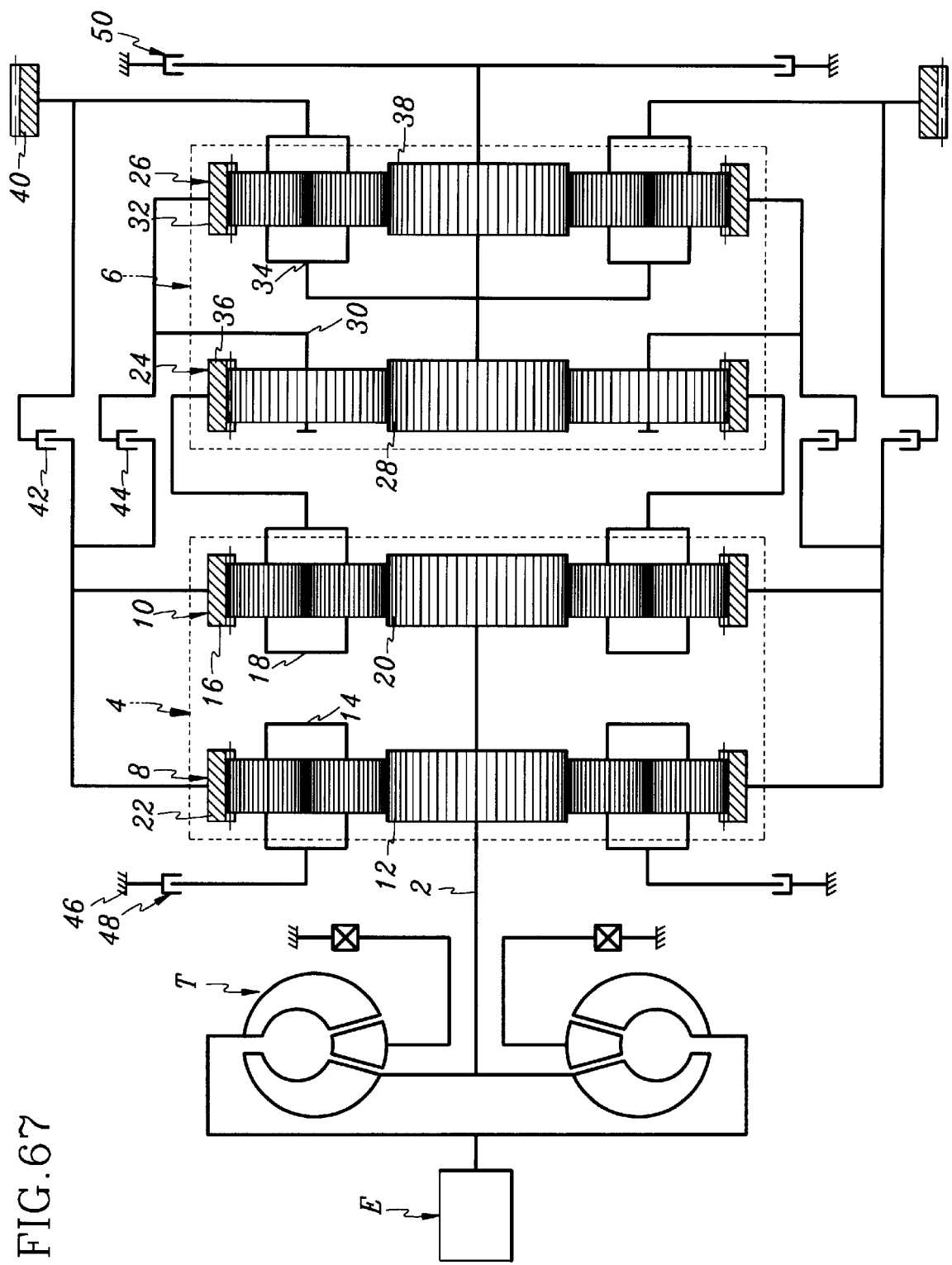
FIG. 67 is a schematic view of a powertrain according to a sixty-second preferred embodiment of the present invention.

Referring to FIG. 67, shown is a schematic view of a powertrain according to a sixty-second preferred embodiment of the present invention. In the sixty-second embodiment, the first, second, and fourth simple planetary gearsets 8, 10, and 26 are double pinion planetary gearsets, while the third simple planetary gearset 24 is a single pinion planetary gearset as in the first embodiment.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gears 22 and 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and the sun gear 38 of the fourth simple planetary gearset 26 is connected to the transmission housing 46 with the second brake 50 interposed therebetween as in the twelfth embodiment such that the planet carrier 14 and the sun gear 38 act as reaction elements. In addition, input is realized through a combination of the sun gears 12 and 20 of the first and second simple planetary gearsets 8 and 10 as in the forty-seventh embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-second embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-third Embodiment

Figure 68:
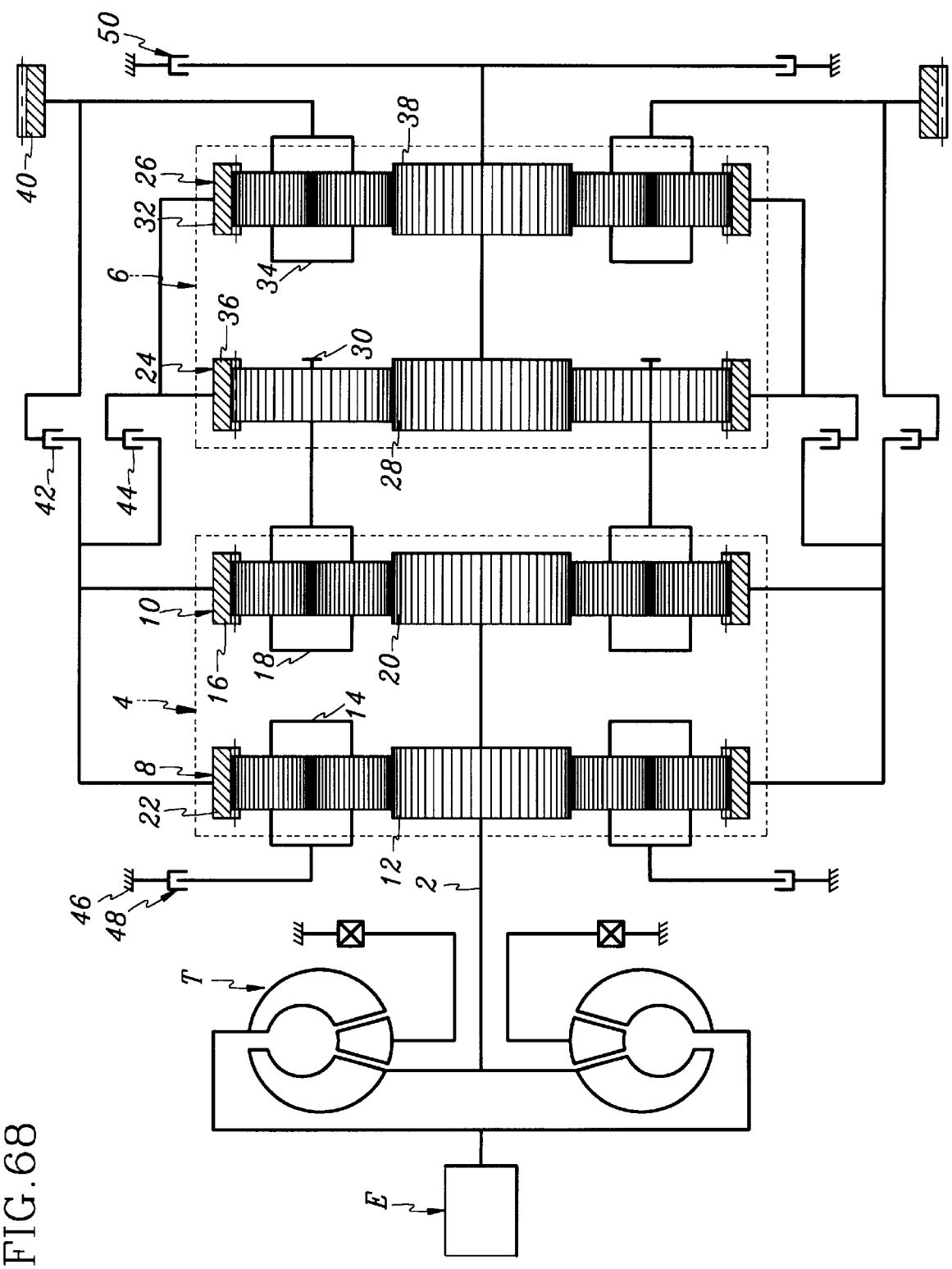
FIG. 68 is a schematic view of a powertrain according to a sixty-third preferred embodiment of the present invention.

Referring to FIG. 68, shown is a schematic view of a powertrain according to a sixty-third preferred embodiment of the present invention. In the sixty-third embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the twentieth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the ring gears 22 and 16 of the first and second simple planetary gearsets 8 and 10 is variably connected to both the planet carrier 34 of the fourth simple planetary gearset 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and a combination of the sun gears 28 and 38 of the third and fourth simple planetary gearsets 24 and 26 is connected to the transmission housing 46 with the second brake 50 interposed therebetween as in the twentieth embodiment such that the planet carrier 14 and the sun gears 28 and 38 act as reaction elements. In addition, input is realized through a combination of the sun gears 12 and 20 of the first and second simple planetary gearsets 8 and 10 as in the forty-seventh embodiment, and the planet carrier 34 of the fourth simple planetary gearset 26 acts as an output element as in the twentieth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the twentieth embodiment, in the lever analogies of FIGS. 2–5 are as follows: the first operating element G indicates the planet carrier 34 of the fourth simple planetary gearset 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-third embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-fourth Embodiment

Figure 69:
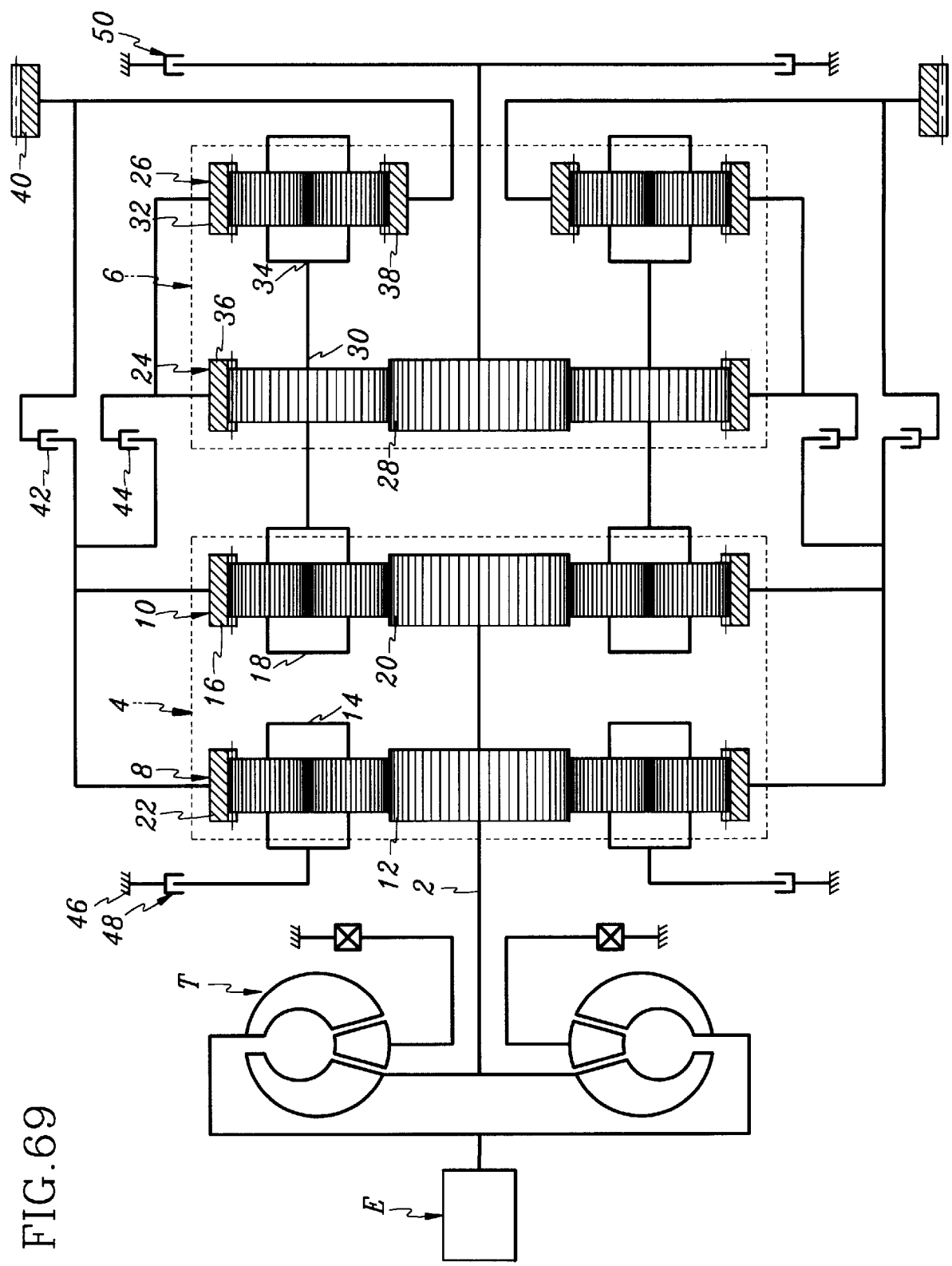
FIG. 69 is a schematic view of a powertrain according to a sixty-fourth preferred embodiment of the present invention.

Referring to FIG. 69, shown is a schematic view of a powertrain according to a sixty-fourth preferred embodiment of the present invention. In the sixty-fourth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the twenty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carriers 30 and 34 of the third and fourth simple planetary gearsets 24 and 26, and a combination of the ring gears 22 and 16 of the first and second simple planetary gearsets 8 and 10 is variably connected to both the sun gear 38 of the fourth simple planetary gearset 26 through the first clutch 42, and to a combination of the ring gears 36 and 32 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and the sun gear 28 of the third simple planetary gearset 24 is connected to the transmission housing 46 with the second brake 50 interposed therebetween as in the twenty-first embodiment such that the planet carrier 14 and the sun gear 28 act as reaction elements. In addition, input is realized through a combination of the sun gears 12 and 20 of the first and second simple planetary gearsets 8 and 10 as in the forty-seventh embodiment, and the sun gear 38 of the fourth simple planetary gearset 26 acts as an output element as in the twenty-first embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the twenty-first embodiment, in the lever analogies of FIGS. 2–5 are as follows: the first operating element G indicates the sun gear 38 of the fourth simple planetary gearset 26, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-fifth Embodiment

Figure 70:
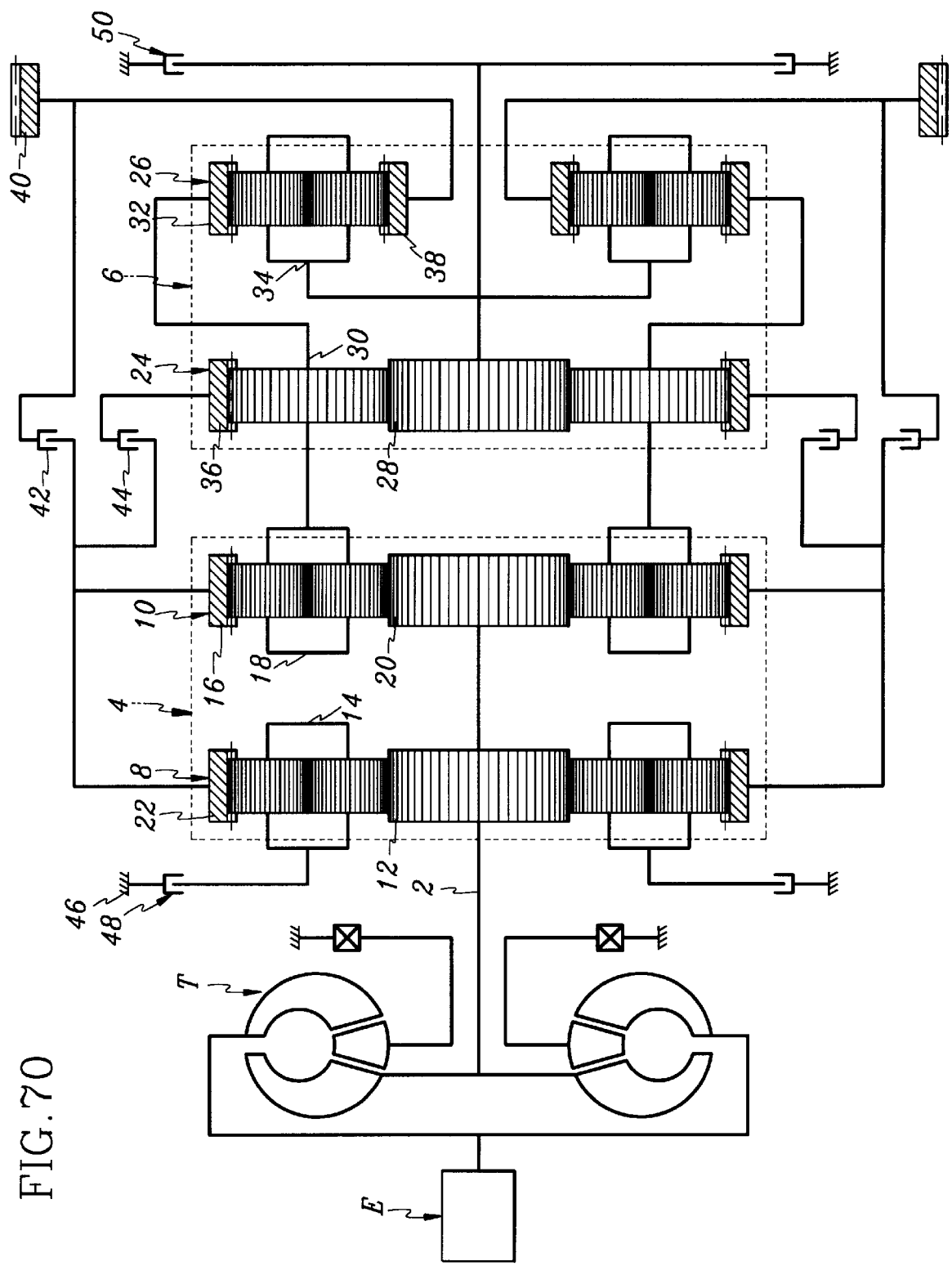
FIG. 70 is a schematic view of a powertrain according to a sixty-fifth preferred embodiment of the present invention.

Referring to FIG. 70, shown is a schematic view of a powertrain according to a sixty-fifth preferred embodiment of the present invention. In the sixty-fifth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the ring gears 22 and 16 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, the planet carrier 14 of the first simple planetary gearset 8 is connected to the transmission housing 46 with the first brake 48 interposed therebetween as in the forty-seventh embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the planet carrier 14, and the sun gear 28 and planet carrier 34 act as reaction elements. In addition, input is realized through a combination of the sun gears 12 and 20 of the first and second simple planetary gearsets 8 and 10 as in the forty-seventh embodiment, and the sun gear 38 of the fourth simple planetary gearset 26 acts as an output element as in the fifteenth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-sixth Embodiment

Figure 71:
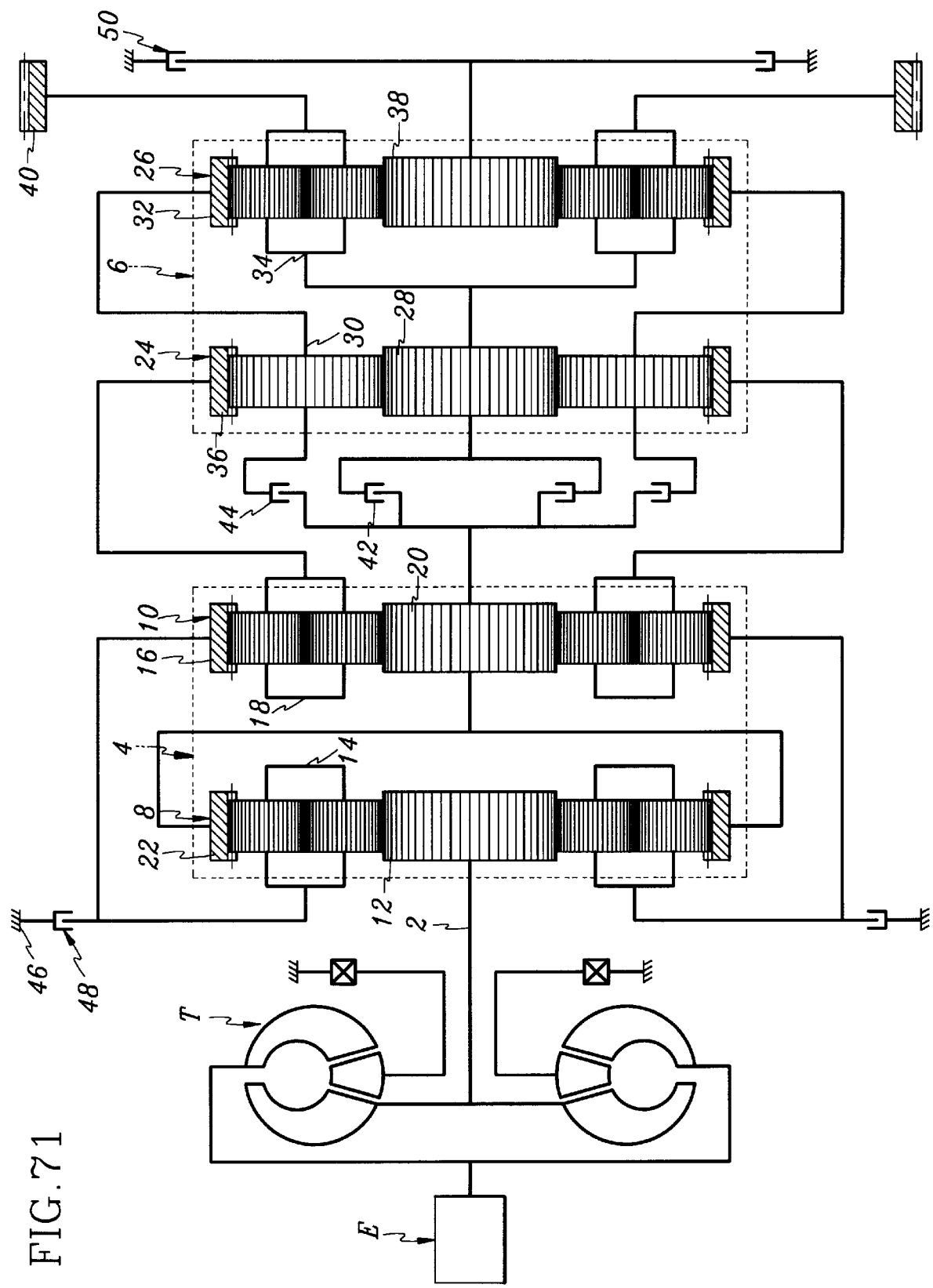
FIG. 71 is a schematic view of a powertrain according to a sixty-sixth preferred embodiment of the present invention.

Referring to FIG. 71, shown is a schematic view of a powertrain according to a sixty-sixth preferred embodiment of the present invention. In the sixty-sixth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the sun gear 38 of the fourth simple planetary gearset 26 is connected to the transmission housing 46 with the second brake 50 interposed therebetween as in the twelfth embodiment such that the planet carrier 14 and ring gear 16, and the sun gear 38 act as reaction elements. In addition, input is realized through the sun gear 12 of the first simple planetary gearset 8 as in the fifty-first embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-seventh Embodiment

Figure 72:
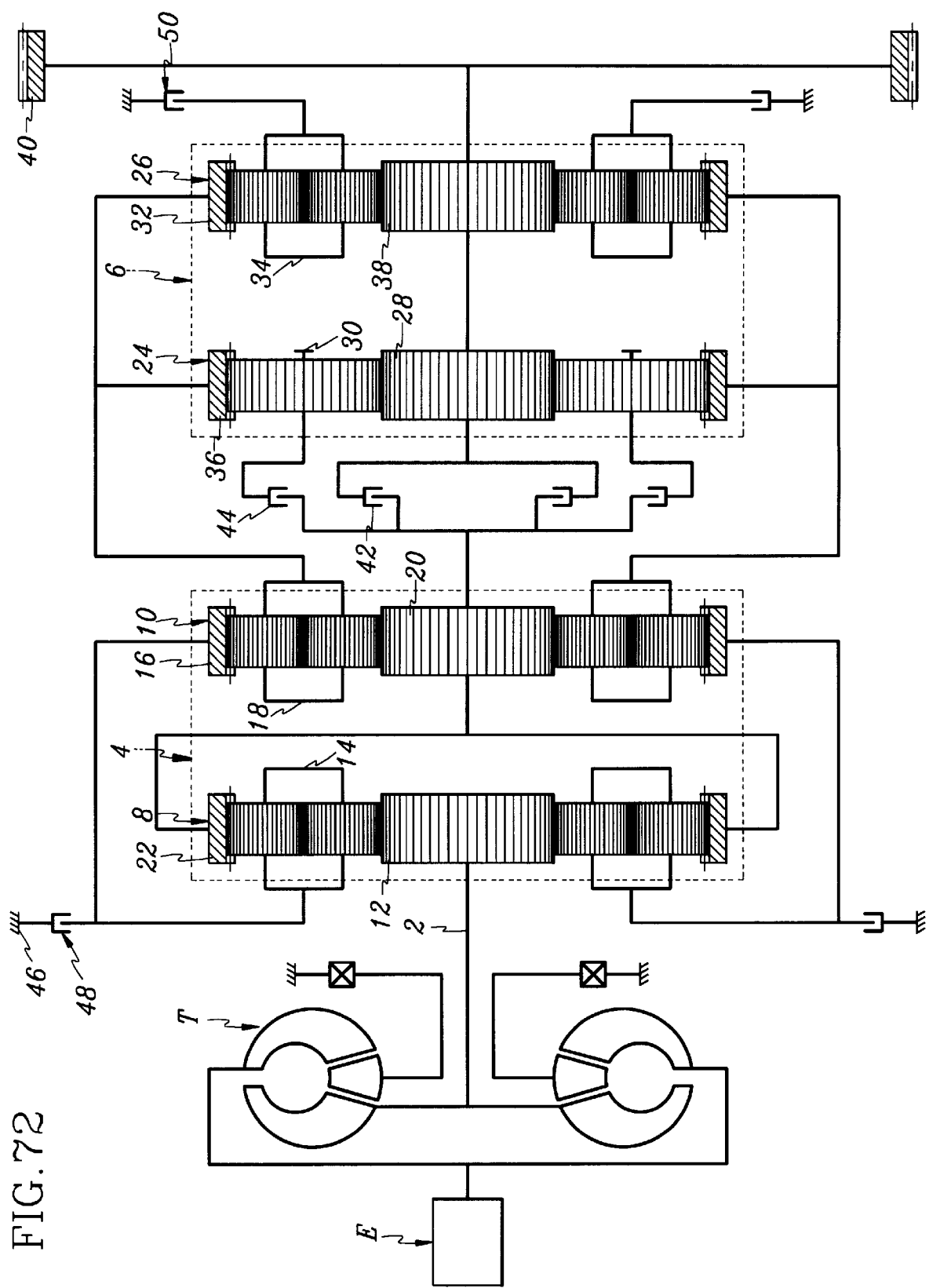
FIG. 72 is a schematic view of a powertrain according to a sixty-seventh preferred embodiment of the present invention.

Referring to FIG. 72, shown is a schematic view of a powertrain according to a sixty-seventh preferred embodiment of the present invention. In the sixty-seventh embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the thirteenth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the ring gear 22 and sun gear 20 of the first and second simple planetary gearsets 8 and 10 is variably connected to both a combination of the sun gears 28 and 38 of the third and fourth simple planetary gearsets 24 and 26 through the first clutch 42, and to the planet carrier 30 of the third simple planetary gearset 24 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the planet carrier 34 of the fourth simple planetary gearset 26 is connected to the transmission housing 46 with the second brake 50 interposed therebetween as in the thirteenth embodiment such that the planet carrier 14 and ring gear 16, and the planet carrier 34 act as reaction elements. In addition, input is realized through the sun gear 12 of the first simple planetary gearset 8 as in the fifty-first embodiment, and a combination of the sun gears 28 and 38 of the third and fourth simple planetary gearsets 24 and 26 acts as an output element as in the thirteenth embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the thirteenth embodiment, in the lever analogies of FIGS. 2–5 are as follows: the first operating element G indicates a combination of the sun gears 28 and 38 of the third and fourth simple planetary gearsets 24 and 26, the second operating element H indicates the planet carrier 30 of the third simple planetary gearset 24, the third operating element I indicates a combination of the ring gears 36 and 32 of the third and fourth simple planetary gearsets 24 and 26, and the fourth operating element J indicates the planet carrier 34 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-eighth Embodiment

Figure 73:
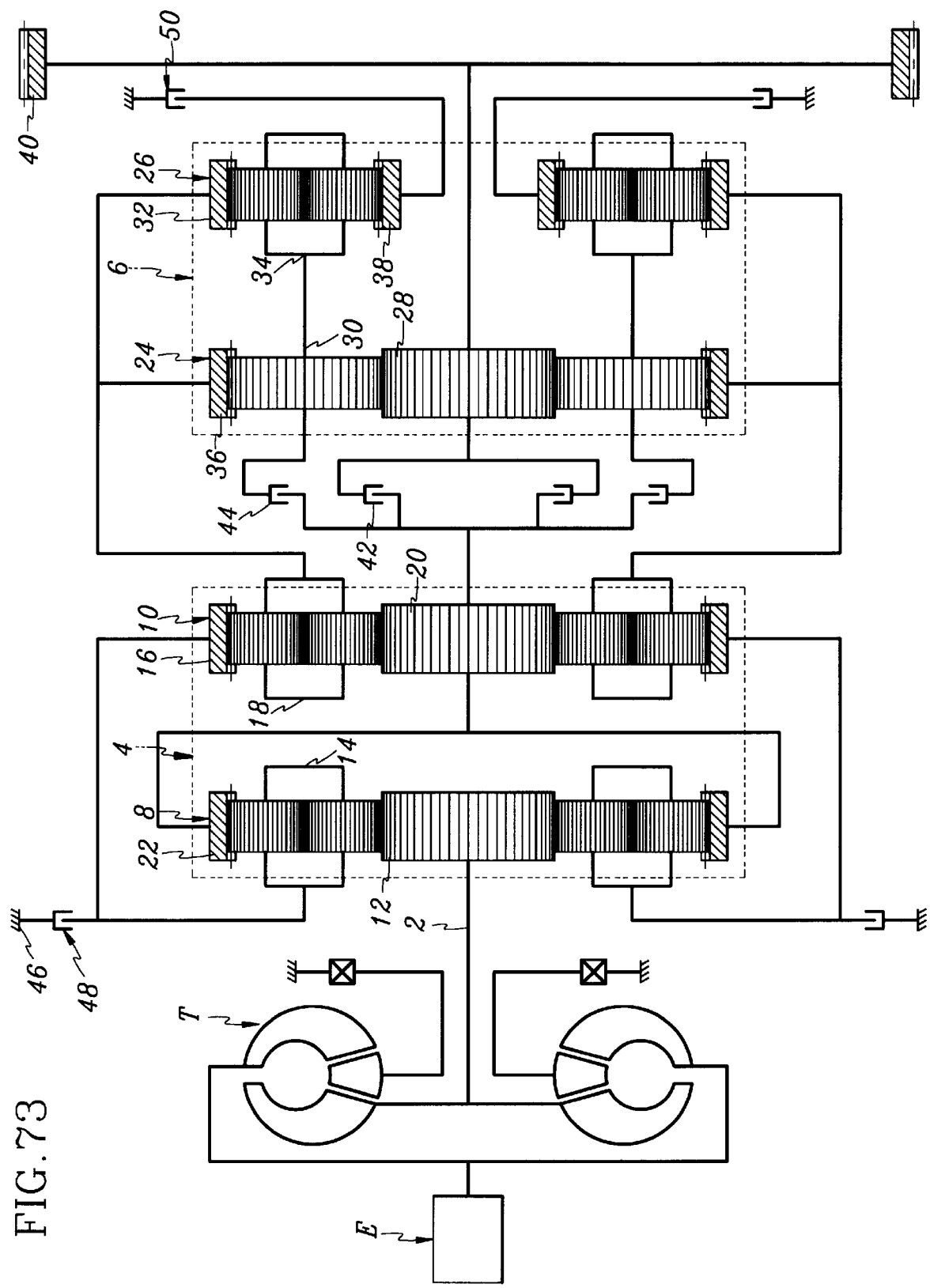
FIG. 73 is a schematic view of a powertrain according to a sixty-eighth preferred embodiment of the present invention.

Referring to FIG. 73, shown is a schematic view of a powertrain according to a sixty-eighth preferred embodiment of the present invention. In the sixty-eighth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the fourteenth embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the ring gear 22 and sun gear 20 of the first and second simple planetary gearsets 8 and 10 is variably connected to both the sun gear 28 of the third simple planetary gearset 24 through the first clutch 42, and to a combination of the planet carriers 30 and 34 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the sun gear 38 of the fourth simple planetary gearset 26 is connected to the transmission housing 46 with the second brake 50 interposed therebetween as in the fourteenth embodiment such that the planet carrier 14 and ring gear 16, and the sun gear 38 act as reaction elements. In addition, input is realized through the sun gear 12 of the first simple planetary gearset 8 as in the fifty-first embodiment, and the sun gear 28 of the third simple planetary gearset 24 acts as an output element as in the fourteenth embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the fourteenth embodiment, in the lever analogies of FIGS. 2–5 are as follows: the first operating element G indicates the sun gear 28 of the third simple planetary gearset 24, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Sixty-ninth Embodiment

Figure 74:
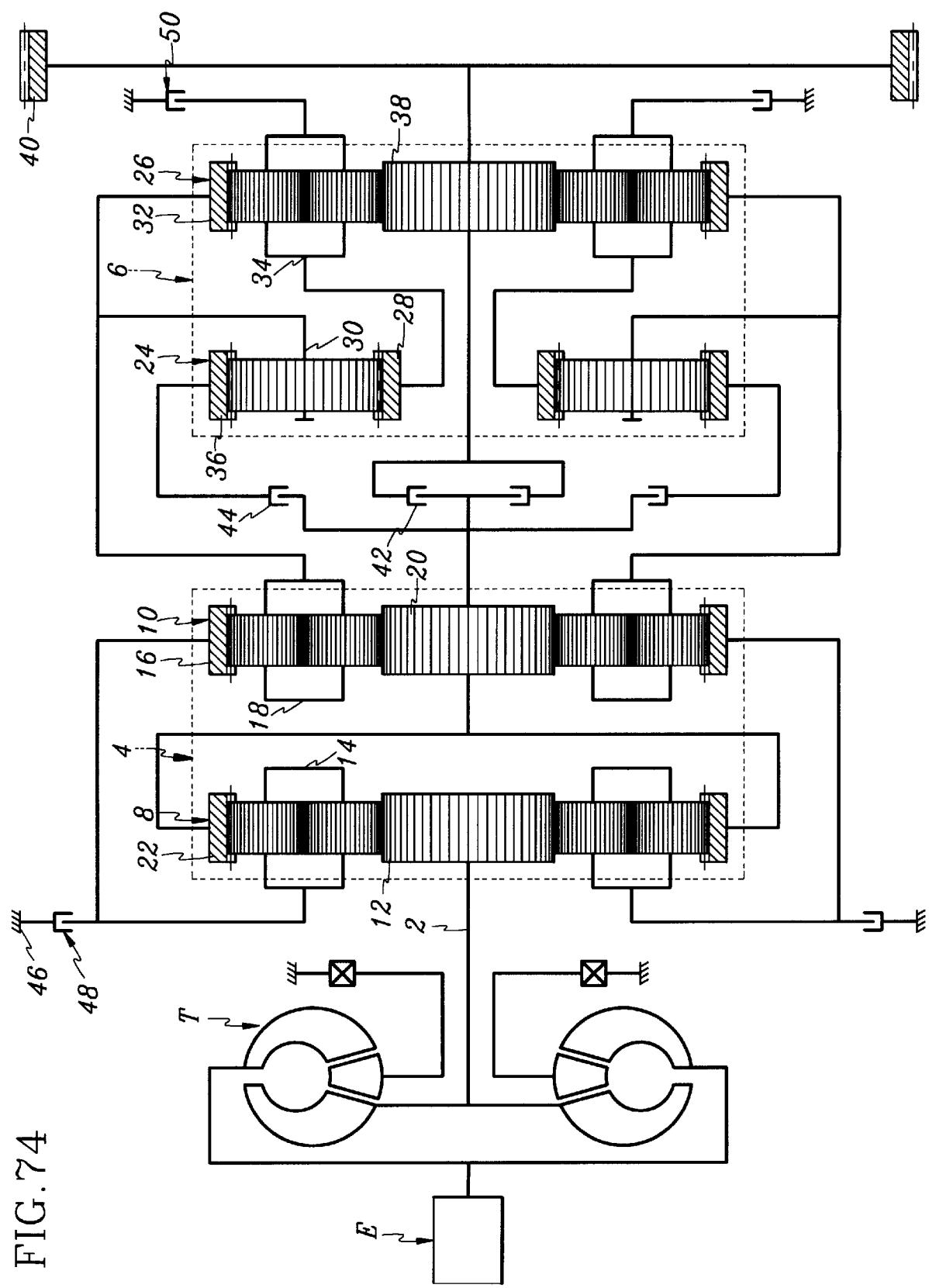
FIG. 74 is a schematic view of a powertrain according to a sixty-ninth preferred embodiment of the present invention.

Referring to FIG. 74, shown is a schematic view of a powertrain according to a sixty-ninth preferred embodiment of the present invention. In the sixty-ninth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to the ring gear 36 of the third simple planetary gearset 26 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the planet carrier 14 and ring gear 16, and the sun gear 28 and planet carrier 34 act as reaction elements. In addition, input is realized through the sun gear 12 of the first simple planetary gearset 8 as in the fifty-first embodiment, and the sun gear 38 of the fourth simple planetary gearset 26 acts as an output element as in the fifteenth embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the sixty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Seventieth Embodiment

Figure 75:
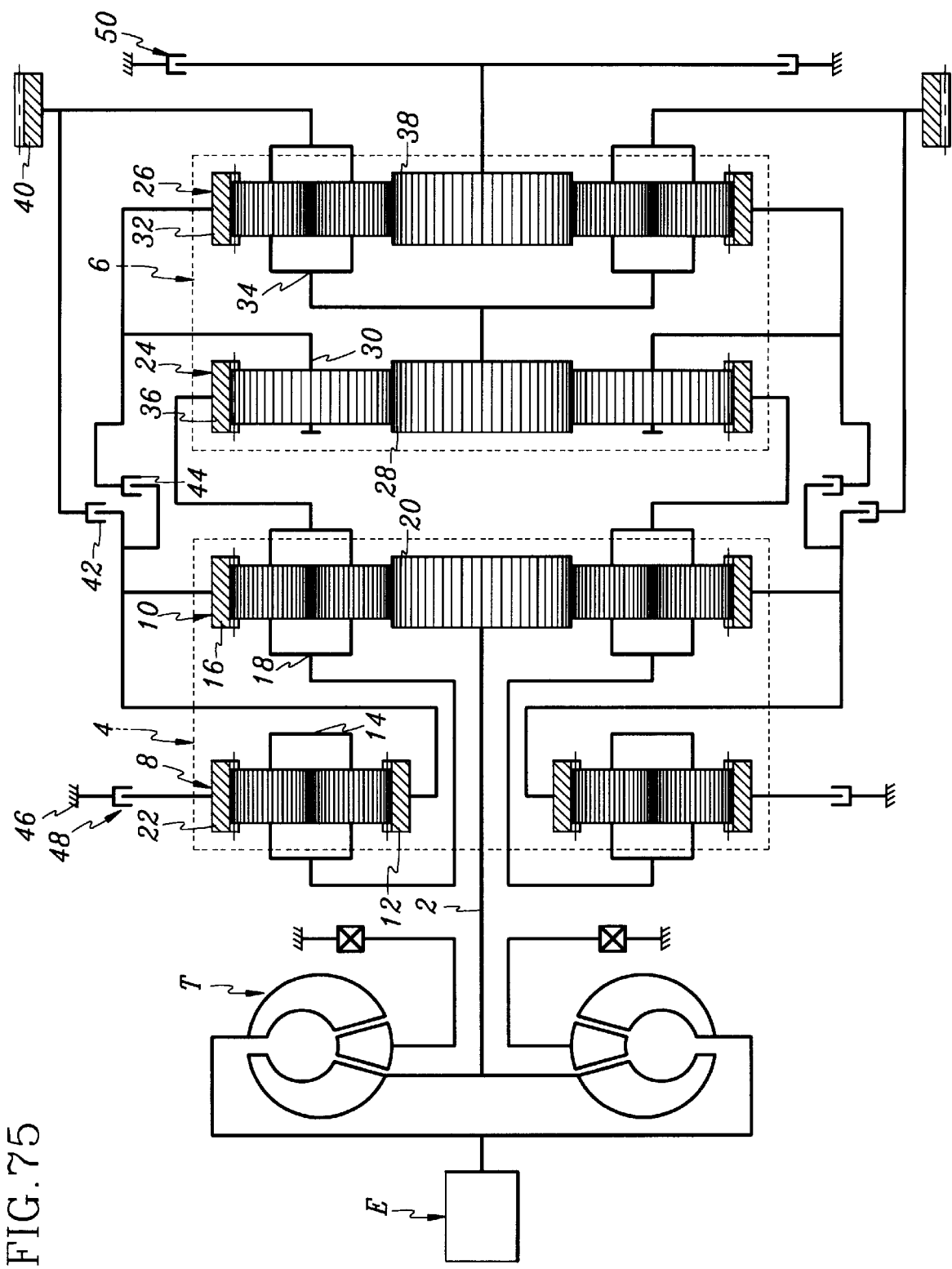
FIG. 75 is a schematic view of a powertrain according to a seventieth preferred embodiment of the present invention.

Referring to FIG. 75, shown is a schematic view of a powertrain according to a seventieth preferred embodiment of the present invention. In the seventieth embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and the sun gear 38 of the fourth simple planetary gearset 26 is connected to the transmission housing 46 with the second brake 50 interposed therebetween as in the twelfth embodiment such that the ring gear 22 and the sun gear 38 act as reaction elements. In addition, input is realized through the sun gear 20 of the second simple planetary gearset 10 as in the fifty-fourth embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventieth embodiment, only the structures of the first and second compound planetary gearsets 4 and 6 are changed from the first embodiment. As the operation of the operating elements in each shift range is identical to that of the first embodiment, an explanation thereof will be omitted herein.

99

Seventy-first Embodiment

Figure 76:
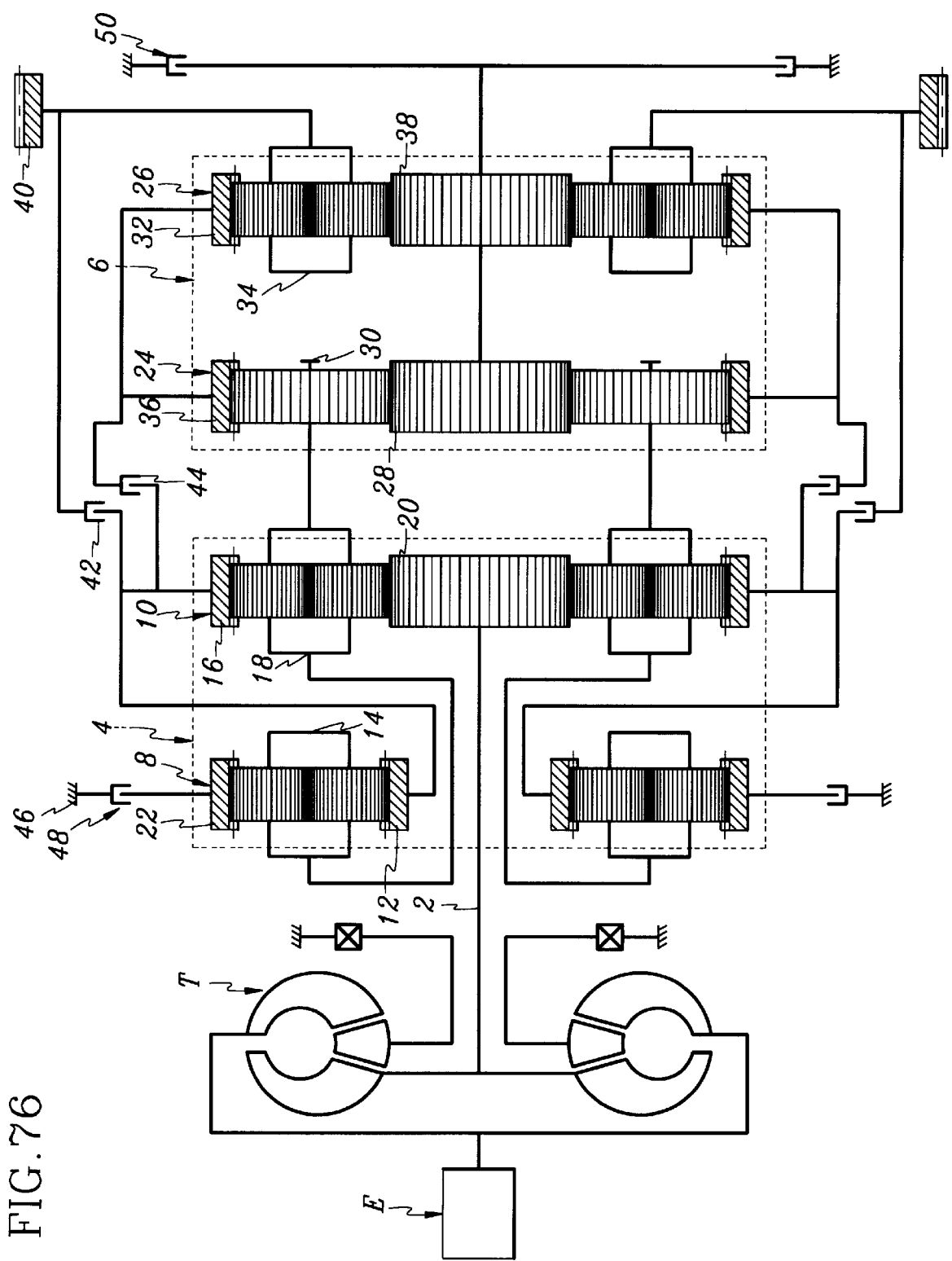
FIG. 76 is a schematic view of a powertrain according to a seventy-first preferred embodiment of the present invention.

Referring to FIG. 76, shown is a schematic view of a powertrain according to a seventy-first preferred embodiment of the present invention. In the seventy-first embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the twentieth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both the planet carrier 34 of the fourth simple planetary gearset 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and a combination of the sun gears 28 and 38 of the third and fourth simple planetary gearsets 24 and 26 is connected to the transmission housing 46 with the second brake 50 interposed therebetween as in the twentieth embodiment such that the ring gear 22 and the sun gears 28 and 38 act as reaction elements. In addition, input is realized through the sun gear 20 of the second simple planetary gearset 10 as in the fifty-fourth embodiment, and the planet carrier 34 of the fourth simple planetary gearset 26 acts as an output element as in the twentieth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the twentieth embodiment, in the lever analogies of FIGS. 2–5 are as follows: the first operating element G indicates the planet carrier 34 of the fourth simple planetary gearset 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

100

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-first embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-second Embodiment

Figure 77:
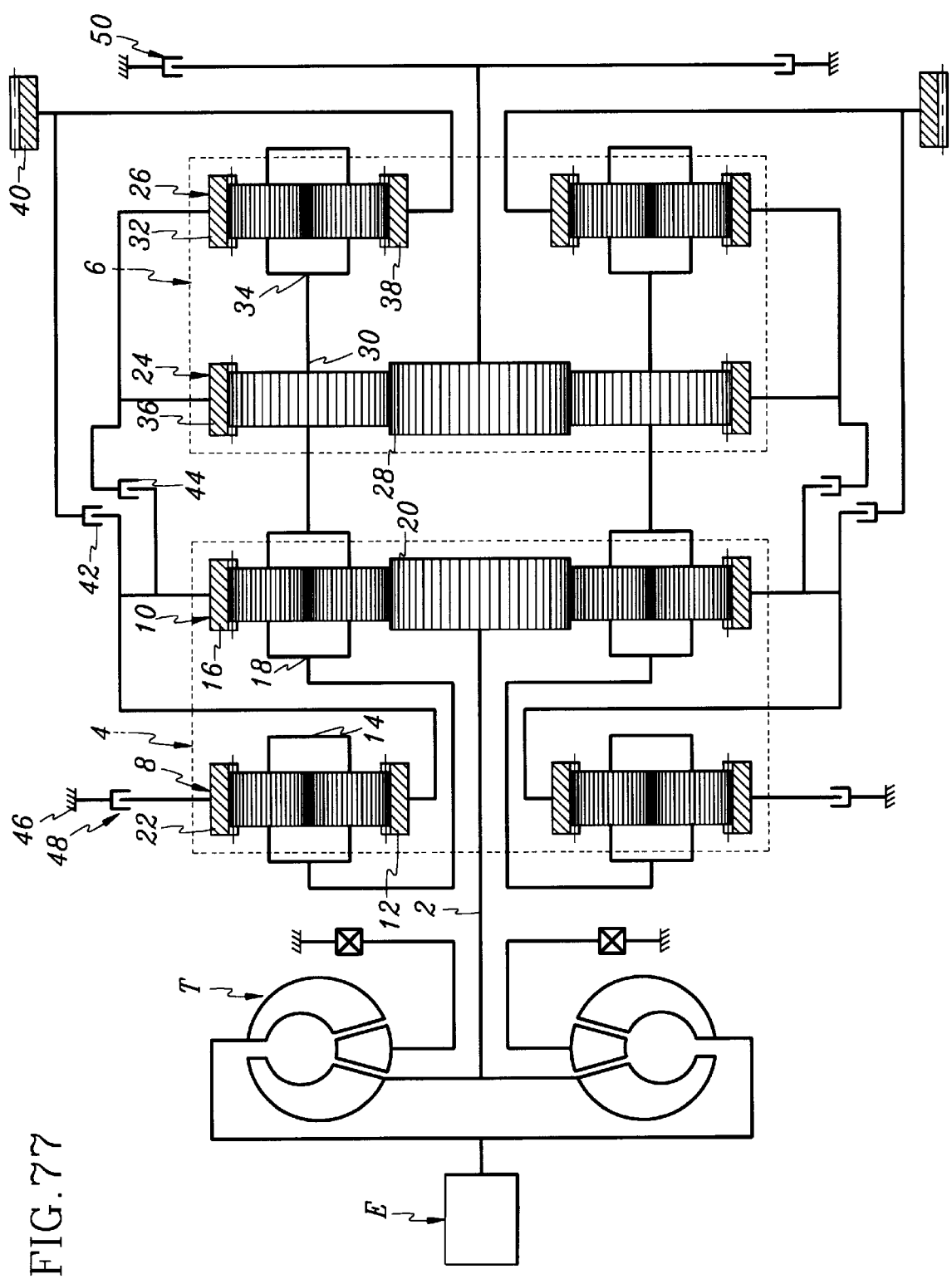
FIG. 77 is a schematic view of a powertrain according to a seventy-second preferred embodiment of the present invention.

Referring to FIG. 77, shown is a schematic view of a powertrain according to a seventy-second preferred embodiment of the present invention. In the seventy-second embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the twenty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the planet carriers 30 and 34 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to a combination of the ring gears 36 and 32 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and the sun gear 28 of the third simple planetary gearset 24 is connected to the transmission housing 46 with the second brake 50 interposed therebetween as in the twenty-first embodiment such that the ring gear 22 and the sun gear 28 act as reaction elements. In addition, input is realized through the sun gear 20 of the second simple planetary gearset 10 as in the fifty-fourth embodiment, and the sun gear 38 of the fourth simple planetary gearset 26 acts as an output element as in the twenty-first embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the twenty-first embodiment, in the lever analogies of FIGS. 2–5 are as follows: the first operating element G indicates the sun gear 38 of the fourth simple planetary gearset 26, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-second embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-third Embodiment

Figure 78:
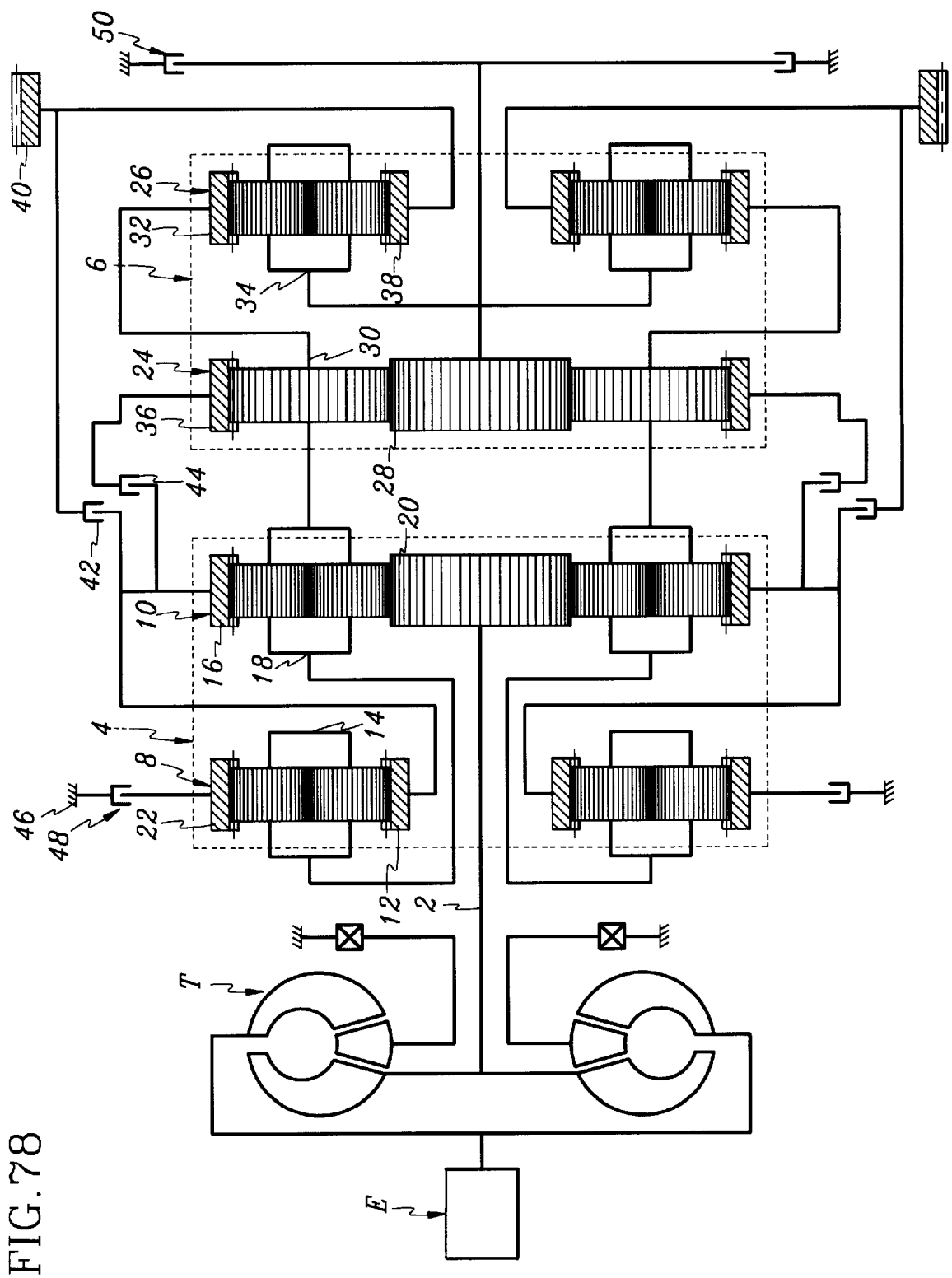
FIG. 78 is a schematic view of a powertrain according to a seventy-third preferred embodiment of the present invention.

Referring to FIG. 78, shown is a schematic view of a powertrain according to a seventy-third preferred embodiment of the present invention. In the seventy-third embodiment, as in the sixty-second embodiment, the first, second, and fourth simple planetary gearsets 8, 10, and 26 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the planet carrier 30 and ring gear 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, the ring gear 22 of the first simple planetary gearset 8 is connected to the transmission housing 46 with the first brake 48 interposed therebetween as in the fifty-fourth embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the ring gear 22, and the sun gear 28 and planet carrier 34 act as reaction elements. In addition, input is realized through the sun gear 20 of the second simple planetary gearset 10 as in the fifty-fourth embodiment, and the sun gear 38 of the fourth simple planetary gearset 26 acts as an output element as in the fifteenth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-third embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-fourth Embodiment

Figure 79:
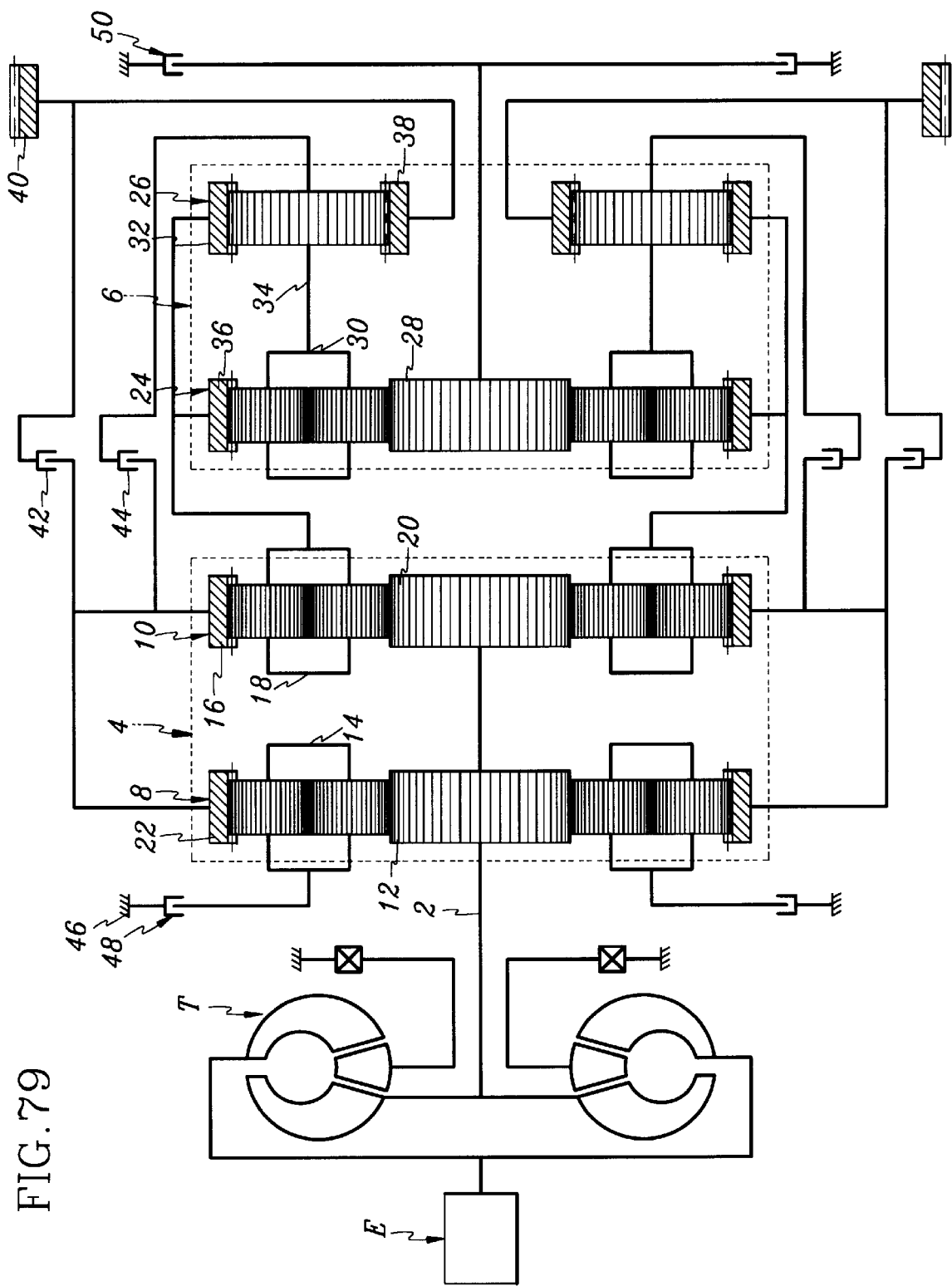
FIG. 79 is a schematic view of a powertrain according to a seventy-fourth preferred embodiment of the present invention.

Referring to FIG. 79, shown is a schematic view of a powertrain according to a seventy-fourth preferred embodiment of the present invention. In the seventy-fourth embodiment, the first, second, and third simple planetary gearsets 8, 10, and 24 are double pinion planetary gearsets, while the third simple planetary gearset 24 is a single pinion planetary gearset as in the first embodiment.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the ring gears 36 and 32 of the third and fourth simple planetary gearsets 24 and 26, and a combination of the ring gears 22 and 16 of the first and second simple planetary gearsets 8 and 10 is variably connected to both the sun gear 38 of the fourth simple planetary gearset 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and the sun gear 28 of the third simple planetary gearset 24 is connected to the transmission housing 46 with the second brake 50 interposed therebetween as in the thirty-first embodiment such that the planet carrier 14 and the sun gear 28 act as reaction elements. In addition, input is realized through a combination of the sun gears 12 and 20 of the first and second simple planetary gearsets 8 and 10 as in the forty-seventh embodiment, and the sun gear 38 of the fourth simple planetary gearset 26 acts as an output element as in the thirty-first embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-first embodiment, in the lever analogies of FIGS. 2–5 are as follows: the first operating element G indicates the sun gear 38 of the fourth simple planetary gearset 26, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-fifth Embodiment

Figure 80:
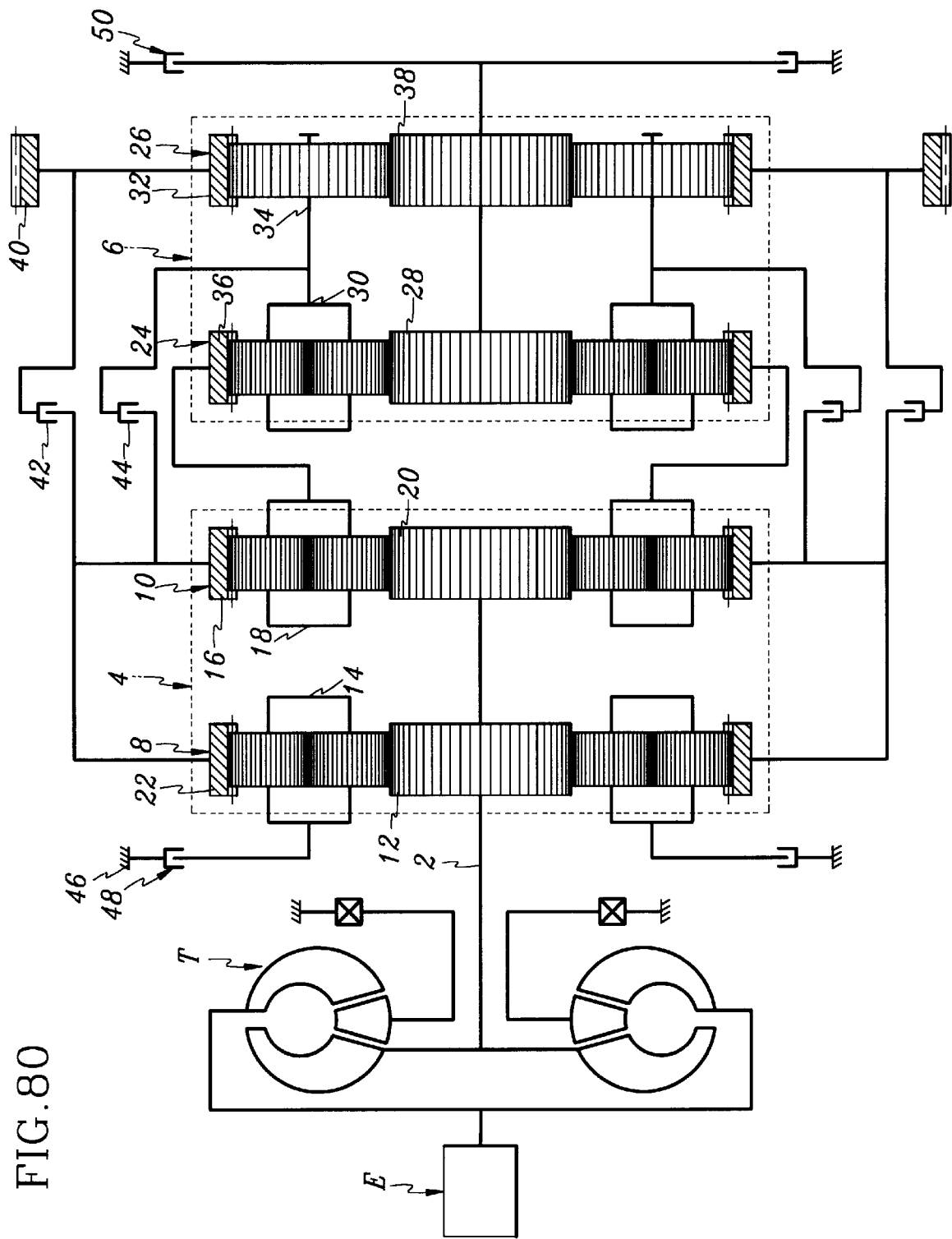
FIG. 80 is a schematic view of a powertrain according to a seventy-fifth preferred embodiment of the present invention.

Referring to FIG. 80, shown is a schematic view of a powertrain according to a seventy-fifth preferred embodiment of the present invention. In the seventy-fifth embodiment, as in the seventy-fourth embodiment, the first, second, and third simple planetary gearsets 8,10, and 24 are double pinion planetary gearsets, while the third simple planetary gearset 24 is a single pinion planetary gearset.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the thirty-second embodiment, the planet carrier 30 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gears 22 and 16 of the first and second simple planetary gearsets 8 and 10 is variably connected to both the ring gear 32 of the fourth simple planetary gearset 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and a combination of the sun gears 28 and 38 of the third and fourth simple planetary gearsets 24 and 26 is connected to the transmission housing 46 with the second brake 50 interposed therebetween as in the thirty-second embodiment such that the planet carrier 14 and the sun gears 28 and 38 act as reaction elements. In addition, input is realized through a combination of the sun gears 12 and 20 of the first and second simple planetary gearsets 8 and 10 as in the forty-seventh embodiment, and the ring gear 32 of the fourth simple planetary gearset 26 acts as an output element as in the thirty-second embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the thirty-second embodiment, in the lever analogies of FIGS. 2–5 are as follows: the first operating element G indicates the ring gear 32 of the fourth simple planetary gearset 26, the second operating element H indicates a combination of the planet carriers 30 and 34 of the third and fourth simple planetary gearsets 24 and 26, the third operating element I indicates the ring gear 36 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-sixth Embodiment

Figure 81:
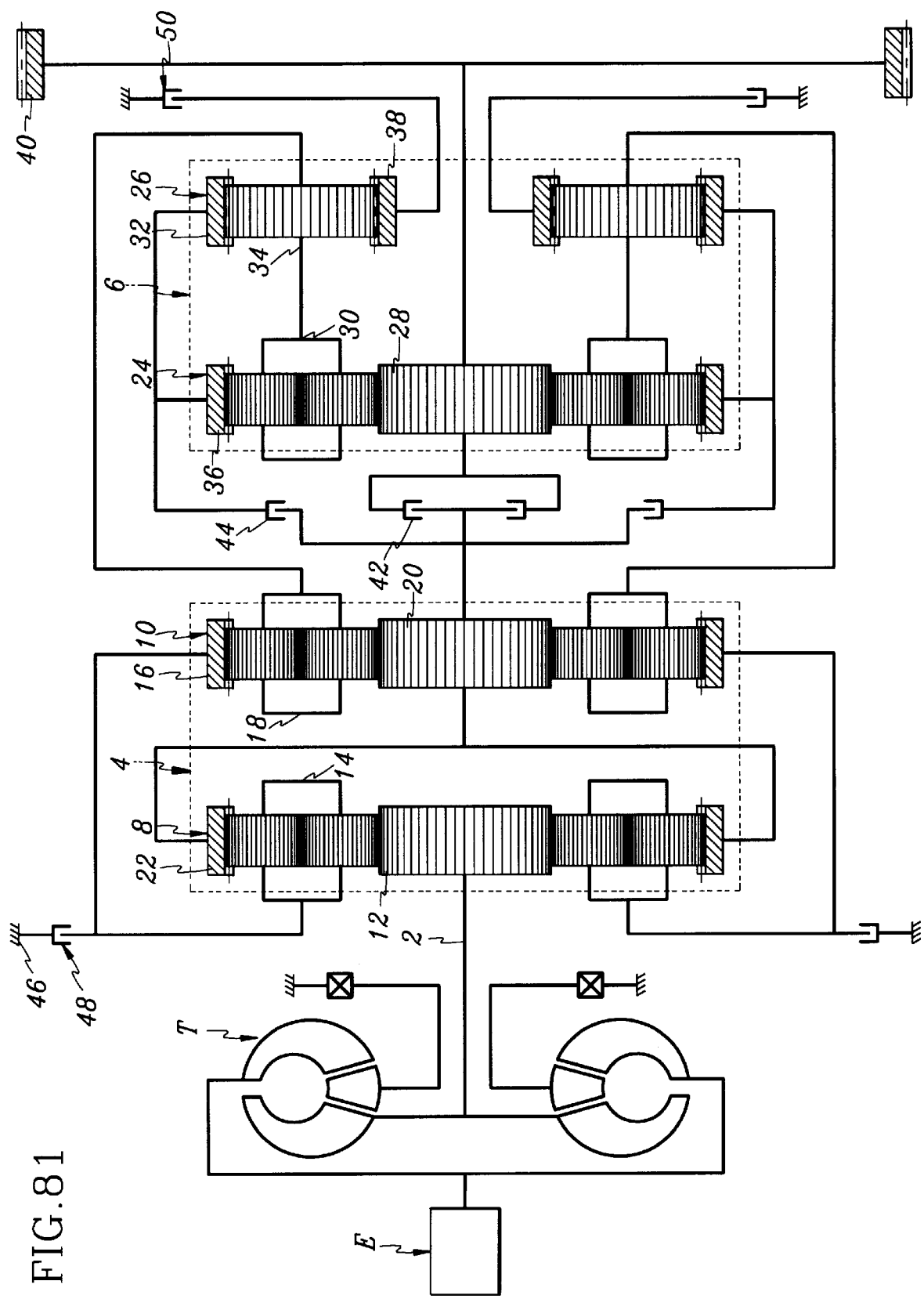
FIG. 81 is a schematic view of a powertrain according to a seventy-sixth preferred embodiment of the present invention.

Referring to FIG. 81, shown is a schematic view of a powertrain according to a seventy-sixth preferred embodiment of the present invention. In the seventy-sixth embodiment, as in the seventy-fourth embodiment, the first, second, and third simple planetary gearsets 8, 10, and 24 are double pinion planetary gearsets, while the fourth simple planetary gearset 26 is a single pinion planetary gearset.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the eleventh embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the planet carrier 18 of the second simple planetary gearset 10 is fixedly connected to a combination of the planet carriers 30 and 34 of the third and fourth simple planetary gearsets 24 and 26, and a combination of the ring gear 22 and sun gear 20 of the first and second simple planetary gearsets 8 and 10 is variably connected to both the sun gear 28 of the third simple planetary gearset 24 through the first clutch 42, and to a combination of the ring gears 36 and 32 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the sun gear 38 of the fourth simple planetary gearset 26 is connected to the transmission housing 46 with the second brake 50 interposed therebetween as in the eleventh embodiment such that the planet carrier 14 and ring gear 16, and the sun gear 38 act as reaction elements. In addition, input is realized through the sun gear 12 of the first simple planetary gearset 8 as in the fifty-first embodiment, and the sun gear 28 of the third simple planetary gearset 24 acts as an output element as in the eleventh embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the eleventh embodiment, in the lever analogies of FIGS. 2–5 are as follows: the first operating element G indicates the sun gear 28 of the third simple planetary gearset 24, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-seventh Embodiment

Figure 82:
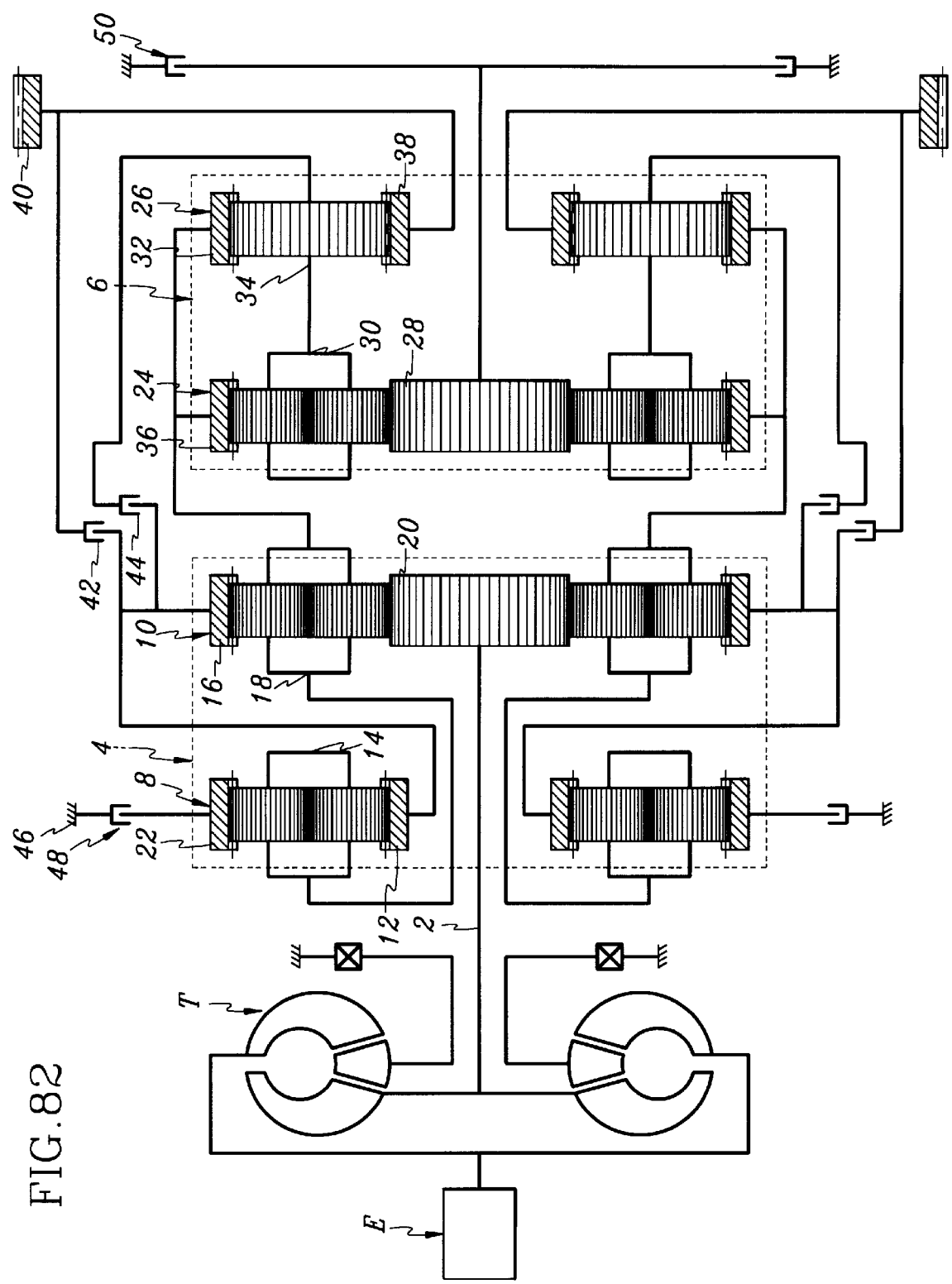
FIG. 82 is a schematic view of a powertrain according to a seventy-seventh preferred embodiment of the present invention.

Referring to FIG. 82, shown is a schematic view of a powertrain according to a seventy-seventh preferred embodiment of the present invention. In the seventy-seventh embodiment, as in the seventy-fourth embodiment, the first, second, and third simple planetary gearsets 8, 10, and 24 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the ring gears 36 and 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and the sun gear 28 of the third simple planetary gearset 24 is connected to the transmission housing 46 with the second brake 50 interposed therebetween as in the thirty-first embodiment such that the ring gear 22 and the sun gear 28 act as reaction elements. In addition, input is realized through the sun gear 20 of the second simple planetary gearset 10 as in the fifty-fourth embodiment, and the sun gear 38 of the fourth simple planetary gearset 26 acts as an output element as in the thirty-first embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-first embodiment, in the lever analogies of FIGS. 2–5 are as follows: the first operating element G indicates the sun gear 38 of the fourth simple planetary gearset 26, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-eighth Embodiment

Figure 83:
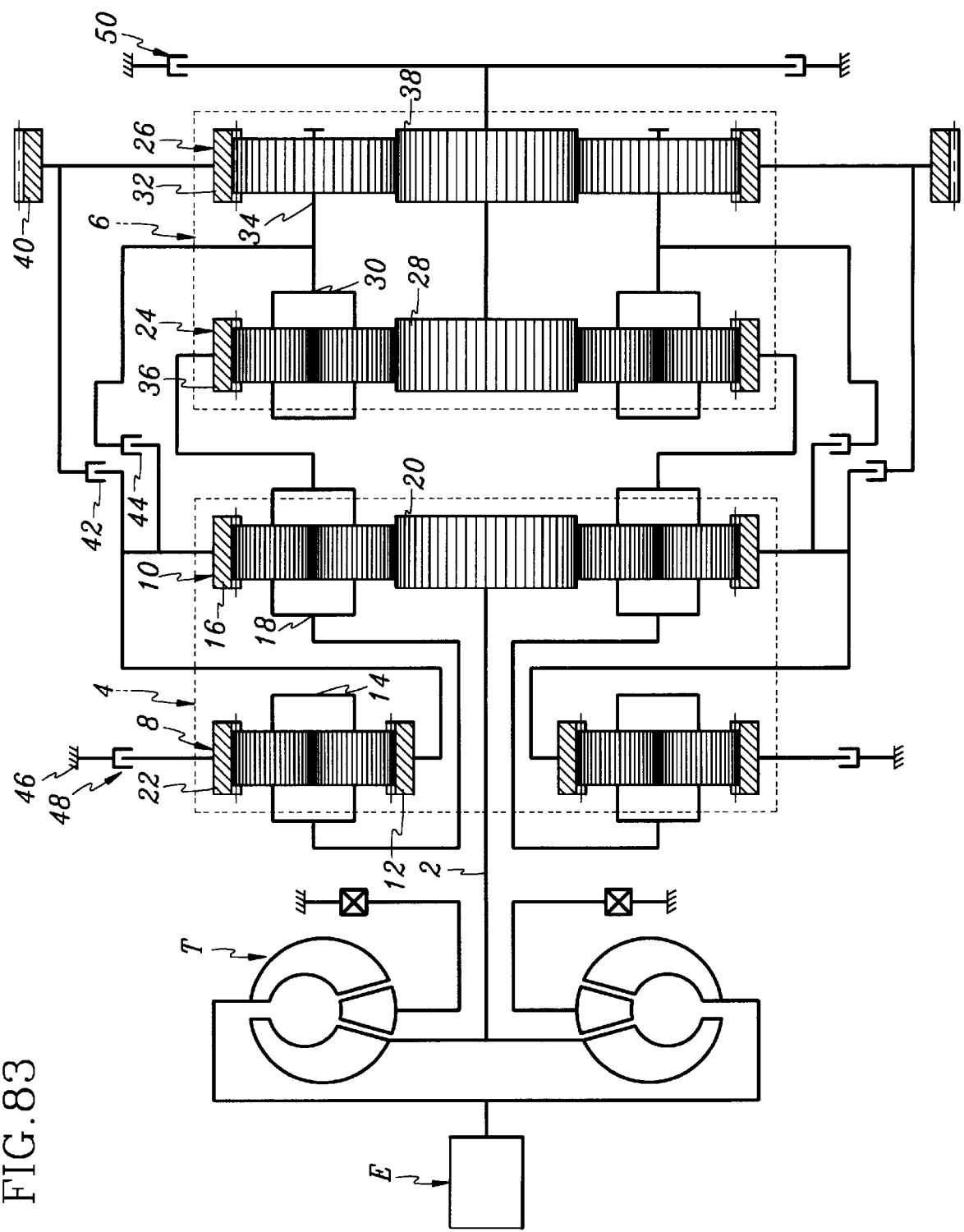
FIG. 83 is a schematic view of a powertrain according to a seventy-eighth preferred embodiment of the present invention.
Figure 84:
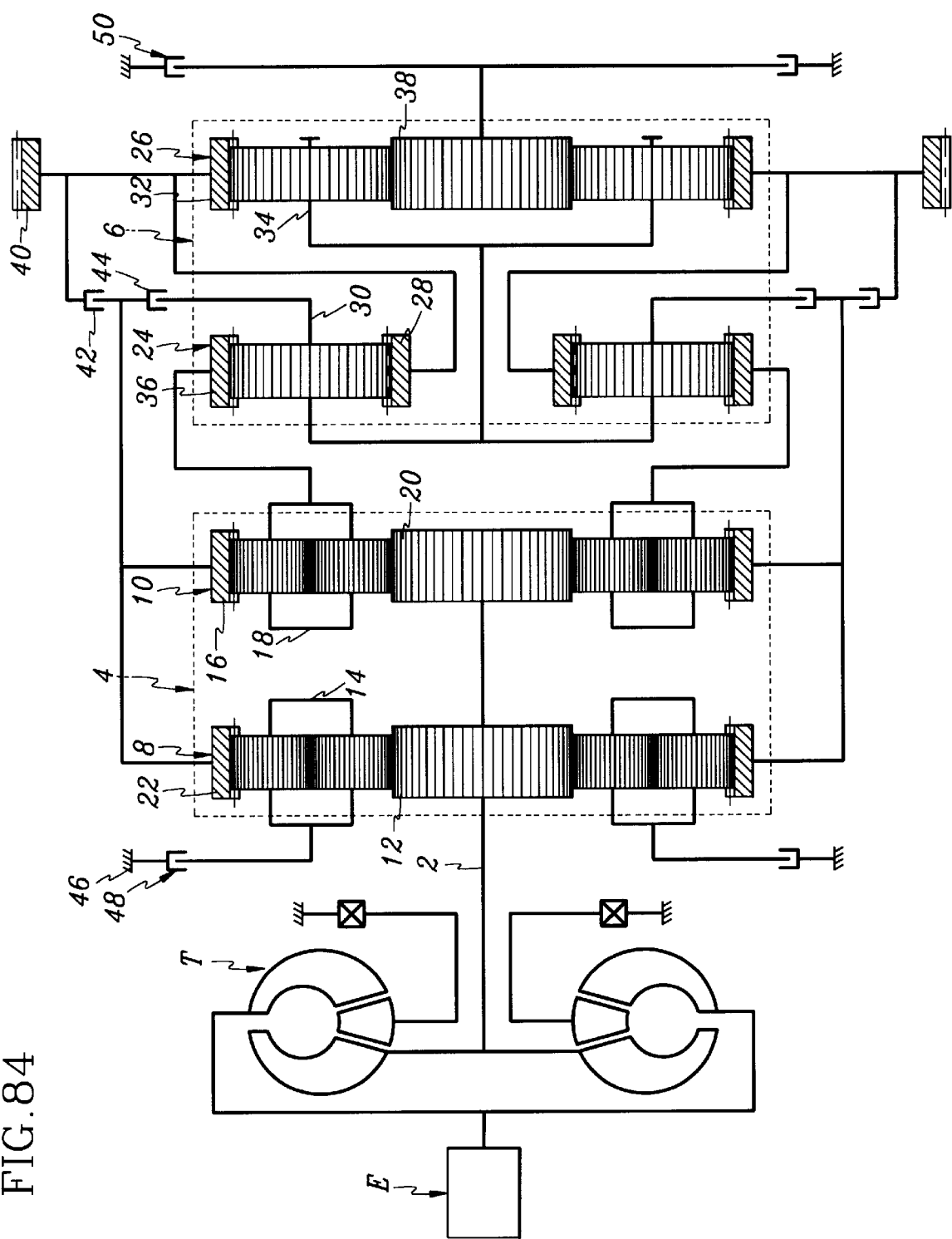
FIG. 84 is a schematic view of a powertrain according to a seventy-ninth preferred embodiment of the present invention.

Referring to FIG. 83, shown is a schematic view of a powertrain according to a seventy-eighth preferred embodiment of the present invention. In the seventy-eighth embodiment, as in the seventy-fourth embodiment, the first, second, and third simple planetary gearsets 8, 10, and 24 are double pinion planetary gearsets, while the third simple planetary gearset 24 is a single pinion planetary gearset.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the thirty-second embodiment, the planet carrier 30 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both the ring gear 36 of the fourth simple planetary gearset 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and a combination of the sun gears 28 and 38 of the third and fourth simple planetary gearsets 24 and 26 is connected to the transmission housing 46 with the second brake 50 interposed therebetween as in the thirty-second embodiment such that the ring gear 22 and the sun gears 28 and 38 act as reaction elements. In addition, input is realized through the sun gear 20 of the second simple planetary gearset 10 as in the fifty-fourth embodiment, and the ring gear 32 of the fourth simple planetary gearset 26 acts as an output element as in the thirty-second embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the thirty-second embodiment, in the lever analogies of FIGS. 2–5 are as follows: the first operating element G indicates the ring gear 32 of the fourth simple planetary gearset 26, the second operating element H indicates a combination of the planet carriers 30 and 34 of the third and fourth simple planetary gearsets 24 and 26, the third operating element I indicates the ring gear 36 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Seventy-ninth Embodiment

Referring to FIG. 79, shown is a schematic view of a powertrain according to a seventy-ninth preferred embodiment of the present invention. In the seventy-ninth embodiment, the first and second simple planetary gearsets 8 and 10 are double pinion planetary gearsets, while the third and fourth simple planetary gearsets 24 and 26 are single pinion planetary gearsets as in the first embodiment. As shown in the drawing, as in the forty-seventh embodiment, the ring gear 22 and sun gear 12 of the first simple planetary gearset 8 are fixedly connected respectively to the ring gear 16 and sun gear 20 of the second simple planetary gearset 10.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gears 22 and 16 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween such that the planet carrier 14 acts as a reaction element. In addition, a combination of the sun gears 12 and 20 of the first and second simple planetary gearsets 8 and 10 acts as an input element.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the seventy-ninth embodiment, only the structure of the first compound planetary gearset 4 is changed from the first embodiment. As the operation of the operating elements in each shift range is identical to that of the first embodiment, an explanation thereof will be omitted herein.

Eightieth Embodiment

Figure 85:
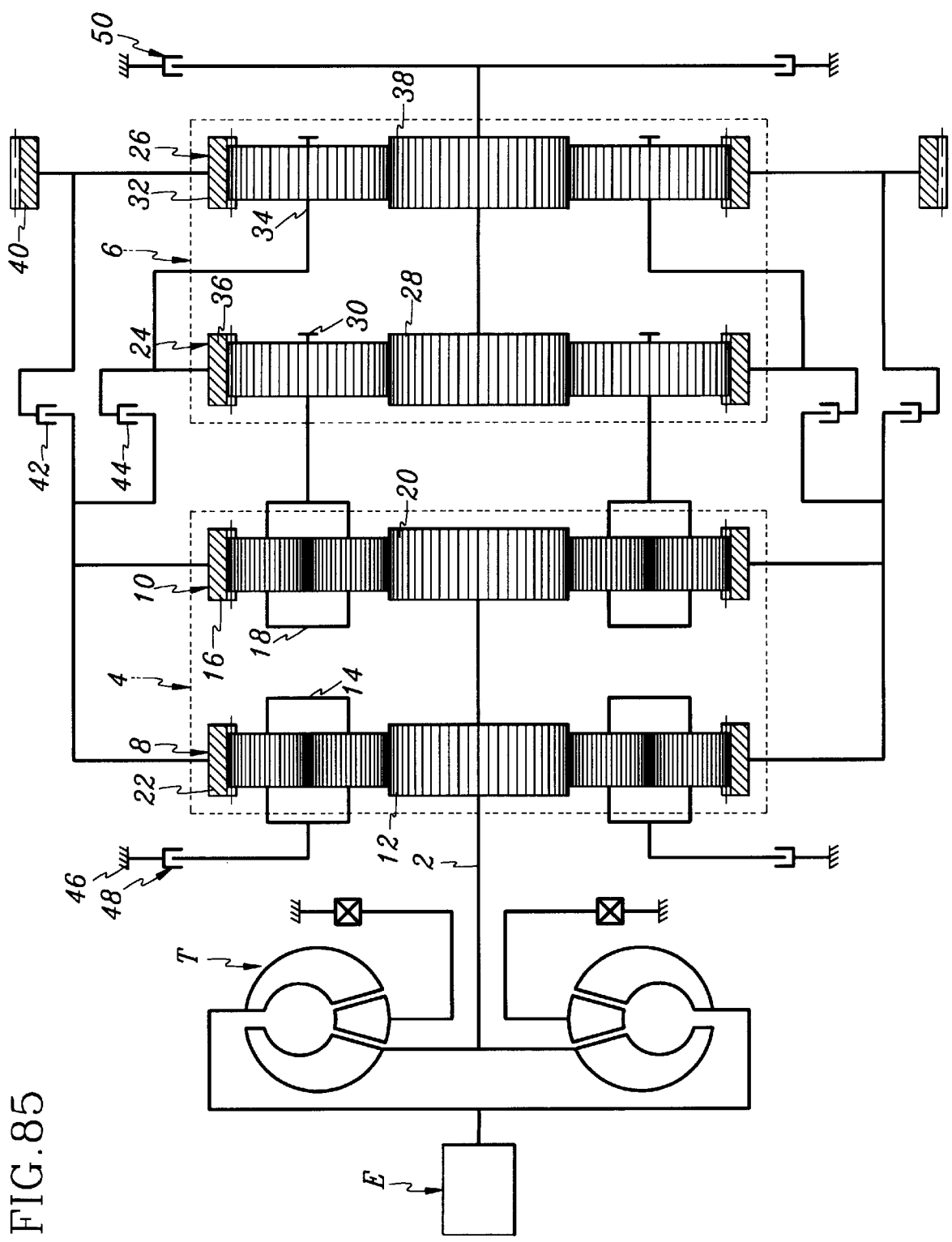
FIG. 85 is a schematic view of a powertrain according to an eightieth preferred embodiment of the present invention.

Referring to FIG. 85, shown is a schematic view of a powertrain according to an eightieth preferred embodiment of the present invention. In the eightieth embodiment, as in the seventy-ninth embodiment, the first and second simple planetary gearsets 8 and 10 are double pinion planetary gearsets, while the third and fourth simple planetary gearsets 24 and 26 are single pinion planetary gearsets.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the fifth embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the planet carrier 18 of the second simple planetary gearset 10 is fixedly connected to the planet carrier 30 of the third simple planetary gearset 24, and a combination of the ring gears 22 and 16 of the first and second simple planetary gearsets 8 and 10 is variably connected to both the ring gear 32 of the fourth simple planetary gearset 26 through the first clutch 42, and to a combination of the ring gear 36 and planet carrier 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and a combination of the sun gears 28 and 38 of the third and fourth simple planetary gearsets 24 and 26 is connected to the transmission housing 46 with the second brake 50 interposed therebetween as in the fifth embodiment such that the planet carrier 14 and the sun gears 28 and 38 act as reaction elements. In addition, input is realized through a combination of the sun gears 12 and 20 of the first and second simple planetary gearsets 8 and 10 as in the forty-seventh embodiment, and the ring gear 32 of the fourth simple planetary gearset 26 acts as an output element as in the fifth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the fifth embodiment, in the lever analogies of FIGS. 2–5 are as follows: the first operating element G indicates the ring gear 32 of the fourth simple planetary gearset 26, the second operating element H indicates a combination of the ring gear 36 and planet carrier 34 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eightieth embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-first Embodiment

Figure 86:
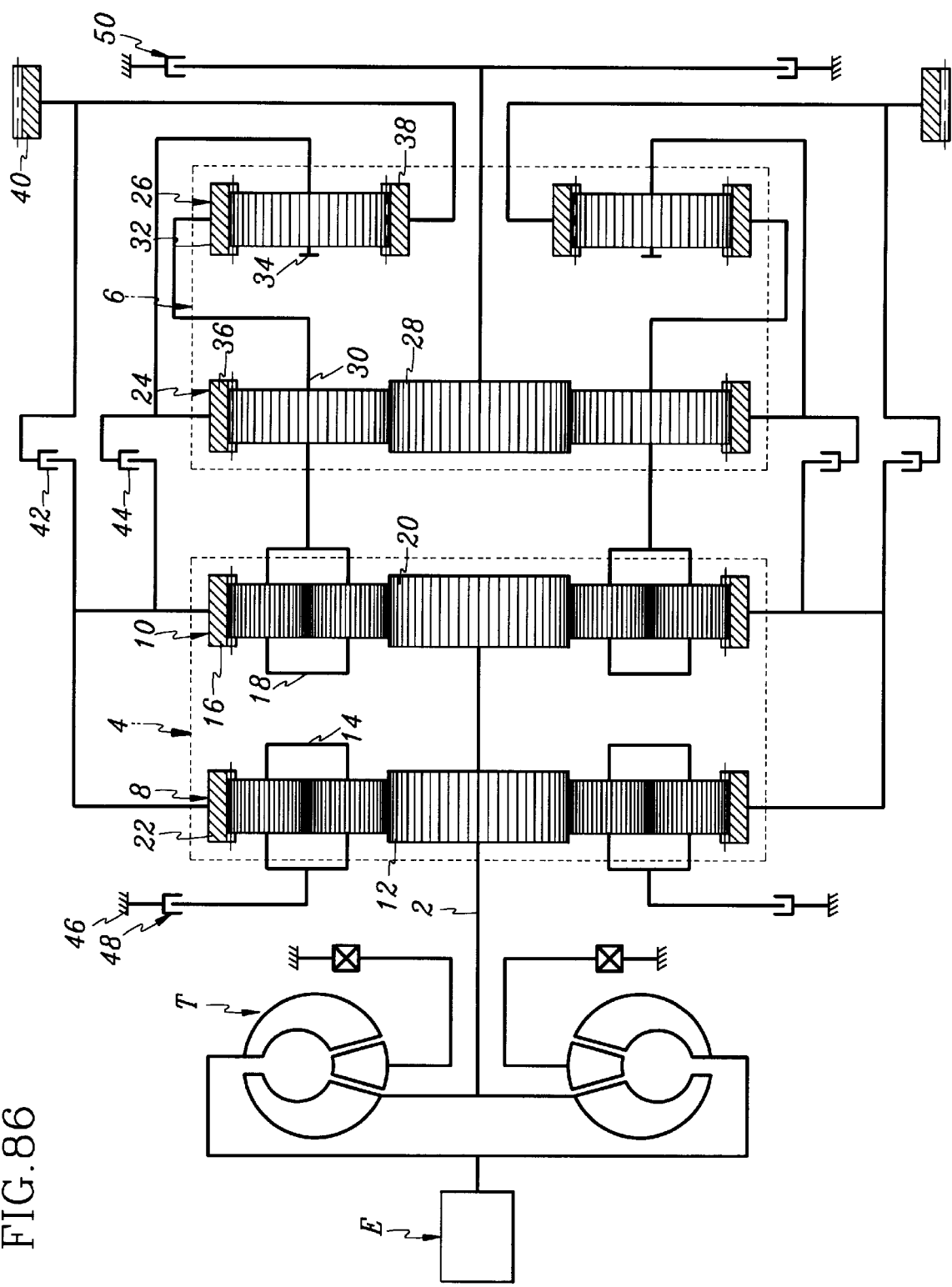
FIG. 86 is a schematic view of a powertrain according to an eighty-first preferred embodiment of the present invention.

Referring to FIG. 86, shown is a schematic view of a powertrain according to an eighty-first preferred embodiment of the present invention. In the eighty-first embodiment, as in the seventy-ninth embodiment, the first and second simple planetary gearsets 8 and 10 are double pinion planetary gearsets, while the third and fourth simple planetary gearsets 24 and 26 are single pinion planetary gearsets.

In the first compound planetary gearset 4, as in the forty-seventh embodiment, the ring gear 22 and sun gear 12 of the first simple planetary gearset 8 are fixedly connected respectively to the ring gear 16 and sun gear 20 of the second simple planetary gearset 10. In the second compound planetary gearset 6, as in the fourth embodiment, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, the planet carrier 18 of the second simple planetary gearset 10 is fixedly connected to a combination of the planet carrier 30 and ring gear 32 of the third and fourth simple planetary gearsets 24 and 26, and a combination of the ring gears 22 and 16 of the first and second simple planetary gearsets 8 and 10 is variably connected to both the sun gear 38 of the fourth simple planetary gearset 26 through the first clutch 42, and to a combination of the ring gear 36 and planet carrier 34 of the third and fourth simple planetary gearsets 24 and 26 through the second clutch 44.

Also, the planet carrier 14 of the first simple planetary gearset 8 is connected to the transmission housing 46 with the first brake 48 interposed therebetween as in the forty-seventh embodiment, and the sun gear 28 of the third simple planetary gearset 24 is connected to the transmission housing 46 with the second brake 50 interposed therebetween as in the fourth embodiment such that the planet carrier 14 and the sun gear 28 act as reaction elements. In addition, input is realized through a combination of the sun gears 12 and 20 of the first and second simple planetary gearsets 8 and 10 as in the forty-seventh embodiment, and the sun gear 38 of the fourth simple planetary gearset 26 acts as an output element as in the fourth embodiment.

According to the above structure, operating elements for the first compound planetary gearset 4, as in the forty-seventh embodiment, in the lever analogies of FIGS. 2–5 are as follows: the first operating element A indicates a combination of the sun gears 12 and 20 of the first and second simple planetary gearsets 8 and 10, the second operating element B indicates a combination of the ring gears 22 and 16 of the first and second simple planetary gearsets 8 and 10, the third operating element C indicates the planet carrier 14 of the first simple planetary gearset 8, and the fourth operating element D indicates the planet carrier 18 of the second simple planetary gearset 10.

Further, operating elements for the second compound planetary gearset 6, as in the fourth embodiment, in the lever analogies of FIGS. 2–5 are as follows: the first operating element G indicates the sun gear 38 of the fourth simple planetary gearset 26, the second operating element H indicates a combination of the ring gear 36 and planet carrier 34 of the third and fourth simple planetary gearsets 24 and 26, the third operating element I indicates a combination of the planet carrier 30 and ring gear 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-first embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-second Embodiment

Figure 87:
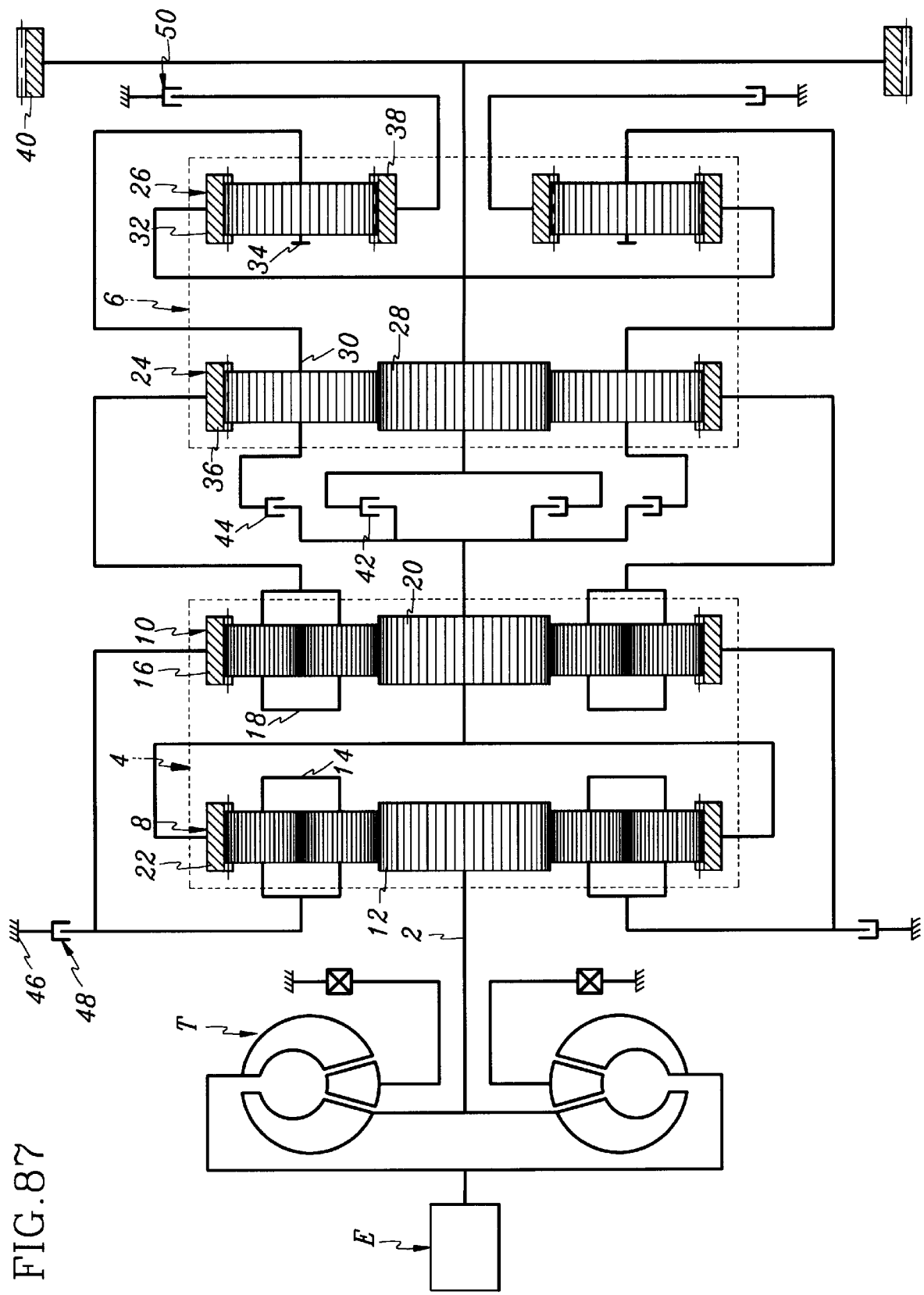
FIG. 87 is a schematic view of a powertrain according to an eighty-second preferred embodiment of the present invention.

Referring to FIG. 87, shown is a schematic view of a powertrain according to an eighty-second preferred embodiment of the present invention. In the eighty-second embodiment, as in the seventy-ninth embodiment, the first and second simple planetary gearsets 8 and 10 are double pinion planetary gearsets, while the third and fourth simple planetary gearsets 24 and 26 are single pinion planetary gearsets. As shown in the drawing, as in the fifty-first embodiment, the ring gear 22 and planet carrier 14 of the first simple planetary gearset 8 are fixedly connected respectively to the sun gear 20 and ring gear 16 of the second simple planetary gearset 10.

Further, with regard to the combination of the first and second compound planetary gearsets 4 and 6, the planet carrier 18 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween such that the planet carrier 14 and ring gear 16 act as reaction elements. In addition, the sun gear 12 of the first simple planetary gearset 8 acts as an input element.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-second embodiment, only the structure of the first compound planetary gearset 4 is changed from the first embodiment. As the operation of the operating elements in each shift range is identical to that of the first embodiment, an explanation thereof will be omitted herein.

Eighty-third Embodiment

Figure 88:
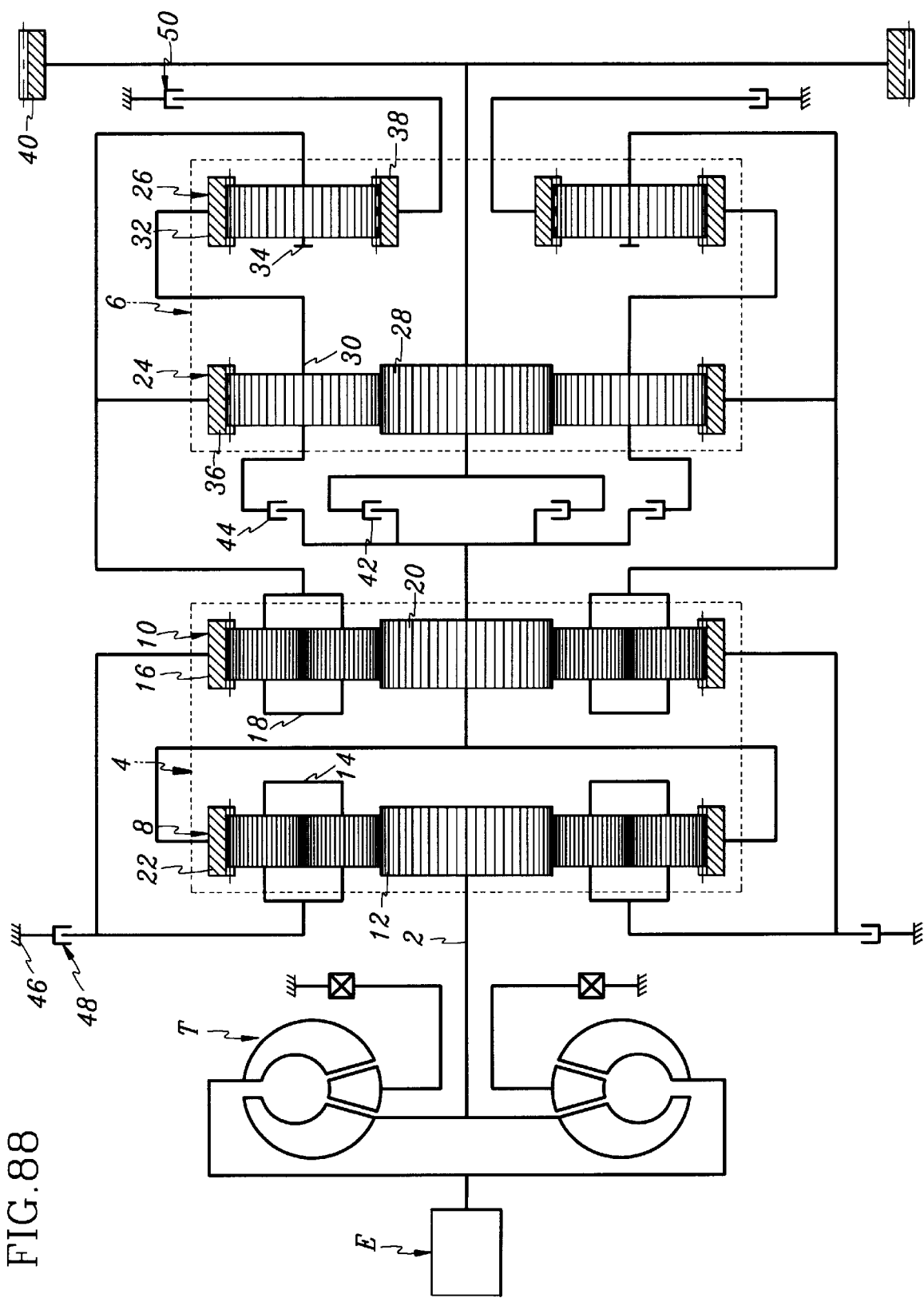
FIG. 88 is a schematic view of powertrain according to eighty-third preferred embodiment of the present invention.

Referring to FIG. 88, shown is a schematic view of a powertrain according to an eighty-third preferred embodiment of the present invention. In the eighty-third embodiment, as in the seventy-ninth embodiment, the first and second simple planetary gearset 8 and 10 are double pinion planetary gearsets, while the third and fourth simple planetary gearset 24 and 26 are single pinion planetary gearsets.

In the first compound planetary gearset 4, as in the fifty-first embodiment, the ring gear 22 and planet carrier 14 of the first simple planetary gearset 8 are fixedly connected respectively to the sun gear 20 and ring gear 16 of the second simple planetary gearset 10. In the second compound planetary gearset 6, as in the second embodiment, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, the planet carrier 18 of the second simple planetary gearset 10 is fixedly connected to a combination of the ring gear 36 and planet carrier 34 of the third and fourth simple planetary gearsets 24 and 26, and a combination of the ring gear 22 and sun gear 20 of the first and second simple planetary gearsets 8 and 10 is variably connected to both the sun gear 28 of the third simple planetary gearset 24 through the first clutch 42, and to a combination of the planet carrier 30 and ring gear 32 of the third and fourth simple planetary gearsets 24 and 26 through the second clutch 44.

Also, a combination of the planet carrier 14 and ring gear 16 of the first and second simple planetary gearsets 8 and 10 is connected to the transmission housing 46 with the first brake 48 interposed therebetween as in the fifty-first embodiment, and the sun gear 38 of the fourth simple planetary gearset 26 is connected to the transmission housing 46 with the second brake 50 interposed therebetween as in the eleventh embodiment such that the planet carrier 14 and ring gear 16, and the sun gear 38 act as reaction elements. In addition, input is realized through the sun gear 12 of the first simple planetary gearset 8 as in the fifty-first embodiment, and the sun gear 28 of the third simple planetary gearset 24 acts as an output element as in the second embodiment.

According to the above structure, operating elements for the first compound planetary gearset 4, as in the fifty-first embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carrier 14 and ring gear 16 of the first and second simple planetary gearsets 8 and 10, and the fourth operating element D indicates the planet carrier 18 of the second simple planetary gearset 10.

Further, operating elements for the second compound planetary gearset 6, as in the eleventh embodiment, in the lever analogies of FIGS. 2–5 are as follows: the first operating element G indicates the sun gear 28 of the third simple planetary gearset 24, the second operating element H indicates a combination of the planet carrier 30 and ring gear 32 of the third and fourth simple planetary gearsets 24 and 26, the third operating element I indicates a combination of the ring gear 36 and planet carrier 34 of the third and fourth simple planetary gearsets 24 and 26, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-third embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-fourth Embodiment

Figure 89:
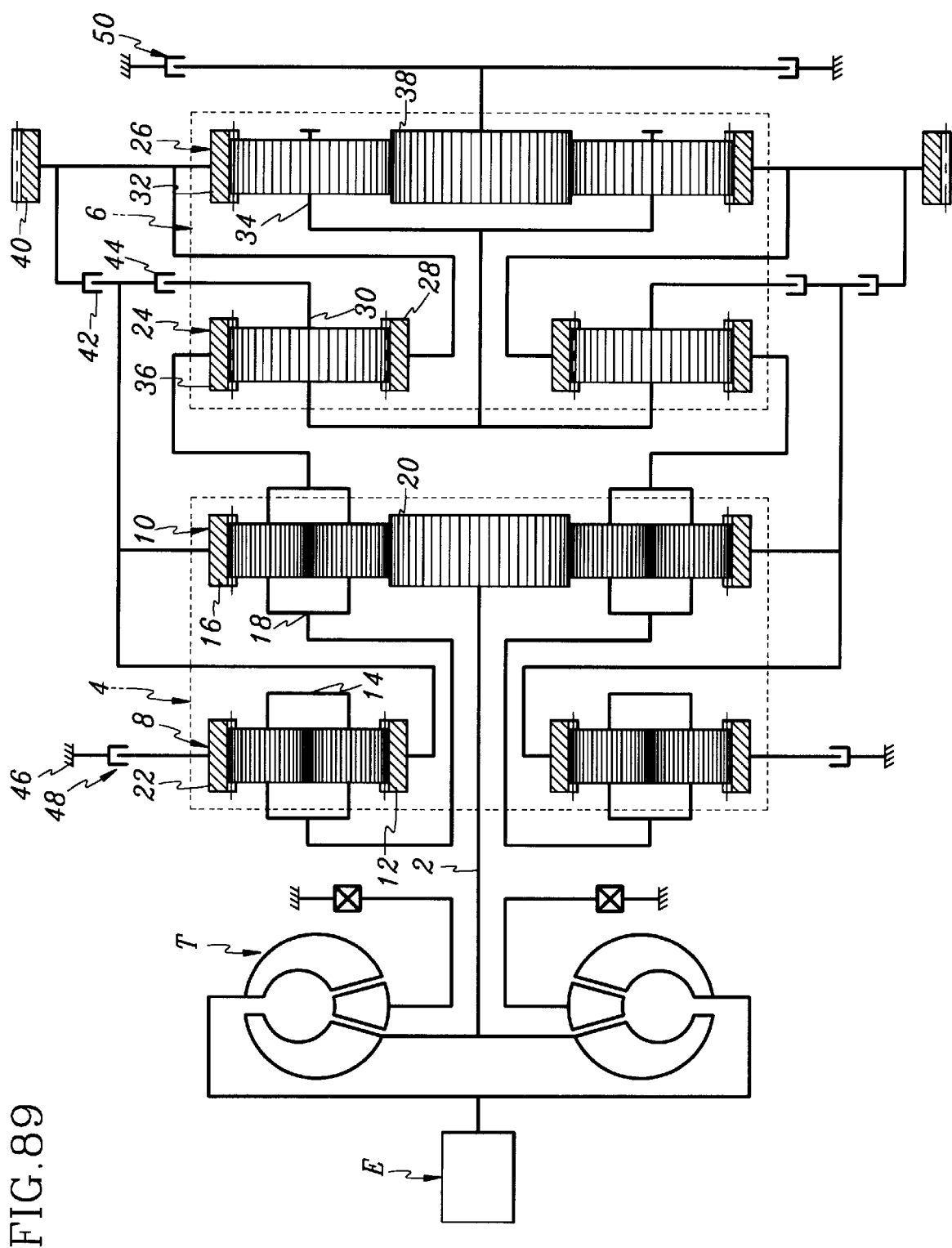
FIG. 89 is a schematic view of a powertrain according to an eighty-fourth preferred embodiment of the present invention.

Referring to FIG. 89, shown is a schematic view of a powertrain according to an eighty-fourth preferred embodiment of the present invention. In the eighty-fourth embodiment, as in the seventy-ninth embodiment, the first and second simple planetary gearsets 8 and 10 are double pinion planetary gearsets, while the third and fourth simple planetary gearsets 24 and 26 are single pinion planetary gearsets. As shown in the drawing, as in the fifty-fourth embodiment, the planet carrier 14 and sun gear 12 of the first simple planetary gearset 8 are fixedly connected respectively to the planet carrier 18 and ring gear 16 of the second simple planetary gearset 10.

Further, with regard to the combination of the first and second compound planetary gearsets 4 and 6, a combination of the planet carriers 14 and 18 of the first and second simple planetary gearsets 8 and 10 is fixedly connected to the ring gear 36 of the third simple planetary gearset 24, and a combination of the sun gear 12 and ring gear 16 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, the ring gear 22 of the first simple planetary gearset 8 is connected to the transmission housing 46 with the first brake 48 interposed therebetween such that the ring gear 22 acts as a reaction element. In addition, the sun gear 20 of the second simple planetary gearset 10 acts as an input element.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-fourth embodiment, only the structure of the first compound planetary gearset 4 is changed from the first embodiment. As the operation of the operating elements in each shift range is identical to that of the first embodiment, an explanation thereof will be omitted herein.

Eighty-fifth Embodiment

Figure 90:
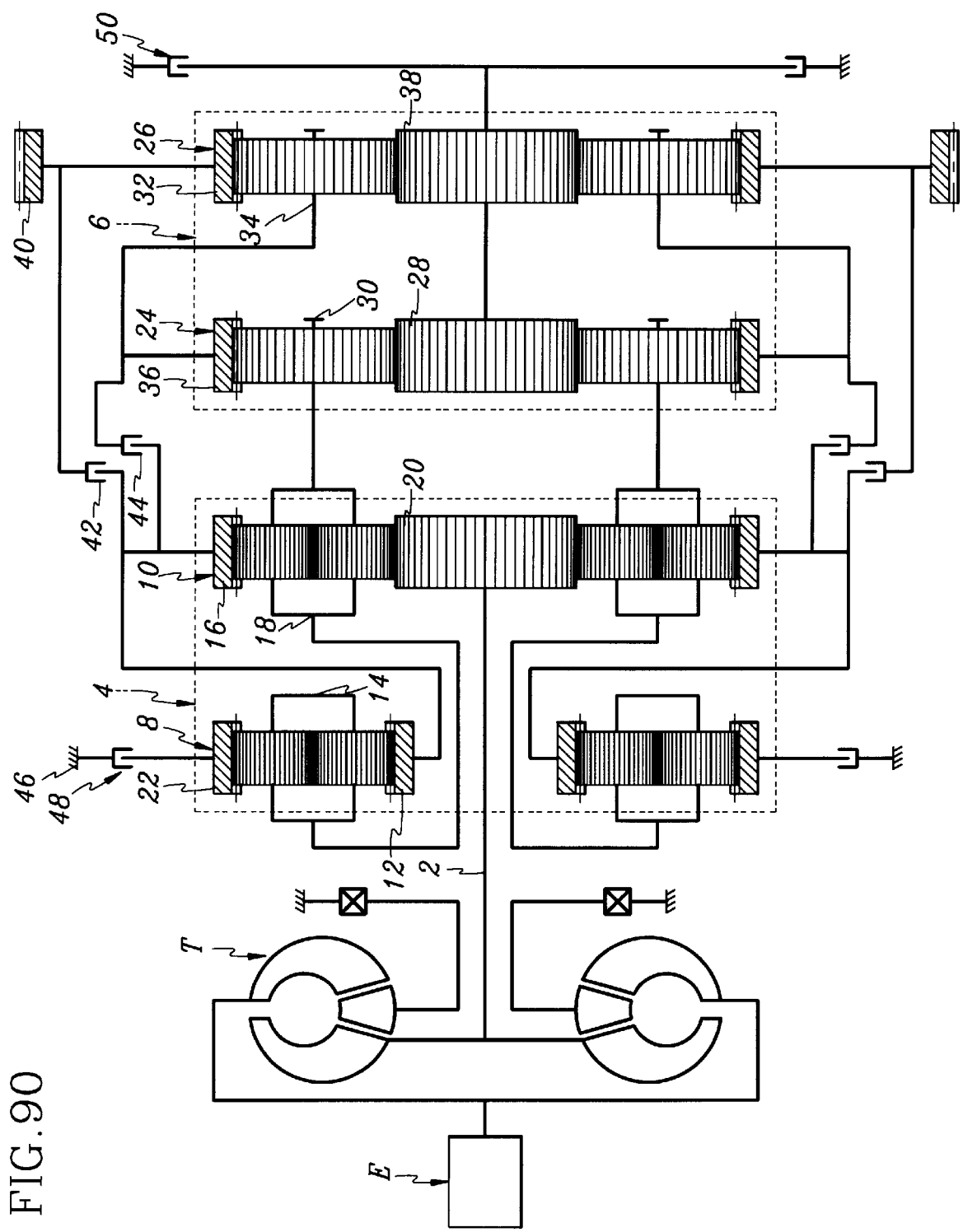
FIG. 90 is a schematic view of a powertrain according to an eighty-fifth preferred embodiment of the present invention.

Referring to FIG. 90, shown is a schematic view of a powertrain according to an eighty-fifth preferred embodiment of the present invention. In the eighty-fifth embodiment, as in the seventy-ninth embodiment, the first and second simple planetary gearsets 8 and 10 are double pinion planetary gearsets, while the third and fourth simple planetary gearsets 24 and 26 are single pinion planetary gearsets.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the fifth embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to the planet carrier 30 of the third simple planetary gearset 24, and a combination of the sun gear 12 and ring gear 16 of the first and second simple planetary gearsets 8 and 10 is variably connected to both the ring gear 32 of the fourth simple planetary gearset 26 through the first clutch 42, and to a combination of the ring gear 36 and planet carrier 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and a combination of the sun gears 28 and 38 of the third and fourth simple planetary gearsets 24 and 26 is connected to the transmission housing 46 with the second brake 50 interposed therebetween as in the fifth embodiment such that the ring gear 22 and the sun gears 28 and 38 act as reaction elements. In addition, input is realized through the sun gear 20 of the second simple planetary gearset 10 as in the fifty-fourth embodiment, and the ring gear 32 of the fourth simple planetary gearset 26 acts as an output element as in the fifth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the fifth embodiment, in the lever analogies of FIGS. 2–5 are as follows: the first operating element G indicates the ring gear 32 of the fourth simple planetary gearset 26, the second operating element H indicates a combination of the ring gear 36 and planet carrier 34 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-fifth embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-sixth Embodiment

Figure 91:
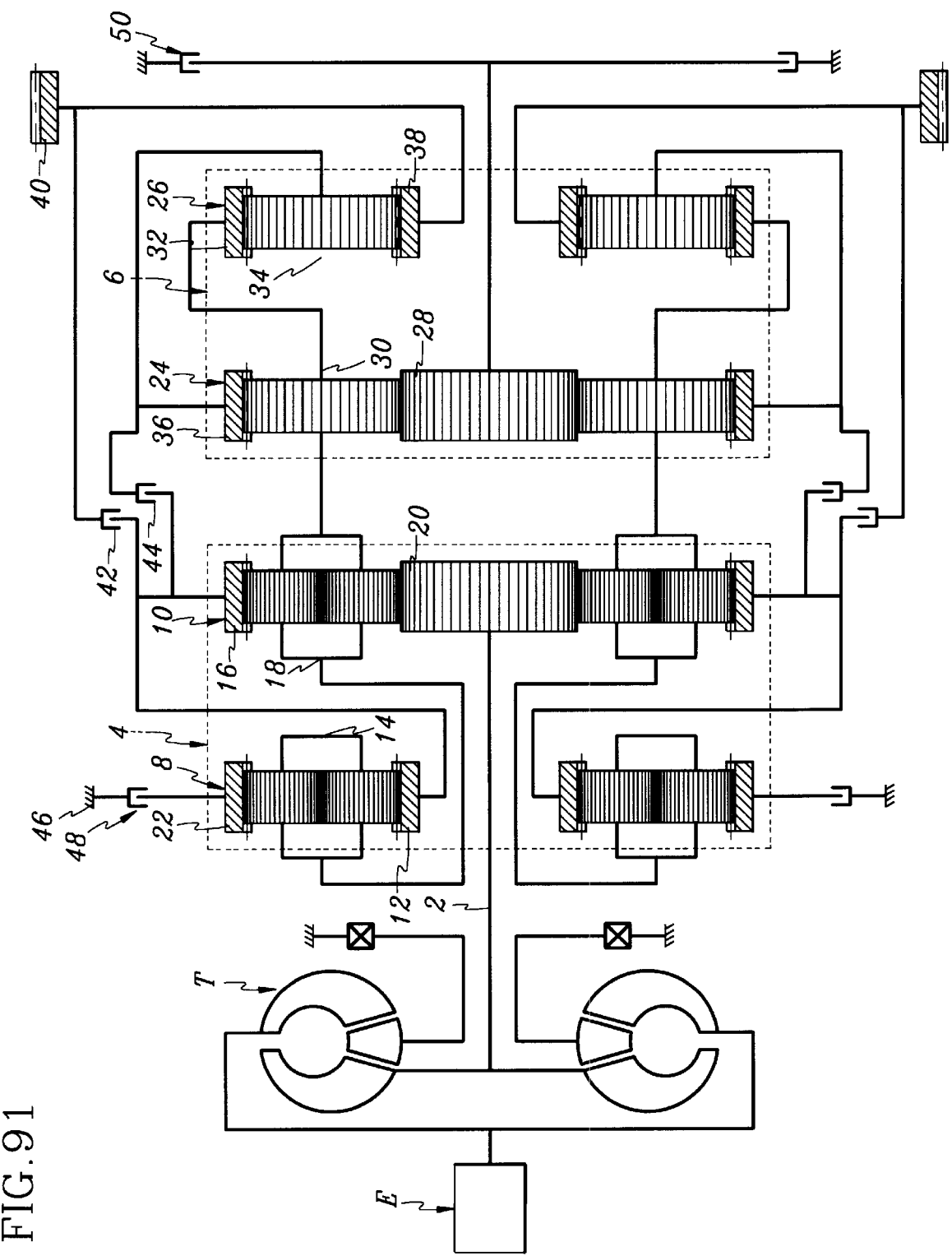
FIG. 91 is a schematic view of a powertrain according to an eighty-sixth preferred embodiment of the present invention.

Referring to FIG. 91, shown is a schematic view of a powertrain according to an eighty-sixth preferred embodiment of the present invention. In the eighty-sixth embodiment, as in the seventy-ninth embodiment, the first and second simple planetary gearsets 8 and 10 are double pinion planetary gearsets, while the third and fourth simple planetary gearsets 24 and 26 are single pinion planetary gearsets.

In the first compound planetary gearset 4, as in the fifty-fourth embodiment, the planet carrier 14 and sun gear 12 of the first simple planetary gearset 8 are fixedly connected respectively to the planet carrier 18 and ring gear 16 of the second simple planetary gearset 10. In the second compound planetary gearset 6, as in the fourth embodiment, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, a combination of the planet carriers 14 and 18 of the first and second simple planetary gearsets 8 and 10 is fixedly connected to a combination of the planet carrier 30 and ring gear 32 of the third and fourth simple planetary gearsets 24 and 26, and a combination of the sun gear 12 and ring gear 16 of the first and second simple planetary gearsets 8 and 10 is variably connected to both the sun gear 38 of the fourth simple planetary gearset 26 through the first clutch 42, and to a combination of the ring gear 36 and planet carrier 34 of the third and fourth simple planetary gearsets 24 and 26 through the second clutch 44.

Also, the ring gear 22 of the first simple planetary gearset 8 is connected to the transmission housing 46 with the first brake 48 interposed therebetween as in the fifty-fourth embodiment, and the sun gear 28 of the third simple planetary gearset 24 is connected to the transmission housing 46 with the second brake 50 interposed therebetween as in the fourth embodiment such that the ring gear 22 and the sun gear 28 act as reaction elements. In addition, input is realized through the sun gear 20 of the second simple planetary gearset 10 as in the fifty-fourth embodiment, and the sun gear 38 of the fourth simple planetary gearset 26 acts as an output element as in the fourth embodiment.

According to the above structure, operating elements for the first compound planetary gearset 4, as in the fifty-fourth embodiment, in the lever analogies of FIGS. 2–5 are as follows: the first operating element A indicates the sun gear 20 of the second simple planetary gearset 10, the second operating element B indicates a combination of the sun gear 12 and ring gear 16 of the first and second simple planetary gearsets 8 and 10, the third operating element C indicates the ring gear 22 of the first simple planetary gearset 8, and the fourth operating element D indicates a combination of the planet carriers 14 and 18 of the first and second simple planetary gearsets 8 and 10.

Further, operating elements for the second compound planetary gearset 6, as in the fourth embodiment, in the lever analogies of FIGS. 2–5 are as follows: the first operating element G indicates the sun gear 38 of the fourth simple planetary gearset 26, the second operating element H indicates a combination of the ring gear 36 and planet carrier 34 of the third and fourth simple planetary gearsets 24 and 26, the third operating element I indicates a combination of the planet carrier 30 and ring gear 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-sixth embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-seventh Embodiment

Figure 92:
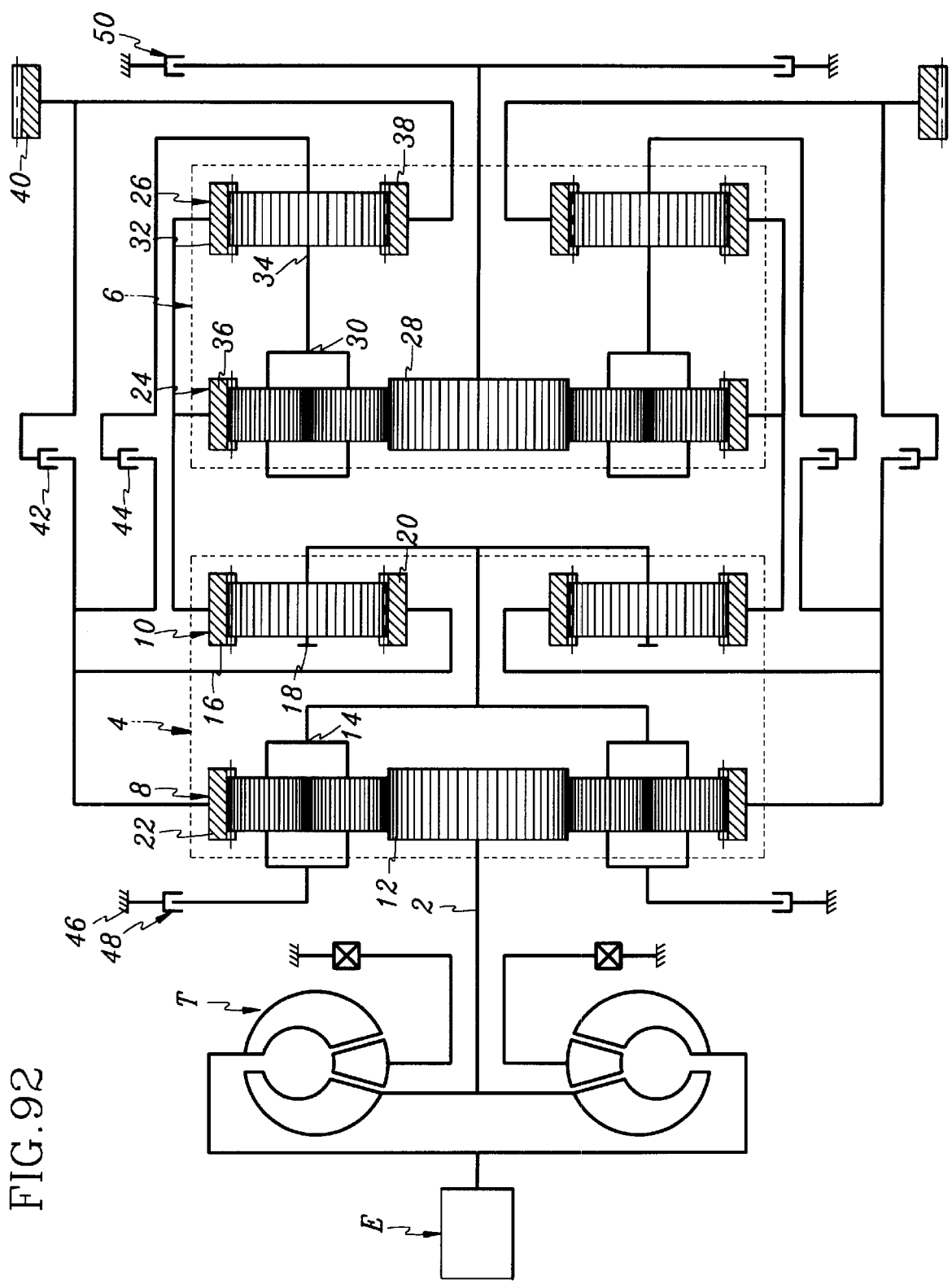
FIG. 92 is a schematic view of a powertrain according to an eighty-seventh preferred embodiment of the present invention.

Referring to FIG. 92, shown is a schematic view of a powertrain according to an eighty-seventh preferred embodiment of the present invention. In the eighty-seventh embodiment, the first and third simple planetary gearset 8 and 24 are double pinion planetary gearsets, while the second and fourth simple planetary gearsets 10 and 26 are single pinion planetary gearsets as in the first embodiment.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 16 of the second simple planetary gearset 10 is fixedly connected to a combination of the ring gears 36 and 32 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to a combination of the planet carriers 30 and 34 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and the sun gear 28 of the third simple planetary gearset 24 is connected to the transmission housing 46 with the second brake 50 interposed therebetween as in the thirty-first embodiment such that the planet carriers 14 and 18, and the sun gear 28 act as reaction elements. In addition, input is realized through the sun gear 12 of the first simple planetary gearset 8 as in the fifty-eighth embodiment, and the sun gear 38 of the fourth simple planetary gearset 26 acts as an output element as in the thirty-first embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-first embodiment, in the lever analogies of FIGS. 2–5 are as follows: the first operating element G indicates the sun gear 38 of the fourth simple planetary gearset 26, the second operating element H indicates a combination of the planet carriers 30 and 34 of the third and fourth simple planetary gearsets 24 and 26, the third operating element I indicates a combination of the ring gears 36 and 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-seventh embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-eighth Embodiment

Figure 93:
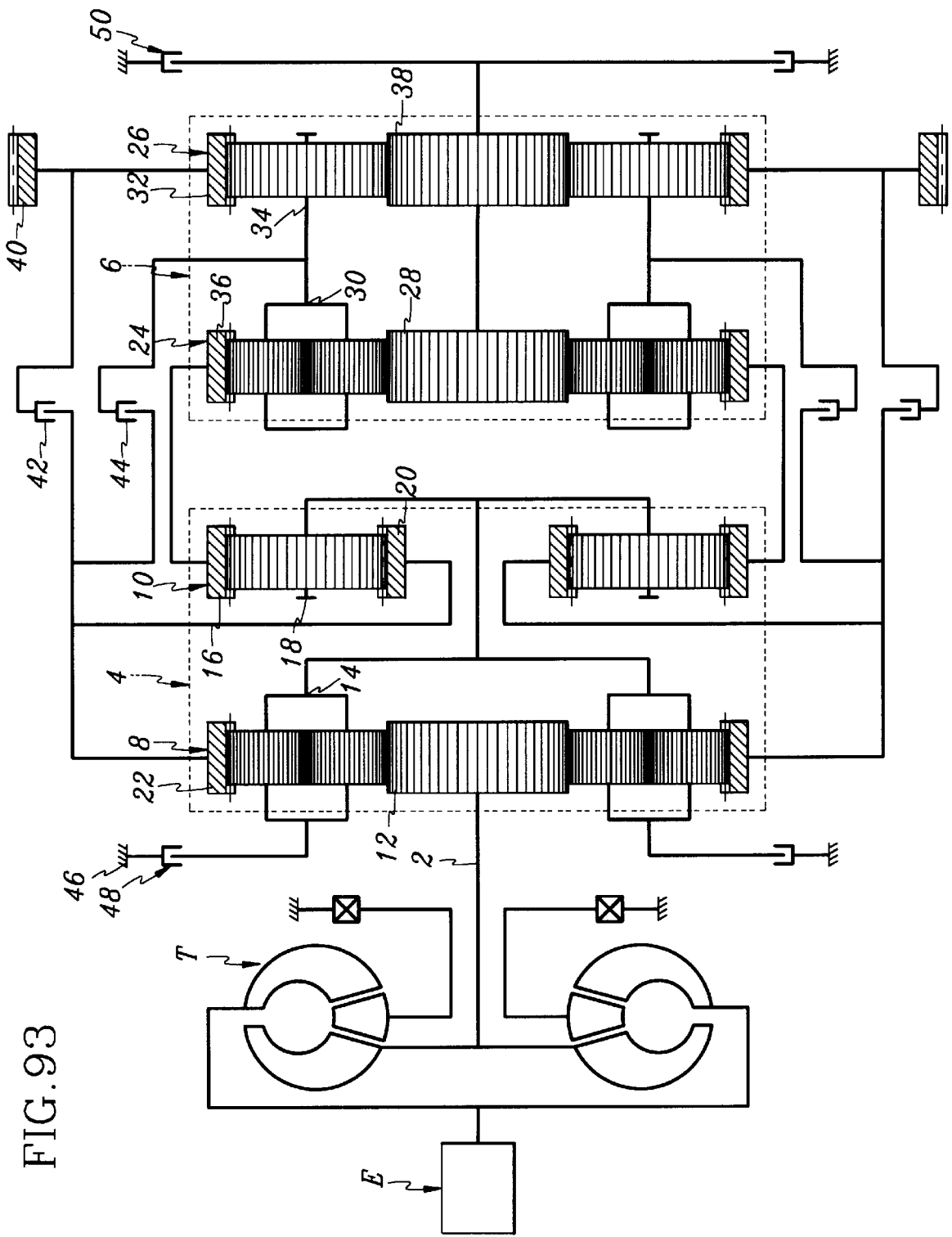
FIG. 93 is a schematic view of a powertrain according to an eighty-eighth preferred embodiment of the present invention.

Referring to FIG. 93, shown is a schematic view of a powertrain according to an eighty-eighth preferred embodiment of the present invention. In the eighty-eighth embodiment, as in the eighty-seventh embodiment, the first and third simple planetary gearset 8 and 24 are double pinion planetary gearsets, while the second and fourth simple planetary gearsets 10 and 26 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the thirty-second embodiment, the planet carrier 30 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the ring gear 16 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both the ring gear 32 of the fourth simple planetary gearset 26 through the first clutch 42, and to a combination of the planet carriers 30 and 34 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the sun gears 28 and 38 of the third and fourth simple planetary gearsets 24 and 26 is connected to the transmission housing 46 with the second brake 50 interposed therebetween as in the thirty-second embodiment such that the planet carriers 14 and 18, and the sun gears 28 and 38 act as reaction elements. In addition, input is realized through the sun gear 12 of the first simple planetary gearset 8 as in the fifty-eighth embodiment, and the ring gear 32 of the fourth simple planetary gearset 26 acts as an output element as in the thirty-second embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the thirty-second embodiment, in the lever analogies of FIGS. 2–5 are as follows: the first operating element G indicates the ring gear 32 of the fourth simple planetary gearset 26, the second operating element H indicates a combination of the planet carriers 30 and 34 of the third and fourth simple planetary gearsets 24 and 26, the third operating element I indicates the ring gear 36 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-eighth embodiment, only the structures of the first and second compound planetary gearsets 4 and 6 are changed from the first embodiment. As the operation of the operating elements in each shift range is identical to that of the first embodiment, an explanation thereof will be omitted herein.

Eighty-ninth Embodiment

Figure 94:
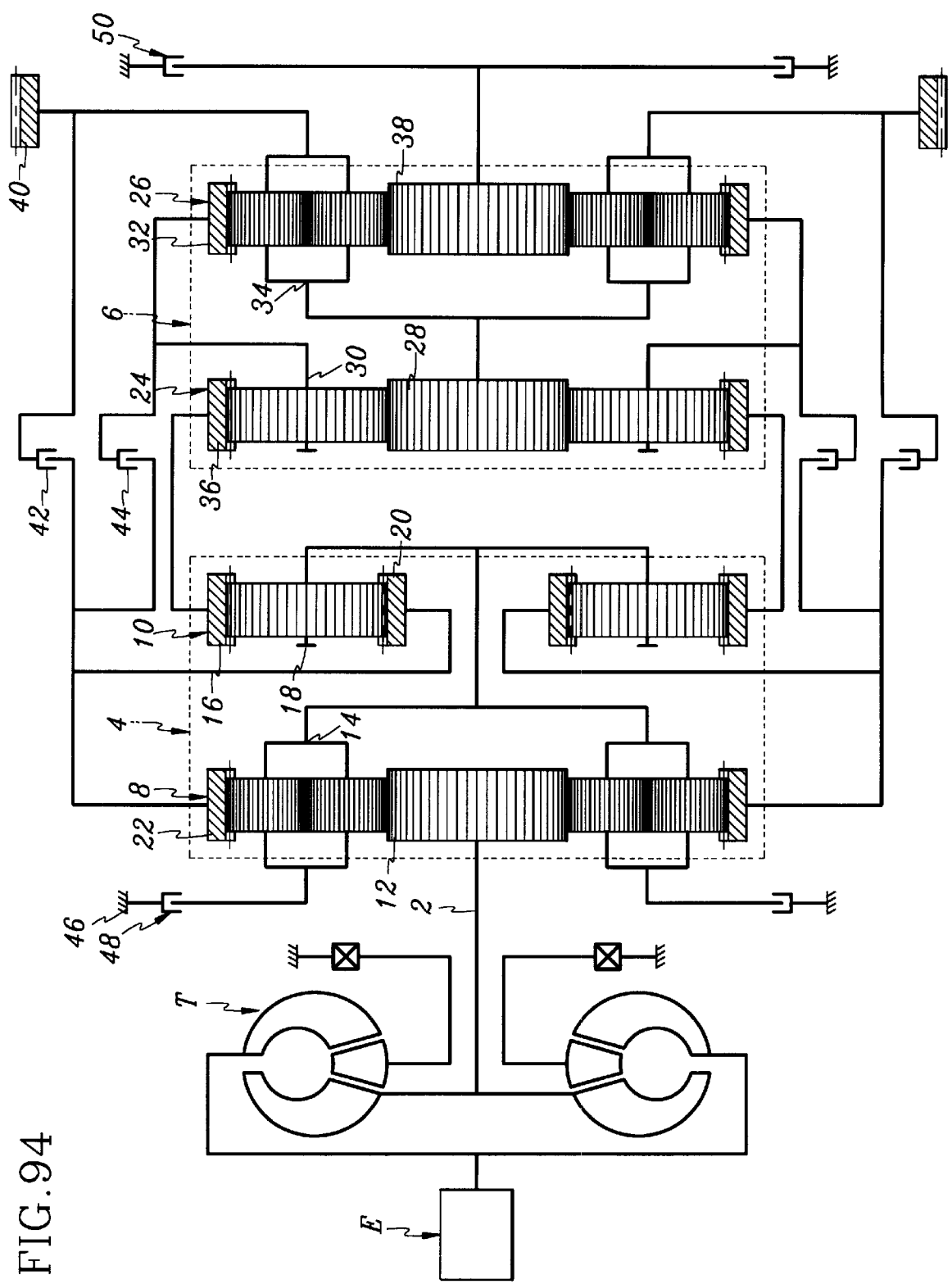
FIG. 94 is a schematic view of a powertrain according to an eighty-ninth preferred embodiment of the present invention.

Referring to FIG. 94, shown is a schematic view of a powertrain according to an eighty-ninth preferred embodiment of the present invention. In the eighty-ninth embodiment, the first and fourth simple planetary gearset 8 and 26 are double pinion planetary gearsets, while the second and third simple planetary gearsets 10 and 24 are single pinion planetary gearsets as in the first embodiment.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the twelfth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 16 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both a combination of the sun gear 28 and planet carrier 34 of the third and fourth simple planetary gearsets 24 and 26 through the first clutch 42, and to a combination of the planet carrier 30 and ring gear 32 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and the sun gear 38 of the fourth simple planetary gearset 26 is connected to the transmission housing 46 with the second brake 50 interposed therebetween as in the twelfth embodiment such that the planet carriers 14 and 18, and the sun gear 38 act as reaction elements. In addition, input is realized through the sun gear 12 of the first simple planetary gearset 8 as in the fifty-eighth embodiment, and a combination of the sun gear 28 and planet carrier 34 of the third and fourth simple planetary gearsets 24 and 26 acts as an output element as in the twelfth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the twelfth embodiment, in the lever analogies of FIGS. 2–5 are as follows: the first operating element G indicates a combination of the sun gear 28 and planet carrier 34 of the third and fourth simple planetary gearsets 24 and 26, the second operating element H indicates a combination of the planet carrier 30 and ring gear 32 of the third and fourth simple planetary gearsets 24 and 26, the third operating element I indicates the ring gear 36 of the third simple planetary gearset 24, and the fourth operating element J indicates the sun gear 38 of the fourth simple planetary gearset 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the eighty-ninth embodiment, only the structures of the first and second compound planetary gearsets 4 and 6 are changed from the first embodiment. As the operation of the operating elements in each shift range is identical to that of the first embodiment, an explanation thereof will be omitted herein.

Ninetieth Embodiment

Figure 95:
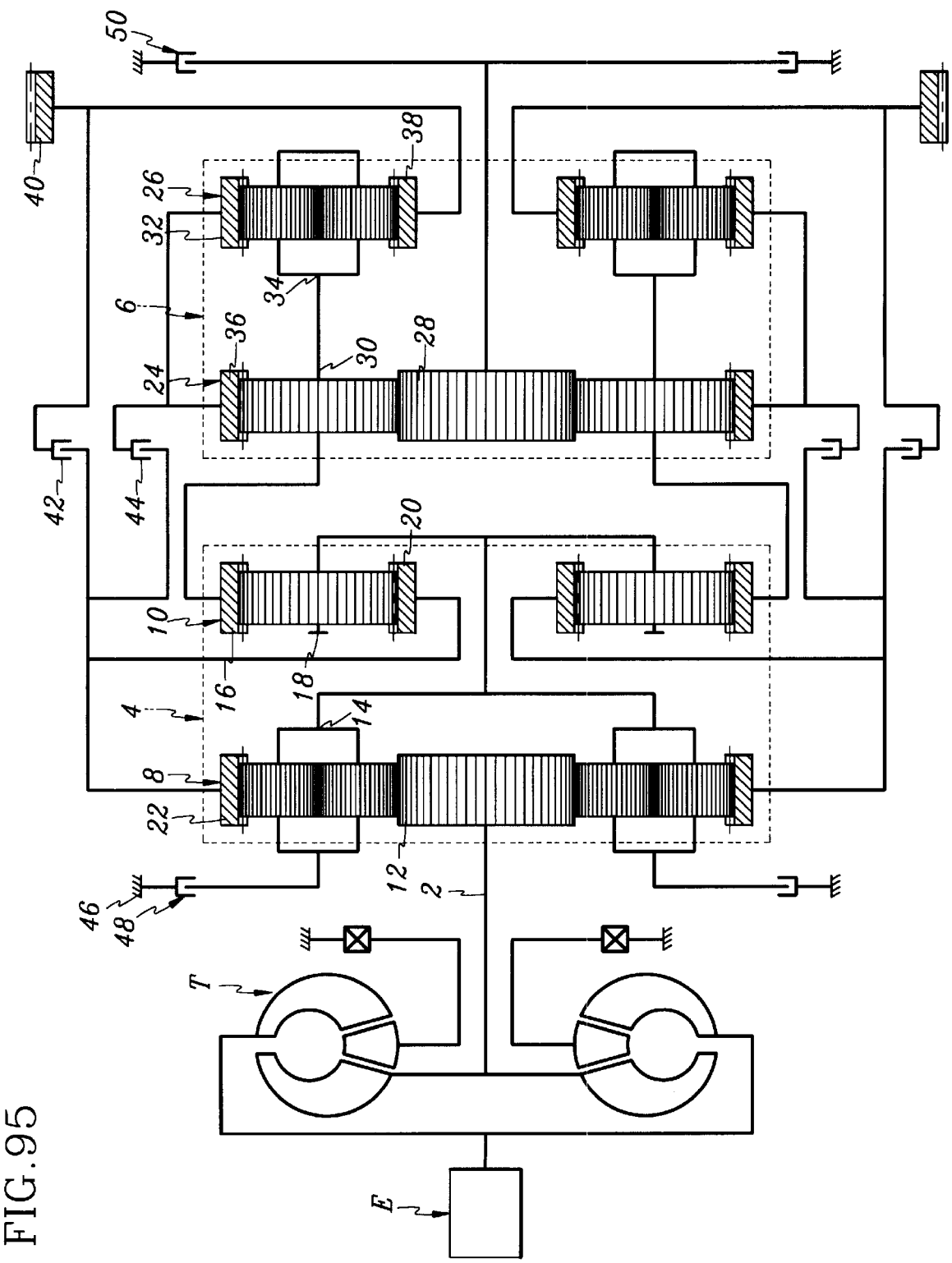
FIG. 95 is a schematic view of a powertrain according to a ninetieth preferred embodiment of the present invention.

Referring to FIG. 95, shown is a schematic view of a powertrain according to a ninetieth preferred embodiment of the present invention. In the ninetieth embodiment, as in the eighty-ninth embodiment, the first and fourth simple planetary gearset 8 and 26 are double pinion planetary gearsets, while the second and third simple planetary gearsets 10 and 24 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the twenty-first embodiment, the ring gear 36 and planet carrier 30 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 16 of the second simple planetary gearset 10 is fixedly connected to a combination of the planet carriers 30 and 34 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to a combination of the ring gears 36 and 32 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and the sun gear 28 of the third simple planetary gearset 24 is connected to the transmission housing 46 with the second brake 50 interposed therebetween as in the twenty-first embodiment such that the planet carriers 14 and 18, and the sun gear 28 act as reaction elements. In addition, input is realized through the sun gear 12 of the first simple planetary gearset 8 as in the fifty-eighth embodiment, and the sun gear 38 of the fourth simple planetary gearset 26 acts as an output element as in the twenty-first embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the twenty-first embodiment, in the lever analogies of FIGS. 2–5 are as follows: the first operating element G indicates the sun gear 38 of the fourth simple planetary gearset 26, the second operating element H indicates a combination of the ring gears 36 and 32 of the third and fourth simple planetary gearsets 24 and 26, the third operating element I indicates a combination of the planet carriers 30 and 34 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninetieth embodiment, only the structures of the first and second compound planetary gearsets 4 and 6 are changed from the first embodiment. As the operation of the operating elements in each shift range is identical to that of the first embodiment, an explanation thereof will be omitted herein.

Ninety-first Embodiment

Figure 96:
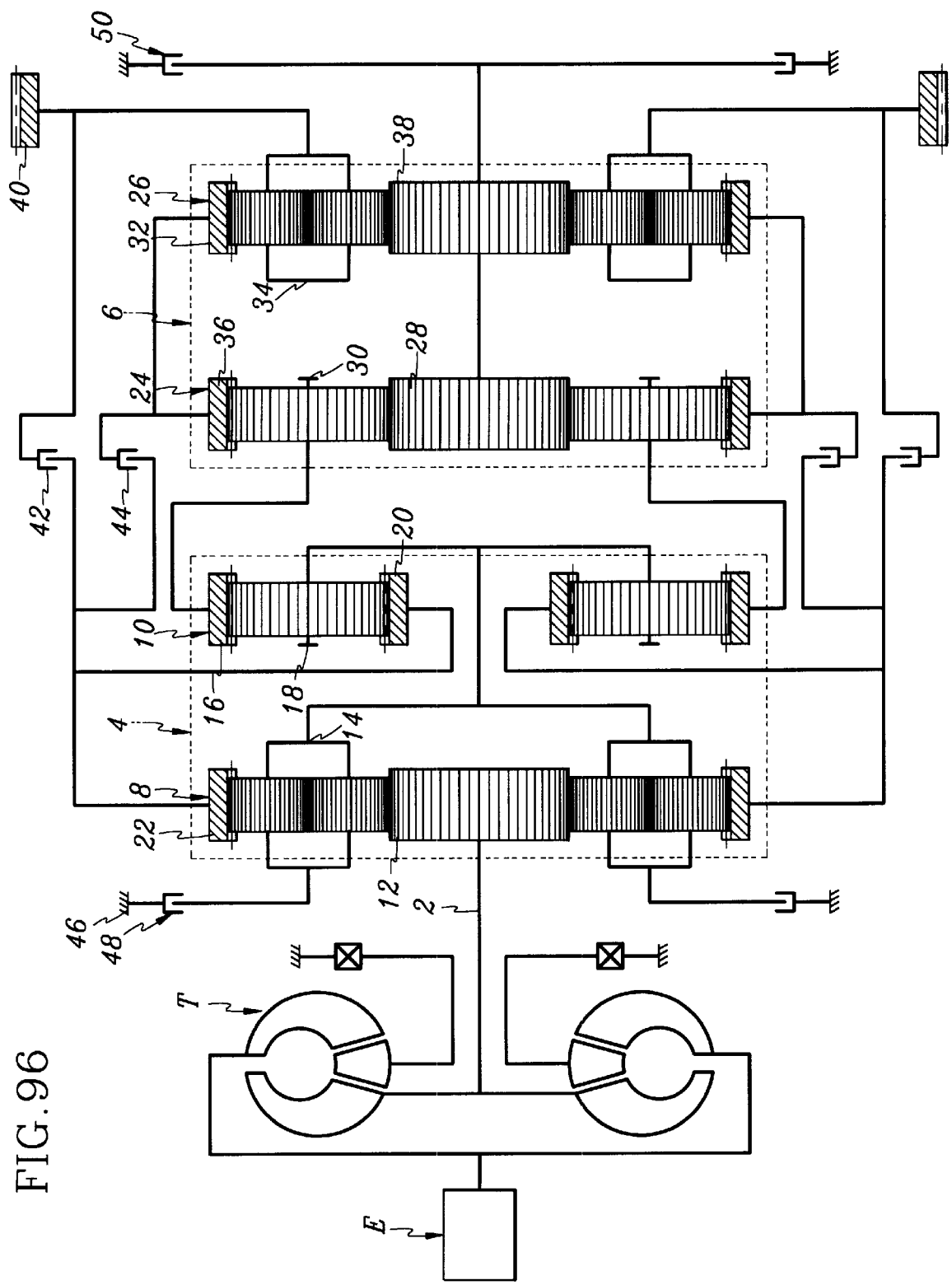
FIG. 96 is a schematic view of a powertrain according to a ninety-first preferred embodiment of the present invention.

Referring to FIG. 96, shown is a schematic view of a powertrain according to a ninety-first preferred embodiment of the present invention. In the ninety-first embodiment, as in the eighty-ninth embodiment, the first and fourth simple planetary gearset 8 and 26 are double pinion planetary gearsets, while the second and third simple planetary gearsets 10 and 24 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the twentieth embodiment, the ring gear 36 and sun gear 28 of the third simple planetary gearset 24 are fixedly connected respectively to the ring gear 32 and sun gear 38 of the fourth simple planetary gearset 26.

Further, with regard to the combination of the first and second compound planetary gearsets 4 and 6, the ring gear 16 of the second simple planetary gearset 10 is fixedly connected to the planet carrier 30 of the third simple planetary gearset 24, and a combination of the ring gear 22 and sun gear 20 of the first and second simple planetary gearsets 8 and 10 is variably connected to both the planet carrier 34 of the fourth simple planetary gearset 26 through the first clutch 42, and to a combination of the ring gears 36 and 32 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the sun gears 28 and 38 of the third and fourth simple planetary gearsets 24 and 26 is connected to the transmission housing 46 with the second brake 50 interposed therebetween as in the twentieth embodiment such that the planet carriers 14 and 18, and the sun gears 28 and 38 act as reaction elements. In addition, input is realized through the sun gear 12 of the first simple planetary gearset 8 as in the fifty-eighth embodiment, and the planet carrier 34 of the fourth simple planetary gearset 26 acts as an output element as in the twentieth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the twentieth embodiment, in the lever analogies of FIGS. 2–5 are as follows: the first operating element G indicates the planet carrier 34 of the fourth simple planetary gearset 26, the second operating element H indicates a combination of the ring gears 36 and 32 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninety-first embodiment, only the structures of the first and second compound planetary gearsets 4 and 6 are changed from the first embodiment. As the operation of the operating elements in each shift range is identical to that of the first embodiment, an explanation thereof will be omitted herein.

Ninety-second Embodiment

Figure 97:
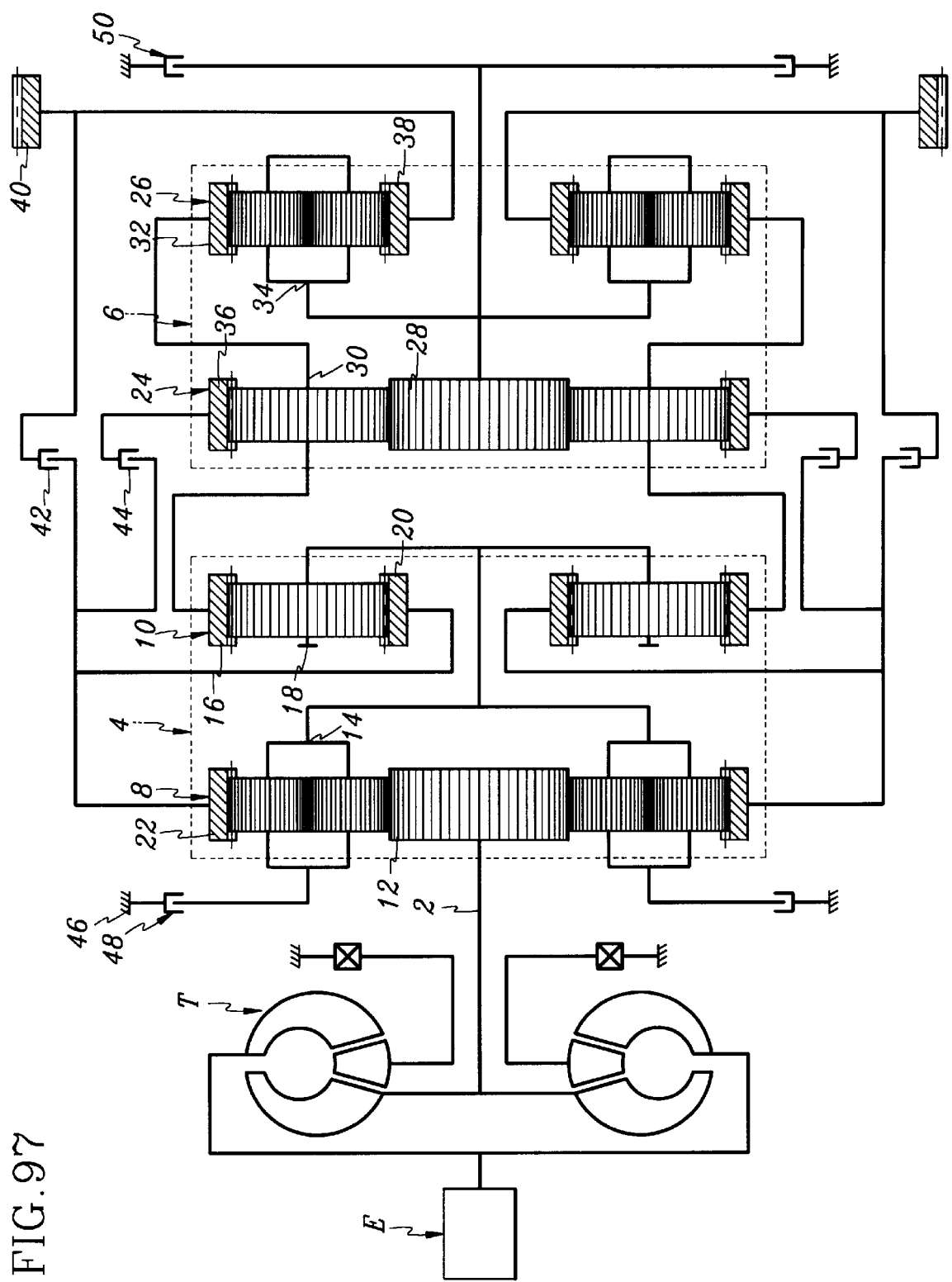
FIG. 97 is a schematic view of a powertrain according to a ninety-second preferred embodiment of the present invention.

Referring to FIG. 97, shown is a schematic view of a powertrain according to a ninety-second preferred embodiment of the present invention. In the ninety-second embodiment, as in the eighty-ninth embodiment, the first and fourth simple planetary gearsets 8 and 26 are double pinion planetary gearsets, while the second and third simple planetary gearsets 10 and 24 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the fifteenth embodiment, the planet carrier 30 and sun gear 28 of the third simple planetary gearset 24 are fixedly connected respectively to the ring gear 32 and planet carrier 34 of the fourth simple planetary gearset 26.

Further, with regard to the combination of the first and second compound planetary gearsets 4 and 6, the ring gear 16 of the second simple planetary gearset 10 is fixedly connected to a combination of the planet carrier 30 and ring gear 32 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to the ring gear 36 of the third simple planetary gearset 24 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the sun gear 28 and planet carrier 34 of the third and fourth simple planetary gearsets 24 and 26 is connected to the transmission housing 46 with the second brake 50 interposed therebetween as in the fifteenth embodiment such that the planet carriers 14 and 18, and the sun gear 28 and planet carrier 34 act as reaction elements. In addition, input is realized through the sun gear 12 of the first simple planetary gearset 8 as in the fifty-eighth embodiment, and the sun gear 38 of the fourth simple planetary gearset 26 acts as an output element as in the fifteenth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the fifteenth embodiment, in the lever analogies of FIGS. 2–5 are as follows: the first operating element G indicates the sun gear 38 of the fourth simple planetary gearset 26, the second operating element H indicates the ring gear 36 of the third simple planetary gearset 24, the third operating element I indicates a combination of the planet carrier 30 and ring gear 32 of the third and fourth simple planetary gearsets 24 and 26, and the fourth operating element J indicates a combination of the sun gear 28 and planet carrier 34 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninety-second embodiment, only the structures of the first and second compound planetary gearsets 4 and 6 are changed from the first embodiment. As the operation of the operating elements in each shift range is identical to that of the first embodiment, an explanation thereof will be omitted herein.

Ninety-third Embodiment

Figure 98:
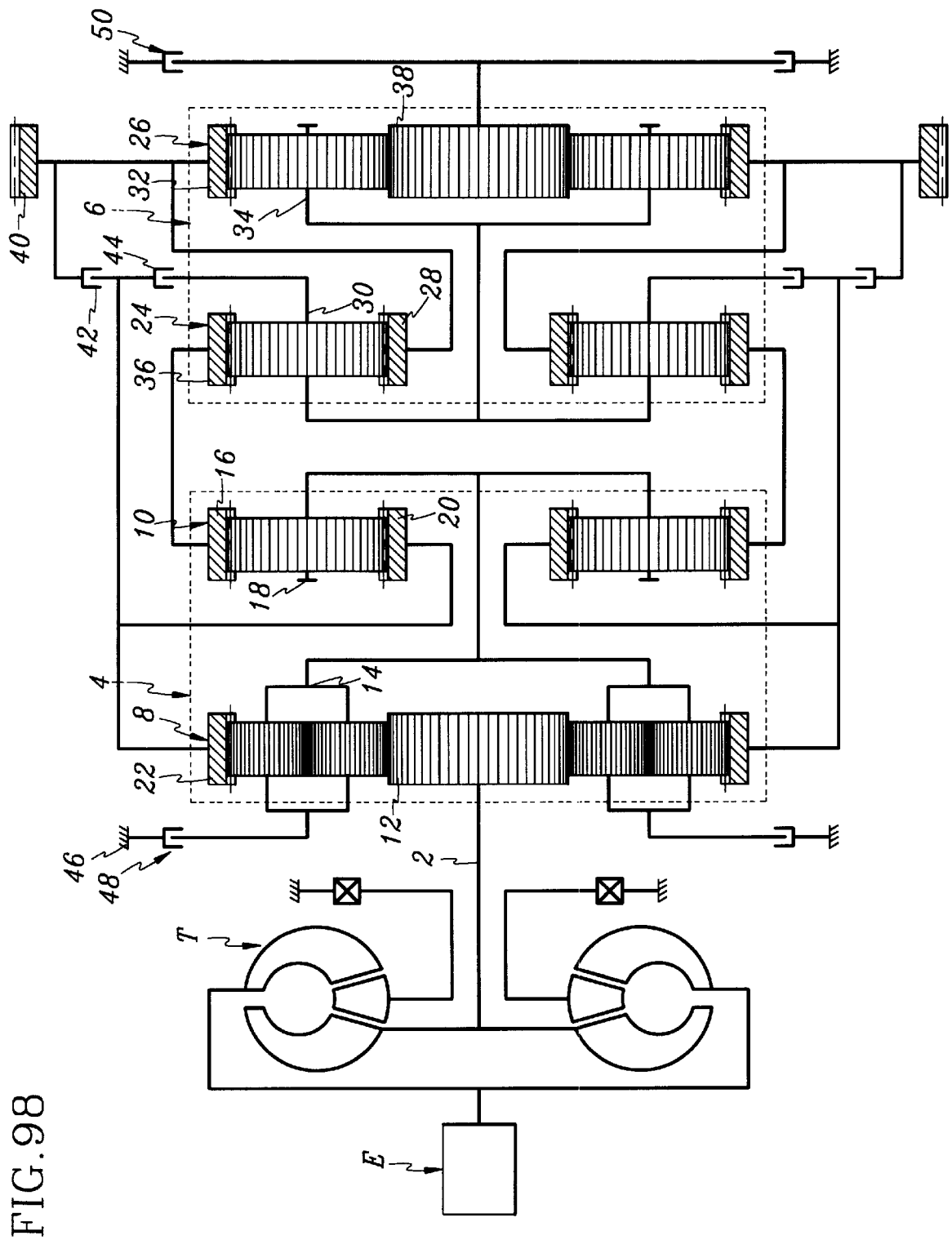
FIG. 98 is a schematic view of a powertrain according to a ninety-third preferred embodiment of the present invention.

Referring to FIG. 98, shown is a schematic view of a powertrain according to a ninety-third preferred embodiment of the present invention. In the ninety-third embodiment, the first simple planetary gearset 8 is a double pinion planetary gearset, while the second, third, and fourth simple planetary gearsets 10, 24, and 26 are single pinion planetary gearsets. As shown in the drawing, as in the fifty-eighth embodiment, the ring gear 22 and planet carrier 14 of the first simple planetary gearset 8 are fixedly connected respectively to the sun gear 20 and planet carrier 18 of the second simple planetary gearset 10.

Further, with regard to the combination of the first and second compound planetary gearsets 4 and 6, the ring gear 16 of the second simple planetary gearset 10 is fixedly connected to the ring gear 36 of the third simple planetary gearset 24, and a combination of the ring gear 22 and sun gear 20 of the first and second simple planetary gearsets 8 and 10 is variably connected to both a combination of the sun gear 28 and ring gear 32 of the third and fourth simple planetary gearsets 24 and 26 through the first clutch 42, and to a combination of the planet carriers 30 and 34 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween such that the planet carriers 14 and 18 act as reaction elements. In addition, the sun gear 12 of the first simple planetary gearset 8 acts as an input element.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninety-third embodiment, only the structure of the first compound planetary gearset 4 is changed from the first embodiment. As the operation of the operating elements in each shift range is identical to that of the first embodiment, an explanation thereof will be omitted herein.

Ninety-fourth Embodiment

Figure 99:
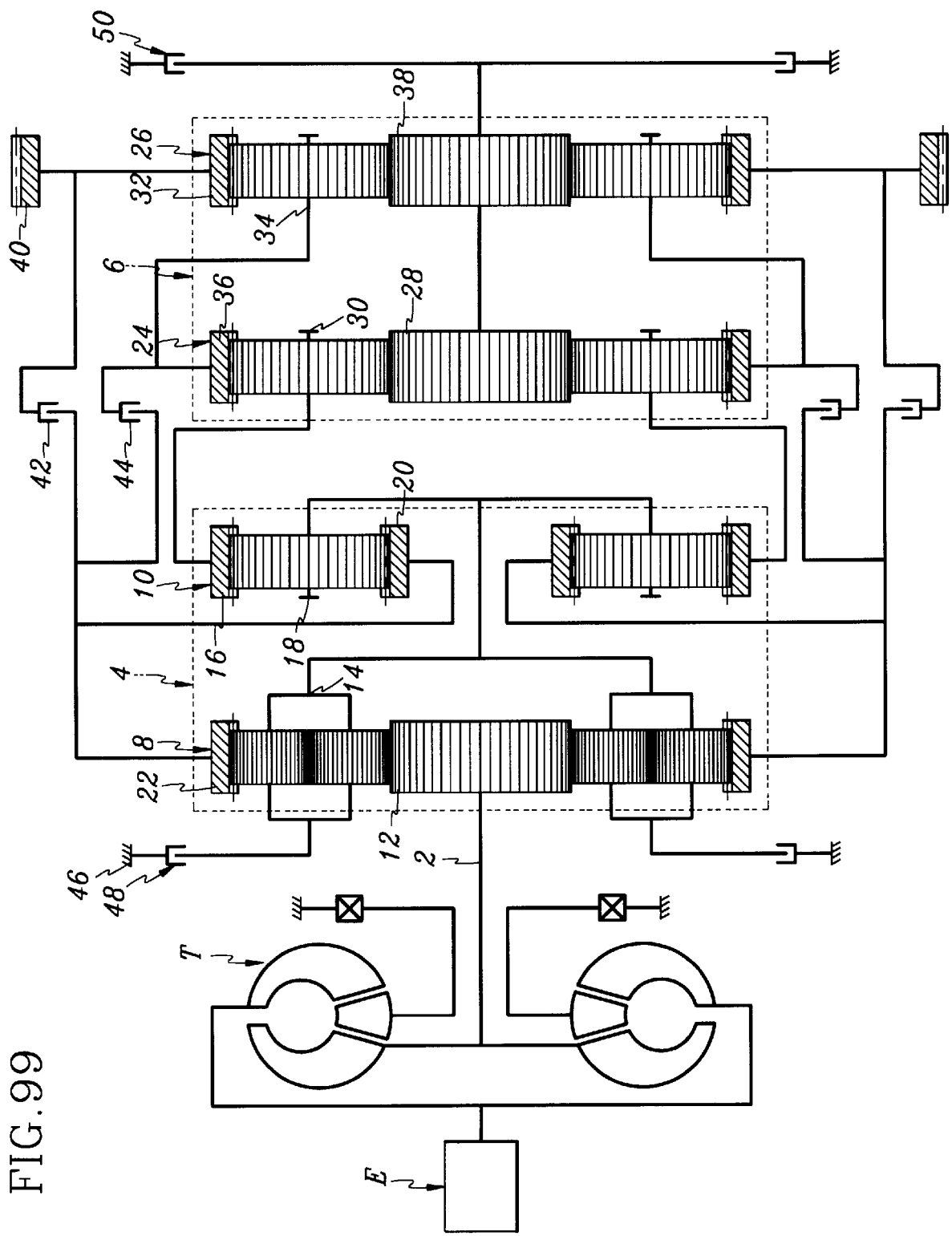
FIG. 99 is a schematic view of a powertrain according to a ninety-fourth preferred embodiment of the present invention.

Referring to FIG. 99, shown is a schematic view of a powertrain according to a ninety-fourth preferred embodiment of the present invention. In the ninety-fourth embodiment, as in the ninety-third embodiment, the first simple planetary gearset 8 is a double pinion planetary gearset, while the second, third, and fourth simple planetary gearsets 10, 24, and 26 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the fifth embodiment, the ring gear 36 and sun gear 28 of the third simple planetary gearset 24 are fixedly connected respectively to the planet carrier 34 and sun gear 38 of the fourth simple planetary gearset 26.

Further, with regard to the combination of the first and second compound planetary gearsets 4 and 6, the ring gear 16 of the second simple planetary gearset 10 is fixedly connected to the planet carrier 30 of the third simple planetary gearset 24, and a combination of the ring gear 22 and sun gear 20 of the first and second simple planetary gearsets 8 and 10 is variably connected to both the ring gear 32 of the fourth simple planetary gearset 26 through the first clutch 42, and to a combination of the ring gear 36 and planet carrier 34 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and a combination of the sun gears 28 and 38 of the third and fourth simple planetary gearsets 24 and 26 is connected to the transmission housing 46 with the second brake 50 interposed therebetween as in the fifth embodiment such that the planet carriers 14 and 18, and the sun gears 28 and 38 act as reaction elements. In addition, input is realized through the sun gear 12 of the first simple planetary gearset 8 as in the fifty-eighth embodiment, and the ring gear 32 of the fourth simple planetary gearset 26 acts as an output element as in the fifth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the fifth embodiment, in the lever analogies of FIGS. 2–5 are as follows: the first operating element G indicates the ring gear 32 of the fourth simple planetary gearset 26, the second operating element H indicates a combination of the ring gear 36 and planet carrier 34 of the third and fourth simple planetary gearsets 24 and 26, the third operating element I indicates the planet carrier 30 of the third simple planetary gearset 24, and the fourth operating element J indicates a combination of the sun gears 28 and 38 of the third and fourth simple planetary gearsets 24 and 26.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninety-fourth embodiment, only the structures of the first and second compound planetary gearsets 4 and 6 are changed from the first embodiment. As the operation of the operating elements in each shift range is identical to that of the first embodiment, an explanation thereof will be omitted herein.

Ninety-fifth Embodiment

Figure 100:
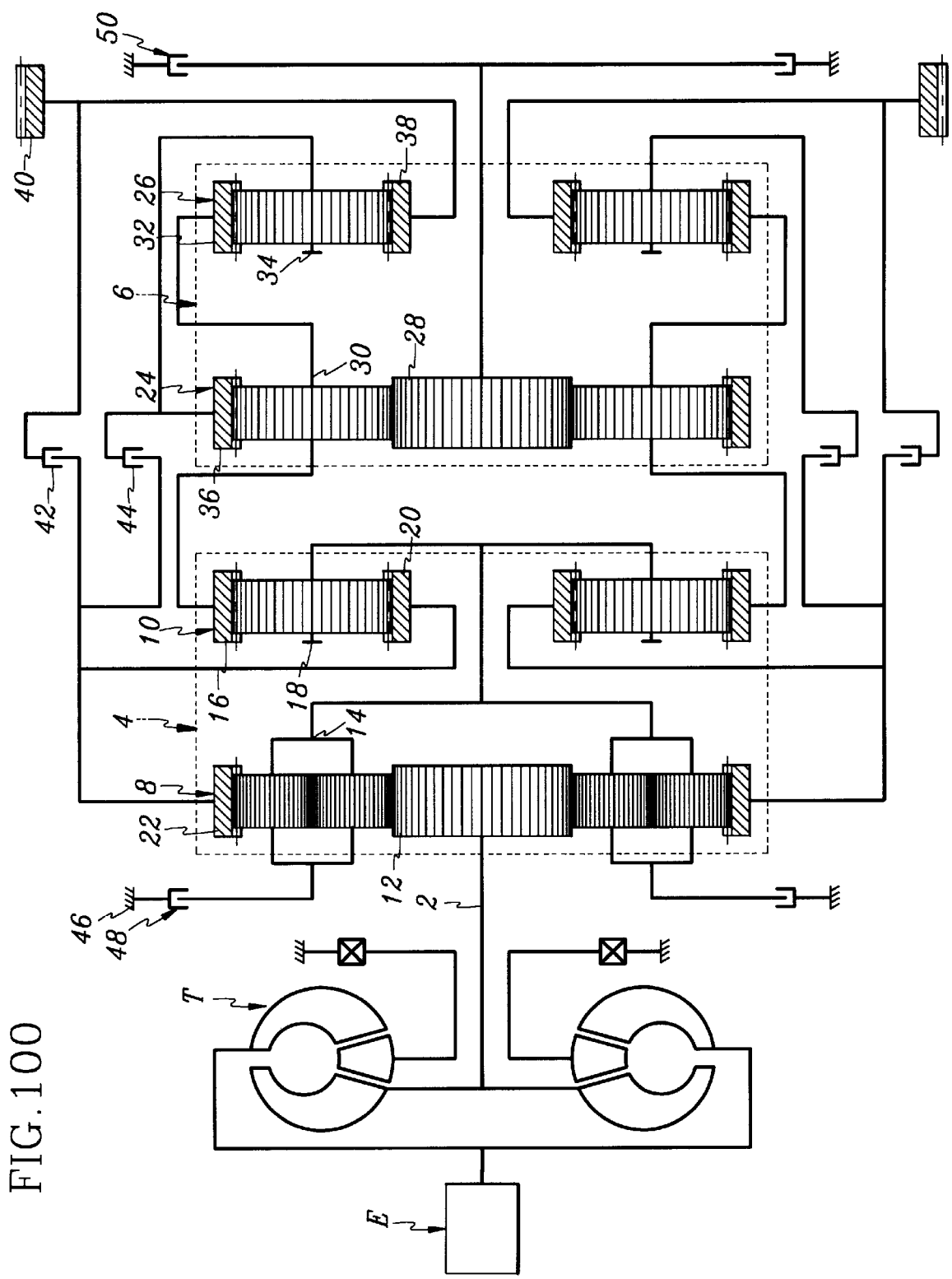
FIG. 100 is a schematic view of a powertrain according to a ninety-fifth preferred embodiment of the present invention.

Referring to FIG. 100, shown is a schematic view of a powertrain according to a ninety-fifth preferred embodiment of the present invention. In the ninety-fifth embodiment, as in the ninety-third embodiment, the first simple planetary gearset 8 is a double pinion planetary gearset, while the second, third, and fourth simple planetary gearsets 10, 24, and 26 are single pinion planetary gearsets.

In the first compound planetary gearset 4, as in the fifty-eighth embodiment, the ring gear 22 and planet carrier 14 of the first simple planetary gearset 8 are fixedly connected respectively to the sun gear 20 and planet carrier 18 of the second simple planetary gearset 10. In the second compound planetary gearset 6, as in the fourth embodiment, the ring gear 36 and planet carrier 30 of the third simple planetary gearset 24 are fixedly connected respectively to the planet carrier 34 and ring gear 32 of the fourth simple planetary gearset 26.

Further, with regard to the combination of the first and second compound planetary gearsets 4 and 6, the ring gear 16 of the second simple planetary gearset 10 is fixedly connected to a combination of the planet carrier 30 and ring gear 32 of the third and fourth simple planetary gearsets 24 and 26, and a combination of the ring gear 22 and sun gear 20 of the first and second simple planetary gearsets 8 and 10 is variably connected to both the sun gear 38 of the fourth simple planetary gearset 26 through the first clutch 42, and to a combination of the ring gear 36 and planet carrier 34 of the third and fourth simple planetary gearsets 24 and 26 through the second clutch 44.

Also, a combination of the planet carriers 14 and 18 of the first and second simple planetary gearsets 8 and 10 is connected to the transmission housing 46 with the first brake 48 interposed therebetween as in the fifty-eighth embodiment, and the sun gear 28 of the third simple planetary gearset 24 is connected to the transmission housing 46 with the second brake 50 interposed therebetween as in the fourth embodiment such that the planet carriers 14 and 18, and the sun gear 28 act as reaction elements. In addition, input is realized through the sun gear 12 of the first simple planetary gearset 8 as in the fifty-eighth embodiment, and the sun gear 38 of the fourth simple planetary gearset 26 acts as an output element as in the fourth embodiment.

According to the above structure, operating elements for the first compound planetary gearset 4, as in the fifty-eighth embodiment, in the lever analogies of FIGS. 2–5 are as follows: the first operating element A indicates the sun gear 12 of the first simple planetary gearset 8, the second operating element B indicates a combination of the ring gear 22 and sun gear 20 of the first and second simple planetary gearsets 8 and 10, the third operating element C indicates a combination of the planet carriers 14 and 18 of the first and second simple planetary gearsets 8 and 10, and the fourth operating element D indicates the ring gear 16 of the second simple planetary gearset 10.

Further, operating elements for the second compound planetary gearset 6, as in the fourth embodiment, in the lever analogies of FIGS. 2–5 are as follows: the first operating element G indicates the sun gear 38 of the fourth simple planetary gearset 26, the second operating element H indicates a combination of the ring gear 36 and planet carrier 34 of the third and fourth simple planetary gearsets 24 and 26, the third operating element I indicates a combination of the planet carrier 30 and ring gear 32 of the third and fourth simple planetary gearsets 24 and 26, and the fourth operating element J indicates the sun gear 28 of the third simple planetary gearset 24.

The operating elements of the first compound planetary gearset 4 are connected to the operating elements of the second compound planetary gearset 6 identically as in the first embodiment. Namely, the fourth operating element D of the first compound planetary gearset 4 is fixedly connected to the third operating element I of the second compound planetary gearset 6, and the second operating element B of the first compound planetary gearset 4 is variably connected to both the first and second operating elements G and H of the second compound planetary gearset 6.

Accordingly, input is realized through the first operating element A of the first compound planetary gearset 4, the third operating element C of the first compound planetary gearset 4 and the fourth operating element J of the second compound planetary gearset 6 selectively operate as reaction elements, and output is realized through the first operating element G of the second compound planetary gearset 6.

In the ninety-fifth embodiment, only the structures of the first and second compound planetary gearsets 4 and 6 are changed from the first embodiment. As the operation of the operating elements in each shift range is identical to that of the first embodiment, an explanation thereof will be omitted herein.

In the powertrain for a 5-speed automatic transmission structured and operating as in the above, by eliminating an element rotating faster than a final output element needed in the prior art when in overdrive, power loss is minimized. Also, as the number of friction elements is reduced, the powertrain can be designed to be lightweight and compact in size.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A powertrain for a 5-speed automatic transmission comprising:

a first compound planetary gearset comprising first and second simple planetary gearsets having first, second, third and fourth operating elements, said first operating element acting as an input element;

a second compound planetary gearset comprising third and fourth simple planetary gearsets having fifth, sixth, seventh and eighth operating elements, said fifth operating element acting as an output element, said fifth and sixth operating elements being variably connected to said second operating element, and said seventh operating element being fixedly connected to the fourth operating element;

clutch means for variably connecting said fifth and sixth operating elements to said second operating element; and brake means for selectively connecting said third and eighth operating elements to a transmission housing.

2. The powertrain of claim 1, wherein each of said first, second, third, and fourth simple planetary gearsets is a single pinion planetary gearset.

3. The powertrain of claim 2, wherein the first operating element is a sun gear of the second simple planetary gearset;

the second operating element is a combination of a sun gear of the first simple planetary gearset and a planet carrier of the second simple planetary gearset;

the third operating element is a combination of a planet carrier of the first simple planetary gearset and a ring gear of the second simple planetary gearset; and the fourth operating element is a ring gear of the first simple planetary gearset.

4. The powertrain of claim 2, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

5. The powertrain of claim 3, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

6. The powertrain of claim 5, wherein the clutch means comprises a first clutch interposed between the combination of the sun gear and planet carrier of the first and second simple planetary gearsets and the combination of the sun gear and ring gear of the third and fourth simple planetary gearsets, and a second clutch interposed between the combination of the sun gear and planet carrier of the first and second simple planetary gearsets and the combination of the planet carriers of the third and fourth simple planetary gearsets.

7. The powertrain of claim 5, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

8. The powertrain of claim 3, wherein the fifth operating element is a sun gear of the third simple planetary gearset;

the sixth operating element is a combination of a planet carrier of the third simple planetary gearset and a ring gear of the fourth simple planetary gearset;

the seventh operating element is a combination of a ring gear of the third simple planetary gearset and a planet carrier of the fourth simple planetary gearset; and the eighth operating element is a sun gear of the fourth simple planetary gearset.

9. The powertrain of claim 8, wherein the clutch means comprises a first clutch interposed between the combination of the sun gear and planet carrier of the first and second simple planetary gearsets and the sun gear of the third simple planetary gearset, and a second clutch interposed between the combination of the sun gear and planet carrier of the first and second simple planetary gearsets and the combination of the planet carrier and ring gear of the third and fourth simple planetary gearsets.

10. The powertrain of claim 8, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

11. The powertrain of claim 1, wherein each of said first, third, and fourth simple planetary gearsets is a single pinion planetary gearset, while the second simple planetary gearset is a double pinion planetary gearset.

12. The powertrain of claim 11, wherein the first operating element is a combination of a sun gear of the first simple planetary gearset and a sun gear of the second simple planetary gearset;
the second operating element is a combination of a planet carrier of the first simple planetary gearset and a ring gear of the second simple planetary gearset;
the third operating element is a ring gear of the first simple planetary gearset; and
the fourth operating element is a planet carrier of the second simple planetary gearset.

13. The powertrain of claim 11, wherein the fifth operating element is a combination of a sun gear of the third simple planetary gearset and a ring gear of the fourth simple planetary gearset;
the sixth operating element is a combination of a planet carrier of the third simple planetary gearset and a planet carrier of the fourth simple planetary gearset;
the seventh operating element is a ring gear of the third simple planetary gearset; and
the eighth operating element is a sun gear of the fourth simple planetary gearset.

14. The powertrain of claim 12, wherein the fifth operating element is a combination of a sun gear of the third simple planetary gearset and a ring gear of the fourth simple planetary gearset;
the sixth operating element is a combination of a planet carrier of the third simple planetary gearset and a planet carrier of the fourth simple planetary gearset;
the seventh operating element is a ring gear of the third simple planetary gearset; and
the eighth operating element is a sun gear of the fourth simple planetary gearset.

15. The powertrain of claim 14, wherein the clutch means comprises a first clutch interposed between the combination of the planet carrier and ring gear of the first and second simple planetary gearsets and the combination of the sun gear and ring gear of the third and fourth simple planetary gearsets, and a second clutch interposed between the combination of the planet carrier and ring gear of the first and second simple planetary gearsets and the combination of the planet carriers of the third and fourth simple planetary gearsets.

16. The powertrain of claim 14, wherein the brake means comprises a first brake interposed between the ring gear of the first simple planetary gearset and the transmission housing, and a second brake interposed between the sun gear of the fourth simple planetary gearset and the transmission housing.

17. The powertrain of claim 12, wherein the fifth operating element is a sun gear of the fourth simple planetary gearset;
the sixth operating element is a combination of a ring gear of the third simple planetary gearset and a planet carrier of the fourth simple planetary gearset;
the seventh operating element is a combination of a planet carrier of the third simple planetary gearset and a ring gear of the fourth simple planetary gearset; and
the eighth operating element is a sun gear of the third simple planetary gearset.

18. The powertrain of claim 17, wherein the clutch means comprises a first clutch interposed between the combination of the planet carrier and ring gear of the first and second simple planetary gearsets and the sun gear of the fourth simple planetary gearset, and a second clutch interposed between the combination of the planet carrier and ring gear of the first and second simple planetary gearsets and the combination of the ring gear and planet carrier of the third and fourth simple planetary gearsets.

19. The powertrain of claim 17, wherein the brake means comprises a first brake interposed between the ring gear of the first simple planetary gearset and the transmission housing, and a second brake interposed between the sun gear of the third simple planetary gearset and the transmission housing.

20. The powertrain of claim 12, wherein the fifth operating element is a ring gear of the fourth simple planetary gearset;
the sixth operating element is a combination of a ring gear of the third simple planetary gearset and a planet carrier of the fourth simple planetary gearset;
the seventh operating element is a planet carrier of the third simple planetary gearset; and
the eighth operating element is a combination of a sun gear of the third simple planetary gearset and a sun gear of the fourth simple planetary gearset.

21. The powertrain of claim 20, wherein the clutch means comprises a first clutch interposed between the combination of the planet carrier and ring gear of the first and second simple planetary gearsets and the ring gear of the fourth simple planetary gearset, and a second clutch interposed between the combination of the planet carrier and ring gear of the first and second simple planetary gearsets and the combination of the ring gear and planet carrier of the third and fourth simple planetary gearsets.

22. The powertrain of claim 20, wherein the brake means comprises a first brake interposed between the ring gear of the first simple planetary gearset and the transmission housing, and a second brake interposed between the combination of the sun gears of the third and fourth simple planetary gearsets and the transmission housing.

23. The powertrain of claim 11, wherein the first operating element is a sun gear of the first simple planetary gearset;
the second operating element is a combination of a planet carrier of the first simple planetary gearset and a sun gear of the second simple planetary gearset;
the third operating element is a combination of a ring gear of the first simple planetary gearset and a ring gear of the second simple planetary gearset; and
the fourth operating element is a planet carrier of the second simple planetary gearset.

24. The powertrain of claim 11, wherein the fifth operating element is a combination of a sun gear of the third simple planetary gearset and a ring gear of the fourth simple planetary gearset;
the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

25. The powertrain of claim 23, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

26. The powertrain of claim 25, wherein the clutch means comprises a first clutch interposed between the combination of the planet carrier and sun gear of the first and second simple planetary gearsets and the combination of the sun gear and ring gear of the third and fourth simple planetary gearsets, and a second clutch interposed between the combination of the planet carrier and sun gear of the first and second simple planetary gearsets and the combination of the planet carriers of the third and fourth simple planetary gearsets.

27. The powertrain of claim 25, wherein the brake means comprises a first brake interposed between the combination of the ring gears of the first and second simple planetary gearsets and the transmission housing, and a second brake interposed between the sun gear of the fourth simple planetary gearset and the transmission housing.

28. The powertrain of claim 23, wherein the fifth operating element is a sun gear of the third simple planetary gearset;

the sixth operating element is a combination of a planet carrier of the third simple planetary gearset and a ring gear of the fourth simple planetary gearset;

the seventh operating element is a combination of a ring gear of the third simple planetary gearset and a planet carrier of the fourth simple planetary gearset; and the eighth operating element is a sun gear of the fourth simple planetary gearset.

29. The powertrain of claim 28, wherein the clutch means comprises a first clutch interposed between the combination of the planet carrier and sun gear of the first and second simple planetary gearsets and the sun gear of the third simple planetary gearset, and a second clutch interposed between the combination of the planet carrier and sun gear of the first and second simple planetary gearsets and the combination of the planet carrier and ring gear of the third and fourth simple planetary gearsets.

30. The powertrain of claim 28, wherein the brake means comprises a first brake interposed between the combination of the ring gears of the first and second simple planetary gearsets and the transmission housing, and a second brake interposed between the sun gear of the fourth simple planetary gearset and the transmission housing.

31. The powertrain of claim 11, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

32. The powertrain of claim 11, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

33. The powertrain of claim 31, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

34. The powertrain of claim 33, wherein the clutch means comprises a first clutch interposed between the combination of the sun gear and ring gear of the first and second simple planetary gearsets and the combination of the sun gear and ring gear of the third and fourth simple planetary gearsets, and a second clutch interposed between the combination of the sun gear and ring gear of the first and second simple planetary gearsets and the combination of the planet carriers of the third and fourth simple planetary gearsets.

35. The powertrain of claim 33, wherein the brake means comprises a first brake interposed between the planet carrier of the first simple planetary gearset and the transmission housing, and a second brake interposed between the sun gear of the fourth simple planetary gearset and the transmission housing.

36. The powertrain of claim 31, wherein the fifth operating element is a ring gear of the fourth simple planetary gearset;

the sixth operating element is a combination of a ring gear of the third simple planetary gearset and a planet carrier of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

37. The powertrain of claim 36, wherein the clutch means comprises a first clutch interposed between the combination of the sun gear and ring gear of the first and second simple planetary gearsets and the ring gear of the fourth simple planetary gearset, and a second clutch interposed between the combination of the sun gear and ring gear of the first and second simple planetary gearsets and the combination of the ring gear and planet carrier of the third and fourth simple planetary gearsets.

38. The powertrain of claim 36, wherein the brake means comprises a first brake interposed between the planet carrier of the first simple planetary gearset and the transmission housing, and a second brake interposed between the combination of the sun gears of the third and fourth simple planetary gearsets and the transmission housing.

39. The powertrain of claim 31, wherein the fifth operating element is a sun gear of the fourth simple planetary gearset;

the sixth operating element is a combination of a ring gear of the third simple planetary gearset and a planet carrier of the fourth simple planetary gearset;

the seventh operating element is a combination of a planet carrier of the third simple planetary gearset and a ring gear of the fourth simple planetary gearset; and the eighth operating element is a sun gear of the third simple planetary gearset.

40. The powertrain of claim 39, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the ring gear and planet carrier of the third and fourth simple planetary gearsets.

41. The powertrain of claim 39, wherein the brake means comprises a first brake interposed between the planet carrier of the first simple planetary gearset and the transmission housing, and a second brake interposed between the sun gear of the third simple planetary gearset and the transmission housing.

42. The powertrain of claim 1, wherein each of said first, second, and fourth simple planetary gearsets is a single pinion planetary gearset, while the third simple planetary gearset is a double pinion planetary gearset.

43. The powertrain of claim 42, wherein the first operating element is a sun gear of the second simple planetary gearset;

the second operating element is a combination of a sun gear of the first simple planetary gearset and a planet carrier of the second simple planetary gearset;

the third operating element is a combination of a planet carrier of the first simple planetary gearset and a ring gear of the second simple planetary gearset; and the fourth operating element is a ring gear of the first simple planetary gearset.

44. The powertrain of claim 42, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

45. The powertrain of claim 43, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

46. The powertrain of claim 45, wherein the clutch means comprises a first clutch interposed between the combination of the sun gear and planet carrier of the first and second simple planetary gearsets and the sun gear of the third simple planetary gearset, and a second clutch interposed between the combination of the sun gear and planet carrier of the first and second simple planetary gearsets and the combination of the ring gears of the third and fourth simple planetary gearsets.

47. The powertrain of claim 45, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

48. The powertrain of claim 1, wherein each of said first, second, and third simple planetary gearsets is a single pinion planetary gearset, while the fourth simple planetary gearset is a double pinion planetary gearset.

49. The powertrain of claim 48, wherein the first operating element is a sun gear of the second simple planetary gearset;

the second operating element is a combination of a sun gear of the first simple planetary gearset and a planet carrier of the second simple planetary gearset;

the third operating element is a combination of a planet carrier of the first simple planetary gearset and a ring gear of the second simple planetary gearset; and the fourth operating element is a ring gear of the first simple planetary gearset.

50. The powertrain of claim 48, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

51. The powertrain of claim 49, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

52. The powertrain of claim 51, wherein the clutch means comprises a first clutch interposed between the combination of the sun gear and planet carrier of the first and second simple planetary gearsets and the combination of sun gear and planet carrier of the third and fourth simple planetary gearsets, and a second clutch interposed between the combination of the sun gear and planet carrier of the first and second simple planetary gearsets and the combination of the planet carrier and ring gear of the third and fourth simple planetary gearsets.

53. The powertrain of claim 51, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

54. The powertrain of claim 49, wherein the fifth operating element is a combination of a sun gear of the third simple planetary gearset and a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a planet carrier of the fourth simple planetary gearset.

55. The powertrain of claim 54, wherein the clutch means comprises a first clutch interposed between the combination of the sun gear and planet carrier of the first and second simple planetary gearsets and the combination of sun gears of the third and fourth simple planetary gearsets, and a second clutch interposed between the combination of the sun gear and planet carrier of the first and second simple planetary gearsets and the planet carrier of the third simple planetary gearset.

56. The powertrain of claim 54, wherein the brake means comprises a first brake interposed between the combination of the planet carrier and ring gear of the first and second simple planetary gearsets and the transmission housing, and a second brake interposed between the planet carrier of the fourth simple planetary gearset and the transmission housing.

57. The powertrain of claim 49, wherein the fifth operating element is a sun gear of the third simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the fourth simple planetary gearset.

58. The powertrain of claim 57, wherein the clutch means comprises a first clutch interposed between the combination of the sun gear and planet carrier of the first and second simple planetary gearsets and the sun gear of the third simple planetary gearset, and a second clutch interposed between the combination of the sun gear and planet carrier of the first and second simple planetary gearsets and the combination of the planet carriers of the third and fourth simple planetary gearsets.

59. The powertrain of claim 57, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

60. The powertrain of claim 49, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

61. The powertrain of claim 60, wherein the clutch means comprises a first clutch interposed between the combination of the sun gear and planet carrier of the first and second simple planetary gearsets and the sun gear of the fourth simple planetary gearset, and a second clutch interposed between the combination of the sun gear and planet carrier of the first and second simple planetary gearsets and the ring gear of the third simple planetary gearset.

62. The powertrain of claim 60, wherein the brake means comprises a first brake interposed between the combination of the planet carrier and ring gear of the first and second simple planetary gearsets and the transmission housing, and a second brake interposed between the combination of the sun gear and planet carrier of the third and fourth simple planetary gearsets and the transmission housing.

63. The powertrain of claim 1, wherein each of said first and second simple planetary gearsets is a single pinion planetary gearset, while the third and fourth simple planetary gearsets are double pinion planetary gearsets.

64. The powertrain of claim 63, wherein the first operating element is a sun gear of the second simple planetary gearset;

the second operating element is a combination of a sun gear of the first simple planetary gearset and a planet carrier of the second simple planetary gearset;

the third operating element is a combination of a planet carrier of the first simple planetary gearset and a ring gear of the second simple planetary gearset; and the fourth operating element is a ring gear of the first simple planetary gearset.

65. The powertrain of claim 63, wherein the fifth operating element is a combination of a planet carrier of the third simple planetary gearset and a sun gear of the fourth simple planetary gearset;

the sixth operating element is a combination of a ring gear of the third simple planetary gearset and a ring gear of the fourth simple planetary gearset;

the seventh operating element is a planet carrier of the fourth simple planetary gearset; and the eighth operating element is a sun gear of the third simple planetary gearset.

66. The powertrain of claim 64, wherein the fifth operating element is a combination of a planet carrier of the third simple planetary gearset and a sun gear of the fourth simple planetary gearset;

the sixth operating element is a combination of a ring gear of the third simple planetary gearset and a ring gear of the fourth simple planetary gearset;

the seventh operating element is a planet carrier of the fourth simple planetary gearset; and the eighth operating element is a sun gear of the third simple planetary gearset.

67. The powertrain of claim 66, wherein the clutch means comprises a first clutch interposed between the combination of the sun gear and planet carrier of the first and second simple planetary gearsets and the combination of the planet carrier and sun gear of the third and fourth simple planetary gearsets, and a second clutch interposed between the combination of the sun gear and planet carrier of the first and second simple planetary gearsets and the combination of the ring gears of the third and fourth simple planetary gearsets.

68. The powertrain of claim 66, wherein the brake means comprises a first brake interposed between the combination of the planet carrier and ring gear of the first and second simple planetary gearsets and the transmission housing, and a second brake interposed between the sun gear of the third simple planetary gearset and the transmission housing.

69. The powertrain of claim 63, wherein the fifth operating element is a combination of a sun gear of the third simple planetary gearset and a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a planet carrier of the fourth simple planetary gearset.

70. The powertrain of claim 64, wherein the fifth operating element is a combination of a sun gear of the third simple planetary gearset and a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a planet carrier of the fourth simple planetary gearset.

71. The powertrain of claim 70, wherein the clutch means comprises a first clutch interposed between the combination of the sun gear and planet carrier of the first and second simple planetary gearsets and the combination of the sun gears of the third and fourth simple planetary gearsets, and a second clutch interposed between the combination of the sun gear and planet carrier of the first and second simple planetary gearsets and the ring gear of the third simple planetary gearset.

72. The powertrain of claim 70, wherein the brake means comprises a first brake interposed between the combination of the planet carrier and ring gear of the first and second simple planetary gearsets and the transmission housing, and a second brake interposed between the planet carrier of the fourth simple planetary gearset and the transmission housing.

73. The powertrain of claim 63, wherein the fifth operating element is a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a combination of a sun gear of the third simple planetary gearset and a planet carrier of the fourth simple planetary gearset.

74. The powertrain of claim 64, wherein the fifth operating element is a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a combination of a sun gear of the third simple planetary gearset and a planet carrier of the fourth simple planetary gearset.

75. The powertrain of claim 74, wherein the clutch means comprises a first clutch interposed between the combination of the sun gear and planet carrier of the first and second simple planetary gearsets and the sun gear of the fourth simple planetary gearset, and a second clutch interposed between the combination of the sun gear and planet carrier of the first and second simple planetary gearsets and the planet carrier of the third simple planetary gearset.

76. The powertrain of claim 74, wherein the brake means comprises a first brake interposed between the combination of the planet carrier and ring gear of the first and second simple planetary gearsets and the transmission housing, and a second brake interposed between the combination of the sun gear and planet carrier of the third and fourth simple planetary gearsets and the transmission housing.

77. The powertrain of claim 1, wherein each of said first and third simple planetary gearsets is a single pinion planetary gearset, while the second and fourth simple planetary gearsets are double pinion planetary gearsets.

78. The powertrain of claim 77, wherein the first operating element is a combination of a sun gear of the first simple planetary gearset and a sun gear of the second simple planetary gearset;

the second operating element is a combination of a planet carrier of the first simple planetary gearset and a ring gear of the second simple planetary gearset;

the third operating element is a ring gear of the first simple planetary gearset; and the fourth operating element is a planet carrier of the second simple planetary gearset.

79. The powertrain of claim 77, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

80. The powertrain of claim 78, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

81. The powertrain of claim 80, wherein the clutch means comprises a first clutch interposed between the combination of the planet carrier and ring gear of the first and second simple planetary gearsets and the combination of the sun gear and planet carrier of the third and fourth simple planetary gearsets, and a second clutch interposed between the combination of the planet carrier and ring gear of the first and second simple planetary gearsets and the combination of the planet carrier and ring gear of the third and fourth simple planetary gearsets.

82. The powertrain of claim 80, wherein the brake means comprises a first brake interposed between the ring gear of the first simple planetary gearset and the transmission housing, and a second brake interposed between the sun gear of the fourth simple planetary gearset and the transmission housing.

83. The powertrain of claim 77, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

84. The powertrain of claim 78, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

85. The powertrain of claim 84, wherein the clutch means comprises a first clutch interposed between the combination of the planet carrier and ring gear of the first and second simple planetary gearsets and the planet carrier of the fourth simple planetary gearset, and a second clutch interposed between the combination of the planet carrier and ring gear of the first and second simple planetary gearsets and the combination of the ring gears of the third and fourth simple planetary gearsets.

86. The powertrain of claim 84, wherein the brake means comprises a first brake interposed between the ring gear of the first simple planetary gearset and the transmission housing, and a second brake interposed between the combination of the sun gears of the third and fourth simple planetary gearsets and the transmission housing.

87. The powertrain of claim 77, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

88. The powertrain of claim 78, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

89. The powertrain of claim 88, wherein the clutch means comprises a first clutch interposed between the combination of the planet carrier and ring gear of the first and second simple planetary gearsets and the sun gear of the fourth simple planetary gearset, and a second clutch interposed between the combination of the planet carrier and ring gear of the first and second simple planetary gearsets and the combination of the ring gears of the third and fourth simple planetary gearsets.

90. The powertrain of claim 88, wherein the brake means comprises a first brake interposed between the ring gear of the first simple planetary gearset and the transmission housing, and a second brake interposed between the sun gear of the third simple planetary gearset and the transmission housing.

91. The powertrain of claim 77, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

92. The powertrain of claim 78, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

93. The powertrain of claim 92, wherein the clutch means comprises a first clutch interposed between the combination of the planet carrier and ring gear of the first and second simple planetary gearsets and the sun gear of the fourth simple planetary gearset, and a second clutch interposed between the combination of the planet carrier and ring gear of the first and second simple planetary gearsets and the ring gear of the third simple planetary gearset.

94. The powertrain of claim 92, wherein the brake means comprises a first brake interposed between the ring gear of the first simple planetary gearset and the transmission housing, and a second brake interposed between the combination of the sun gear and planet carrier of the third and fourth simple planetary gearsets and the transmission housing.

95. The powertrain of claim 77, wherein the first operating element is a sun gear of the first simple planetary gearset;

the second operating element is a combination of a planet carrier of the first simple planetary gearset and a sun gear of the second simple planetary gearset;

the third operating element is a ring gear of the first simple planetary gearset and a ring gear of the second simple planetary gearset; and the fourth operating element is a planet carrier of the second simple planetary gearset.

96. The powertrain of claim 79, wherein the first operating element is a sun gear of the first simple planetary gearset;

the second operating element is a combination of a planet carrier of the first simple planetary gearset and a sun gear of the second simple planetary gearset;

the third operating element is a ring gear of the first simple planetary gearset and a ring gear of the second simple planetary gearset; and the fourth operating element is a planet carrier of the second simple planetary gearset.

97. The powertrain of claim 96, wherein the clutch means comprises a first clutch interposed between the combination of the planet carrier and sun gear of the first and second simple planetary gearsets and the combination of the sun gear and planet carrier of the third and fourth simple planetary gearsets, and a second clutch interposed between the combination of the planet carrier and sun gear of the first and second simple planetary gearsets and the combination of the planet carrier and ring gear of the third and fourth simple planetary gearsets.

98. The powertrain of claim 96, wherein the brake means comprises a first brake interposed between the combination of the ring gears of the first and second simple planetary gearsets and the transmission housing, and a second brake interposed between the sun gear of the fourth simple planetary gearset and the transmission housing.

99. The powertrain of claim 77, wherein the fifth operating element is a combination of a sun gear of the third simple planetary gearset and a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a planet carrier of the fourth simple planetary gearset.

100. The powertrain of claim 95, wherein the fifth operating element is a combination of a sun gear of the third simple planetary gearset and a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a planet carrier of the fourth simple planetary gearset.

101. The powertrain of claim 100, wherein the clutch means comprises a first clutch interposed between the combination of the planet carrier and sun gear of the first and second simple planetary gearsets and the combination of the sun gears of the third and fourth simple planetary gearsets, and a second clutch interposed between the combination of the planet carrier and sun gear of the first and second simple planetary gearsets and the planet carrier of the third simple planetary gearset.

102. The powertrain of claim 100, wherein the brake means comprises a first brake interposed between the combination of the ring gears of the first and second simple planetary gearsets and the transmission housing, and a second brake interposed between the planet carrier of the fourth simple planetary gearset and the transmission housing.

103. The powertrain of claim 77, wherein the fifth operating element is a sun gear of the third simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the fourth simple planetary gearset.

104. The powertrain of claim 95, wherein the fifth operating element is a sun gear of the third simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the fourth simple planetary gearset.

105. The powertrain of claim 104, wherein the clutch means comprises a first clutch interposed between the combination of the planet carrier and sun gear of the first and second simple planetary gearsets and the sun gear of the third simple planetary gearset, and a second clutch interposed between the combination of the planet carrier and sun gear of the first and second simple planetary gearsets and the combination of the planet carriers of the third and fourth simple planetary gearsets.

106. The powertrain of claim 104, wherein the brake means comprises a first brake interposed between the combination of the ring gears of the first and second simple planetary gearsets and the transmission housing, and a second brake interposed between the sun gear of the fourth simple planetary gearset and the transmission housing.

107. The powertrain of claim 95, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

108. The powertrain of claim 107, wherein the clutch means comprises a first clutch interposed between the combination of the planet carrier and sun gear of the first and second simple planetary gearsets and the sun gear of the fourth simple planetary gearset, and a second clutch interposed between the combination of the planet carrier and sun gear of the first and second simple planetary gearsets and the ring gear of the third simple planetary gearset.

109. The powertrain of claim 107, wherein the brake means comprises a first brake interposed between the combination of the ring gears of the first and second simple planetary gearsets and the transmission housing, and a second brake interposed between the combination of the sun gear and planet carrier of the third and fourth simple planetary gearsets and the transmission housing.

110. The powertrain of claim 77, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

111. The powertrain of claim 79, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

112. The powertrain of claim 111, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the combination of the planet carrier and ring gear of the third and fourth simple planetary gearsets.

113. The powertrain of claim 111, wherein the brake means comprises a first brake interposed between the planet carrier of the first simple planetary gearset and the transmission housing, and a second brake interposed between the sun gear of the fourth simple planetary gearset and the transmission housing.

114. The powertrain of claim 110, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

115. The powertrain of claim 114, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the ring gears of the third and fourth simple planetary gearsets.

116. The powertrain of claim 114, wherein the brake means comprises a first brake interposed between the planet carrier of the first simple planetary gearset and the transmission housing, and a second brake interposed between the sun gear of the third simple planetary gearset and the transmission housing.

117. The powertrain of claim 110, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

118. The powertrain of claim 117, wherein the clutch means comprises a first clutch interposed between the combination of the sun gear and ring gear of the first and second simple planetary gearsets and the planet carrier of the fourth simple planetary gearset, and a second clutch interposed between the combination of the sun gear and ring gear of the first and second simple planetary gearsets and the combination of the ring gears of the third and fourth simple planetary gearsets.

119. The powertrain of claim 117, wherein the brake means comprises a first brake interposed between the planet carrier of the first simple planetary gearset and the transmission housing, and a second brake interposed between the combination of the sun gears of the third and fourth simple planetary gearsets and the transmission housing.

120. The powertrain of claim 110, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

121. The powertrain of claim 120, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the ring gear of the third simple planetary gearset.

122. The powertrain of claim 120, wherein the brake means comprises a first brake interposed between the planet carrier of the first simple planetary gearset and the transmission housing, and a second brake interposed between the combination of the sun gear and planet carrier of the third and fourth simple planetary gearsets and the transmission housing.

123. The powertrain of claim 1, wherein each of said first and fourth simple planetary gearsets is a single pinion planetary gearset, while the second and third simple planetary gearsets are double pinion planetary gearsets.

124. The powertrain of claim 123, wherein the first operating element is a combination of a sun gear of the first simple planetary gearset and a sun gear of the second simple planetary gearset;

the second operating element is a combination of a planet carrier of the first simple planetary gearset and a ring gear of the second simple planetary gearset;

the third operating element is a ring gear of the first simple planetary gearset; and the fourth operating element is a planet carrier of the second simple planetary gearset.

125. The powertrain of claim 123, wherein the fifth operating element is a sun gear of the fourth simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the third simple planetary gearset.

126. The powertrain of claim 124, wherein the fifth operating element is a sun gear of the fourth simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the third simple planetary gearset.

127. The powertrain of claim 126, wherein the clutch means comprises a first clutch interposed between the combination of the planet carrier and ring gear of the first and second simple planetary gearsets and the sun gear of the fourth simple planetary gearset, and a second clutch interposed between the combination of the planet carrier and ring gear of the first and second simple planetary gearsets and the combination of the planet carriers of the third and fourth simple planetary gearsets.

128. The powertrain of claim 126, wherein the brake means comprises a first brake interposed between the ring gear of the first simple planetary gearset and the transmission housing, and a second brake interposed between the sun gear of the third simple planetary gearset and the transmission housing.

129. The powertrain of claim 124, wherein the fifth operating element is a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a combination of a sun gear of the third simple planetary gearset and a sun gear of the fourth simple planetary gearset.

130. The powertrain of claim 129, wherein the clutch means comprises a first clutch interposed between the combination of the planet carrier and ring gear of the first and second simple planetary gearsets and the ring gear of the fourth simple planetary gearset, and a second clutch interposed between the combination of the planet carrier and ring gear of the first and second simple planetary gearsets and the combination of the planet carriers of the third and fourth simple planetary gearsets.

131. The powertrain of claim 129, wherein the brake means comprises a first brake interposed between the ring gear of the first simple planetary gearset and the transmission housing, and a second brake interposed between the combination of the sun gears of the third and fourth simple planetary gearsets and the transmission housing.

132. The powertrain of claim 123, wherein the first operating element is a sun gear of the first simple planetary gearset;

the second operating element is a combination of a planet carrier of the first simple planetary gearset and a sun gear of the second simple planetary gearset;

the third operating element is a combination of a ring gear of the first simple planetary gearset and a ring gear of the second simple planetary gearset; and the fourth operating element is a planet carrier of the second simple planetary gearset.

133. The powertrain of claim 123, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

134. The powertrain of claim 132, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

135. The powertrain of claim 134, wherein the clutch means comprises a first clutch interposed between the combination of the planet carrier and sun gear of the first and second simple planetary gearsets and the sun gear of the third simple planetary gearset, and a second clutch interposed between the combination of the planet carrier and sun gear of the first and second simple planetary gearsets and the combination of the ring gears of the third and fourth simple planetary gearsets.

136. The powertrain of claim 134, wherein the brake means comprises a first brake interposed between the combination of the ring gears of the first and second simple planetary gearsets and the transmission housing, and a second brake interposed between the sun gear of the fourth simple planetary gearset and the transmission housing.

137. The powertrain of claim 123, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

138. The powertrain of claim 137, wherein the fifth operating element is a sun gear of the fourth simple planetary gearset;

the sixth operating element is a combination of a planet carrier of the third simple planetary gearset and a planet carrier of the fourth simple planetary gearset;

the seventh operating element is a combination of a ring gear of the third simple planetary gearset and a ring gear of the fourth simple planetary gearset; and the eighth operating element is a sun gear of the third simple planetary gearset.

139. The powertrain of claim 138, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the planet carriers of the third and fourth simple planetary gearsets.

140. The powertrain of claim 138, wherein the brake means comprises a first brake interposed between the planet carrier of the first simple planetary gearset and the transmission housing, and a second brake interposed between the sun gear of the third simple planetary gearset and the transmission housing.

141. The powertrain of claim 137, wherein the fifth operating element is a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a combination of a sun gear of the third simple planetary gearset and a sun gear of the fourth simple planetary gearset.

142. The powertrain of claim 141, wherein the clutch means comprises a first clutch interposed between the combination of the sun gear and ring gear of the first and second simple planetary gearsets and the ring gear of the fourth simple planetary gearset, and a second clutch interposed between the combination of the sun gear and ring gear of the first and second simple planetary gearsets and the combination of the planet carriers of the third and fourth simple planetary gearsets.

143. The powertrain of claim 141, wherein the brake means comprises a first brake interposed between the planet carrier of the first simple planetary gearset and the transmission housing, and a second brake interposed between the combination of the sun gears of the third and fourth simple planetary gearsets and the transmission housing.

144. The powertrain of claim 1, wherein said first simple planetary gearset is a single pinion planetary gearset, while the second, third, and fourth simple planetary gearsets are double pinion planetary gearsets.

145. The powertrain of claim 144, wherein the first operating element is a combination of a sun gear of the first simple planetary gearset and a sun gear of the second simple planetary gearset;

the second operating element is a combination of a planet carrier of the first simple planetary gearset and a ring gear of the second simple planetary gearset;

the third operating element is a ring gear of the first simple planetary gearset; and the fourth operating element is a planet carrier of the second simple planetary gearset.

146. The powertrain of claim 144, wherein the fifth operating element is a combination of a sun gear of the third simple planetary gearset and a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a sun gear of the fourth simple planetary gearset.

147. The powertrain of claim 145, wherein the fifth operating element is a combination of a sun gear of the third simple planetary gearset and a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a sun gear of the fourth simple planetary gearset.

148. The powertrain of claim 147, wherein the clutch means comprises a first clutch interposed between the combination of the planet carrier and ring gear of the first and second simple planetary gearsets and the combination of the sun gear and planet carrier of the third and fourth simple planetary gearsets, and a second clutch interposed between the combination of the planet carrier and ring gear of the first and second simple planetary gearsets and the combination of the ring gears of the third and fourth simple planetary gearsets.

149. The powertrain of claim 147, wherein the brake means comprises a first brake interposed between the ring gear of the first simple planetary gearset and the transmission housing, and a second brake interposed between the sun gear of the fourth simple planetary gearset and the transmission housing.

150. The powertrain of claim 144, wherein the fifth operating element is a combination of a sun gear of the third simple planetary gearset and a sun gear of the fourth simple planetary gearset;

the sixth operating element is a ring gear of the fourth simple planetary gearset;

the seventh operating element is a combination of a ring gear of the third simple planetary gearset and a planet carrier of the fourth simple planetary gearset; and the eighth operating element is a planet carrier of the third simple planetary gearset.

151. The powertrain of claim 145, wherein the fifth operating element is a combination of a sun gear of the third simple planetary gearset and a sun gear of the fourth simple planetary gearset;

the sixth operating element is a ring gear of the fourth simple planetary gearset;

the seventh operating element is a combination of a ring gear of the third simple planetary gearset and a planet carrier of the fourth simple planetary gearset; and the eighth operating element is a planet carrier of the third simple planetary gearset.

152. The powertrain of claim 151, wherein the clutch means comprises a first clutch interposed between the combination of the planet carrier and ring gear of the first and second simple planetary gearsets and the combination of the sun gears of the third and fourth simple planetary gearsets, and a second clutch interposed between the combination of the planet carrier and ring gear of the first and second simple planetary gearsets and the ring gear of the fourth simple planetary gearset.

153. The powertrain of claim 151, wherein the brake means comprises a first brake interposed between the ring gear of the first simple planetary gearset and the transmission housing, and a second brake interposed between the planet carrier of the third simple planetary gearset and the transmission housing.

154. The powertrain of claim 144, wherein the fifth operating element is a combination of a sun gear of the third simple planetary gearset and a planet carrier of the fourth simple planetary gearset;

the sixth operating element is a ring gear of the fourth simple planetary gearset;

the seventh operating element is a ring gear of the third simple planetary gearset; and the eighth operating element is a combination of a planet carrier of the third simple planetary gearset and a sun gear of the fourth simple planetary gearset.

155. The powertrain of claim 145, wherein the fifth operating element is a combination of a sun gear of the third simple planetary gearset and a planet carrier of the fourth simple planetary gearset;

the sixth operating element is a ring gear of the fourth simple planetary gearset;

the seventh operating element is a ring gear of the third simple planetary gearset; and the eighth operating element is a combination of a planet carrier of the third simple planetary gearset and a sun gear of the fourth simple planetary gearset.

156. The powertrain of claim 155, wherein the clutch means comprises a first clutch interposed between the combination of the planet carrier and ring gear of the first and second simple planetary gearsets and the combination of the sun gear and planet carrier of the third and fourth simple planetary gearsets, and a second clutch interposed between the combination of the planet carrier and ring gear of the first and second simple planetary gearsets and the ring gear of the fourth simple planetary gearset.

157. The powertrain of claim 155, wherein the brake means comprises a first brake interposed between the ring gear of the first simple planetary gearset and the transmission housing, and a second brake interposed between the combination of the planet carrier and sun gear of the third and fourth simple planetary gearsets and the transmission housing.

158. The powertrain of claim 144, wherein the fifth operating element is a sun gear of the third simple planetary gearset;
 the sixth operating element is a planet carrier of the fourth simple planetary gearset;
 the seventh operating element is a combination of a ring gear of the third simple planetary gearset and a ring gear of the fourth simple planetary gearset; and
 the eighth operating element is a combination of a planet carrier of the third simple planetary gearset and a sun gear of the fourth simple planetary gearset.

159. The powertrain of claim 145, wherein the fifth operating element is a sun gear of the third simple planetary gearset;
 the sixth operating element is a planet carrier of the fourth simple planetary gearset;
 the seventh operating element is a combination of a ring gear of the third simple planetary gearset and a ring gear of the fourth simple planetary gearset; and
 the eighth operating element is a combination of a planet carrier of the third simple planetary gearset and a sun gear of the fourth simple planetary gearset.

160. The powertrain of claim 159, wherein the clutch means comprises a first clutch interposed between the combination of the planet carrier and ring gear of the first and second simple planetary gearsets and the sun gear of the third simple planetary gearset, and a second clutch interposed between the combination of the planet carrier and ring gear of the first and second simple planetary gearsets and the planet carrier of the fourth simple planetary gearset.

161. The powertrain of claim 159, wherein the brake means comprises a first brake interposed between the ring gear of the first simple planetary gearset and the transmission housing, and a second brake interposed between the combination of the planet carrier and sun gear of the third and fourth simple planetary gearsets and the transmission housing.

162. The powertrain of claim 144, wherein the first operating element is a sun gear of the first simple planetary gearset;
 the second operating element is a combination of a planet carrier of the first simple planetary gearset and a sun gear of the second simple planetary gearset;
 the third operating element is a combination of a ring gear of the first simple planetary gearset and a ring gear of the second simple planetary gearset; and
 the fourth operating element is a planet carrier of the second simple planetary gearset.

163. The powertrain of claim 144, wherein the fifth operating element is a combination of a planet carrier of the third simple planetary gearset and a sun gear of the fourth simple planetary gearset;
 the sixth operating element is a combination of a ring gear of the third simple planetary gearset and a ring gear of the fourth simple planetary gearset;
 the seventh operating element is a planet carrier of the fourth simple planetary gearset; and
 the eighth operating element is a sun gear of the third simple planetary gearset.

164. The powertrain of claim 162, wherein the fifth operating element is a combination of a planet carrier of the third simple planetary gearset and a sun gear of the fourth simple planetary gearset;
 the sixth operating element is a combination of a ring gear of the third simple planetary gearset and a ring gear of the fourth simple planetary gearset;
 the seventh operating element is a planet carrier of the fourth simple planetary gearset; and
 the eighth operating element is a sun gear of the third simple planetary gearset.

165. The powertrain of claim 164, wherein the clutch means comprises a first clutch interposed between the combination of the planet carrier and sun gear of the first and second simple planetary gearsets and the combination of the planet carrier and sun gear of the third and fourth simple planetary gearsets, and a second clutch interposed between the combination of the planet carrier and sun gear of the first and second simple planetary gearsets and the combination of the ring gears of the third and fourth simple planetary gearsets.

166. The powertrain of claim 164, wherein the brake means comprises a first brake interposed between the ring gears of the first and second simple planetary gearsets and the transmission housing, and a second brake interposed between the sun gear of the third simple planetary gearset and the transmission housing.

167. The powertrain of claim 144, wherein the fifth operating element is a combination of a sun gear of the third simple planetary gearset and a sun gear of the fourth simple planetary gearset;
 the sixth operating element is a ring gear of the third simple planetary gearset;
 the seventh operating element is a combination of a planet carrier of the third simple planetary gearset and a ring gear of the fourth simple planetary gearset; and
 the eighth operating element is a planet carrier of the fourth simple planetary gearset.

168. The powertrain of claim 162, wherein the fifth operating element is a combination of a sun gear of the third simple planetary gearset and a sun gear of the fourth simple planetary gearset;
 the sixth operating element is a ring gear of the fourth simple planetary gearset;
 the seventh operating element is a combination of a planet carrier of the third simple planetary gearset and a ring gear of the fourth simple planetary gearset; and
 the eighth operating element is a planet carrier of the fourth simple planetary gearset.

169. The powertrain of claim 168, wherein the clutch means comprises a first clutch interposed between the combination of the planet carrier and sun gear of the first and second simple planetary gearsets and the combination of the sun gears of the third and fourth simple planetary gearsets, and a second clutch interposed between the combination of the planet carrier and sun gear of the first and second simple planetary gearsets and the ring gear of the third simple planetary gearset.

170. The powertrain of claim 168, wherein the brake means comprises a first brake interposed between the combination of the ring gears of the first and second simple planetary gearsets and the transmission housing, and a second brake interposed between the planet carrier of the fourth simple planetary gearset and the transmission housing.

171. The powertrain of claim 144, wherein the fifth operating element is a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a combination of a sun gear of the third simple planetary gearset and a planet carrier of the fourth simple planetary gearset.

172. The powertrain of claim 162, wherein the fifth operating element is a sun gear of the fourth simple planetary gearset;

the sixth operating element is a planet carrier of the third simple planetary gearset;

the seventh operating element is a combination of a ring gear of the third simple planetary gearset and a planet carrier of the fourth simple planetary gearset; and the eighth operating element is a combination of a sun gear of the third simple planetary gearset and a planet carrier of the fourth simple planetary gearset.

173. The powertrain of claim 172, wherein the clutch means comprises a first clutch interposed between the combination of the planet carrier and sun gear of the first and second simple planetary gearsets and the sun gear of the fourth simple planetary gearset, and a second clutch interposed between the combination of the planet carrier and sun gear of the first and second simple planetary gearsets and the planet carrier of the third simple planetary gearset.

174. The powertrain of claim 172, wherein the brake means comprises a first brake interposed between the combination of the ring gears of the first and second simple planetary gearsets and the transmission housing, and a second brake interposed between the combination of the sun gear and planet carrier of the third and fourth simple planetary gearsets and the transmission housing.

175. The powertrain of claim 144, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

176. The powertrain of claim 146, wherein the first operating element is a sun gear of the second simple planetary gearset;

the second operating element is a combination of a sun gear of the first simple planetary gearset and a ring gear of the second simple planetary gearset;

the third operating element is a planet carrier of the first simple planetary gearset; and the fourth operating element is a combination of a ring gear of the first simple planetary gearset and a planet carrier of the second simple planetary gearset.

177. The powertrain of claim 176, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the combination of the ring gears of the third and fourth simple planetary gearsets.

178. The powertrain of claim 176, wherein the brake means comprises a first brake interposed between the planet carrier of the first simple planetary gearset and the transmission housing, and a second brake interposed between the sun gear of the fourth simple planetary gearset and the transmission housing.

179. The powertrain of claim 175, wherein the fifth operating element is a combination of a sun gear of the third simple planetary gearset and a sun gear of the fourth simple planetary gearset;

the sixth operating element is a ring gear of the fourth simple planetary gearset;

the seventh operating element is a combination of a ring gear of the third simple planetary gearset and a planet carrier of the fourth simple planetary gearset; and the eighth operating element is a planet carrier of the third simple planetary gearset.

180. The powertrain of claim 179, wherein the clutch means comprises a first clutch interposed between the combination of the sun gear and ring gear of the first and second simple planetary gearsets and the combination of the sun gears of the third and fourth simple planetary gearsets, and a second clutch interposed between the combination of the sun gear and ring gear of the first and second simple planetary gearsets and the ring gear of the fourth simple planetary gearset.

181. The powertrain of claim 179, wherein the brake means comprises a first brake interposed between the planet carrier of the first simple planetary gearset and the transmission housing, and a second brake interposed between the planet carrier of the third simple planetary gearset and the transmission housing.

182. The powertrain of claim 175, wherein the fifth operating element is a combination of a sun gear of the third simple planetary gearset and a planet carrier of the fourth simple planetary gearset;

the sixth operating element is a ring gear of the fourth simple planetary gearset;

the seventh operating element is a ring gear of the third simple planetary gearset; and the eighth operating element is a combination of a planet carrier of the third simple planetary gearset and a sun gear of the fourth simple planetary gearset.

183. The powertrain of claim 182, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the ring gear of the fourth simple planetary gearset.

184. The powertrain of claim 182, wherein the brake means comprises a first brake interposed between the planet carrier of the first simple planetary gearset and the transmission housing, and a second brake interposed between the combination of the planet carrier and sun gear of the third and fourth simple planetary gearsets and the transmission housing.

185. The powertrain of claim 175, wherein the fifth operating element is a sun gear of the third simple planetary gearset;

the sixth operating element is a planet carrier of the fourth simple planetary gearset;

the seventh operating element is a combination of a ring gear of the third simple planetary gearset and a ring gear of the fourth simple planetary gearset; and the eighth operating element is a combination of a planet carrier of the third simple planetary gearset and a sun gear of the fourth simple planetary gearset.

186. The powertrain of claim 185, wherein the clutch means comprises a first clutch interposed between the combination of the sun gear and ring gear of the first and second simple planetary gearsets and the sun gear of the third simple planetary gearset, and a second clutch interposed between the combination of the sun gear and ring gear of the first and second simple planetary gearsets and the planet carrier of the fourth simple planetary gearset.

187. The powertrain of claim 185, wherein the brake means comprises a first brake interposed between the planet carrier of the first simple planetary gearset and the transmission housing, and a second brake interposed between the combination of the planet carrier and sun gear of the third and fourth simple planetary gearsets and the transmission housing.

188. The powertrain of claim 1, wherein said first, second, third, and fourth simple planetary gearsets are double pinion planetary gearsets.

189. The powertrain of claim 188, wherein the first operating element is a combination of a sun gear of the first simple planetary gearset and a sun gear of the second simple planetary gearset;

the second operating element is a combination of a ring gear of the first simple planetary gearset and a ring gear of the second simple planetary gearset;

the third operating element is a planet carrier of the first simple planetary gearset; and the fourth operating element is a planet carrier of the second simple planetary gearset.

190. The powertrain of claim 188, wherein the fifth operating element is a combination of a sun gear of the third simple planetary gearset and a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a sun gear of the fourth simple planetary gearset.

191. The powertrain of claim 189, wherein the fifth operating element is a combination of a sun gear of the third simple planetary gearset and a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a sun gear of the fourth simple planetary gearset.

192. The powertrain of claim 191, wherein the clutch means comprises a first clutch interposed between the combination of the ring gears of the first and second simple planetary gearsets and the combination of the sun gear and planet carrier of the third and fourth simple planetary gearsets, and a second clutch interposed between the combination of the ring gears of the first and second simple planetary gearsets and the combination of the ring gears of the third and fourth simple planetary gearsets.

193. The powertrain of claim 191, wherein the brake means comprises a first brake interposed between the planet carrier of the first simple planetary gearset and the transmission housing, and a second brake interposed between the sun gear of the fourth simple planetary gearset and the transmission housing.

194. The powertrain of claim 188, wherein the fifth operating element is a combination of a sun gear of the third simple planetary gearset and a sun gear of the fourth simple planetary gearset;

the sixth operating element is a ring gear of the fourth simple planetary gearset;

the seventh operating element is a combination of a ring gear of the third simple planetary gearset and a planet carrier of the fourth simple planetary gearset; and the eighth operating element is a planet carrier of the third simple planetary gearset.

195. The powertrain of claim 189, wherein the fifth operating element is a combination of a sun gear of the third simple planetary gearset and a sun gear of the fourth simple planetary gearset;

the sixth operating element is a ring gear of the fourth simple planetary gearset;

the seventh operating element is a combination of a ring gear of the third simple planetary gearset and a planet carrier of the fourth simple planetary gearset; and the eighth operating element is a planet carrier of the third simple planetary gearset.

196. The powertrain of claim 195, wherein the clutch means comprises a first clutch interposed between the combination of the ring gears of the first and second simple planetary gearsets and the combination of the sun gears of the third and fourth simple planetary gearsets, and a second clutch interposed between the combination of the ring gears of the first and second simple planetary gearsets and the ring gear of the fourth simple planetary gearset.

197. The powertrain of claim 195, wherein the brake means comprises a first brake interposed between the planet carrier of the first simple planetary gearset and the transmission housing, and a second brake interposed between the planet carrier of the third simple planetary gearset and the transmission housing.

198. The powertrain of claim 188, wherein the fifth operating element is a combination of a sun gear of the third simple planetary gearset and a planet carrier of the fourth simple planetary gearset;

the sixth operating element is a ring gear of the fourth simple planetary gearset;

the seventh operating element is a ring gear of the third simple planetary gearset; and the eighth operating element is a combination of a planet carrier of the third simple planetary gearset and a sun gear of the fourth simple planetary gearset.

199. The powertrain of claim 189, wherein the fifth operating element is a combination of a sun gear of the third simple planetary gearset and a planet carrier of the fourth simple planetary gearset;

the sixth operating element is a ring gear of the fourth simple planetary gearset;

the seventh operating element is a ring gear of the third simple planetary gearset; and the eighth operating element is a combination of a planet carrier of the third simple planetary gearset and a sun gear of the fourth simple planetary gearset.

200. The powertrain of claim 199, wherein the clutch means comprises a first clutch interposed between the combination of the ring gears of the first and second simple planetary gearsets and the combination of the sun gear and planet carrier of the third and fourth simple planetary gearsets, and a second clutch interposed between the combination of the ring gears of the first and second simple planetary gearsets and the ring gear of the fourth simple planetary gearset.

201. The powertrain of claim 199, wherein the brake means comprises a first brake interposed between the planet carrier of the first simple planetary gearset and the transmission housing, and a second brake interposed between the combination of the planet carrier and sun gear of the third and fourth simple planetary gearsets and the transmission housing.

202. The powertrain of claim 188, wherein the fifth operating element is a sun gear of the third simple planetary gearset;

the sixth operating element is a planet carrier of the fourth simple planetary gearset;

the seventh operating element is a combination of a ring gear of the third simple planetary gearset and a ring gear of the fourth simple planetary gearset; and the eighth operating element is a combination of a planet carrier of the third simple planetary gearset and a sun gear of the fourth simple planetary gearset.

203. The powertrain of claim 189, wherein the fifth operating element is a sun gear of the third simple planetary gearset;

the sixth operating element is a planet carrier of the fourth simple planetary gearset;

the seventh operating element is a combination of a ring gear of the third simple planetary gearset and a ring gear of the fourth simple planetary gearset; and the eighth operating element is a combination of a planet carrier of the third simple planetary gearset and a sun gear of the fourth simple planetary gearset.

204. The powertrain of claim 203, wherein the clutch means comprises a first clutch interposed between the combination of the ring gears of the first and second simple planetary gearsets and the sun gear of the third simple planetary gearset, and a second clutch interposed between the combination of the ring gears of the first and second simple planetary gearsets and the planet carrier of the fourth simple planetary gearset.

205. The powertrain of claim 203, wherein the brake means comprises a first brake interposed between the planet carrier of the first simple planetary gearset and the transmission housing, and a second brake interposed between the combination of the planet carrier and sun gear of the third and fourth simple planetary gearsets and the transmission housing.

206. The powertrain of claim 188, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

207. The powertrain of claim 188, wherein the fifth operating element is a combination of a planet carrier of the third simple planetary gearset and a sun gear of the fourth simple planetary gearset;

the sixth operating element is a combination of a ring gear of the third simple planetary gearset and a ring gear of the fourth simple planetary gearset;

the seventh operating element is a planet carrier of the fourth simple planetary gearset; and the eighth operating element is a sun gear of the third simple planetary gearset.

208. The powertrain of claim 206, wherein the fifth operating element is a combination of a planet carrier of the third simple planetary gearset and a sun gear of the fourth simple planetary gearset;

the sixth operating element is a combination of a ring gear of the third simple planetary gearset and a ring gear of the fourth simple planetary gearset;

the seventh operating element is a planet carrier of the fourth simple planetary gearset; and the eighth operating element is a sun gear of the third simple planetary gearset.

209. The powertrain of claim 208, wherein the clutch means comprises a first clutch interposed between the combination of the ring gear and sun gear of the first and second simple planetary gearsets and the combination of the planet carrier and sun gear of the third and fourth simple planetary gearsets, and a second clutch interposed between the combination of the ring gear and sun gear of the first and second simple planetary gearsets and the combination of the ring gears of the third and fourth simple planetary gearsets.

210. The powertrain of claim 208, wherein the brake means comprises a first brake interposed between the combination of the planet carrier and ring gear of the first and second simple planetary gearsets and the transmission housing, and a second brake interposed between the sun gear of the third simple planetary gearset and the transmission housing.

211. The powertrain of claim 206, wherein the fifth operating element is a combination of a sun gear of the third simple planetary gearset and a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a planet carrier of the fourth simple planetary gearset.

212. The powertrain of claim 211, wherein the clutch means comprises a first clutch interposed between the combination of the ring gear and sun gear of the first and second simple planetary gearsets and the combination of the sun gears of the third and fourth simple planetary gearsets, and a second clutch interposed between the combination of the ring gear and sun gear of the first and second simple planetary gearsets and the ring gear of the third simple planetary gearset.

213. The powertrain of claim 211, wherein the brake means comprises a first brake interposed between the combination of the planet carrier and ring gear of the first and second simple planetary gearsets and the transmission housing, and a second brake interposed between the planet carrier of the fourth simple planetary gearset and the transmission housing.

214. The powertrain of claim 206, wherein the fifth operating element is a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a combination of a sun gear of the third simple planetary gearset and a planet carrier of the fourth simple planetary gearset.

215. The powertrain of claim 214, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the planet carrier of the third simple planetary gearset.

216. The powertrain of claim 214, wherein the brake means comprises a first brake interposed between the combination of the planet carrier and ring gear of the first and second simple planetary gearsets and the transmission housing, and a second brake interposed between the combination of the sun gear and planet carrier of the third and fourth simple planetary gearsets and the transmission housing.

217. The powertrain of claim 188, wherein the first operating element is a sun gear of the second simple planetary gearset;
the second operating element is a combination of a sun gear of the first simple planetary gearset and a ring gear of the second simple planetary gearset;
the third operating element is a ring gear of the first simple planetary gearset; and
the fourth operating element is a combination of a planet carrier of the first simple planetary gearset and a planet carrier of the second simple planetary gearset.

218. The powertrain of claim 190, wherein the first operating element is a sun gear of the second simple planetary gearset;
the second operating element is a combination of a sun gear of the first simple planetary gearset and a ring gear of the second simple planetary gearset;
the third operating element is a ring gear of the first simple planetary gearset; and
the fourth operating element is a combination of a planet carrier of the first simple planetary gearset and a planet carrier of the second simple planetary gearset.

219. The powertrain of claim 218, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the combination of the ring gears of the third and fourth simple planetary gearsets.

220. The powertrain of claim 218, wherein the brake means comprises a first brake interposed between the ring gear of the first simple planetary gearset and the transmission housing, and a second brake interposed between the sun gear of the fourth simple planetary gearset and the transmission housing.

221. The powertrain of claim 194, wherein the first operating element is a sun gear of the second simple planetary gearset;
the second operating element is a combination of a sun gear of the first simple planetary gearset and a ring gear of the second simple planetary gearset;
the third operating element is a ring gear of the first simple planetary gearset; and
the fourth operating element is a combination of a planet carrier of the first simple planetary gearset and a planet carrier of the second simple planetary gearset.

222. The powertrain of claim 221, wherein the clutch means comprises a first clutch interposed between the combination of the sun gear and ring gear of the first and second simple planetary gearsets and the combination of the sun gears of the third and fourth simple planetary gearsets, and a second clutch interposed between the combination of the sun gear and ring gear of the first and second simple planetary gearsets and the ring gear of the fourth simple planetary gearset.

223. The powertrain of claim 221, wherein the brake means comprises a first brake interposed between the ring gear of the first simple planetary gearset and the transmission housing, and a second brake interposed between the planet carrier of the third simple planetary gearset and the transmission housing.

224. The powertrain of claim 198, wherein the first operating element is a sun gear of the second simple planetary gearset;
the second operating element is a combination of a sun gear of the first simple planetary gearset and a ring gear of the second simple planetary gearset;
the third operating element is a ring gear of the first simple planetary gearset; and
the fourth operating element is a combination of a planet carrier of the first simple planetary gearset and a planet carrier of the second simple planetary gearset.

225. The powertrain of claim 224, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the ring gear of the fourth simple planetary gearset.

226. The powertrain of claim 224, wherein the brake means comprises a first brake interposed between the ring gear of the first simple planetary gearset and the transmission housing, and a second brake interposed between the combination of the planet carrier and sun gear of the third and fourth simple planetary gearsets and the transmission housing.

227. The powertrain of claim 202, wherein the first operating element is a sun gear of the second simple planetary gearset;
the second operating element is a combination of a sun gear of the first simple planetary gearset and a ring gear of the second simple planetary gearset;
the third operating element is a ring gear of the first simple planetary gearset; and
the fourth operating element is a combination of a planet carrier of the first simple planetary gearset and a planet carrier of the second simple planetary gearset.

228. The powertrain of claim 227, wherein the clutch means comprises a first clutch interposed between the combination of the sun gear and ring gear of the first and second simple planetary gearsets and the sun gear of the third simple planetary gearset, and a second clutch interposed between the combination of the sun gear and ring gear of the first and second simple planetary gearsets and the planet carrier of the fourth simple planetary gearset.

229. The powertrain of claim 227, wherein the brake means comprises a first brake interposed between the ring gear of the first simple planetary gearset and the transmission housing, and a second brake interposed between the combination of the planet carrier and sun gear of the third and fourth simple planetary gearsets and the transmission housing.

230. The powertrain of claim 1, wherein said second simple planetary gearset is a single pinion planetary gearset, while the first, third, and fourth simple planetary gearsets are double pinion planetary gearsets.

231. The powertrain of claim 230, wherein the first operating element is a sun gear of the first simple planetary gearset;
the second operating element is a combination of a ring gear of the first simple planetary gearset and a sun gear of the second simple planetary gearset;
the third operating element is a combination of a planet carrier of the first simple planetary gearset and a planet carrier of the second simple planetary gearset; and
the fourth operating element is a ring gear of the second simple planetary gearset.

232. The powertrain of claim 230, wherein the fifth operating element is a combination of a sun gear of the third simple planetary gearset and a planet carrier of the fourth simple planetary gearset;
the sixth operating element is a combination of a ring gear of the third simple planetary gearset and a ring gear of the fourth simple planetary gearset;
the seventh operating element is a planet carrier of the third simple planetary gearset; and
the eighth operating element is a sun gear of the fourth simple planetary gearset.

233. The powertrain of claim 231, wherein the fifth operating element is a combination of a sun gear of the third simple planetary gearset and a planet carrier of the fourth simple planetary gearset;
the sixth operating element is a combination of a ring gear of the third simple planetary gearset and a ring gear of the fourth simple planetary gearset;
the seventh operating element is a planet carrier of the third simple planetary gearset; and
the eighth operating element is a sun gear of the fourth simple planetary gearset.

234. The powertrain of claim 233, wherein the clutch means comprises a first clutch interposed between the combination of the ring gear and sun gear of the first and second simple planetary gearsets and the combination of the sun gear and planet carrier of the third and fourth simple planetary gearsets, and a second clutch interposed between the combination of the ring gear and sun gear of the first and second simple planetary gearsets and the combination of the ring gears of the third and fourth simple planetary gearsets.

235. The powertrain of claim 233, wherein the brake means comprises a first brake interposed between the combination of the planet carriers of the first and second simple planetary gearsets and the transmission housing, and a second brake interposed between the sun gear of the fourth simple planetary gearset and the transmission housing.

236. The powertrain of claim 230, wherein the fifth operating element is a combination of a sun gear of the third simple planetary gearset and a sun gear of the fourth simple planetary gearset;
the sixth operating element is a ring gear of the fourth simple planetary gearset;
the seventh operating element is a combination of a ring gear of the third simple planetary gearset and a planet carrier of the fourth simple planetary gearset; and
the eighth operating element is a planet carrier of the third simple planetary gearset.

237. The powertrain of claim 231, wherein the fifth operating element is a combination of a sun gear of the third simple planetary gearset and a sun gear of the fourth simple planetary gearset;
the sixth operating element is a ring gear of the fourth simple planetary gearset;
the seventh operating element is a combination of a ring gear of the third simple planetary gearset and a planet carrier of the fourth simple planetary gearset; and
the eighth operating element is a planet carrier of the third simple planetary gearset.

238. The powertrain of claim 237, wherein the clutch means comprises a first clutch interposed between the combination of the ring gear and sun gear of the first and second simple planetary gearsets and the combination of the sun gears of the third and fourth simple planetary gearsets, and a second clutch interposed between the combination of the ring gear and sun gear of the first and second simple planetary gearsets and the ring gear of the fourth simple planetary gearset.

239. The powertrain of claim 237, wherein the brake means comprises a first brake interposed between the combination of the planet carriers of the first and second simple planetary gearsets and the transmission housing, and a second brake interposed between the planet carrier of the third simple planetary gearset and the transmission housing.

240. The powertrain of claim 230, wherein the fifth operating element is a combination of a sun gear of the third simple planetary gearset and a planet carrier of the fourth simple planetary gearset;
the sixth operating element is a ring gear of the fourth simple planetary gearset;
the seventh operating element is a ring gear of the third simple planetary gearset; and
the eighth operating element is a combination of a planet carrier of the third simple planetary gearset and a sun gear of the fourth simple planetary gearset.

241. The powertrain of claim 231, wherein the fifth operating element is a combination of a sun gear of the third simple planetary gearset and a planet carrier of the fourth simple planetary gearset;
the sixth operating element is a ring gear of the fourth simple planetary gearset;
the seventh operating element is a ring gear of the third simple planetary gearset; and
the eighth operating element is a combination of a planet carrier of the third simple planetary gearset and a sun gear of the fourth simple planetary gearset.

242. The powertrain of claim 241, wherein the clutch means comprises a first clutch interposed between the combination of the ring gear and sun gear of the first and second simple planetary gearsets and the combination of the sun gear and planet carrier of the third and fourth simple planetary gearsets, and a second clutch interposed between the combination of the ring gear and sun gear of the first and second simple planetary gearsets and the ring gear of the fourth simple planetary gearset.

243. The powertrain of claim 241, wherein the brake means comprises a first brake interposed between the combination of the planet carriers of the first and second simple planetary gearsets and the transmission housing, and a second brake interposed between the combination of the planet carrier and sun gear of the third and fourth simple planetary gearsets and the transmission housing.

244. The powertrain of claim 230, wherein the fifth operating element is a sun gear of the third simple planetary gearset;
the sixth operating element is a planet carrier of the fourth simple planetary gearset;

the seventh operating element is a combination of a ring gear of the third simple planetary gearset and a ring gear of the fourth simple planetary gearset; and the eighth operating element is a combination of a planet carrier of the third simple planetary gearset and a sun gear of the fourth simple planetary gearset.

245. The powertrain of claim 231, wherein the fifth operating element is a sun gear of the third simple planetary gearset;

the sixth operating element is a planet carrier of the fourth simple planetary gearset;

the seventh operating element is a combination of a ring gear of the third simple planetary gearset and a ring gear of the fourth simple planetary gearset; and the eighth operating element is a combination of a planet carrier of the third simple planetary gearset and a sun gear of the fourth simple planetary gearset.

246. The powertrain of claim 245, wherein the clutch means comprises a first clutch interposed between the combination of the ring gear and sun gear of the first and second simple planetary gearsets and the sun gear of the third simple planetary gearset, and a second clutch interposed between the combination of the ring gear and sun gear of the first and second simple planetary gearsets and the planet carrier of the fourth simple planetary gearset.

247. The powertrain of claim 245, wherein the brake means comprises a first brake interposed between the combination of the planet carriers of the first and second simple planetary gearsets and the transmission housing, and a second brake interposed between the combination of the planet carrier and sun gear of the third and fourth simple planetary gearsets and the transmission housing.

248. The powertrain of claim 1, wherein said third simple planetary gearset is a single pinion planetary gearset, while the first, second, and fourth simple planetary gearsets are double pinion planetary gearsets.

249. The powertrain of claim 248, wherein the first operating element is a combination of a sun gear of the first simple planetary gearset and a sun gear of the second simple planetary gearset;

the second operating element is a combination of a ring gear of the first simple planetary gearset and a ring gear of the second simple planetary gearset;

the third operating element is a planet carrier of the first simple planetary gearset; and the fourth operating element is a planet carrier of the second simple planetary gearset.

250. The powertrain of claim 248, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

251. The powertrain of claim 249, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

252. The powertrain of claim 251, wherein the clutch means comprises a first clutch interposed between the combination of the ring gears of the first and second simple planetary gearsets and the combination of the sun gear and planet carrier of the third and fourth simple planetary gearsets, and a second clutch interposed between the combination of the ring gears of the first and second simple planetary gearsets and the combination of the planet carrier and ring gear of the third and fourth simple planetary gearsets.

253. The powertrain of claim 251, wherein the brake means comprises a first brake interposed between the planet carrier of the first simple planetary gearset and the transmission housing, and a second brake interposed between the sun gear of the fourth simple planetary gearset and the transmission housing.

254. The powertrain of claim 248, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

255. The powertrain of claim 249, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

256. The powertrain of claim 255, wherein the clutch means comprises a first clutch interposed between the combination of the ring gears of the first and second simple planetary gearsets and the planet carrier of the fourth simple planetary gearset, and a second clutch interposed between the combination of the ring gears of the first and second simple planetary gearsets and the combination of the ring gears of the third and fourth simple planetary gearsets.

257. The powertrain of claim 255, wherein the brake means comprises a first brake interposed between the planet carrier of the first simple planetary gearset and the transmission housing, and a second brake interposed between the combination of the sun gears of the third and fourth simple planetary gearsets and the transmission housing.

258. The powertrain of claim 248, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

259. The powertrain of claim 249, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

260. The powertrain of claim 259, wherein the clutch means comprises a first clutch interposed between the combination of the ring gears of the first and second simple planetary gearsets and the sun gear of the fourth simple planetary gearset, and a second clutch interposed between the combination of the ring gears of the first and second simple planetary gearsets and the combination of the ring gears of the third and fourth simple planetary gearsets.

261. The powertrain of claim 259, wherein the brake means comprises a first brake interposed between the planet carrier of the first simple planetary gearset and the transmission housing, and a second brake interposed between the sun gear of the third simple planetary gearset and the transmission housing.

262. The powertrain of claim 248, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

263. The powertrain of claim 249, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

264. The powertrain of claim 263, wherein the clutch means comprises a first clutch interposed between the combination of the ring gears of the first and second simple planetary gearsets and the sun gear of the fourth simple planetary gearset, and a second clutch interposed between the combination of the ring gears of the first and second simple planetary gearsets and the ring gear of the third simple planetary gearset.

265. The powertrain of claim 263, wherein the brake means comprises a first brake interposed between the planet carrier of the first simple planetary gearset and the transmission housing, and a second brake interposed between the combination of the sun gear and planet carrier of the third and fourth simple planetary gearsets and the transmission housing.

266. The powertrain of claim 248, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

267. The powertrain of claim 250, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

268. The powertrain of claim 267, wherein the clutch means comprises a first clutch interposed between the combination of the ring gear and sun gear of the first and second simple planetary gearsets and the combination of the sun gear and planet carrier of the third and fourth simple planetary gearsets, and a second clutch interposed between the combination of the ring gear and sun gear of the first and second simple planetary gearsets and the combination of the planet carrier and ring gear of the third and fourth simple planetary gearsets.

269. The powertrain of claim 267, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

270. The powertrain of claim 248, wherein the fifth operating element is a combination of a sun gear of the third simple planetary gearset and a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a planet carrier of the fourth simple planetary gearset.

271. The powertrain of claim 266, wherein the fifth operating element is a combination of a sun gear of the third simple planetary gearset and a sun gear of the fourth simple planetary gearset;

the sixth operating element is a planet carrier of the third simple planetary gearset;

the seventh operating element is a combination of a ring gear of the third simple planetary gearset and a ring gear of the fourth simple planetary gearset; and the eighth operating element is a planet carrier of the fourth simple planetary gearset.

272. The powertrain of claim 271, wherein the clutch means comprises a first clutch interposed between the combination of the ring gear and sun gear of the first and second simple planetary gearsets and the combination of the sun gears of the third and fourth simple planetary gearsets, and a second clutch interposed between the combination of the ring gear and sun gear of the first and second simple planetary gearsets and the planet carrier of the third simple planetary gearset.

273. The powertrain of claim 271, wherein the brake means comprises a first brake interposed between the combination of the planet carrier and ring gear of the first and second simple planetary gearsets and the transmission housing, and a second brake interposed between the planet carrier of the fourth simple planetary gearset and the transmission housing.

274. The powertrain of claim 248, wherein the fifth operating element is a sun gear of the third simple planetary gearset;

the sixth operating element is a combination of a planet carrier of the third simple planetary gearset and a planet carrier of the fourth simple planetary gearset;

the seventh operating element is a combination of the ring gear of the third simple planetary gearset and a ring gear of the fourth simple planetary gearset; and the eighth operating element is a sun gear of the fourth simple planetary gearset.

275. The powertrain of claim 266, wherein the fifth operating element is a sun gear of the third simple planetary gearset;

the sixth operating element is a combination of a planet carrier of the third simple planetary gearset and a planet carrier of the fourth simple planetary gearset;

the seventh operating element is a combination of the ring gear of the third simple planetary gearset and a ring gear of the fourth simple planetary gearset; and the eighth operating element is a sun gear of the fourth simple planetary gearset.

276. The powertrain of claim 275, wherein the clutch means comprises a first clutch interposed between the combination of the ring gear and sun gear of the first and second simple planetary gearsets and the sun gear of the third simple planetary gearset, and a second clutch interposed between the combination of the ring gear and sun gear of the first and second simple planetary gearsets and the combination of the planet carriers of the third and fourth simple planetary gearsets.

277. The powertrain of claim 275, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

278. The powertrain of claim 266, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

279. The powertrain of claim 278, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the ring gear of the third simple planetary gearset.

280. The powertrain of claim 278, wherein the brake means comprises a first brake interposed between the combination of the planet carrier and ring gear of the first and second simple planetary gearsets and the transmission housing, and a second brake interposed between the combination of the sun gear and planet carrier of the third and fourth simple planetary gearsets and the transmission housing.

281. The powertrain of claim 248, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of a second simple planetary gearset.

282. The powertrain of claim 250, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of a second simple planetary gearset.

283. The powertrain of claim 282, wherein the clutch means comprises a first clutch interposed between the combination of the sun gear and ring gear of the first and second simple planetary gearsets and the combination of the sun gear and planet carrier of the third and fourth simple planetary gearsets, and a second clutch interposed between the combination of the sun gear and ring gear of the first and second simple planetary gearsets and the combination of the planet carrier and ring gear of the third and fourth simple planetary gearsets.

284. The powertrain of claim 282, wherein the brake means comprises a first brake interposed between the ring gear of the first simple planetary gearset and the transmission housing, and a second brake interposed between the sun gear of the fourth simple planetary gearset and the transmission housing.

285. The powertrain of claim 281, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

286. The powertrain of claim 285, wherein the clutch means comprises a first clutch interposed between the combination of the sun gear and ring gear of the first and second simple planetary gearsets and the planet carrier of the fourth simple planetary gearset, and a second clutch interposed between the combination of the sun gear and ring gear of the first and second simple planetary gearsets and the combination of the ring gears of the third and fourth simple planetary gearsets.

287. The powertrain of claim 285, wherein the brake means comprises a first brake interposed between the ring gear of the first simple planetary gearset and the transmission housing, and a second brake interposed between the combination of the sun gears of the third and fourth simple planetary gearsets and the transmission housing.

288. The powertrain of claim 281, wherein the fifth operating element is a sun gear of the fourth simple planetary gearset;
the sixth operating element is a combination of a ring gear of the third simple planetary gearset and a ring gear of the fourth simple planetary gearset;
the seventh operating element is a combination of a planet carrier of the third simple planetary gearset and a planet carrier of the fourth simple planetary gearset; and
the eighth operating element is a sun gear of the third simple planetary gearset.

289. The powertrain of claim 288, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the ring gears of the third and fourth simple planetary gearsets.

290. The powertrain of claim 288, wherein the brake means comprises a first brake interposed between the ring gear of the first simple planetary gearset and the transmission housing, and a second brake interposed between the sun gear of the third simple planetary gearset and the transmission housing.

291. The powertrain of claim 281, wherein the fifth operating element is a sun gear of the fourth simple planetary gearset;
the sixth operating element is a ring gear of the third simple planetary gearset;
the seventh operating element is a combination of a planet carrier of the third simple planetary gearset and a ring gear of the fourth simple planetary gearset; and
the eighth operating element is a combination of a sun gear of the third simple planetary gearset and a planet carrier of the fourth simple planetary gearset.

292. The powertrain of claim 291, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the ring gear of the third simple planetary gearset.

293. The powertrain of claim 291, wherein the brake means comprises a first brake interposed between the ring gear of the first simple planetary gearset and the transmission housing, and a second brake interposed between the combination of the sun gear and planet carrier of the third and fourth simple planetary gearsets and the transmission housing.

294. The powertrain of claim 1, wherein said fourth simple planetary gearset is a single pinion planetary gearset, while the first, second, and third simple planetary gearsets are double pinion planetary gearsets.

295. The powertrain of claim 294, wherein the first operating element is a combination of a sun gear of the first simple planetary gearset and a sun gear of the second simple planetary gearset;
the second operating element is a combination of a ring gear of the first simple planetary gearset and a ring gear of the second simple planetary gearset;
the third operating element is a planet carrier of the first simple planetary gearset; and
the fourth operating element is a planet carrier of the second simple planetary gearset.

296. The powertrain of claim 294, wherein the fifth operating element is a sun gear of the fourth simple planetary gearset;
the sixth operating element is a combination of a planet carrier of the third simple planetary gearset and a planet carrier of the fourth simple planetary gearset;
the seventh operating element is a combination of a ring gear of the third simple planetary gearset and a ring gear of the fourth simple planetary gearset; and
the eighth operating element is a sun gear of the third simple planetary gearset.

297. The powertrain of claim 295, wherein the fifth operating element is a sun gear of the fourth simple planetary gearset;
the sixth operating element is a combination of a planet carrier of the third simple planetary gearset and a planet carrier of the fourth simple planetary gearset;
the seventh operating element is a combination of a ring gear of the third simple planetary gearset and a ring gear of the fourth simple planetary gearset; and
the eighth operating element is a sun gear of the third simple planetary gearset.

298. The powertrain of claim 297, wherein the clutch means comprises a first clutch interposed between the combination of the ring gears of the first and second simple planetary gearsets and the sun gear of the fourth simple planetary gearset, and a second clutch interposed between the combination of the ring gears of the first and second simple planetary gearsets and the combination of the planet carriers of the third and fourth simple planetary gearsets.

299. The powertrain of claim 297, wherein the brake means comprises a first brake interposed between the planet carrier of the first simple planetary gearset and the transmission housing, and a second brake interposed between the sun gear of the third simple planetary gearset and the transmission housing.

300. The powertrain of claim 294, wherein the fifth operating element is a ring gear of the fourth simple planetary gearset;
the sixth operating element is a combination of a planet carrier of the third simple planetary gearset and a planet carrier of the fourth simple planetary gearset;
the seventh operating element is a ring gear of the third simple planetary gearset; and
the eighth operating element is a combination of a sun gear of the third simple planetary gearset and a sun gear of the fourth simple planetary gearset.

301. The powertrain of claim 295, wherein the fifth operating element is a ring gear of the fourth simple planetary gearset;
the sixth operating element is a combination of a planet carrier of the third simple planetary gearset and a planet carrier of the fourth simple planetary gearset,
the seventh operating element is a ring gear of the third simple planetary gearset; and
the eighth operating element is a combination of a sun gear of the third simple planetary gearset and a sun gear of the fourth simple planetary gearset.

302. The powertrain of claim 301, wherein the clutch means comprises a first clutch interposed between the combination of the ring gears of the first and second simple planetary gearsets and the ring gear of the fourth simple planetary gearset, and a second clutch interposed between the combination of the ring gears of the first and second simple planetary gearsets and the combination of the planet carriers of the third and fourth simple planetary gearsets.

303. The powertrain of claim 301, wherein the brake means comprises a first brake interposed between the planet carrier of the first simple planetary gearset and the transmission housing, and a second brake interposed between the combination of the sun gears of the third and fourth simple planetary gearsets and the transmission housing.

304. The powertrain of claim 294, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

305. The powertrain of claim 294, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

306. The powertrain of claim 304, wherein the fifth operating element is a sun gear of the third simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the fourth simple planetary gearset.

307. The powertrain of claim 306, wherein the clutch means comprises a first clutch interposed between the combination of the ring gear and sun gear of the first and second simple planetary gearsets and the sun gear of the third simple planetary gearset, and a second clutch interposed between the combination of the ring gear and sun gear of the first and second simple planetary gearsets and the combination of the ring gears of the third and fourth simple planetary gearsets.

308. The powertrain of claim 306, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

309. The powertrain of claim 294, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of the second simple planetary gearset.

310. The powertrain of claim 296, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of the second simple planetary gearset.

311. The powertrain of claim 310, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the planet carriers of the third and fourth simple planetary gearsets.

312. The powertrain of claim 310, wherein the brake means comprises a first brake interposed between the ring gear of the first simple planetary gearset and the transmission housing, and a second brake interposed between the sun gear of the third simple planetary gearset and the transmission housing.

313. The powertrain of claim 309, wherein the fifth operating element is a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a combination of a sun gear of the third simple planetary gearset and a sun gear of the fourth simple planetary gearset.

314. The powertrain of claim 313, wherein the clutch means comprises a first clutch interposed between the combination of the sun gear and ring gear of the first and second simple planetary gearsets and the ring gear of the fourth simple planetary gearset, and a second clutch interposed between the combination of the sun gear and ring gear of the first and second simple planetary gearsets and the combination of the planet carriers of the third and fourth simple planetary gearsets.

315. The powertrain of claim 313, wherein the brake means comprises a first brake interposed between the ring gear of the first simple planetary gearset and the transmission housing, and a second brake interposed between the combination of the sun gears of the third and fourth simple planetary gearsets and the transmission housing.

316. The powertrain of claim 1, wherein each of said third and fourth simple planetary gearsets is a single pinion planetary gearset, while the first and second simple planetary gearsets are double pinion planetary gearsets.

317. The powertrain of claim 316, wherein the first operating element is a combination of a sun gear of the first simple planetary gearset and a sun gear of the second simple planetary gearset;

the second operating element is a combination of a ring gear of the first simple planetary gearset and a ring gear of the second simple planetary gearset;

the third operating element is a planet carrier of the first simple planetary gearset; and the fourth operating element is a planet carrier of the second simple planetary gearset.

318. The powertrain of claim 316, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

319. The powertrain of claim 318, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

320. The powertrain of claim 319, wherein the clutch means comprises a first clutch interposed between the combination of the ring gears of the first and second simple planetary gearsets and the combination of the sun gear and ring gear of the third and fourth simple planetary gearsets, and a second clutch interposed between the combination of the ring gears of the first and second simple planetary gearsets and the combination of the planet carriers of the third and fourth simple planetary gearsets.

321. The powertrain of claim 319, wherein the brake means comprises a first brake interposed between the planet carrier of the first simple planetary gearset and the transmission housing, and a second brake interposed between the sun gear of the fourth simple planetary gearset and the transmission housing.

322. The powertrain of claim 316, wherein the fifth operating element is a ring gear of the fourth simple planetary gearset;

the sixth operating element is a combination of a ring gear of the third simple planetary gearset and a planet carrier of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

323. The powertrain of claim 317, wherein the fifth operating element is a ring gear of the fourth simple planetary gearset;

the sixth operating element is a combination of a ring gear of the third simple planetary gearset and a planet carrier of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

324. The powertrain of claim 323, wherein the clutch means comprises a first clutch interposed between the combination of the ring gears of the first and second simple planetary gearsets and the ring gear of the fourth simple planetary gearset, and a second clutch interposed between the combination of the ring gears of the first and second simple planetary gearsets and the combination of the ring gear and planet carrier of the third and fourth simple planetary gearsets.

325. The powertrain of claim 323, wherein the brake means comprises a first brake interposed between the planet carrier of the first simple planetary gearset and the transmission housing, and a second brake interposed between the combination of the sun gears of the third and fourth simple planetary gearsets and the transmission housing.

326. The powertrain of claim 316, wherein the fifth operating element is a sun gear of the fourth simple planetary gearset;

the sixth operating element is a combination of a ring gear of the third simple planetary gearset and a planet carrier of the fourth simple planetary gearset;

the seventh operating element is a combination of a planet carrier of the third simple planetary gearset and a ring gear of the fourth simple planetary gearset; and the eighth operating element is a sun gear of the third simple planetary gearset.

327. The powertrain of claim 317, wherein the fifth operating element is a sun gear of the fourth simple planetary gearset;

the sixth operating element is a combination of a ring gear of the third simple planetary gearset and a planet carrier of the fourth simple planetary gearset;

the seventh operating element is a combination of a planet carrier of the third simple planetary gearset and a ring gear of the fourth simple planetary gearset; and the eighth operating element is a sun gear of the third simple planetary gearset.

328. The powertrain of claim 327, wherein the clutch means comprises a first clutch interposed between the combination of the ring gears of the first and second simple planetary gearsets and the sun gear of the fourth simple planetary gearset, and a second clutch interposed between the combination of the ring gears of the first and second simple planetary gearsets and the combination of the ring gear and planet carrier of the third and fourth simple planetary gearsets.

329. The powertrain of claim 327, wherein the brake means comprises a first brake interposed between the planet carrier of the first simple planetary gearset and the transmission housing, and a second brake interposed between the sun gear of the third simple planetary gearset and the transmission housing.

330. The powertrain of claim 316, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

331. The powertrain of claim 318, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a ring gear of the second simple planetary gearset; and the fourth operating element is a planet carrier of the second simple planetary gearset.

332. The powertrain of claim 331, wherein the clutch means comprises a first clutch interposed between the combination of the ring gear and sun gear of the first and second simple planetary gearsets and the combination of the sun gear and ring gear of the third and fourth simple planetary gearsets, and a second clutch interposed between the combination of the ring gear and sun gear of the first and second simple planetary gearsets and the combination of the planet carriers of the third and fourth simple planetary gearsets.

333. The powertrain of claim 331, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

334. The powertrain of claim 316, wherein the fifth operating element is a sun gear of the third simple planetary gearset;

the sixth operating element is a combination of a planet carrier of the third simple planetary gearset and a ring gear of the fourth simple planetary gearset;

the seventh operating element is a combination of a ring gear of the third simple planetary gearset and a planet carrier of the fourth simple planetary gearset; and the eighth operating element is a sun gear of the fourth simple planetary gearset.

335. The powertrain of claim 330, wherein the fifth operating element is a sun gear of the third simple planetary gearset;

the sixth operating element is a combination of a planet carrier of the third simple planetary gearset and a ring gear of the fourth simple planetary gearset;

the seventh operating element is a combination of a ring gear of the third simple planetary gearset and a planet carrier of the fourth simple planetary gearset; and the eighth operating element is a sun gear of the fourth simple planetary gearset.

336. The powertrain of claim 335, wherein the clutch means comprises a first clutch interposed between the combination of the ring gear and sun gear of the first and second simple planetary gearsets and the sun gear of the third simple planetary gearset, and a second clutch interposed between the combination of the ring gear and sun gear of the first and second simple planetary gearsets and the combination of the planet carrier and ring gear of the third and fourth simple planetary gearsets.

337. The powertrain of claim 335, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

338. The powertrain of claim 316, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is combination of a planet carrier of the first simple planetary gearset and a planet carrier of the second simple planetary gearset.

339. The powertrain of claim 318, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is combination of a planet carrier of the first simple planetary gearset and a planet carrier of the second simple planetary gearset.

340. The powertrain of claim 339, wherein the clutch means comprises a first clutch interposed between the combination of the sun gear and ring gear of the first and second simple planetary gearsets and the combination of the sun gear and ring gear of the third and fourth simple planetary gearsets, and a second clutch interposed between the combination of the sun gear and ring gear of the first and second simple planetary gearsets and the combination of the planet carriers of the third and fourth simple planetary gearsets.

341. The powertrain of claim 339, wherein the brake means comprises a first brake interposed between the ring gear of the first simple planetary gearset and the transmission housing, and a second brake interposed between the sun gear of the fourth simple planetary gearset and the transmission housing.

342. The powertrain of claim 322, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of the second simple planetary gearset.

343. The powertrain of claim 342, wherein the clutch means comprises a first clutch interposed between the combination of the sun gear and ring gear of the first and second simple planetary gearsets and the ring gear of the fourth simple planetary gearset, and a second clutch interposed between the combination of the sun gear and ring gear of the first and second simple planetary gearsets and the combination of the ring gear and planet carrier of the third and fourth simple planetary gearsets.

344. The powertrain of claim 342, wherein the brake means comprises a first brake interposed between the ring gear of the first simple planetary gearset and the transmission housing, and a second brake interposed between the combination of the sun gears of the third and fourth simple planetary gearsets and the transmission housing.

345. The powertrain of claim 326, wherein the first operating element is a sun gear of the second simple planetary gearset;

the second operating element is a combination of a sun gear of the first simple planetary gearset and a ring gear of the second simple planetary gearset;

the third operating element is a ring gear of the first simple planetary gearset; and the fourth operating element is a combination of a planet carrier of the first simple planetary gearset and a planet carrier of the second simple planetary gearset.

346. The powertrain of claim 345, wherein the clutch means comprises a first clutch interposed between the combination of the sun gear and ring gear of the first and second simple planetary gearsets and the sun gear of the fourth simple planetary gearset, and a second clutch interposed between the combination of the sun gear and ring gear of the first and second simple planetary gearsets and the combination of the ring gear and planet carrier of the third and fourth simple planetary gearsets.

347. The powertrain of claim 345, wherein the brake means comprises a first brake interposed between the ring gear of the first simple planetary gearset and the transmission housing, and a second brake interposed between the sun gear of the third simple planetary gearset and the transmission housing.

348. The powertrain of claim 1, wherein each of said second and fourth simple planetary gearsets is a single pinion planetary gearset, while the first and third simple planetary gearsets are double pinion planetary gearsets.

349. The powertrain of claim 348, wherein the first operating element is a sun gear of the first simple planetary gearset;
the second operating element is a combination of a ring gear of the first simple planetary gearset and a sun gear of the second simple planetary gearset;
the third operating element is a combination of a planet carrier of the first simple planetary gearset and a planet carrier of the second simple planetary gearset; and
the fourth operating element is a ring gear of the second simple planetary gearset.

350. The powertrain of claim 348, wherein the fifth operating element is a sun gear of the fourth simple planetary gearset;
the sixth operating element is a combination of a planet carrier of the third simple planetary gearset and a planet carrier of the fourth simple planetary gearset;
the seventh operating element is a combination of a ring gear of the third simple planetary gearset and a ring gear of the fourth simple planetary gearset; and
the eighth operating element is a sun gear of the third simple planetary gearset.

351. The powertrain of claim 349, wherein the fifth operating element is a sun gear of the fourth simple planetary gearset;
the sixth operating element is a combination of a planet carrier of the third simple planetary gearset and a planet carrier of the fourth simple planetary gearset;
the seventh operating element is a combination of a ring gear of the third simple planetary gearset and a ring gear of the fourth simple planetary gearset; and
the eighth operating element is a sun gear of the third simple planetary gearset.

352. The powertrain of claim 351, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the combination of the planet carriers of the third and fourth simple planetary gearsets.

353. The powertrain of claim 351, wherein the brake means comprises a first brake interposed between the combination of the planet carriers of the first and second simple planetary gearsets and the transmission housing, and a second brake interposed between the sun gear of the third simple planetary gearset and the transmission housing.

354. The powertrain of claim 348, wherein the fifth operating element is a ring gear of the fourth simple planetary gearset;
the sixth operating element is a combination of a planet carrier of the third simple planetary gearset and a planet carrier of the fourth simple planetary gearset;
the seventh operating element is a ring gear of the third simple planetary gearset; and
the eighth operating element is a combination of a sun gear of the third simple planetary gearset and a sun gear of the fourth simple planetary gearset.

355. The powertrain of claim 349, wherein the fifth operating element is a ring gear of the fourth simple planetary gearset;
the sixth operating element is a combination of a planet carrier of the third simple planetary gearset and a planet carrier of the fourth simple planetary gearset;
the seventh operating element is a ring gear of the third simple planetary gearset; and
the eighth operating element is a combination of a sun gear of the third simple planetary gearset and a sun gear of the fourth simple planetary gearset.

356. The powertrain of claim 355, wherein the clutch means comprises a first clutch interposed between the combination of the ring gear and sun gear of the first and second simple planetary gearsets and the ring gear of the fourth simple planetary gearset, and a second clutch interposed between the combination of the ring gear and sun gear of the first and second simple planetary gearsets and the combination of the planet carriers of the third and fourth simple planetary gearsets.

357. The powertrain of claim 355, wherein the brake means comprises a first brake interposed between the combination of the planet carriers of the first and second simple planetary gearsets and the transmission housing, and a second brake interposed between the combination of the sun gears of the third and fourth simple planetary gearsets and the transmission housing.

358. The powertrain of claim 1, wherein each of said second and third simple planetary gearsets is a single pinion planetary gearset, while the first and fourth simple planetary gearsets are double pinion planetary gearsets.

359. The powertrain of claim 358, wherein the first operating element is a sun gear of the first simple planetary gearset;
the second operating element is a combination of a ring gear of the first simple planetary gearset and a sun gear of the second simple planetary gearset;
the third operating element is a combination of a planet carrier of the first simple planetary gearset and a planet carrier of the second simple planetary gearset; and
the fourth operating element is a ring gear of the second simple planetary gearset.

360. The powertrain of claim 358, wherein the fifth operating element is a combination of a sun gear of the third simple planetary gearset and a planet carrier of the fourth simple planetary gearset;
the sixth operating element is a combination of a planet carrier of the third simple planetary gearset and a ring gear of the fourth simple planetary gearset;
the seventh operating element is a ring gear of the third simple planetary gearset; and
the eighth operating element is a sun gear of the fourth simple planetary gearset.

361. The powertrain of claim 359, wherein the fifth operating element is a combination of a sun gear of the third simple planetary gearset and a planet carrier of the fourth simple planetary gearset;

the sixth operating element is a combination of a planet carrier of the third simple planetary gearset and a ring gear of the fourth simple planetary gearset;

the seventh operating element is a ring gear of the third simple planetary gearset; and the eighth operating element is a sun gear of the fourth simple planetary gearset.

362. The powertrain of claim 361, wherein the clutch means comprises a first clutch interposed between the combination of the ring gear and sun gear of the first and second simple planetary gearsets and the combination of the sun gear and planet carrier of the third and fourth simple planetary gearsets, and a second clutch interposed between the combination of the ring gear and sun gear of the first and second simple planetary gearsets and the combination of the planet carrier and ring gear of the third and fourth simple planetary gearsets.

363. The powertrain of claim 361, wherein the brake means comprises a first brake interposed between the combination of the planet carriers of the first and second simple planetary gearsets and the transmission housing, and a second brake interposed between the sun gear of the fourth simple planetary gearset and the transmission housing.

364. The powertrain of claim 358, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

365. The powertrain of claim 359, wherein the fifth operating element is a sun gear of the fourth simple planetary gearset;

the sixth operating element is a combination of a ring gear of the third simple planetary gearset and a ring gear of the fourth simple planetary gearset;

the seventh operating element is a combination of a planet carrier of the third simple planetary gearset and a planet carrier of the fourth simple planetary gearset; and the eighth operating element is a sun gear of the third simple planetary gearset.

366. The powertrain of claim 365, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the combination of the ring gears of the third and fourth simple planetary gearsets.

367. The powertrain of claim 365, wherein the brake means comprises a first brake interposed between the combination of the planet carriers of the first and second simple planetary gearsets and the transmission housing, and a second brake interposed between the sun gear of the third simple planetary gearset and the transmission housing.

368. The powertrain of claim 358, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

369. The powertrain of claim 359, wherein the fifth operating element is a planet carrier of the fourth simple planetary gearset;

the sixth operating element is a combination of a ring gear of the third simple planetary gearset and a ring gear of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

370. The powertrain of claim 369, wherein the clutch means comprises a first clutch interposed between the combination of the ring gear and sun gear of the first and second simple planetary gearsets and the planet carrier of the fourth simple planetary gearset, and a second clutch interposed between the combination of the ring gear and sun gear of the first and second simple planetary gearsets and the combination of the ring gears of the third and fourth simple planetary gearsets.

371. The powertrain of claim 369, wherein the brake means comprises a first brake interposed between the combination of the planet carriers of the first and second simple planetary gearsets and the transmission housing, and a second brake interposed between the combination of the sun gears of the third and fourth simple planetary gearsets and the transmission housing.

372. The powertrain of claim 358, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

373. The powertrain of claim 359, wherein the fifth operating element is a sun gear of the fourth simple planetary gearset;

the sixth operating element is a ring gear of the third simple planetary gearset;

the seventh operating element is a combination of a planet carrier of the third simple planetary gearset and a ring gear of the fourth simple planetary gearset; and the eighth operating element is a combination of a sun gear of the third simple planetary gearset and a planet carrier of the fourth simple planetary gearset.

374. The powertrain of claim 373, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the ring gear of the third simple planetary gearset.

375. The powertrain of claim 373, wherein the brake means comprises a first brake interposed between the combination of the planet carriers of the first and second simple planetary gearsets and the transmission housing, and a second brake interposed between the combination of the sun gear and planet carrier of the third and fourth simple planetary gearsets and the transmission housing.

376. The powertrain of claim 1, wherein each of said second, third, and fourth simple planetary gearsets is a single pinion planetary gearsets, while the first simple planetary gearset is a double pinion planetary gearset.

377. The powertrain of claim 376, wherein the first operating element is a sun gear of the first simple planetary gearset;

the second operating element is a combination of a ring gear of the first simple planetary gearset and a sun gear of the second simple planetary gearset;

the third operating element is a combination of a planet carrier of the first simple planetary gearset and a planet carrier of the second simple planetary gearset; and the fourth operating element is a ring gear of the second simple planetary gearset.

378. The powertrain of claim 376, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

379. The powertrain of claim 377, wherein the fifth operating element is a combination of a sun gear of the third simple planetary gearset and a ring gear of the fourth simple planetary gearset;

the sixth operating element is a combination of a planet carrier of the third simple planetary gearset and a planet carrier of the fourth simple planetary gearset;

the seventh operating element is a ring gear of the third simple planetary gearset; and the eighth operating element is a sun gear of the fourth simple planetary gearset.

380. The powertrain of claim 379, wherein the clutch means comprises a first clutch interposed between the combination of the ring gear and sun gear of the first and second simple planetary gearsets and the combination of the sun gear and ring gear of the third and fourth simple planetary gearsets, and a second clutch interposed between the combination of the ring gear and sun gear of the first and second simple planetary gearsets and the combination of the planet carriers of the third and fourth simple planetary gearsets.

381. The powertrain of claim 379, wherein the brake means comprises a first brake interposed between the combination of the planet carriers of the first and second simple planetary gearsets and the transmission housing, and a second brake interposed between the sun gear of the fourth simple planetary gearset and the transmission housing.

382. The powertrain of claim 376, wherein the fifth operating element is a ring gear of the fourth simple planetary gearset;

the sixth operating element is a combination of a ring gear of the third simple planetary gearset and a planet carrier of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

383. The powertrain of claim 377, wherein the fifth operating element is a ring gear of the fourth simple planetary gearset;

the sixth operating element is a combination of a ring gear of the third simple planetary gearset and a planet carrier of the fourth simple planetary gearset;

the seventh operating element is a planet carrier of the third simple planetary gearset; and the eighth operating element is a combination of a sun gear of the third simple planetary gearset and a sun gear of the fourth simple planetary gearset.

384. The powertrain of claim 383, wherein the clutch means comprises a first clutch interposed between the combination of the ring gear and sun gear of the first and second simple planetary gearsets and the ring gear of the fourth simple planetary gearset, and a second clutch interposed between the combination of the ring gear and sun gear of the first and second simple planetary gearsets and the combination of the ring gear and planet carrier of the third and fourth simple planetary gearsets.

385. The powertrain of claim 383, wherein the brake means comprises a first brake interposed between the combination of the planet carriers of the first and second simple planetary gearsets and the transmission housing, and a second brake interposed between the combination of the sun gears of the third and fourth simple planetary gearsets and the transmission housing.

386. The powertrain of claim 376, wherein the fifth operating element is a sun gear of the fourth simple planetary gearset;

the sixth operating element is a combination of a ring gear of the third simple planetary gearset and a planet carrier of the fourth simple planetary gearset;

the seventh operating element is a combination of a planet carrier of the third simple planetary gearset and a ring gear of the fourth simple planetary gearset; and the eighth operating element is a sun gear of the third simple planetary gearset.

387. The powertrain of claim 377, wherein the fifth operating element is a sun gear of the fourth simple planetary gearset;

the sixth operating element is a combination of a ring gear of the third simple planetary gearset and a planet carrier of the fourth simple planetary gearset;

the seventh operating element is a combination of a planet carrier of the third simple planetary gearset and a ring gear of the fourth simple planetary gearset; and the eighth operating element is a sun gear of the third simple planetary gearset.

388. The powertrain of claim 387, wherein the clutch means comprises a first clutch interposed between the combination of the ring gear and sun gear of the first and second simple planetary gearsets and the sun gear of the fourth simple planetary gearset, and a second clutch interposed between the combination of the ring gear and sun gear of the first and second simple planetary gearsets and the combination of the ring gear and planet carrier of the third and fourth simple planetary gearsets.

389. The powertrain of claim 387, wherein the brake means comprises a first brake interposed between the combination of the planet carriers of the first and second simple planetary gearsets and the transmission housing, and a second brake interposed between the sun gear of the third simple planetary gearset and the transmission housing.

390. A powertrain for a 5-speed automatic transmission comprising:

a first compound planetary gearset comprising first and second simple planetary gearsets having first, second, third, and fourth operating elements, said first operating element acting as an input element, said first and second simple planetary gearsets being single pinion planetary gearsets;

a second compound planetary gearset comprising third and fourth simple planetary gearsets having fifth, sixth, seventh, and eighth operating elements, said fifth operating element acting as an output element and being a combination of a sun gear of the third simple planetary gearset and a ring gear of the fourth planetary gearset, said sixth operating element being a combination of a planet carrier of the third simple planetary gearset and a planet carrier of the fourth simple planetary gearset, said fifth and sixth operating elements being variably connected to said second operating element, said seventh operating element being fixedly connected to the fourth operating element and said seventh operating element being a ring gear of the third simple planetary gearset, said eighth operating element being a sun gear of the fourth simple planetary gearset, and said third and fourth simple planetary gearsets being single pinion planetary gearsets;

clutch means for variably connecting said fifth and sixth operating elements to said second operating element; and brake means for selectively connecting said third and eighth operating elements to a transmission housing.

391. A powertrain for a 5-speed automatic transmission comprising:

a first compound planetary gearset comprising first and second simple planetary gearsets having first, second, third, and fourth operating elements, said first operating element acting as an input element and being a sun gear of the second simple planetary gearset, said second operating element being a combination of a sun gear of the first simple planetary gearset and a planet carrier of the second simple planetary gearset, said third operating element being a combination of a planet carrier of the first simple planetary gearset and a ring gear of the second simple planetary gearset, said fourth operating element being a ring gear of the first simple planetary gearset, and said first and second simple planetary gearsets being single pinion planetary gearsets;

a second compound planetary gearset comprising third and fourth simple planetary gearsets having fifth, sixth, seventh, and eighth operating elements, said fifth operating element acting as an output element and being a combination of a sun gear of the third simple planetary gearset and a ring gear of the fourth simple planetary gearset, said sixth operating element being a combination of a planet carrier of the third simple planetary gearset and a planet carrier of the fourth simple planetary gearset, said fifth and sixth operating elements being variably connected to said second operating element, said seventh operating element being a ring gear of the third simple planetary gearset and being fixedly connected to the fourth operating element, said eighth operating element being a sun gear of the fourth simple planetary gearset, and said third and fourth simple planetary gearsets being single pinion planetary gearsets;

clutch means for variably connecting said fifth and sixth operating elements to said second operating element; and brake means for selectively connecting said third and eighth operating elements to a transmission housing.

392. The powertrain of claim 391, wherein the clutch means comprises a first clutch interposed between the combination of the sun gear and the planet carrier of the first and second simple planetary gearsets and the combination of the sun gear and the ring gear of the third and fourth simple planetary gearsets, and a second clutch interposed between the combination of the sun gear and the planet carrier of the first and second simple planetary gearsets and the combination of the planet carriers of the third and fourth simple planetary gearsets.

393. The powertrain of claim 392, wherein the brake means comprises a first brake interposed between the combination of the planet carrier and ring gear of the first and second simple planetary gearsets and the transmission housing, and a second brake interposed between the sun gear of the fourth simple planetary gearset and the transmission housing.

* * * * *